(12) United States Patent
Nishioka et al.

(10) Patent No.: US 6,464,363 B1
(45) Date of Patent: Oct. 15, 2002

(54) VARIABLE MIRROR, OPTICAL APPARATUS AND DECENTERED OPTICAL SYSTEM WHICH INCLUDE VARIABLE MIRROR, VARIABLE-OPTICAL CHARACTERISTIC OPTICAL ELEMENT OR COMBINATION THEREOF

(75) Inventors: Kimihiko Nishioka, Hachioji; Kenji Murakami, Hino; Kazunari Tokuda; Kazuhito Hayakawa, both of Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/526,963

(22) Filed: Mar. 16, 2000

(30) Foreign Application Priority Data

| Mar. 17, 1999 | (JP) | 11-072557 |
| Apr. 13, 1999 | (JP) | 11-105538 |
| Jan. 18, 2000 | (JP) | 2000-009142 |
| Jan. 25, 2000 | (JP) | 2000-015960 |

(51) Int. Cl.$^7$ .................. G02B 7/182; G02B 5/08
(52) U.S. Cl. .................. 359/846; 359/224; 359/859; 359/834
(58) Field of Search .................. 359/846, 847, 359/848, 849, 223, 224, 857, 858, 859, 868, 869

(56) References Cited

U.S. PATENT DOCUMENTS

| 3,972,600 A | * | 8/1976 | Cobarg |
| 4,420,222 A | * | 12/1983 | Bret et al. ............ 359/846 |
| 5,291,337 A | * | 3/1994 | Greger et al. ............ 359/846 |
| 6,021,004 A | * | 2/2000 | Sekita et al. ............ 359/676 |

FOREIGN PATENT DOCUMENTS

| JP | 5-157903 | 6/1993 |
| JP | A-11-64817 | 3/1998 |

\* cited by examiner

Primary Examiner—Mark A Robinson
(74) Attorney, Agent, or Firm—Pillsbury Winthrop LLP

(57) ABSTRACT

A variable mirror that is readily formable and can be readily and precisely changed into various configurations as desired is provided. The variable mirror includes a mirror body formed of an elastic or flexible material and having one surface functioning as a reflecting surface. The mirror body is capable of changing the reflecting surface configuration. The rigidity of the mirror body varies in a direction parallel to the one surface.

20 Claims, 54 Drawing Sheets

FIG. 80 (A) (PRIOR ART)
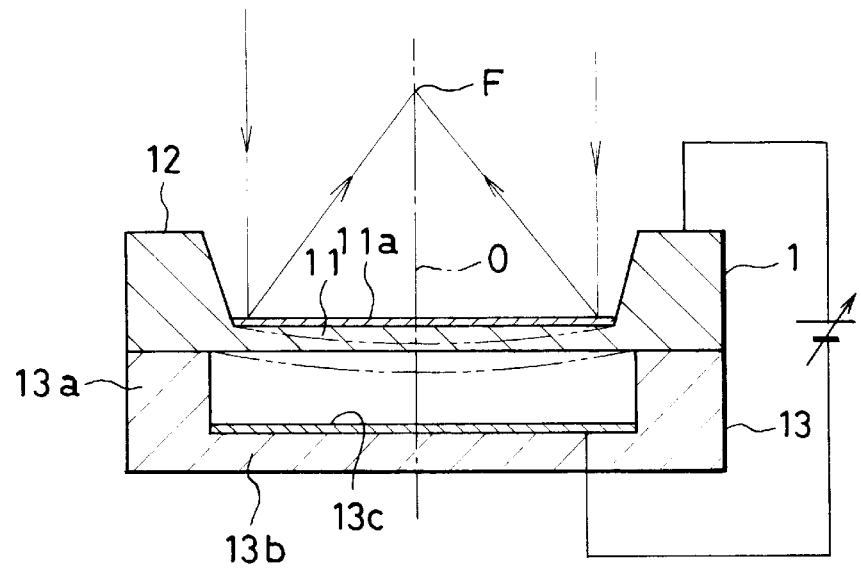
FIG. 80 (B) (PRIOR ART)
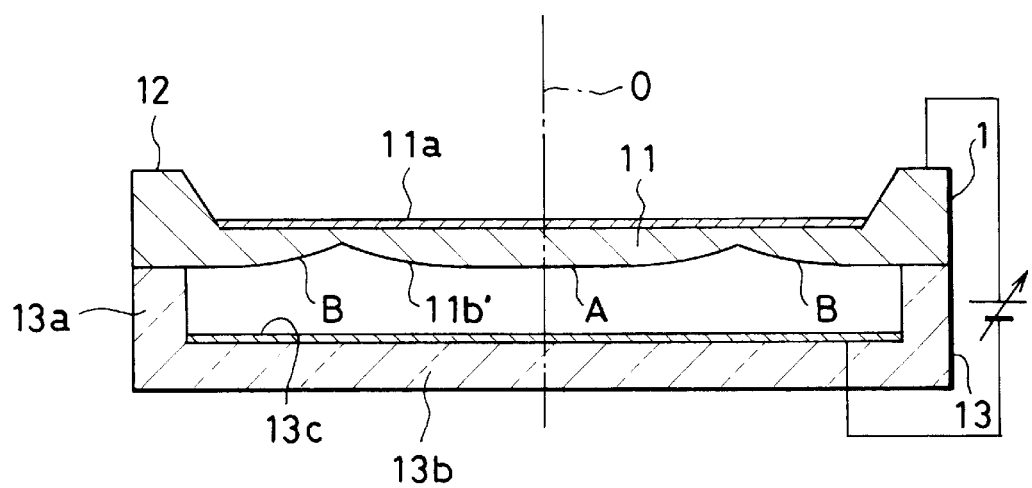

VARIABLE MIRROR, OPTICAL APPARATUS AND DECENTERED OPTICAL SYSTEM WHICH INCLUDE VARIABLE MIRROR, VARIABLE-OPTICAL CHARACTERISTIC OPTICAL ELEMENT OR COMBINATION THEREOF

BACKGROUND OF THE INVENTION

The present invention relates to a variable mirror capable of varying the configuration of a reflecting mirror to change the reflecting direction of light.

Another invention in the present invention relates to an optical apparatus including a variable-optical-characteristic optical element, a variable-optical-characteristic mirror, or a combination thereof.

Still another invention in the present invention relates to an optical system using the above-described variable mirror, etc. More particularly, the invention relates to an optical system capable of focusing, etc. for a camera, a video camera, a digital camera, a finder, a viewing optical system, an image display device, and so forth.

This type of variable mirror is widely known, for example, from Japanese Patent Application Unexamined Publication (KOKAI) No. 5-157903. A variable mirror described in this publication is produced in a very small size by making use of a semiconductor manufacturing technique with a view to using the variable mirror in a micromachine. The variable mirror has a mirror body formed from a sheet 1 of single crystal silicon. As shown in part (A) of FIG. 80, the sheet 1 includes a thin inner portion 11 and a thick outer peripheral frame portion 12 surrounding the inner portion 11. The sheet 1 is supported at the outer peripheral frame portion 12 by a thick outer peripheral frame portion 13a of a glass substrate 13, which is a support member. The glass substrate 13 has a thin inner portion 13b surrounded by the outer peripheral frame portion 13a. A space is created between the inner portion 13b of the glass substrate 13 and the inner portion 11 of the sheet 1. An electrode film 13c is formed on the upper surface of the inner portion 13b of the glass substrate 13.

An upper surface 11a of the inner portion 11 of the sheet 1 is a flat mirror-finished surface, and a lower surface 11b thereof is a flat finished surface, although it is not a mirror surface.

In the conventional variable mirror arranged as stated above, when a voltage is applied between the sheet 1 and the electrode film 13c, electrostatic attraction occurs therebetween, causing the inner portion 11 of the sheet 1 to curve so as to be convex toward the electrode film 13c. Consequently, the upper surface 11a forms a concave mirror. The degree of curvature of the inner portion 11 can be changed according to the magnitude of the above-described voltage. Accordingly, by changing the magnitude of the voltage, the position of the focus F of the concave mirror, which is formed by the upper surface 11a, can be moved along an optical axis 0 of the concave mirror.

However, the conventional variable mirror, in which the inner portion 11 is formed with a uniform thickness as stated above, suffers from the problem that the curved inner portion 11 is a biquadratic surface and therefore the concave mirror of the upper surface 11a produces unfavorably large aberrations.

To solve the problem, Japanese Patent Application Unexamined Publication (KOKAI) No. 5-157903 proposes an arrangement such as that shown in part (B) of FIG. 80. In this arrangement, the lower surface 11b' of the inner portion 11 of the sheet 1 is not flat but formed from a plurality of curved surfaces. More specifically, the lower surface 11b' is constructed by forming different curved surfaces concentrically. The central portion of the lower surface 11b' is formed from a paraboloid A. A peripheral portion surrounding the central portion of the lower surface 11b' is formed from a cubic surface B. Because the lower surface 11b' is formed by combining together a plurality of curved surfaces, when the inner portion 11 is curved by electrostatic attraction as stated above, the upper surface 11a becomes a concave mirror formed from a paraboloid (quadratic surface). Accordingly, large aberrations are not produced.

The configuration of the lower surface 11b' shown in part (B) of FIG. 80 is determined by a mathematical expression. The lower surface 11b' is formed by laser-assisted etching. However, as the external size of the variable mirror decreases, it becomes more difficult to form the lower surface 11b' into such a complicated configuration with high accuracy [particularly within $\lambda$ (wavelength of light)/n (n is generally a value of about 10), which is optical tolerances required]. In addition, it is desired to allow the mirror surface to be changed into even more various configurations other than the paraboloid (quadratic surface), as desired, so that the mirror surface can be applied to various optical systems.

Moreover, large electric power is needed to increase the degree of curvature of the inner portion 11 in the above-described conventional variable mirror, in which the inner portion 11 of the sheet 1 is curved so as to be convex toward the electrode film 13c by utilizing electrostatic attraction, thereby forming the upper surface 11a into a concave mirror.

Conventionally, a digital camera is built by assembling together components as shown in FIG. 81, i.e. a plastic lens PL, a diaphragm D, a focusing solenoid FS, a shutter S, a charge-coupled solid-state image pickup device (CCD), a signal processing circuit PC, and a memory M.

Incidentally, the image-forming performance of plastic lenses generally degrades with changes in temperature because the refractive index and configuration thereof change with changes in temperature and humidity. Therefore, glass lenses are mostly used. For this reason, there are limits to the achievement of a reduction in weight, increase in accuracy and reduction in cost of products.

There has heretofore been known a prism optical system formed by combining a free-form surface and a prism with an optical system of a digital camera or the like as disclosed, for example, in Japanese Patent Application Unexamined Publication (KOKAI) Nos. 9-211330 and 9-211331. In these prior art references, however, no mention is made of a method of focusing for each object position.

Focusing of such a prism optical system is mentioned in part in Japanese Patent Application Unexamined Publication (KOKAI) No. 10-68886. However, what is mentioned therein is a focusing mechanism in which focusing is performed by moving a prism or an image plane along an optical axis as in the case of a coaxial system.

Meanwhile, there has heretofore been an adaptive optics technique in which the disturbance of the wavefront caused by atmospheric fluctuation is corrected by inserting a variable mirror in an optical system of a telescope [e.g. "Applied Physics", Vol. 61, No. 6 (1992), pp. 608–611].

Regarding a focusing system for focusing or diopter adjustment in a reflecting optical system using a rotationally asymmetric surface, because the optical system is a decentered optical system using a rotationally asymmetric surface, if focusing is effected with a lens frame-rotating mechanism similar to that used for a coaxial system, when the rotationally asymmetric optical system rotates together with the lens frame, the image also rotates undesirably. To prevent this, it is necessary to change the distance to the image plane without rotating the rotationally asymmetric optical system. The scheme for preventing the rotation of the image causes the number of components to increase and results in an increase in size of the apparatus, unfavorably.

In the case of aiming principally at mass-production of the decentered reflecting optical system using a rotationally asymmetric surface, it is common practice to employ a technique of production by molding. In the production by molding, however, significant errors are introduced into optical parts produced, causing the optical performance to be degraded.

Although the following matter is not limitative to the decentered reflecting optical system using a rotationally asymmetric surface, the refractive index and configuration of optical parts generally change according to environmental conditions, e.g. temperature and humidity, causing the optical performance to be degraded.

In a zoom optical system, it is impossible to actively change the condition of aberration that varies with the change of the zoomed condition.

SUMMARY OF THE INVENTION

In view of the above-described problems with the prior art, an object of the present invention is to provide a variable mirror that is readily formable so that even when the external size thereof decreases, the variable mirror can be readily changed into various configurations as desired.

Another object of the present invention is to provide a variable mirror capable of obtaining a desired degree of curvature with small electric power even when it is produced with such a small external size that the variable mirror can be used in a micromachine.

Still another object of the present invention is to provide various optical apparatus capable of compensating for a change in image-forming performance or various other optical performance caused by a change in temperature or humidity, e.g. a digital camera, a video endoscope, a portable data terminal (PDA), a video telephone, a VTR camera, a television camera, a film camera, a microscope, a laser scanning microscope, a bar code scanner, a bar code reader, and a pick-up for optical discs.

A further object of the present invention is to provide, in a decentered reflecting optical system using a rotationally asymmetric surface, a compact and readily implementable focusing system for focusing or diopter adjustment, a system for reducing optical performance degradation caused by manufacturing errors or changes in environmental conditions, e.g. temperature and humidity, a system for correcting aberration associated with zooming, and a hand-shake correcting system.

To attain the above-described first object of the present invention, a variable mirror according to a first invention in the present invention is a variable mirror having a mirror body formed of an elastic or flexible material and having one surface functioning as a reflecting surface. The mirror body is capable of changing the reflecting surface configuration. The variable mirror is characterized in that the rigidity of the mirror body varies in a direction parallel to the one surface.

A desired curved surface configuration of the reflecting surface configuration of the mirror body is determined by the set of curvatures at arbitrary points on the reflecting surface configuration. The curvature at each arbitrary point is determined by a combination of a load applied to the arbitrary point and the rigidity.

Therefore, the above-described variable mirror according to the first invention is a variable mirror having a mirror body formed of an elastic or flexible material and having one surface functioning as a reflecting surface. The mirror body is capable of changing the reflecting surface configuration. The rigidity of the mirror body is varied in a direction parallel to the one surface, thereby allowing the reflecting surface configuration of the mirror body to be readily changed to a desired curved surface configuration. The mirror body itself is also readily formable. The variation in rigidity need not be continuous as in the variation in thickness in the above-described prior art but may be varied stepwisely at arbitrary points. Therefore, formation of the mirror body is facilitated.

To attain the above-described object of the first invention, the variable mirror according to the invention may be arranged such that the other surface of the mirror body, which is reverse to the one surface, is formed from a plurality of flat portions of different thicknesses, whereby the rigidity of the mirror body varies in a direction parallel to the one surface.

A difference in thickness produces a difference in rigidity, and a difference in area also produces a difference in rigidity. Accordingly, by forming the other surface, which is reverse to the one surface, from a plurality of flat portions of different thicknesses (i.e. portions different in rigidity from each other), the reflecting surface configuration of the mirror body can be readily changed to a desired curved surface configuration, and the mirror body itself can also be readily formed. The variation in thickness or the variation in area (i.e. the variation in rigidity) need not be continuous as in the variation in thickness in the above-described prior art but may be varied stepwisely at arbitrary points. Therefore, formation of the mirror body is facilitated. Thus, in the case of varying the thickness also, a difference in rigidity can be produced by making the portions of the same thickness vary in area from each other.

To attain the above-described object of the first invention, the variable mirror according to the invention may be arranged such that the material of the mirror body varies in a direction parallel to the one surface thereof, whereby the rigidity of the mirror body varies in a direction parallel to the one surface.

A difference in material produces a difference in rigidity. Accordingly, by varying the material of the mirror body (i.e. the rigidity thereof) in a direction parallel to the one surface as stated above, the reflecting surface configuration of the mirror body can be readily changed to a desired curved surface configuration, and the mirror body itself can also be readily formed. The variation in material (i.e. the variation in rigidity) need not be continuous as in the variation in thickness in the above-described prior art but may be varied stepwisely at arbitrary points. Therefore, formation of the mirror body is facilitated. Thus, in the case of varying the material also, a difference in rigidity can be produced by making the portions of the same material vary in area from each other.

To attain the above-described second object of this invention, a variable mirror according to a second invention in the present invention is a variable mirror capable of changing the configuration of a reflecting surface. The variable mirror is characterized by including: a mirror body having a light-reflecting surface for reflecting light; a support member for supporting a part of the mirror body; and a driving force transmitting means provided to project from the mirror body so as to transmit input driving force for changing the configuration of the reflecting surface to the mirror body.

In the variable mirror according to the second invention, which is characterized by being arranged as stated above, the driving force transmitting means is capable of increasing even such small driving force as electrostatic attraction by accumulating it. The magnitude of driving force to be accumulated can be freely preset independently of the size of the mirror body. A place where the driving force increased as stated above is made to act on the mirror body can be determined to be any desired place irrespective of the external shape of the mirror body. Even when the variable mirror according to the second invention is produced with such a small external size that the variable mirror can be used in a micromachine, a desired degree of curvature can be readily obtained with small electric power.

In the variable mirror according to the second invention, which is characterized by being arranged as stated above, it is preferable for the driving force transmitting means to have a driving force receiving member extending along the reflecting surface of the mirror body at a position away from the mirror body on a side thereof reverse to the reflecting surface so that the above-described driving force is input to the driving force receiving member.

Such a driving force receiving member can be prepared easily, and the magnitude of driving force to be accumulated in the driving force transmitting means can be readily set at will by changing the plane area of the driving force receiving member.

In the variable mirror according to the second invention, which is characterized by being arranged as stated above, it is preferable that the side of the mirror body that is reverse to the reflecting surface be formed with grooves in a predetermined pattern for changing the reflecting surface of the mirror body into a desired configuration when the driving force is transmitted to the mirror body by the driving force transmitting means.

Such grooves can be prepared easily. Accordingly, it is possible to readily set the arrangement so that when the driving force is transmitted to the mirror body by the driving force transmitting means, the reflecting surface of the mirror body can be changed into a desired configuration. The predetermined pattern includes the size, shape and overall arrangement of grooves.

To attain the above-described third object, an optical apparatus according to a third invention in the present invention comprises a variable-optical-characteristic optical element.

The optical apparatus according to the third invention also comprises a variable-optical-characteristic mirror.

According to the third invention, the variable-optical-characteristic mirror comprises a combination of a variable-optical-characteristic lens and a mirror.

A decentered optical system according to a fourth invention in the present invention, which is provided to attain the above-described fourth object of the present invention, is a decentered optical system having at least one reflecting surface with a rotationally asymmetric surface configuration. The decentered optical system is characterized by including an active reflecting optical element capable of changing the direction of reflection for each position in the reflecting surface.

In this case, it is desirable for the active reflecting optical element to constitute at least one reflecting surface of the decentered optical system.

Examples of active reflecting optical elements include a variable-configuration mirror capable of changing the surface configuration and a variable-refractive-index mirror capable of freely changing the refractive index of an optical medium adjacent to the entrance side of the reflecting surface.

It is desirable that the mirror surface of the active reflecting optical element have a rotationally asymmetric surface configuration for correcting rotationally asymmetric aberrations produced by the mirror surface. The mirror surface of the active reflecting optical element may have a rotationally symmetric surface configuration. However, it is preferable from the viewpoint of aberration correction that the mirror surface have a rotationally asymmetric surface configuration for the purpose of correcting rotationally asymmetric aberrations produced by the mirror surface because the entrance rays are in decentered positional relation to the mirror.

Because the fourth invention includes an active reflecting optical element capable of changing the direction of reflection for each position in the reflecting surface, it is possible to perform, with a simple arrangement, focus adjustment and diopter adjustment of a decentered reflecting optical system, correction of aberration variations caused by zooming, compensation for variations in optical performance caused by changes in temperature and humidity, compensation for manufacturing errors of optical elements, hand-shake correction, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

Part (A) of FIG. 1 is a schematic vertical sectional view of a variable mirror according to a first embodiment of a first invention; and part (B) of FIG. 1 is a schematic bottom view of a mirror body of the variable mirror shown in part (A).

Parts (A) to (G) of FIG. 2 are schematic vertical sectional views showing a plurality of steps of a method of producing a variable mirror according to the first embodiment of this invention.

Figure 3:
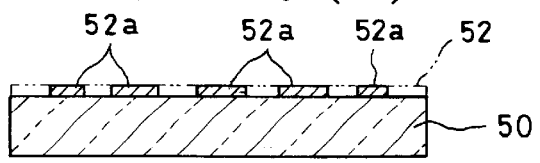
Figure 3:
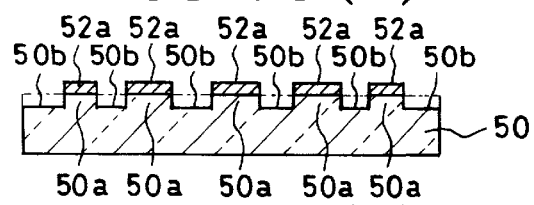
Figure 3:
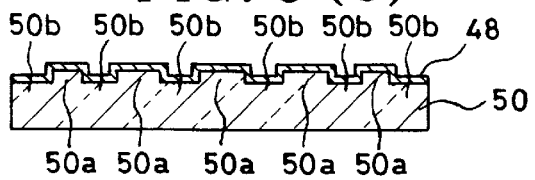
Figure 3:
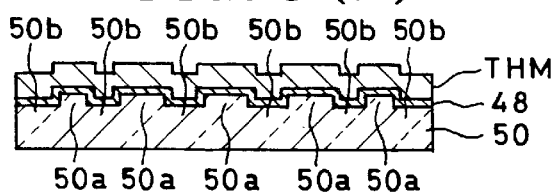
Figure 3:
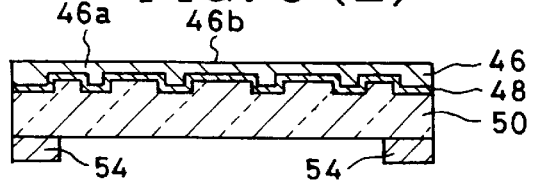
Figure 3:
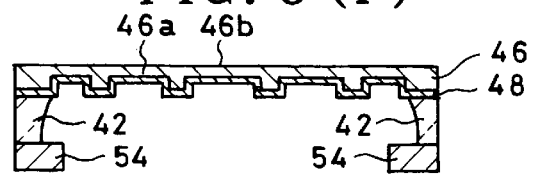
Figure 3:
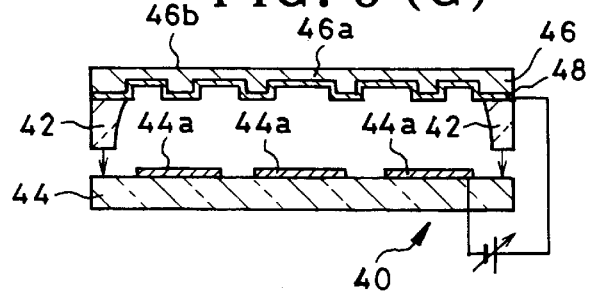

Parts (A) to (G) of FIG. 3 are schematic vertical sectional views showing a plurality of steps of a method of producing a variable mirror according to a second embodiment of this invention.

Figure 4:
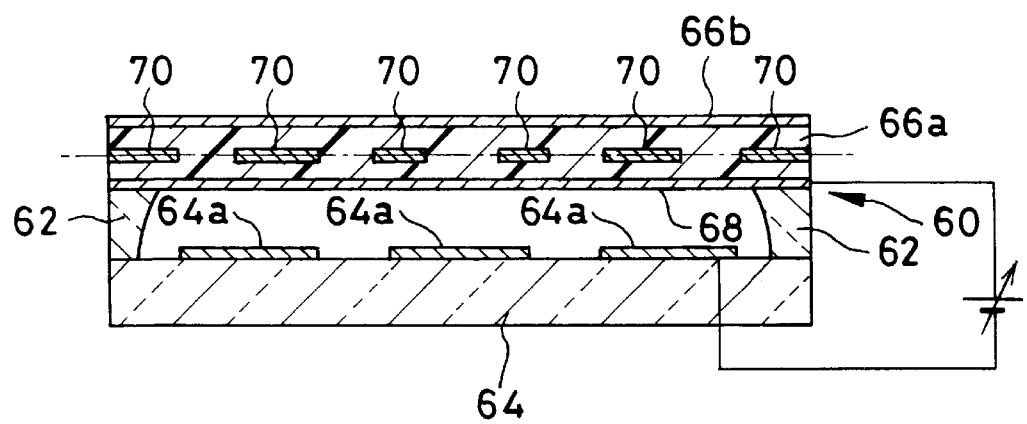

FIG. 4 is a schematic vertical sectional view of a variable mirror according to a third embodiment of this invention.

Figure 5:
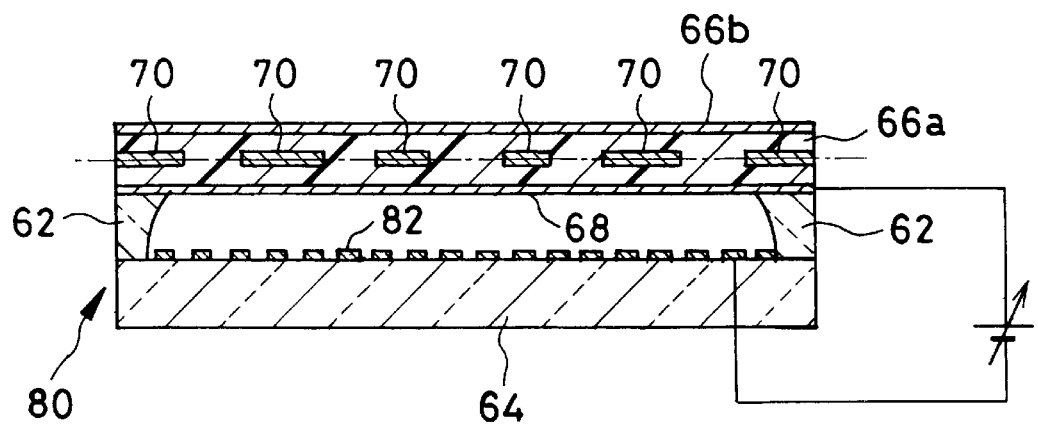

FIG. 5 is a schematic vertical sectional view of a variable mirror according to a fourth embodiment of this invention.

Figure 6:
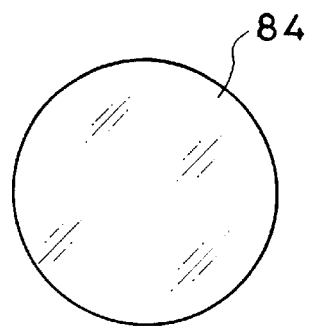
Figure 6:
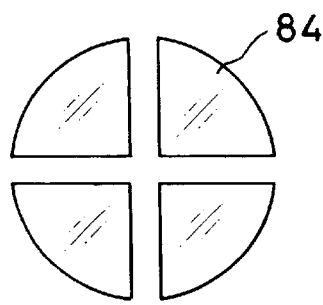
Figure 6:
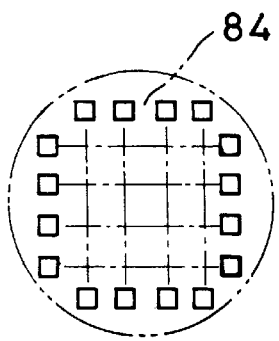
Figure 6:
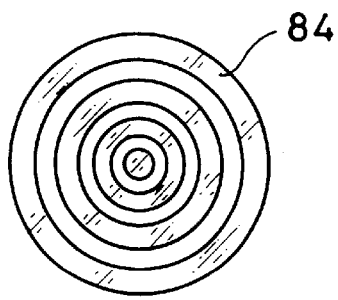

Parts (A) to (D) of FIG. 6 are plan views schematically showing various configurations of a ferromagnetic film in the variable mirror according to the fourth embodiment shown in FIG. 5.

Figure 7:
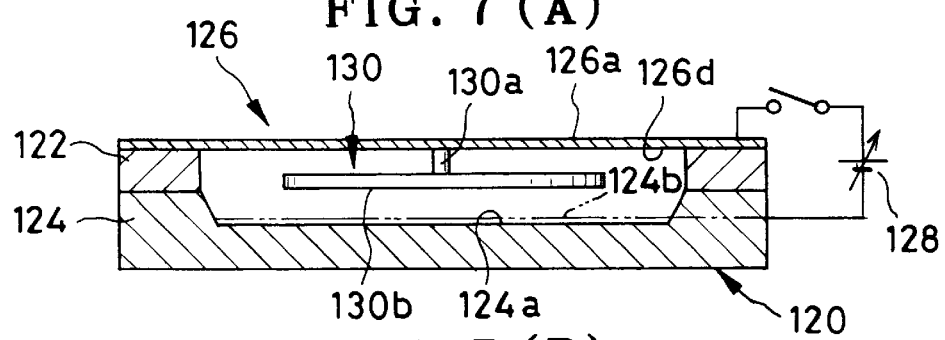
Figure 7:
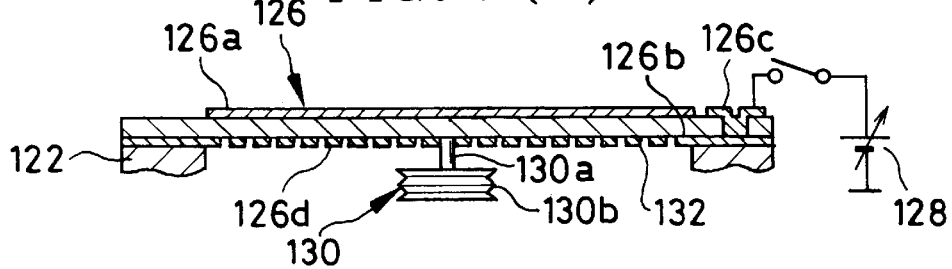
Figure 7:
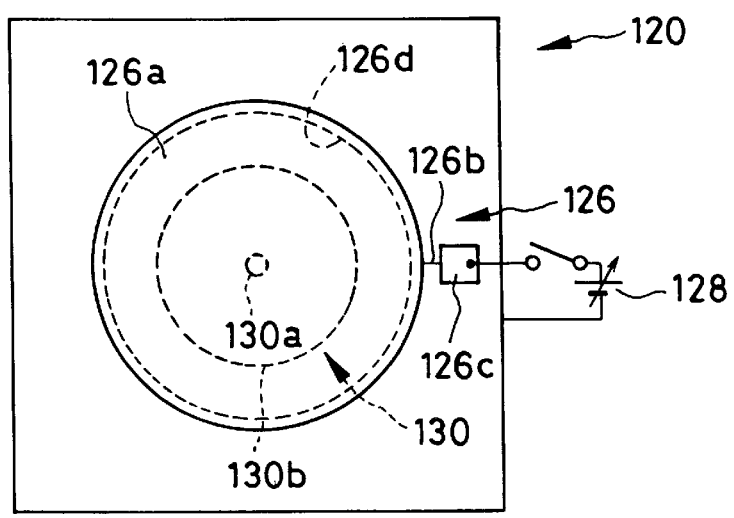

Part (A) of FIG. 7 is a vertical sectional view schematically showing a variable mirror according to a first embodiment of a second invention in a stationary state; part (B) of FIG. 7 is an enlarged vertical sectional view of a mirror body of the variable mirror shown in part (A); and part (C) of FIG. 7 is a schematic plan view of the variable mirror shown in part (A).

Figure 8:
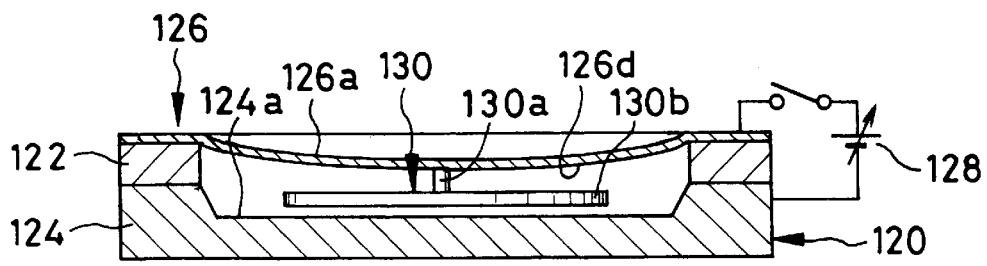

FIG. 8 is a vertical sectional view showing the variable mirror in part (A) of FIG. 7 in an operative state.

Figure 9:
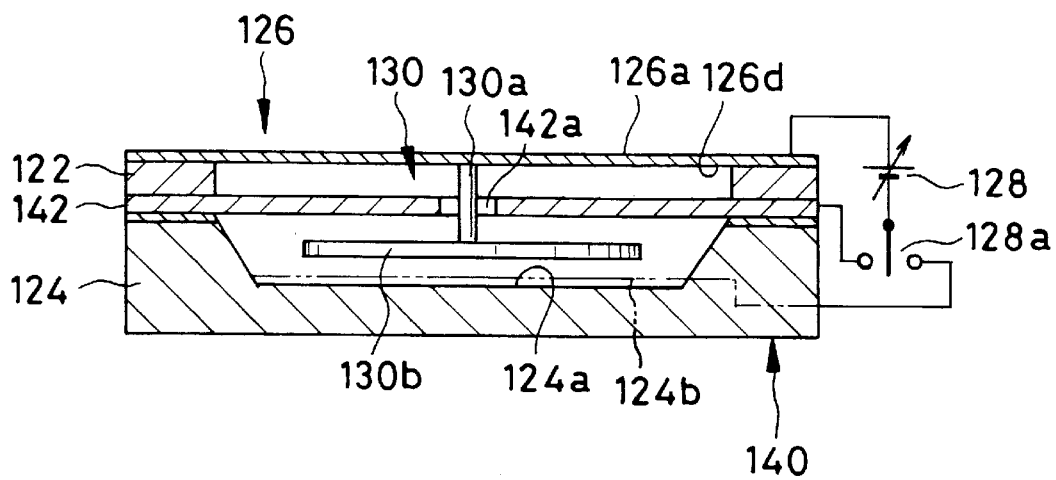

FIG. 9 is a vertical sectional view schematically showing a variable mirror according to a second embodiment of this invention in a stationary state.

Figure 10:
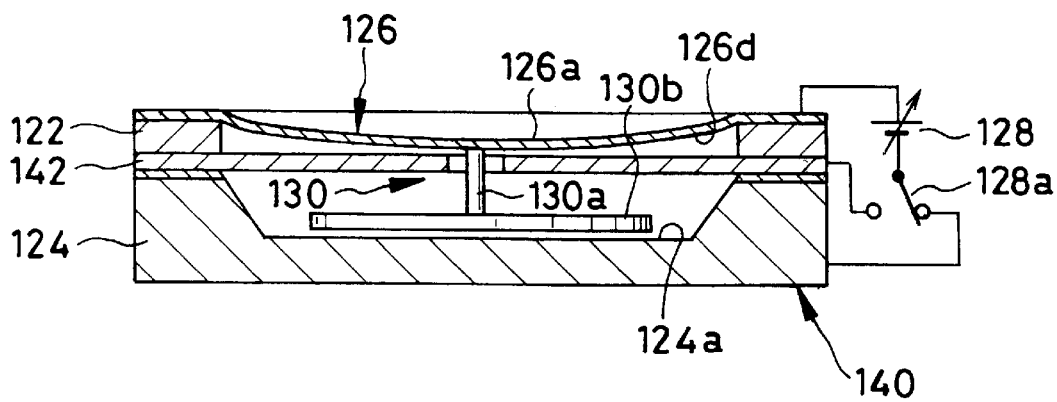
Figure 10:
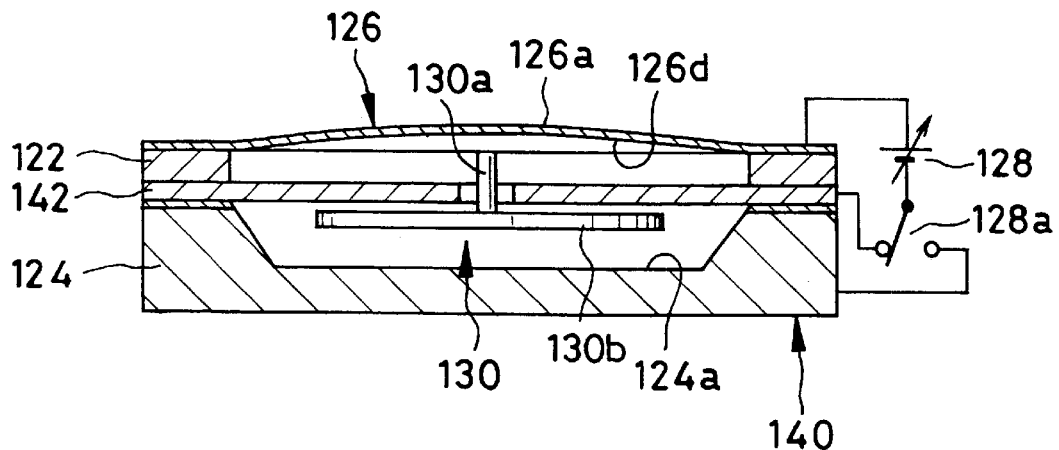

Part (A) of FIG. 10 is a vertical sectional view showing the variable mirror in FIG. 9 in a first operative state; and part (B) of FIG. 10 is a vertical sectional view showing the variable mirror in FIG. 9 in a second operative state.

Figure 11:
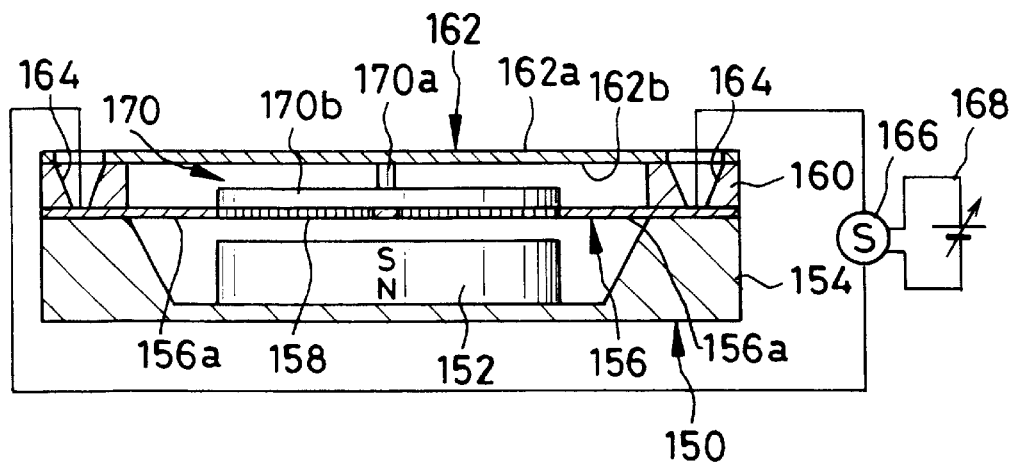
Figure 11:
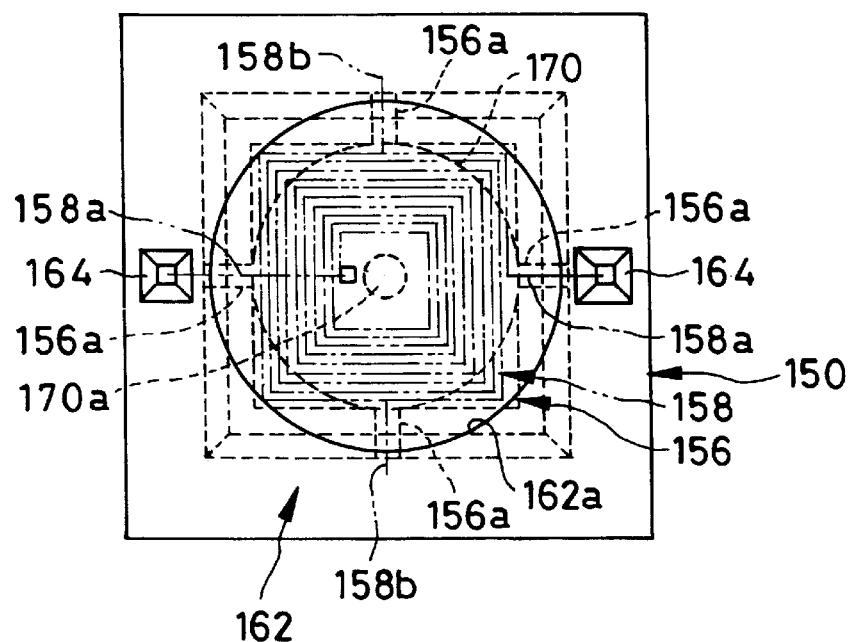
Figure 11:
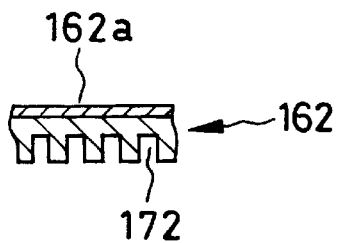

Part (A) of FIG. 11 is vertical sectional view schematically showing a variable mirror according to a third embodiment of this invention in a stationary state; part (B) of FIG. 11 is a schematic plan view of the variable mirror shown in part (A); and part (C) of FIG. 11 is an enlarged vertical sectional view of a mirror body of the variable mirror shown in part (A).

Figure 12:
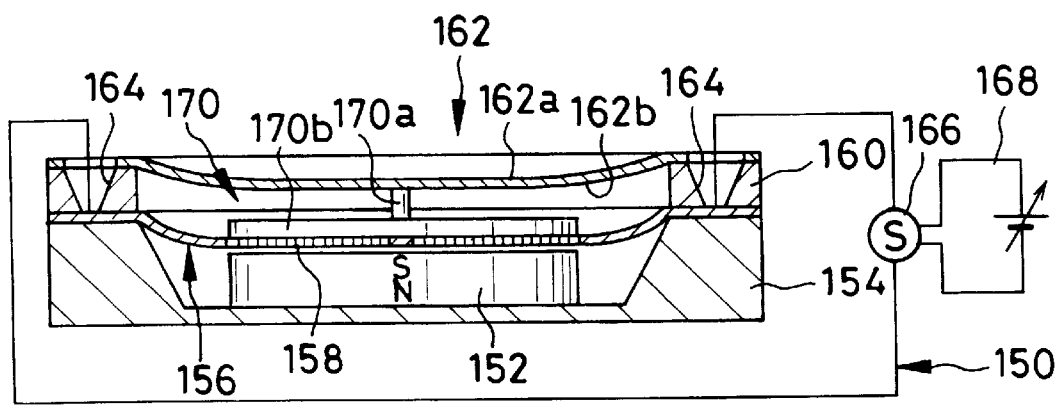
Figure 12:
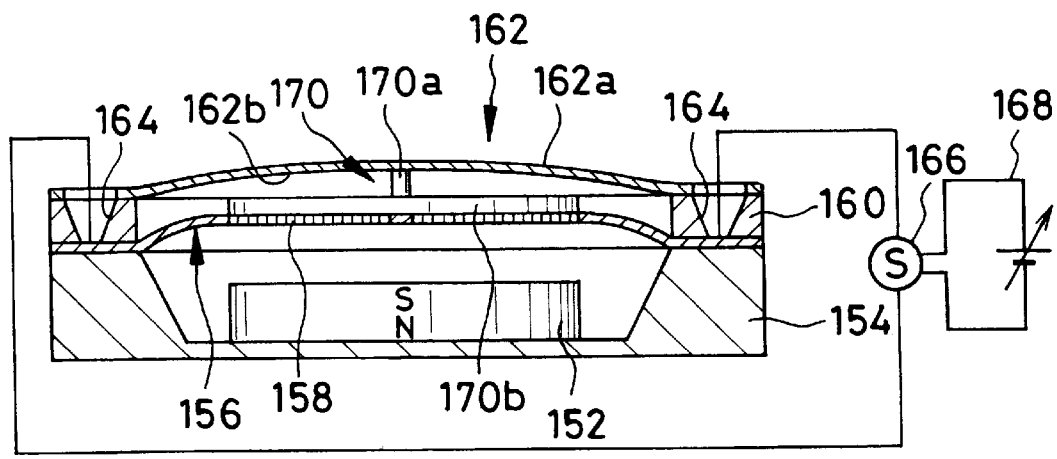

Part (A) of FIG. 12 is a vertical sectional view schematically showing the variable mirror in part (A) of FIG. 11 in a first operative state; and part (B) of FIG. 12 is a vertical sectional view schematically showing the variable mirror in part (A) of FIG. 11 in a second operative state.

Figure 13:
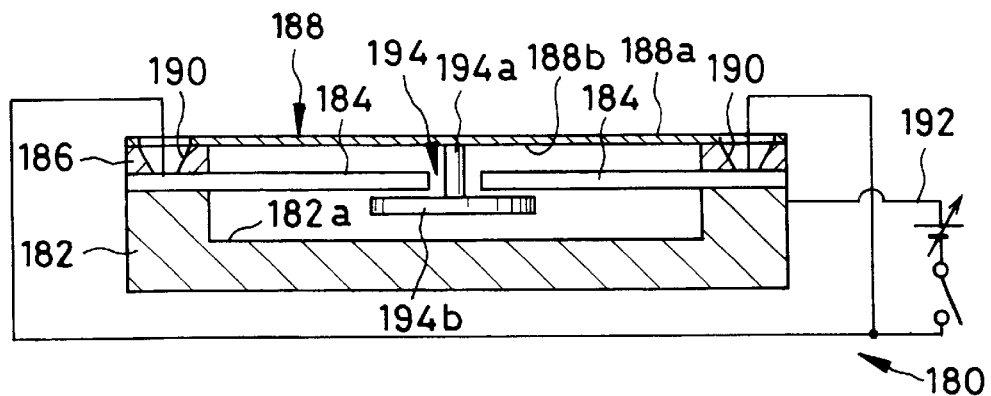
Figure 13:
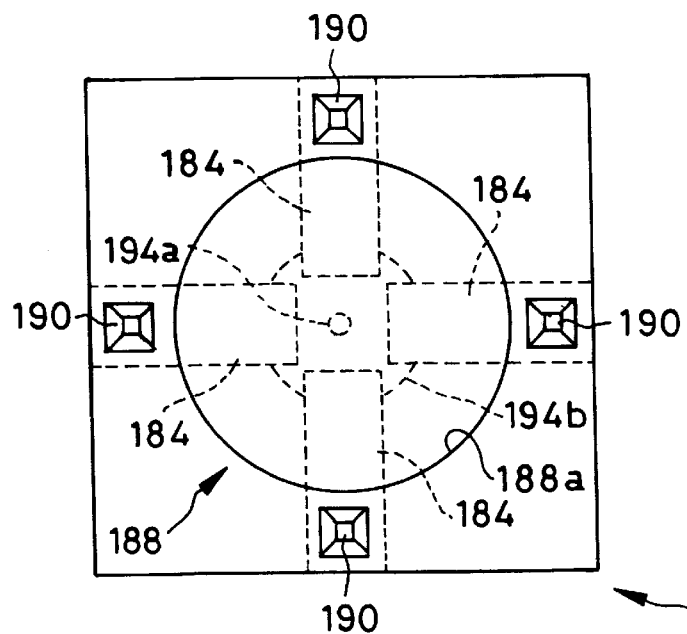
Figure 13:
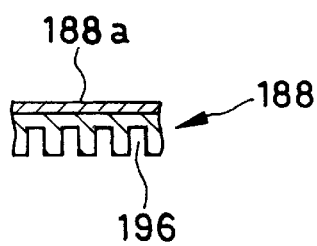

Part (A) of FIG. 13 is a vertical sectional view schematically showing a variable mirror according to a fourth embodiment of this invention in a stationary state; part (B) of FIG. 13 is a schematic plan view of the variable mirror shown in part (A); and part (C) of FIG. 13 is an enlarged vertical sectional view of a mirror body of the variable mirror shown in part (A).

Figure 14:
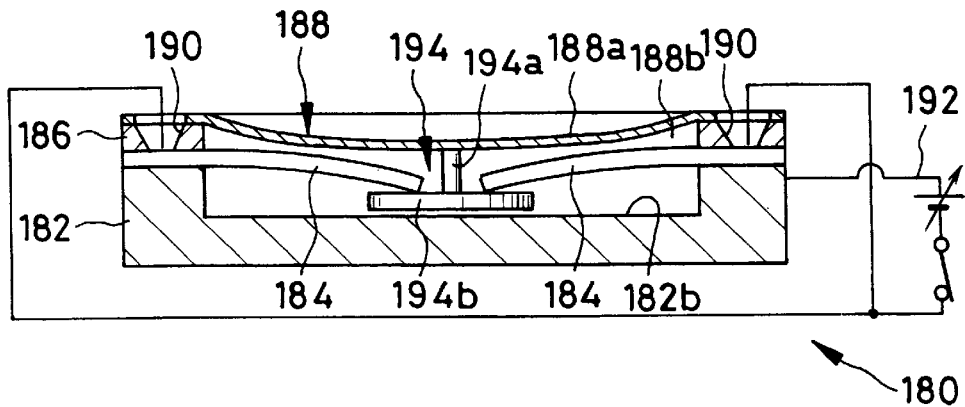

FIG. 14 is a vertical sectional view schematically showing the variable mirror in part (A) of FIG. 13 in an operative state.

Figure 15:
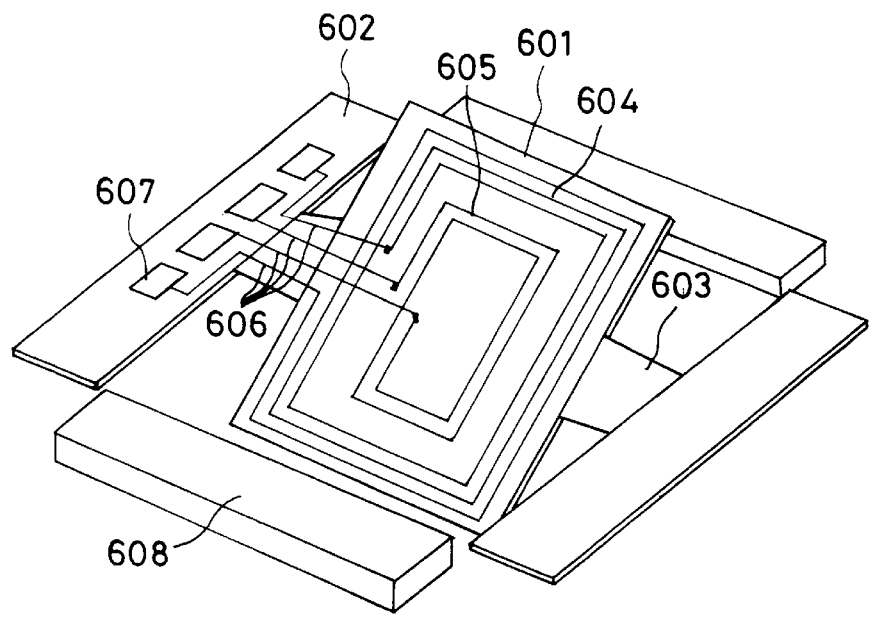

FIG. 15 is a perspective view showing the arrangement of a solenoid-driven torsion bar type mirror.

Figure 16:
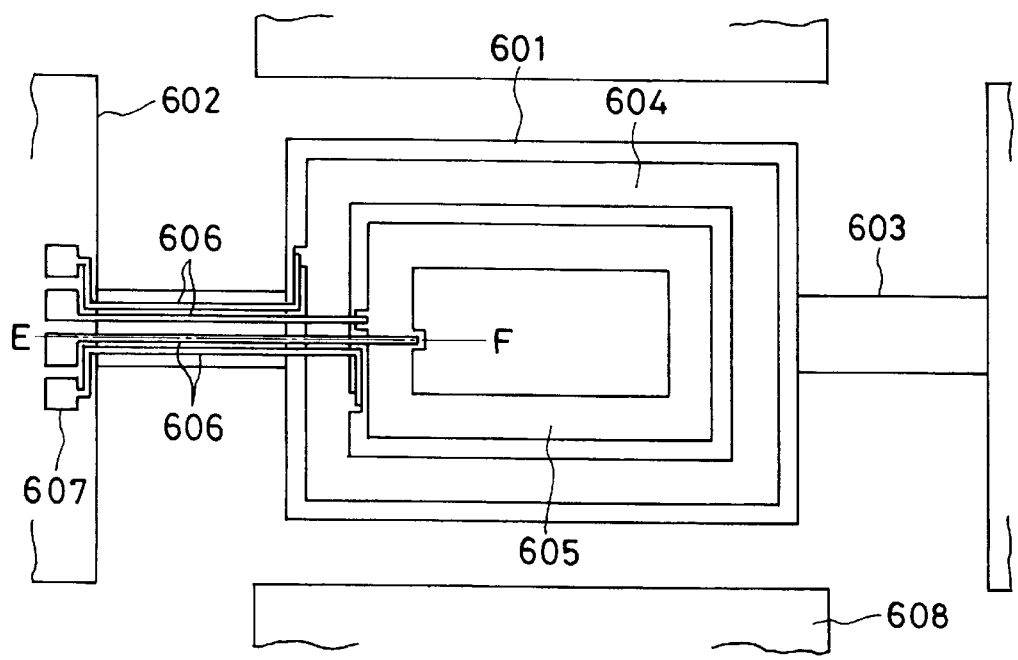

FIG. 16 is a view of the device in FIG. 15 as seen from above.

Figure 17:
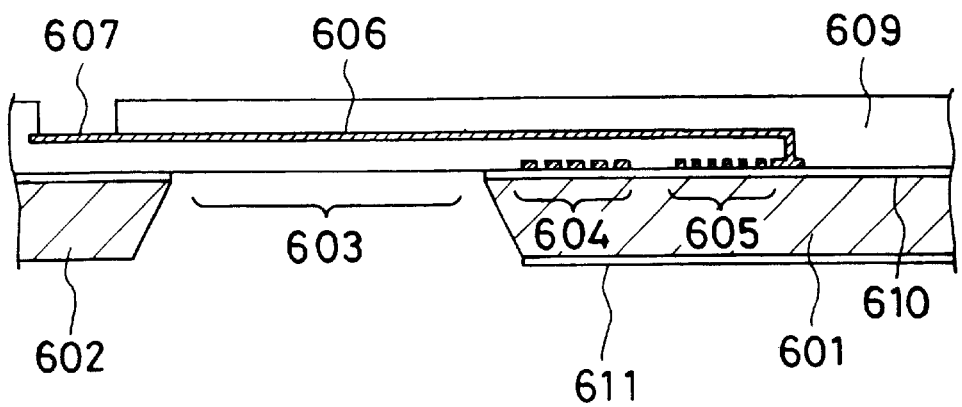

FIG. 17 is a sectional view taken along the line E–F in FIG. 16.

Figure 18:
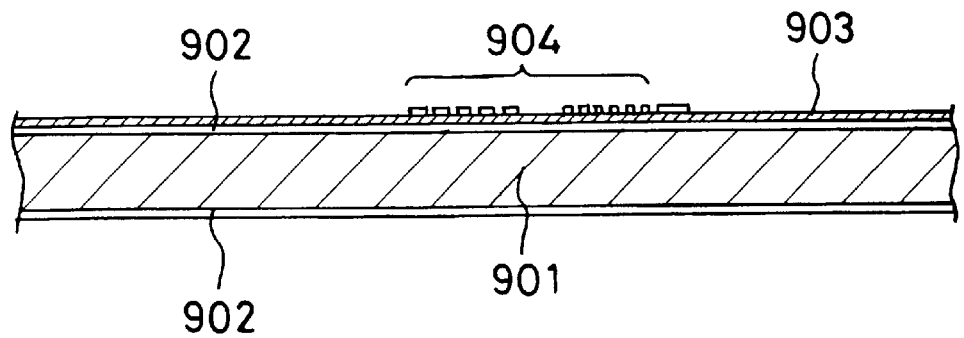

FIG. 18 is a view showing a step of a process for producing a variable mirror according to the present invention.

Figure 19:
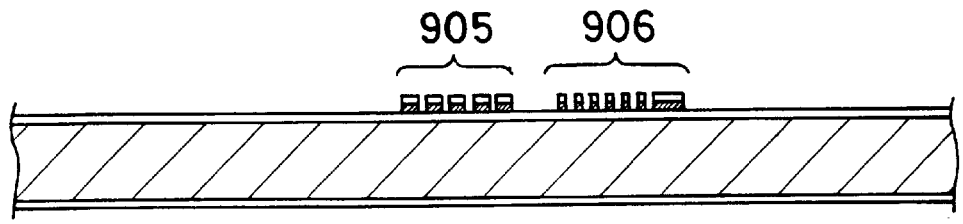

FIG. 19 is a view showing a step of the process for producing the variable mirror according to the present invention that is subsequent to the step shown in FIG. 18.

Figure 20:
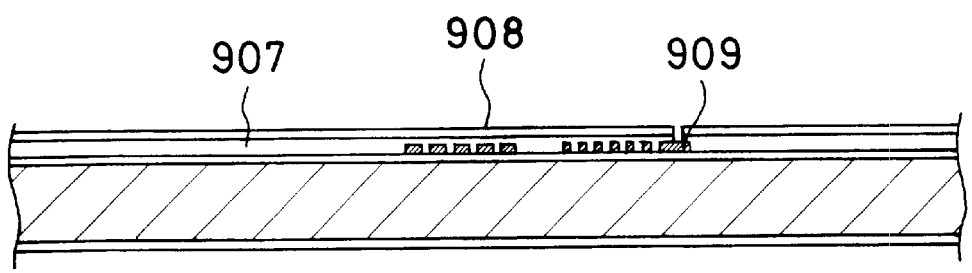

FIG. 20 is a view showing a step of the process for producing the variable mirror according to the present invention that is subsequent to the step shown in FIG. 19.

Figure 21:
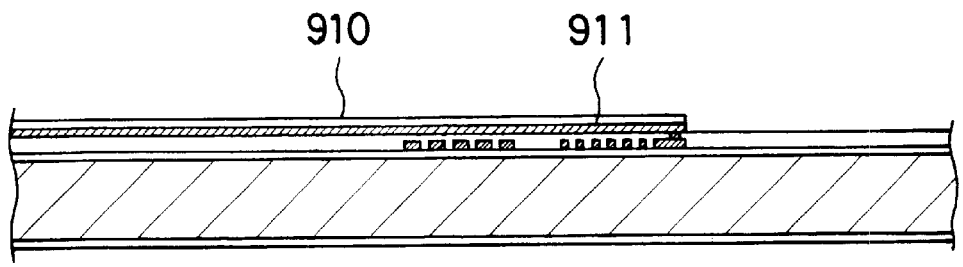

FIG. 21 is a view showing a step of the process for producing the variable mirror according to the present invention that s subsequent to the step shown in FIG. 20.

Figure 22:
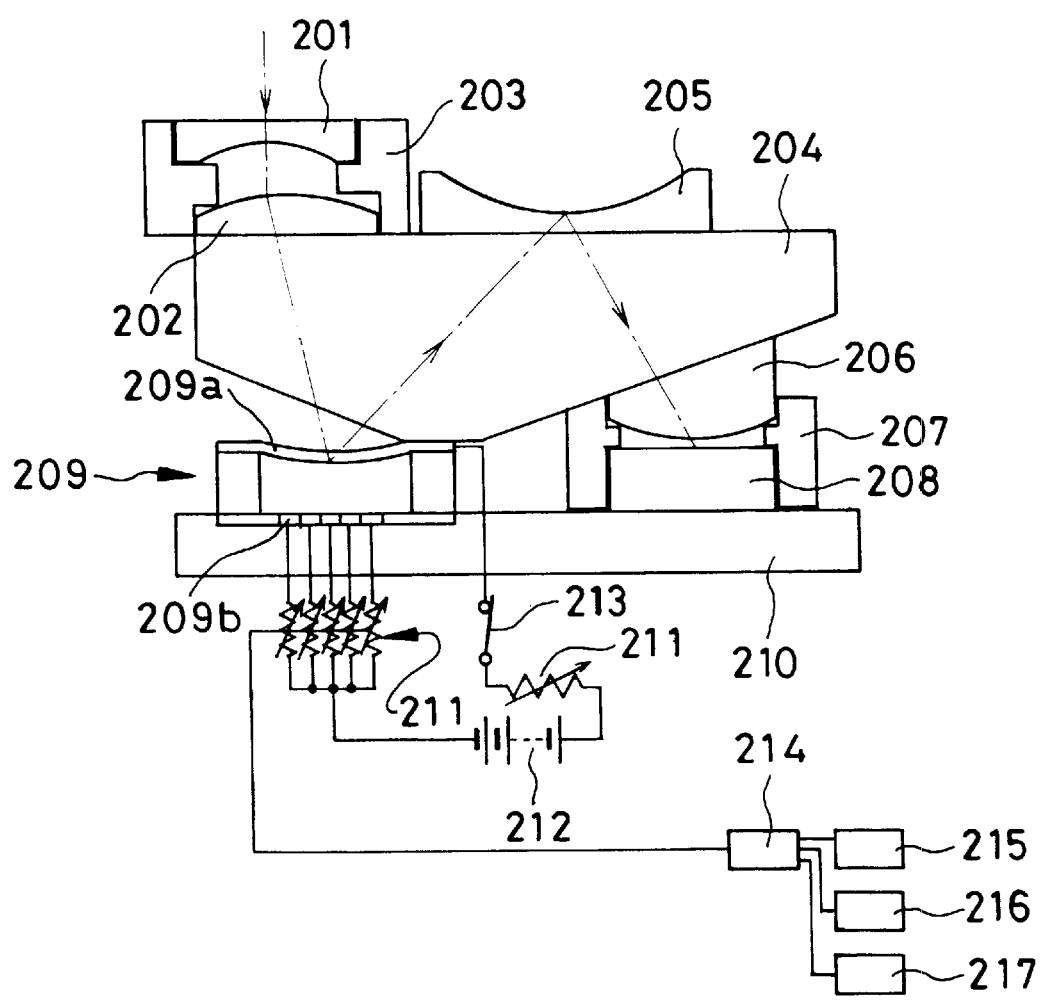

FIG. 22 is a view showing a first embodiment of an optical apparatus according to a third invention.

Figure 23:
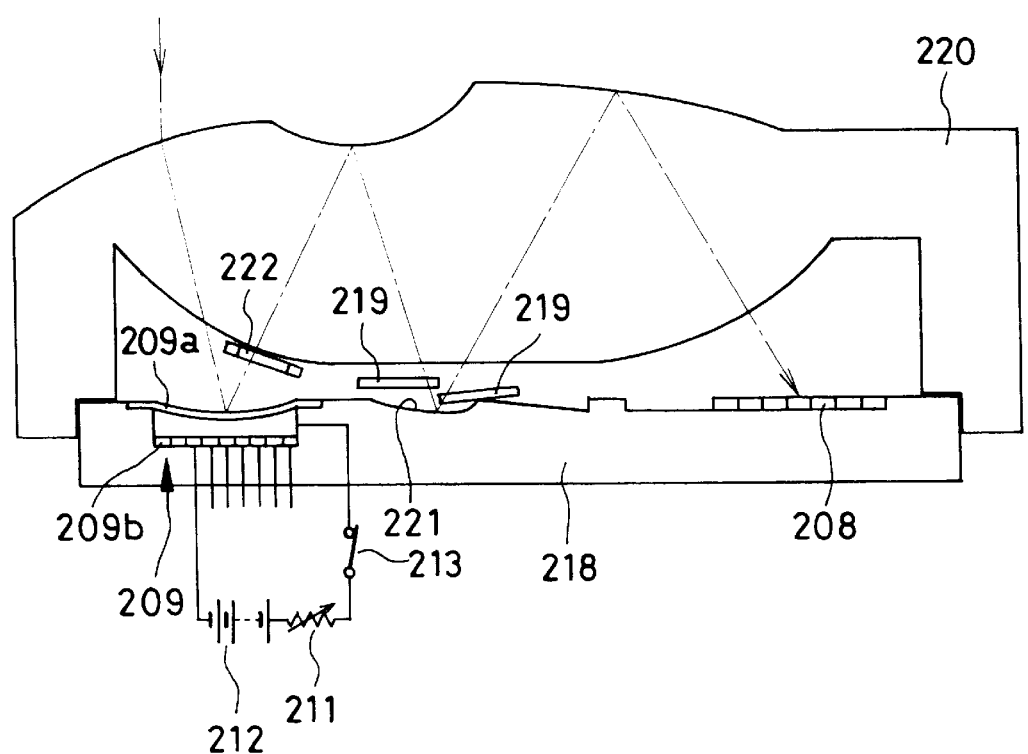

FIG. 23 is a view showing a second embodiment of the optical apparatus according to this invention.

Figure 24:
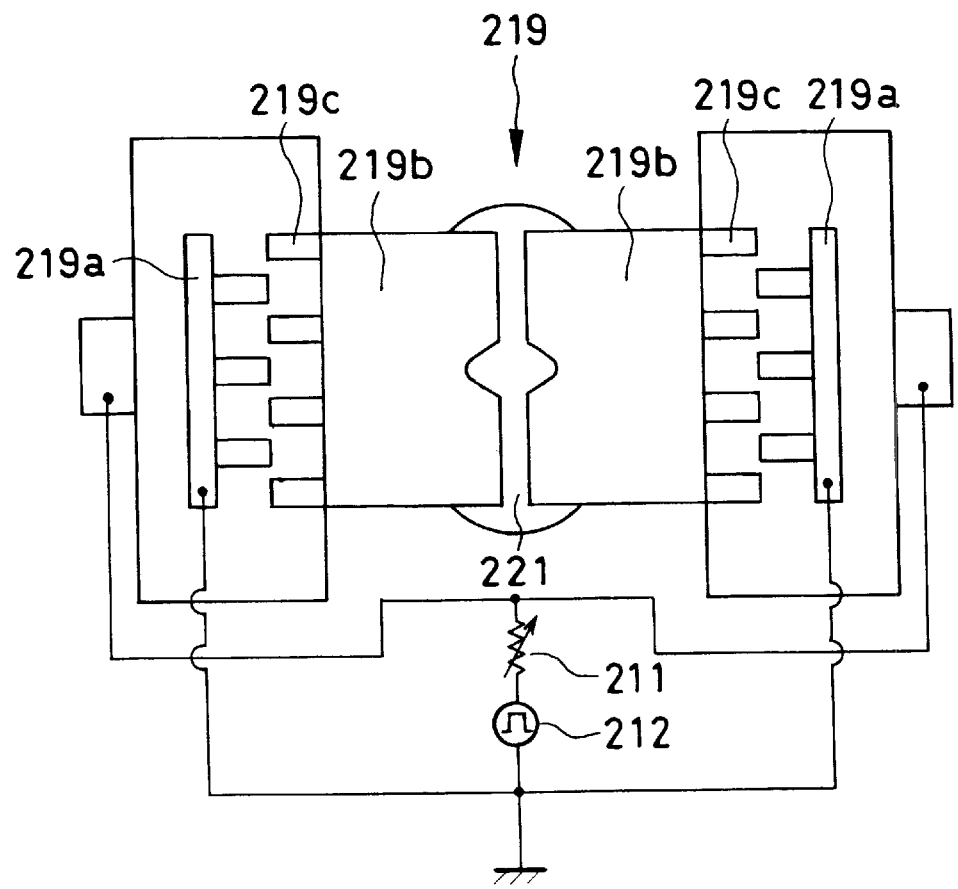

FIG. 24 is a fragmentary enlarged plan view showing the optical apparatus in FIG. 23 with an extended curved surface prism omitted therefrom.

Figure 25:
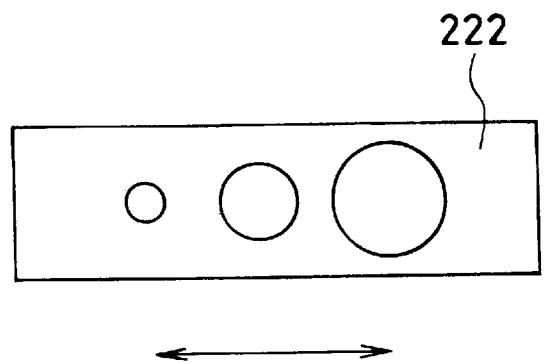

FIG. 25 is a plan view of an example of a stop used in the second embodiment.

Figure 26:
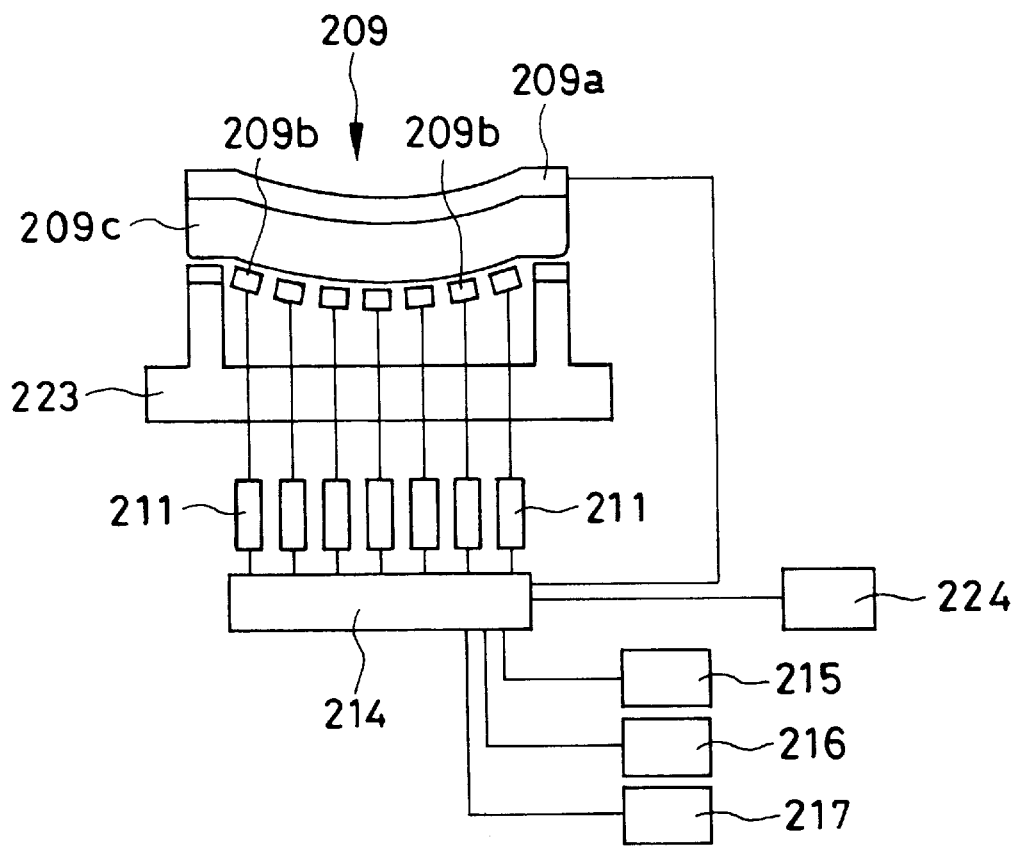

FIG. 26 is a view showing another example of the variable-optical-characteristic mirror.

Figure 27:
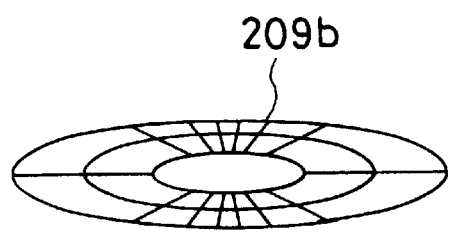

FIG. 27 is a plan view showing an example of the electrode arrangement of the variable mirror shown in FIG. 26.

Figure 28:
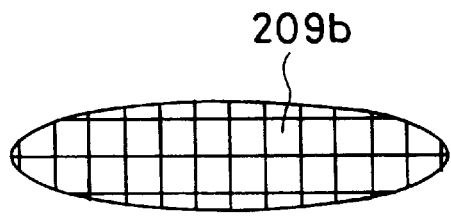

FIG. 28 is a plan view showing another example of the electrode arrangement of the variable mirror shown in FIG. 26.

Figure 29:
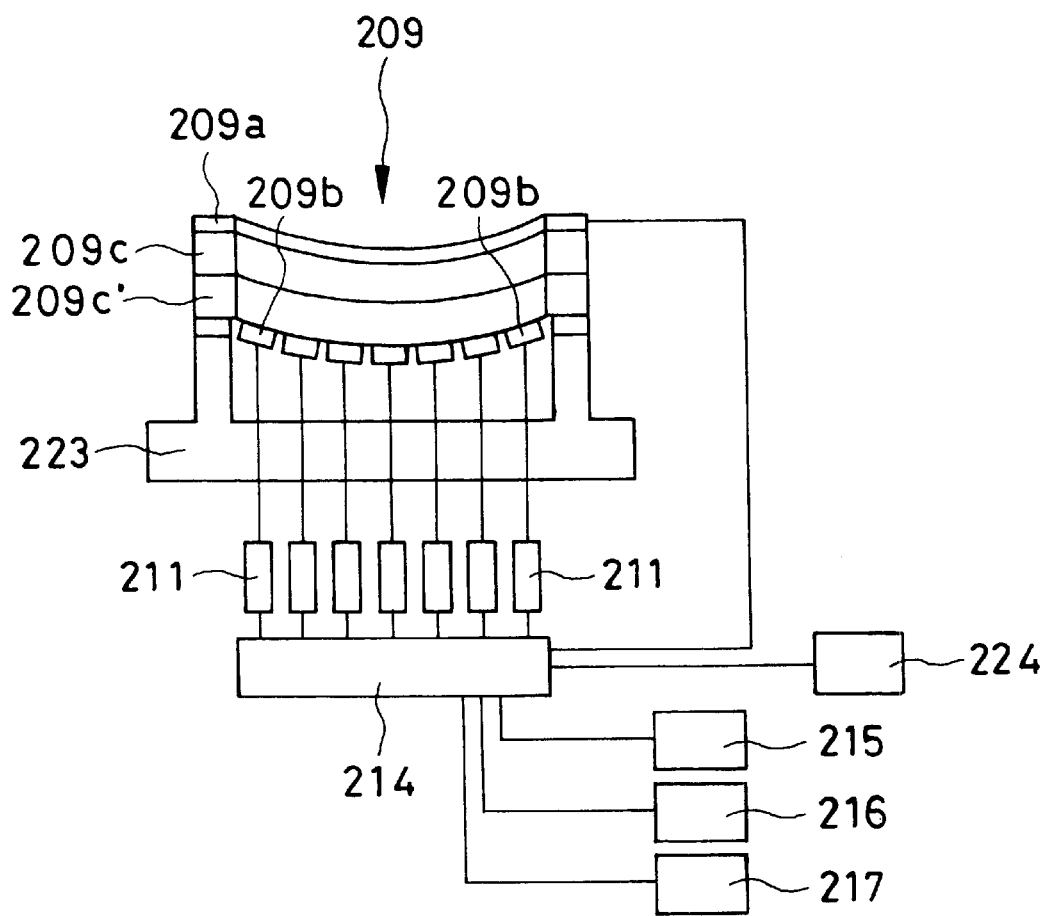

FIG. 29 is a view showing a further example of the variable-optical-characteristic mirror.

Figure 30:
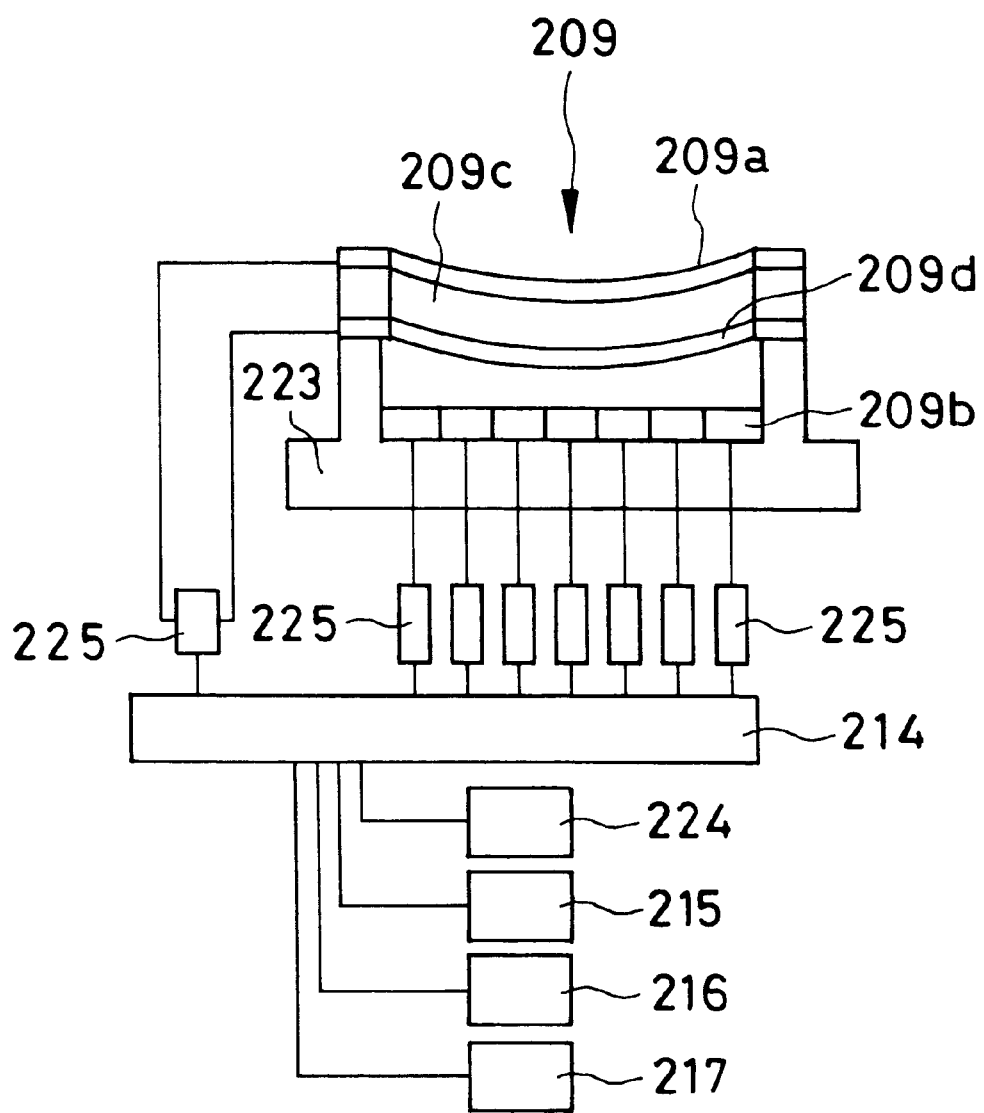

FIG. 30 is a view showing a further example of the variable-optical-characteristic mirror.

Figure 31:
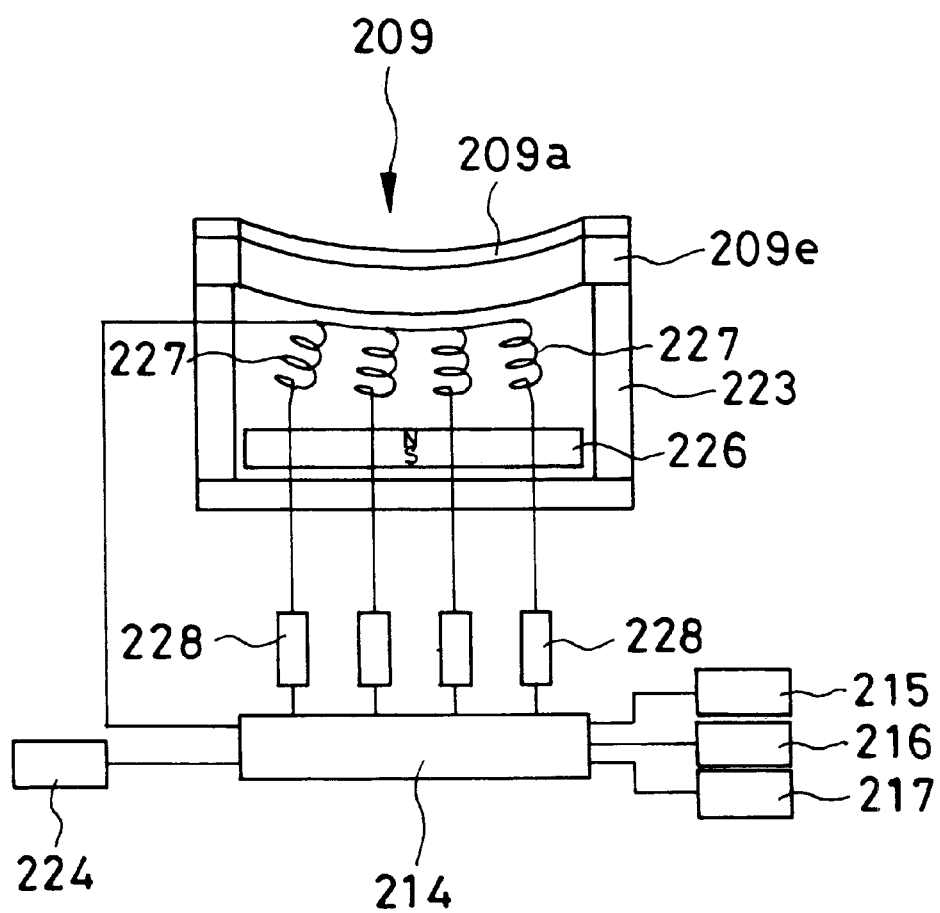

FIG. 31 is a view showing a further example of the variable-optical-characteristic mirror.

Figure 32:
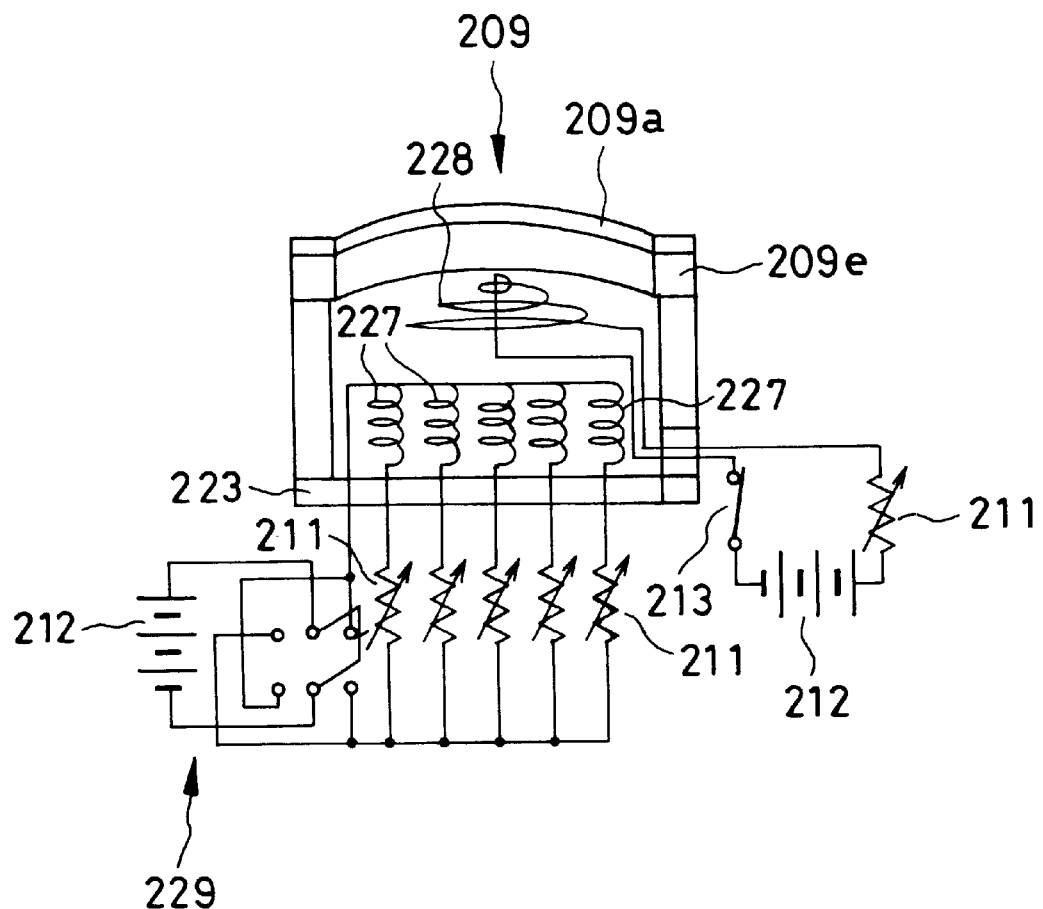

FIG. 32 is a view showing a further example of the variable-optical-characteristic mirror.

Figure 33:
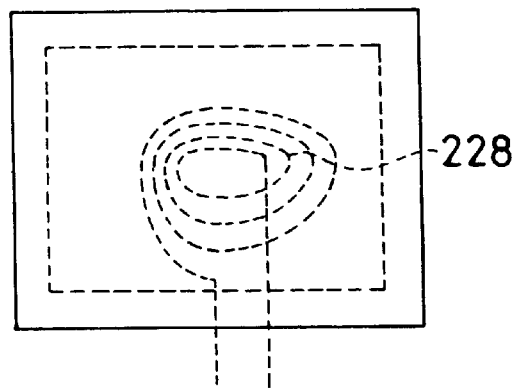

FIG. 33 is a plan view showing an example of a thin-film coil used in the variable mirror shown in FIG. 32.

Figure 34:
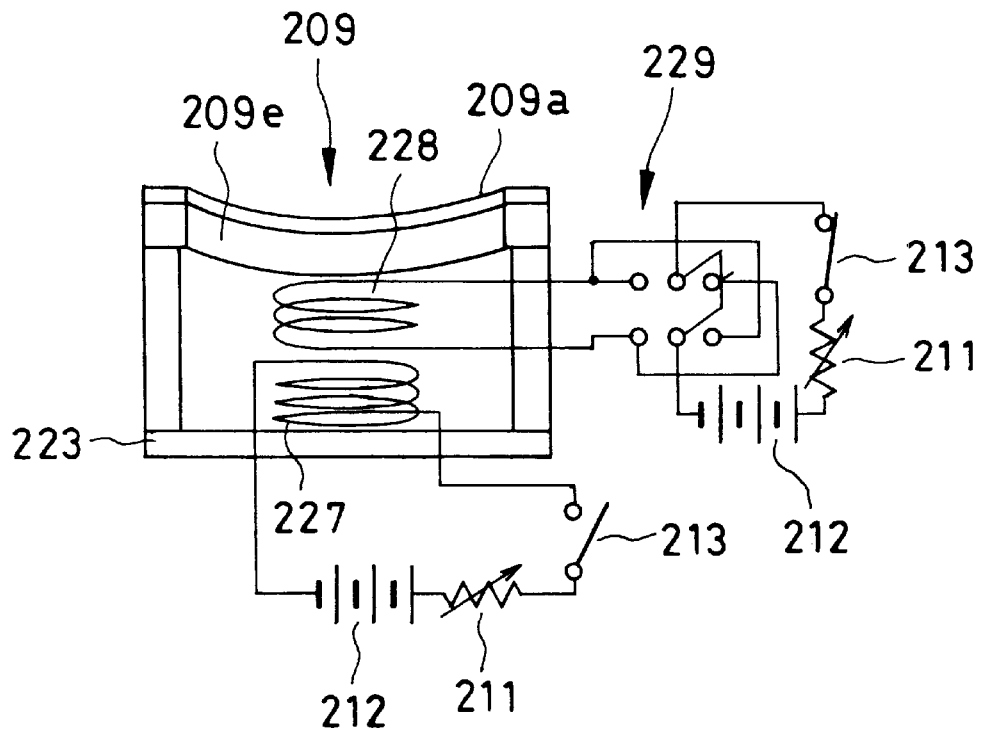

FIG. 34 is a view showing a modification of the variable mirror shown in FIG. 32.

Figure 35:
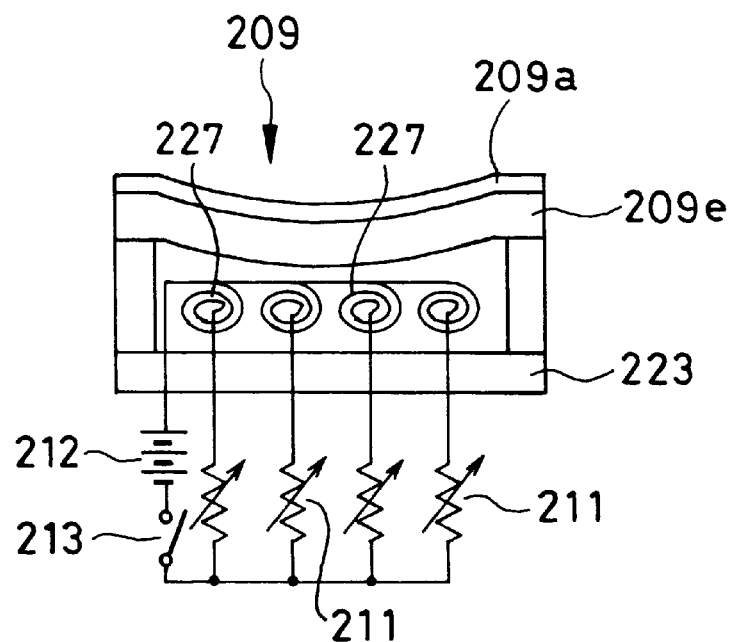

FIG. 35 is a view showing a further example of the variable-optical-characteristic mirror.

Figure 36:
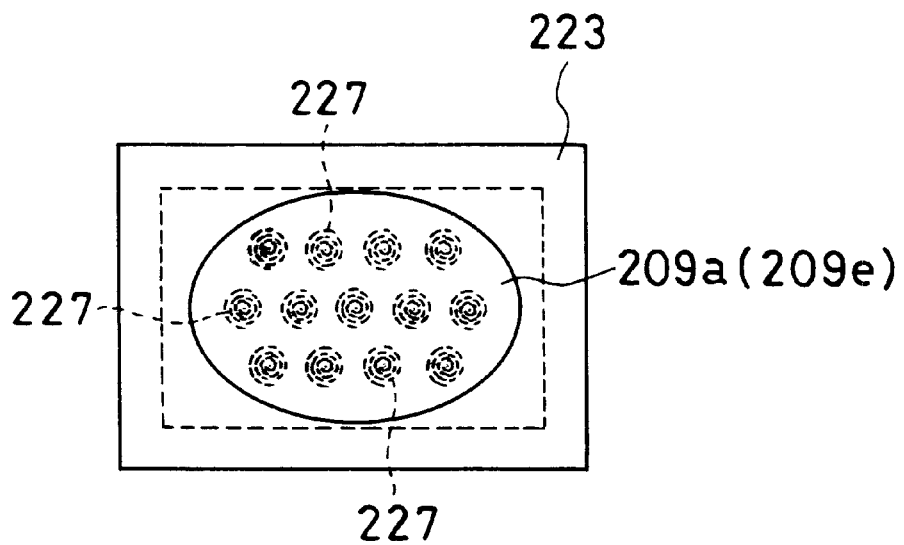

FIG. 36 is a plan view showing an example of the arrangement of coils used in the variable mirror shown in FIG. 35.

Figure 37:
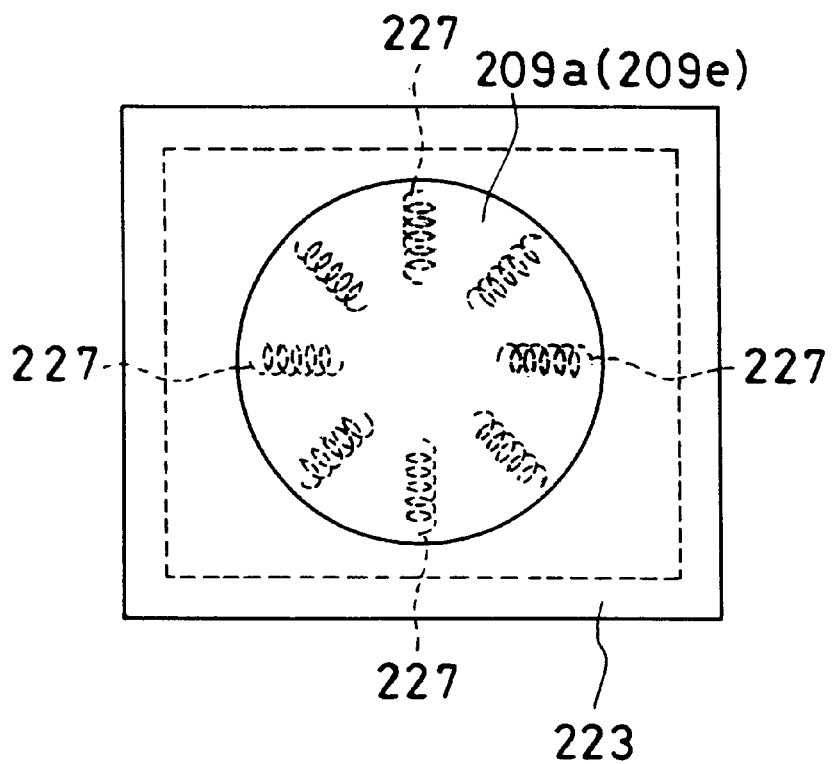

FIG. 37 is a plan view showing another example of the arrangement coils used in the variable mirror shown in FIG. 35.

Figure 38:
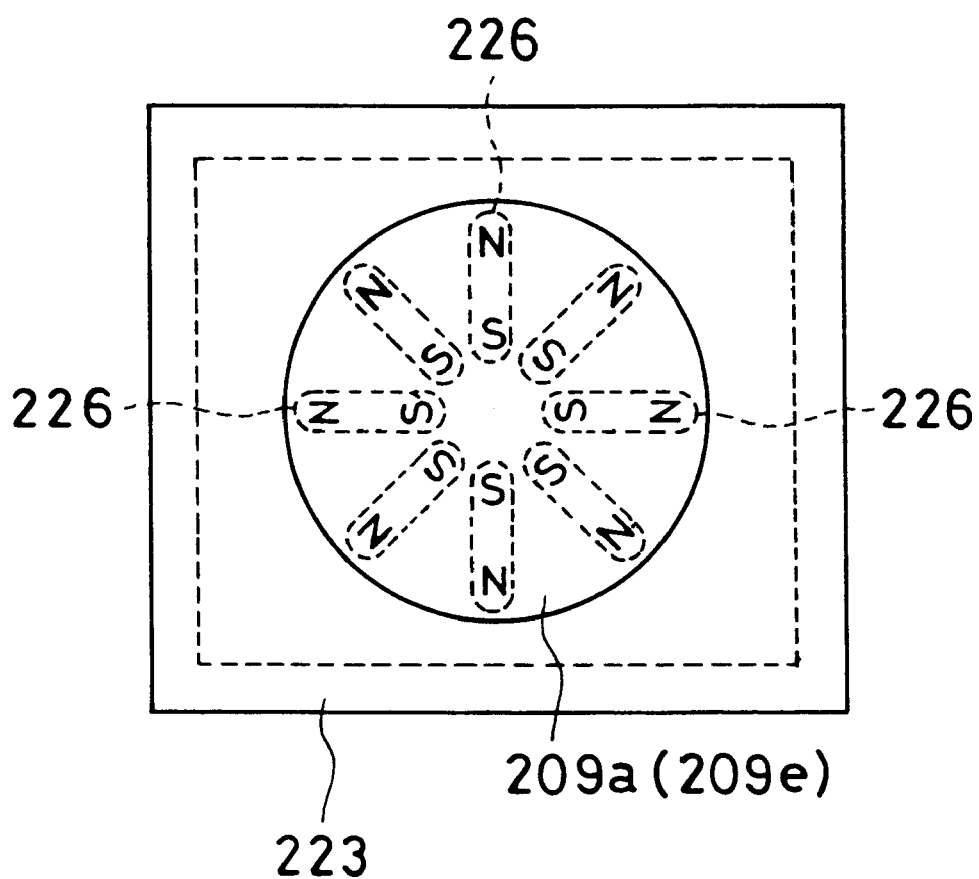

FIG. 38 is a plan view showing the arrangement of permanent magnets suitable for a coil arrangement such as that shown in FIG. 37.

Figure 39:
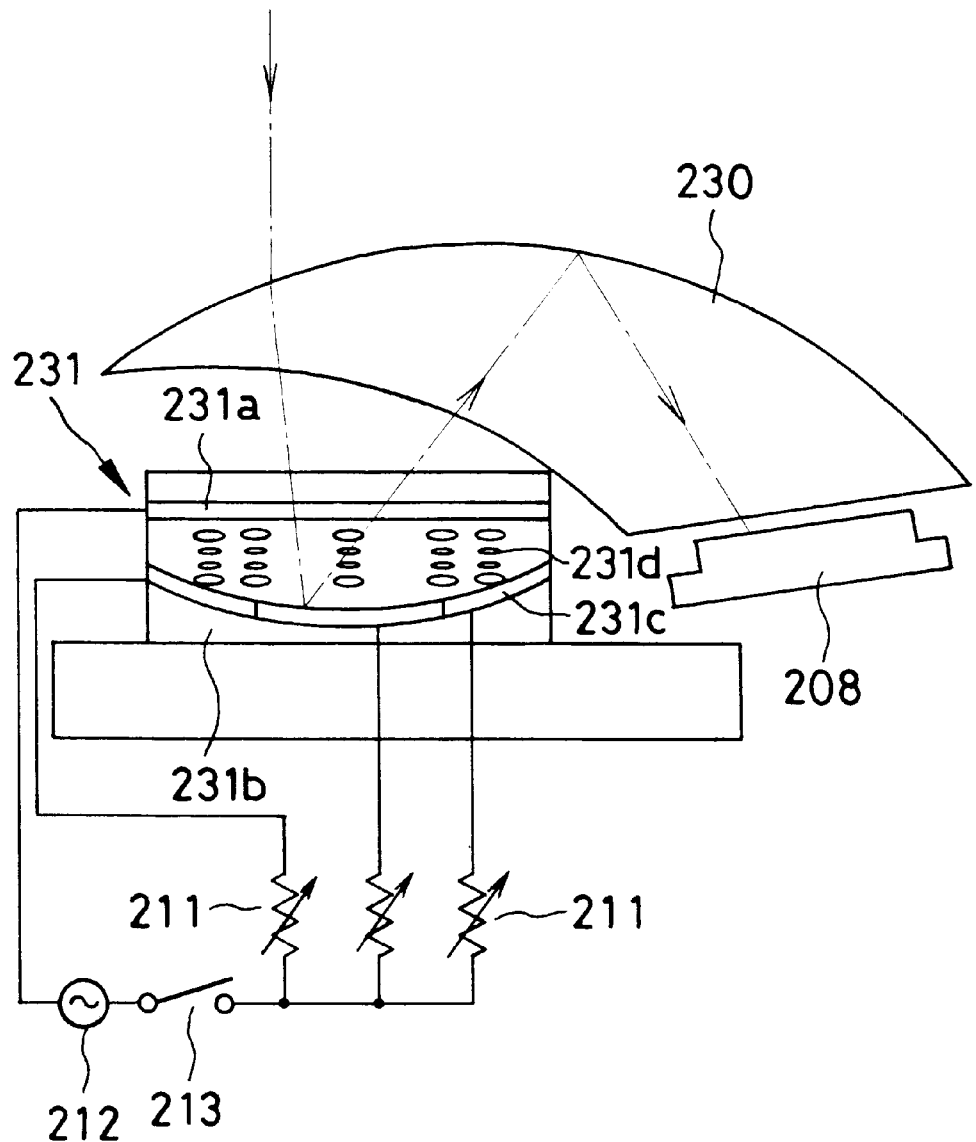

FIG. 39 is a view showing a third embodiment of the optical apparatus according to this invention.

Figure 40:
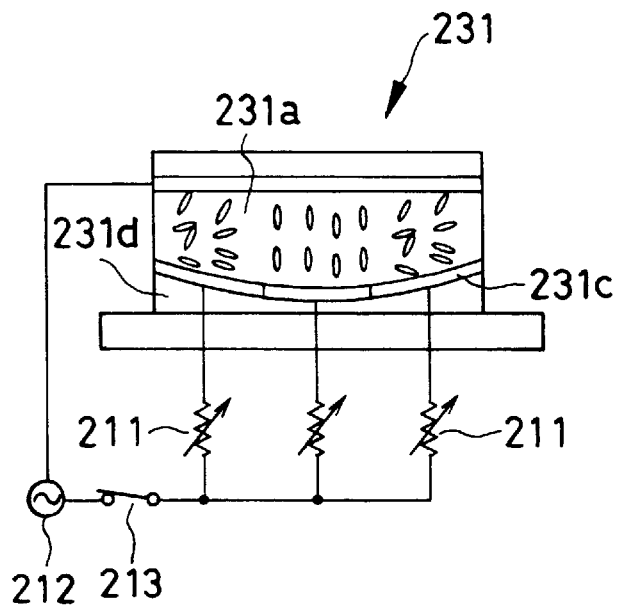

FIG. 40 is a view showing a change of a liquid crystal in a liquid crystal variable mirror shown in FIG. 39.

Figure 41:
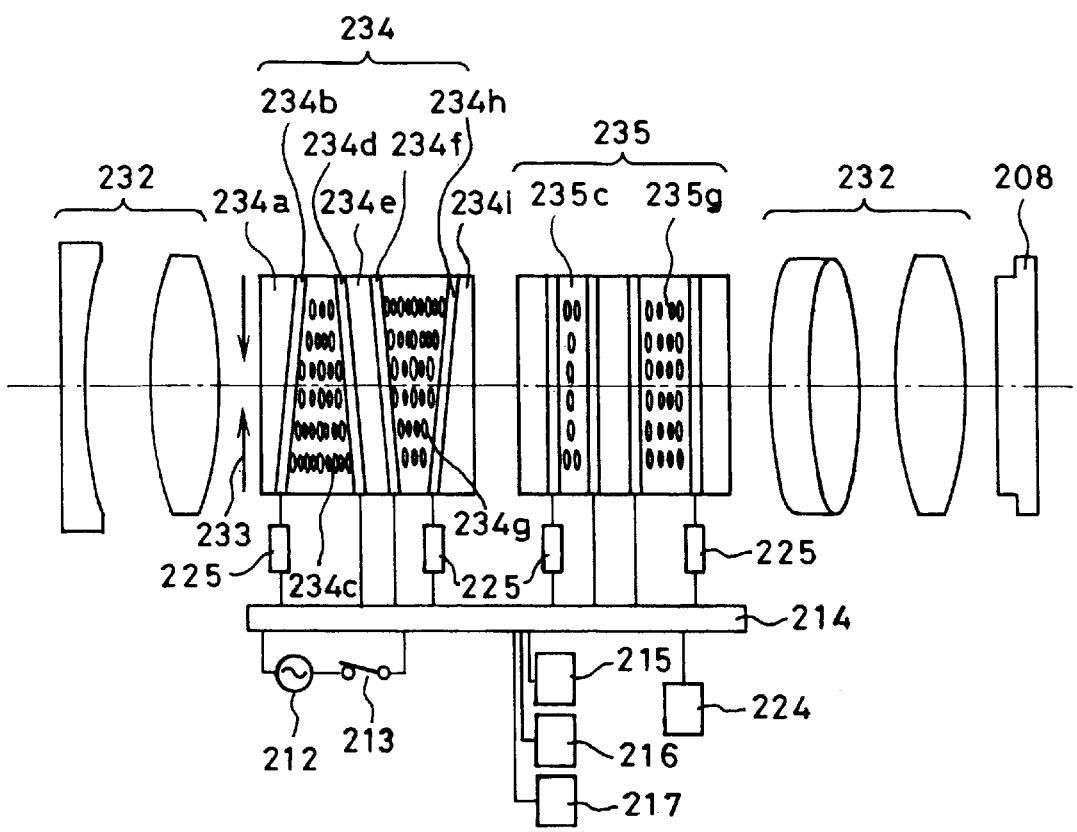

FIG. 41 is a view showing a fourth embodiment of the optical apparatus according to this invention.

Figure 42:
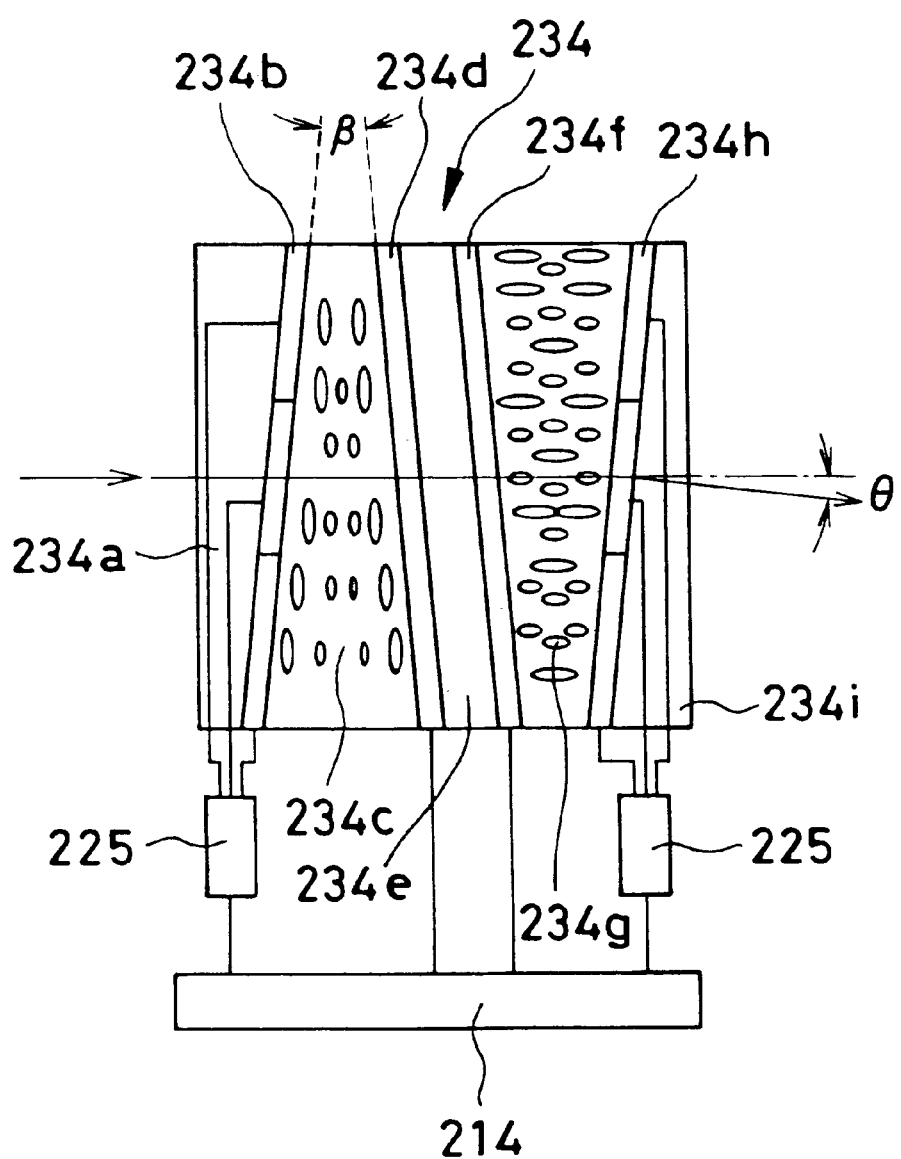

FIG. 42 is a view for describing a detailed structure and operation of a variable-optical-characteristic prism used in the embodiment shown in FIG. 41.

Figure 43:
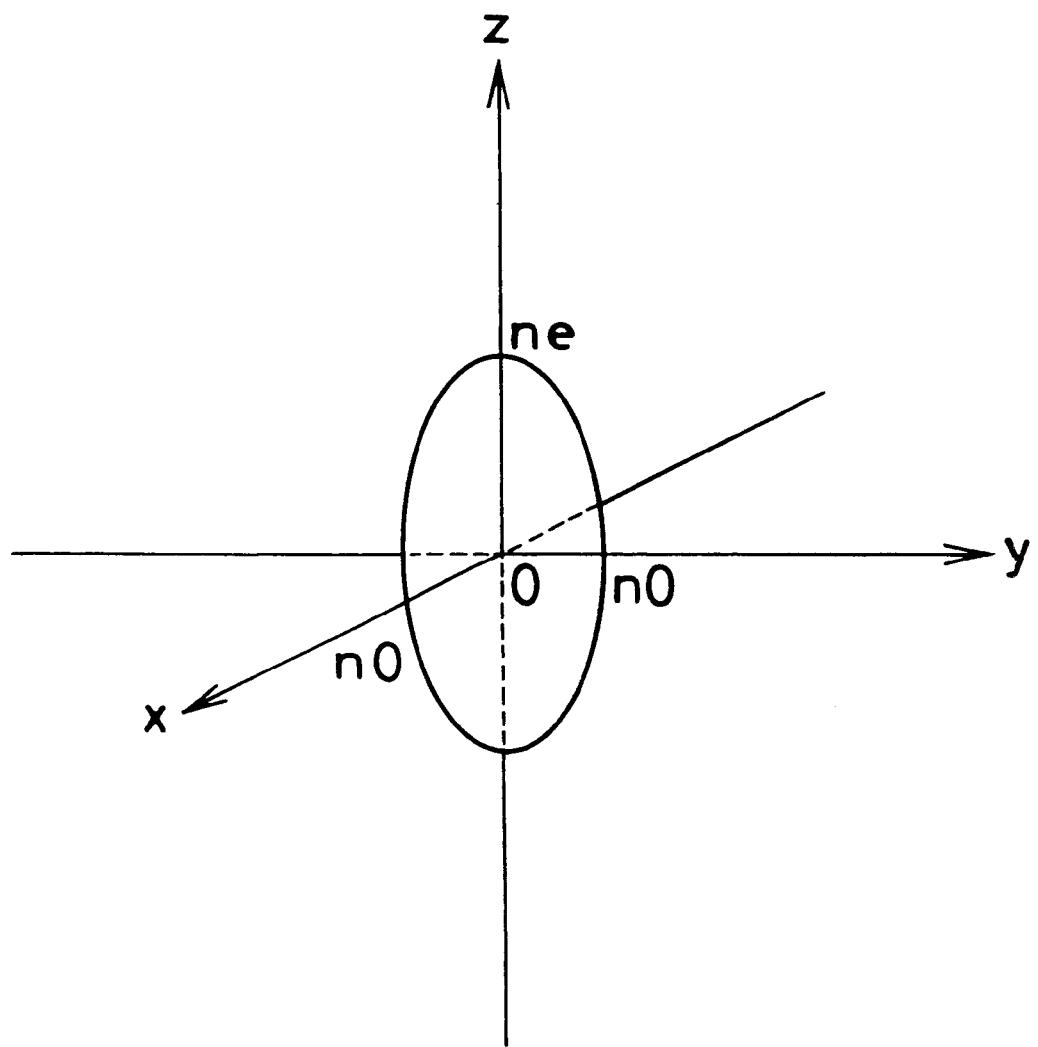

FIG. 43 is a view showing an index ellipsoid of a liquid crystal.

Figure 44:
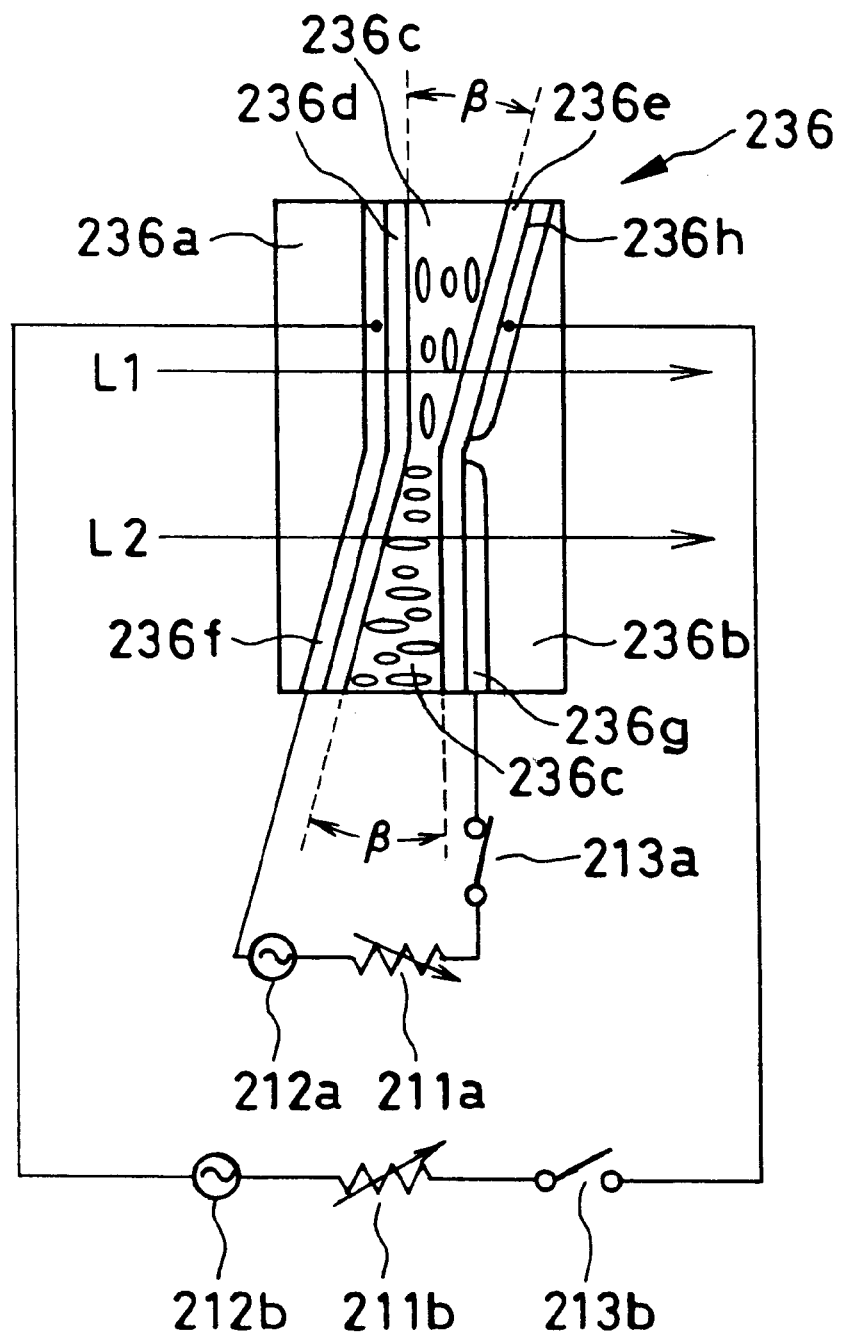

FIG. 44 is a view showing an example of a refractive characteristic deviation prism applicable to the embodiment shown in FIG. 41.

Figure 45:
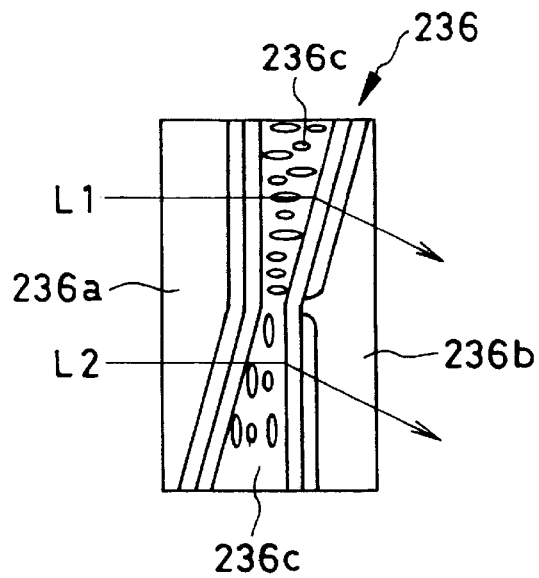

FIG. 45 is a view showing the way in which the refractive characteristic deviation prism shown in FIG. 44 undergoes a change in state.

Figure 46:
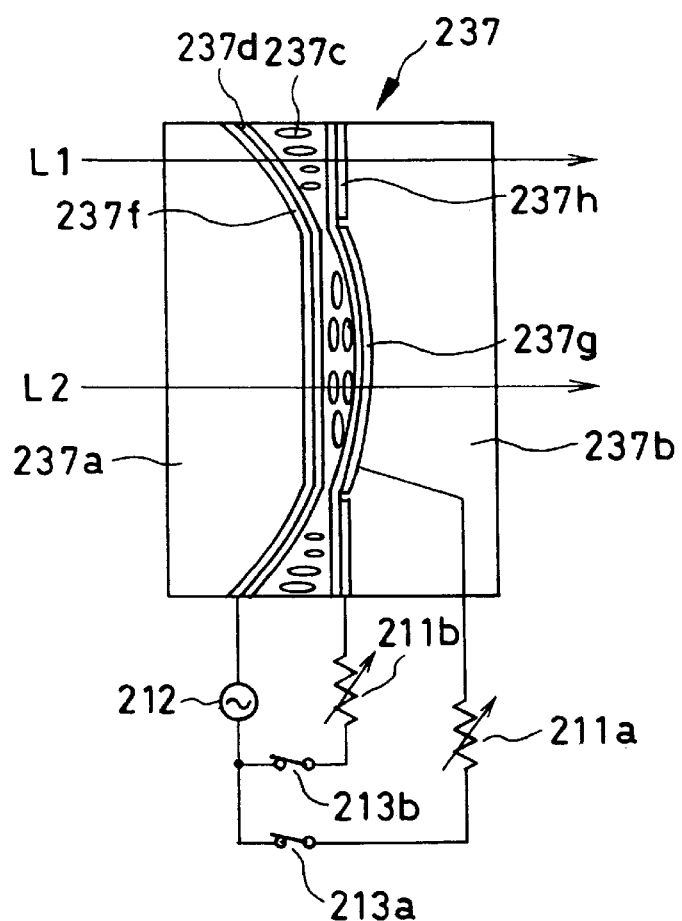

FIG. 46 is a view showing an example of a variable-focus lens a applicable to the embodiment shown in FIG. 41.

Figure 47:
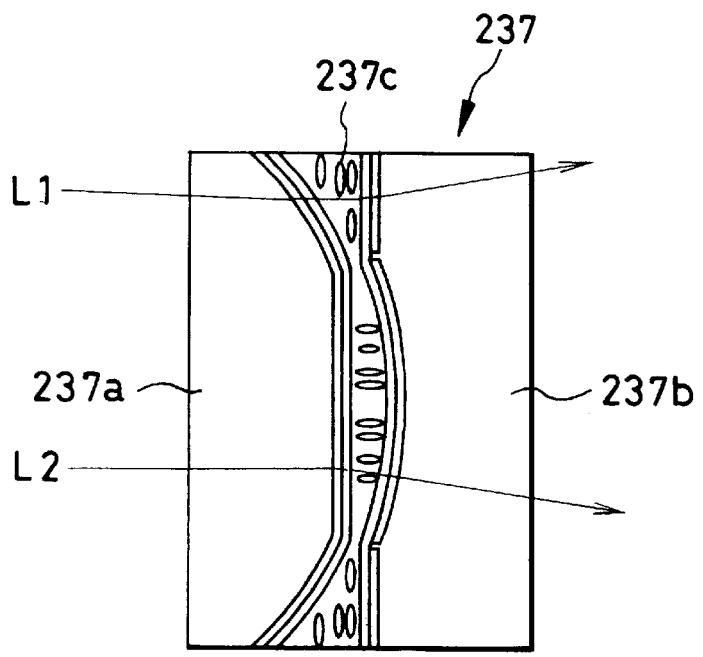

FIG. 47 is a view showing the way in which the variable-focus lens shown in FIG. 46 undergoes a change in state.

Figure 48:
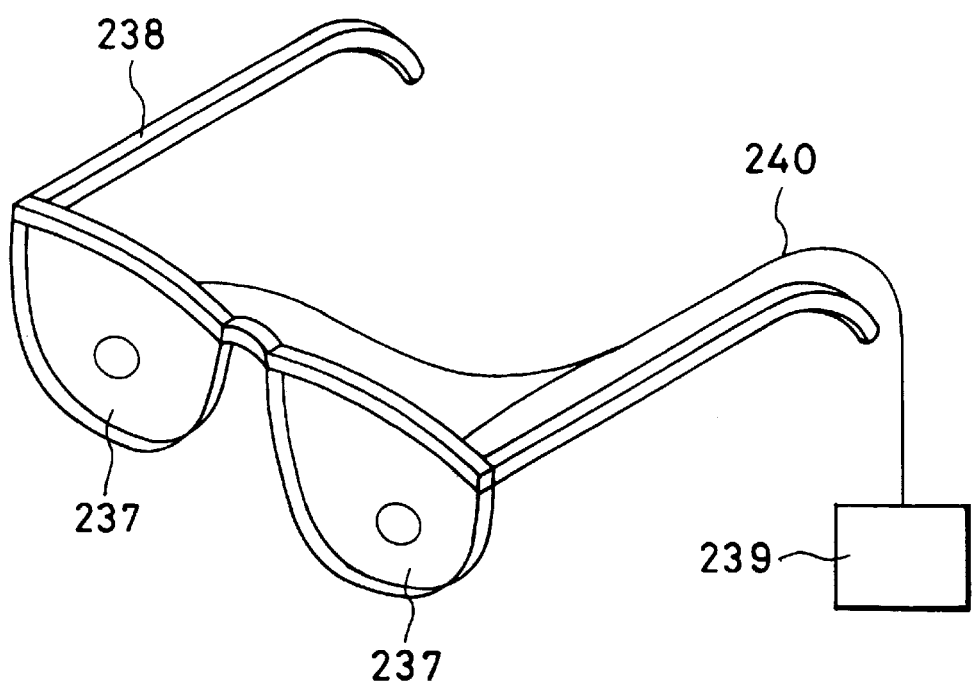

FIG. 48 is a view showing a fifth embodiment of the optical apparatus according to this invention.

Figure 49:
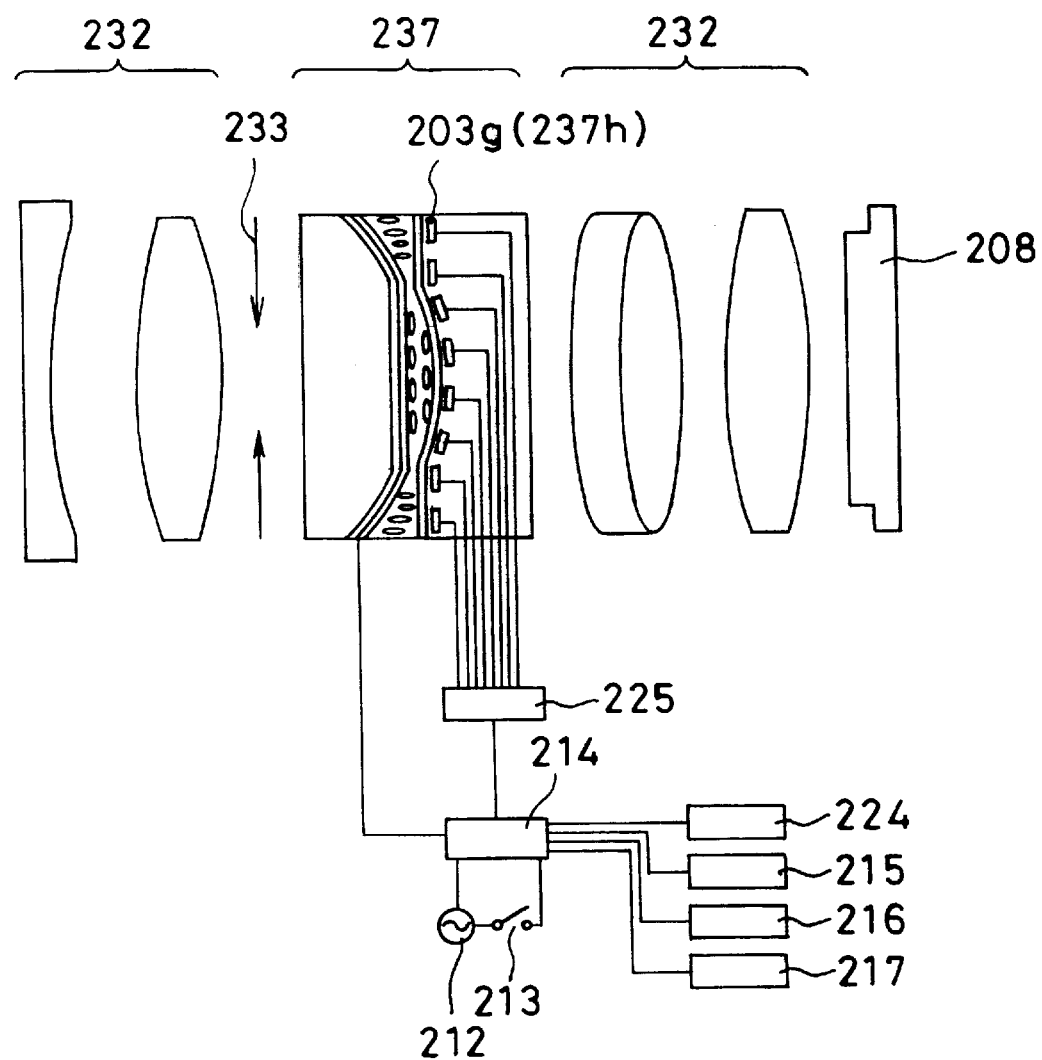

FIG. 49 is a view showing a sixth embodiment of the optical apparatus according to this invention.

Figure 50:
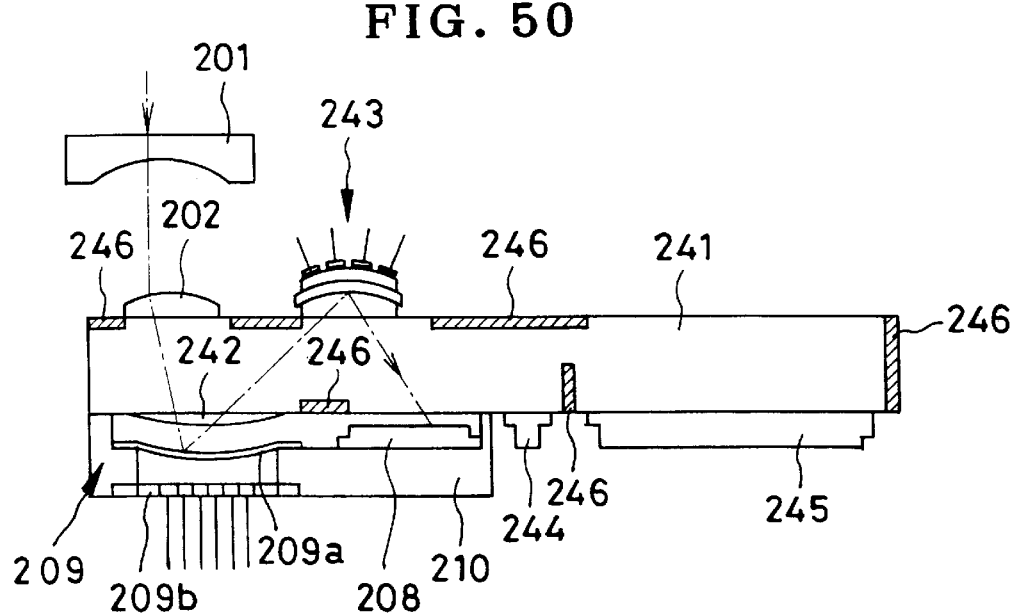

FIG. 50 is a view showing a seventh embodiment of the optical apparatus according to this invention.

Figure 51:
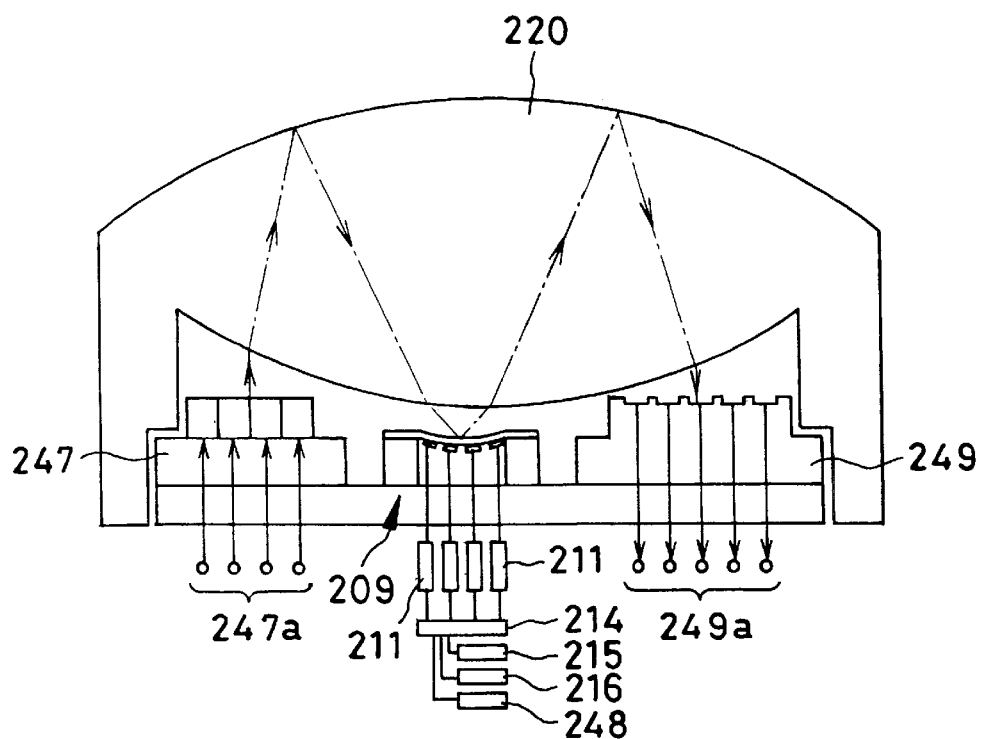

FIG. 51 is a view showing an eighth embodiment of the optical apparatus according to this invention.

Figure 52:
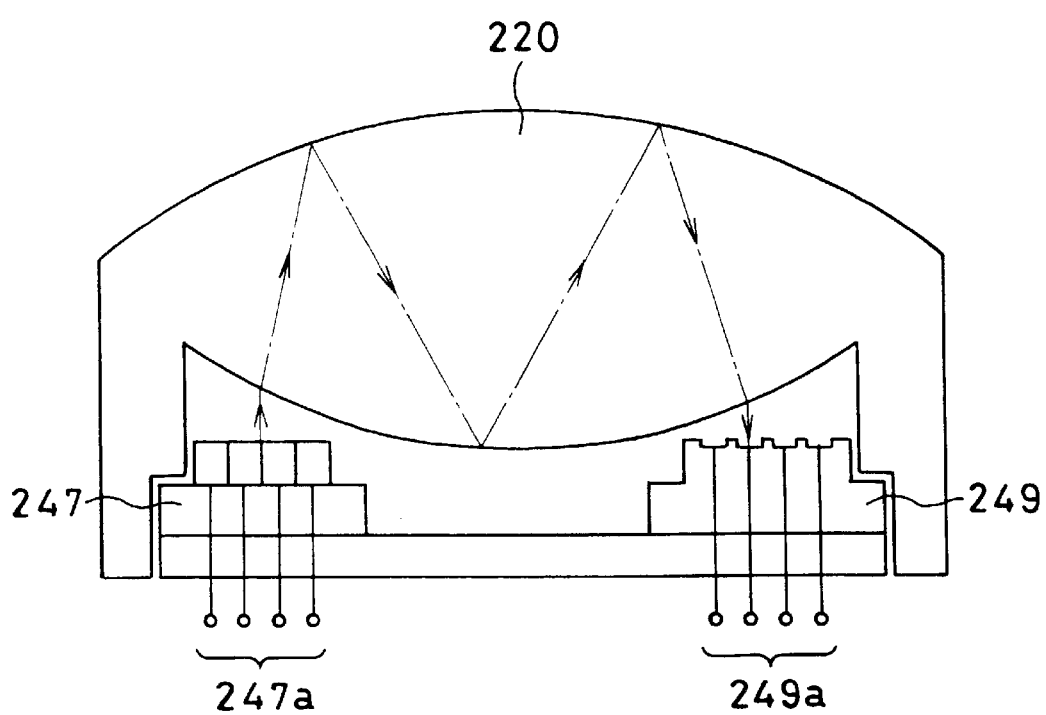

FIG. 52 is a view showing a modification of the embodiment shown in FIG. 30.

Figure 53:
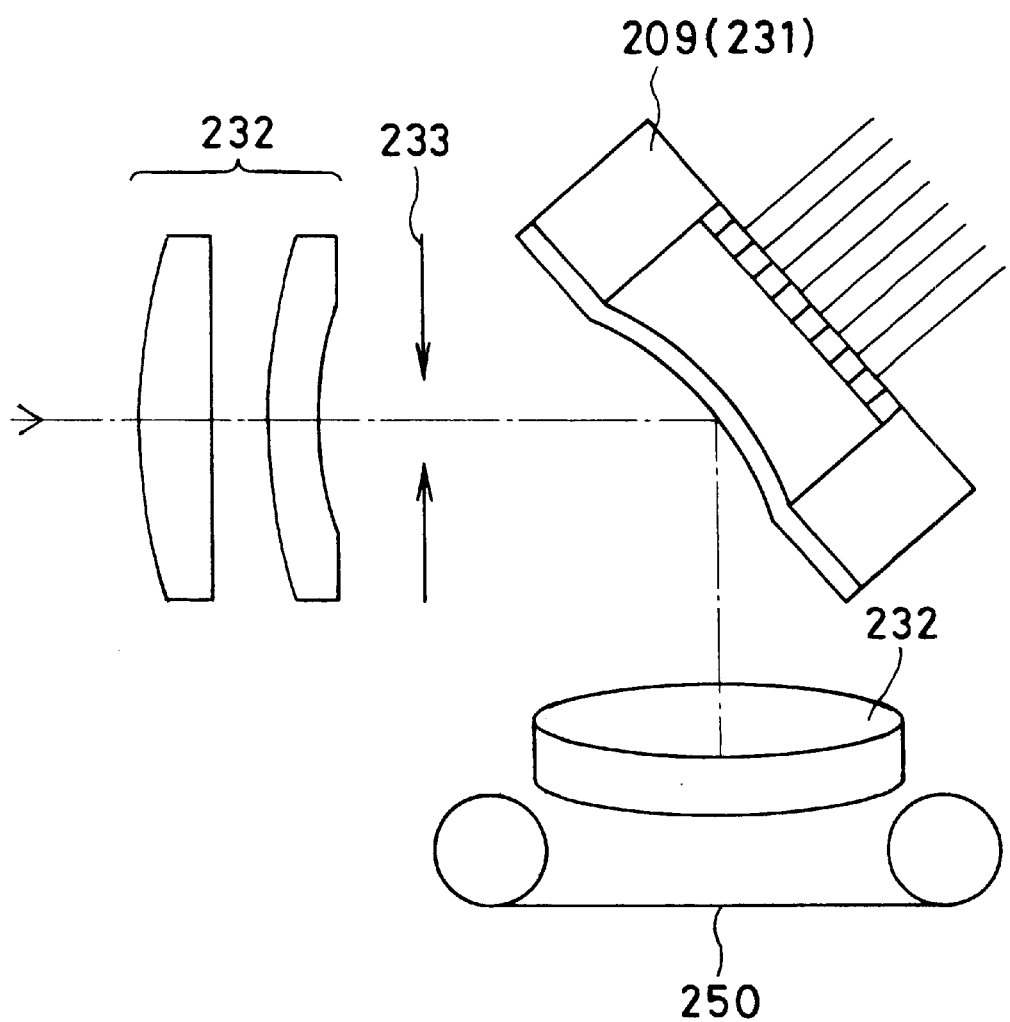

FIG. 53 is a view showing a ninth embodiment of the optical apparatus according to this invention.

Figure 54:
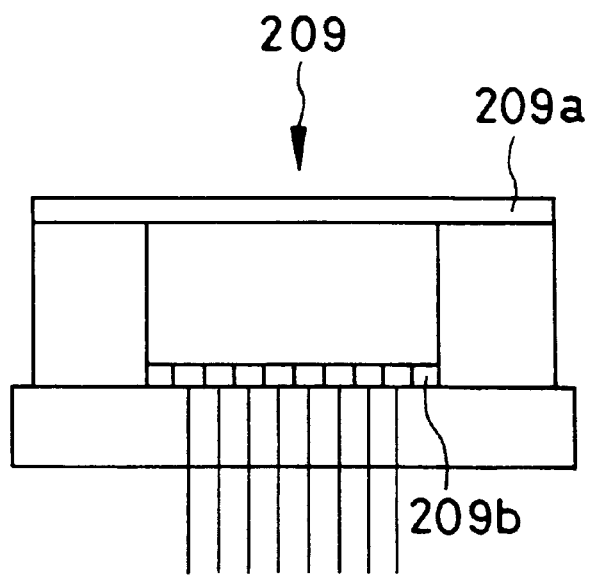

FIG. 54 is a view showing the normal state of the variable mirror used in FIG. 22.

Figure 55:
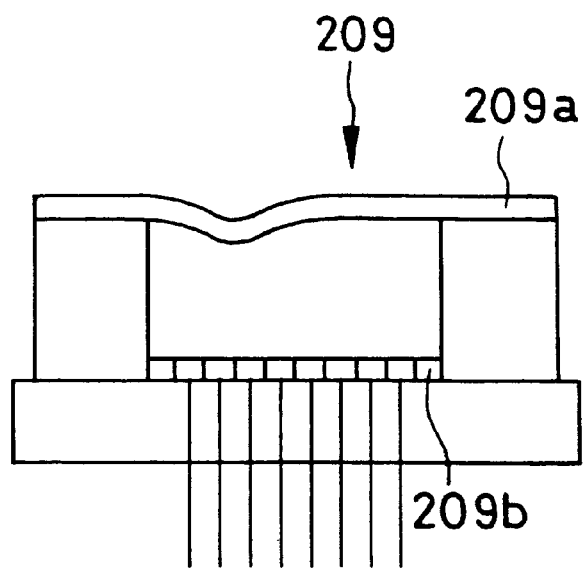

FIG. 55 is a view showing a change in state of the variable mirror own in FIG. 54.

Figure 56:
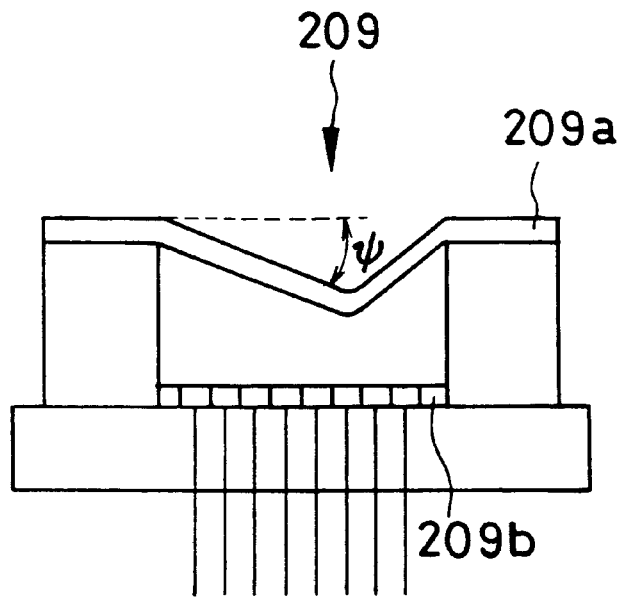

FIG. 56 is a view showing another change in state of the variable mirror shown in FIG. 54.

Figure 57:
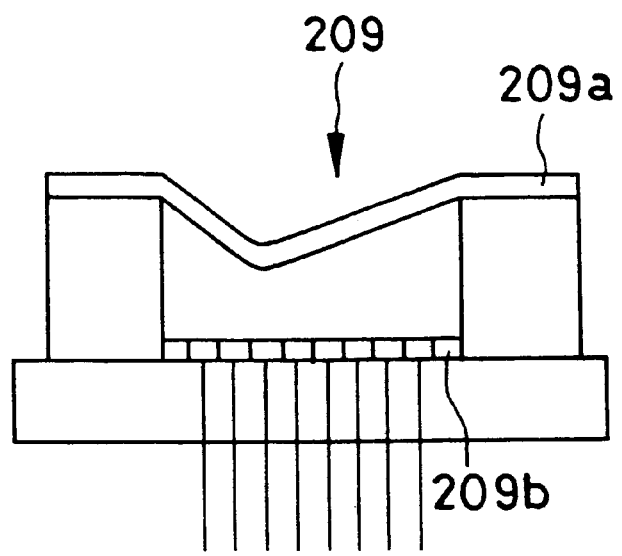

FIG. 57 is a view showing still another change in state of the variable mirror shown in FIG. 54.

Figure 58:
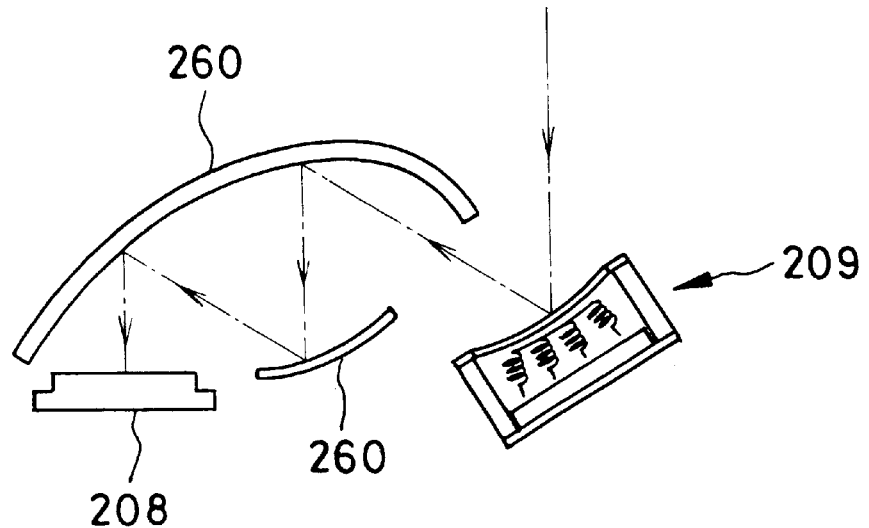

FIG. 58 is a view showing an example of an optical apparatus according to this invention that uses a reflecting mirror having an extended curved surface.

Figure 59:
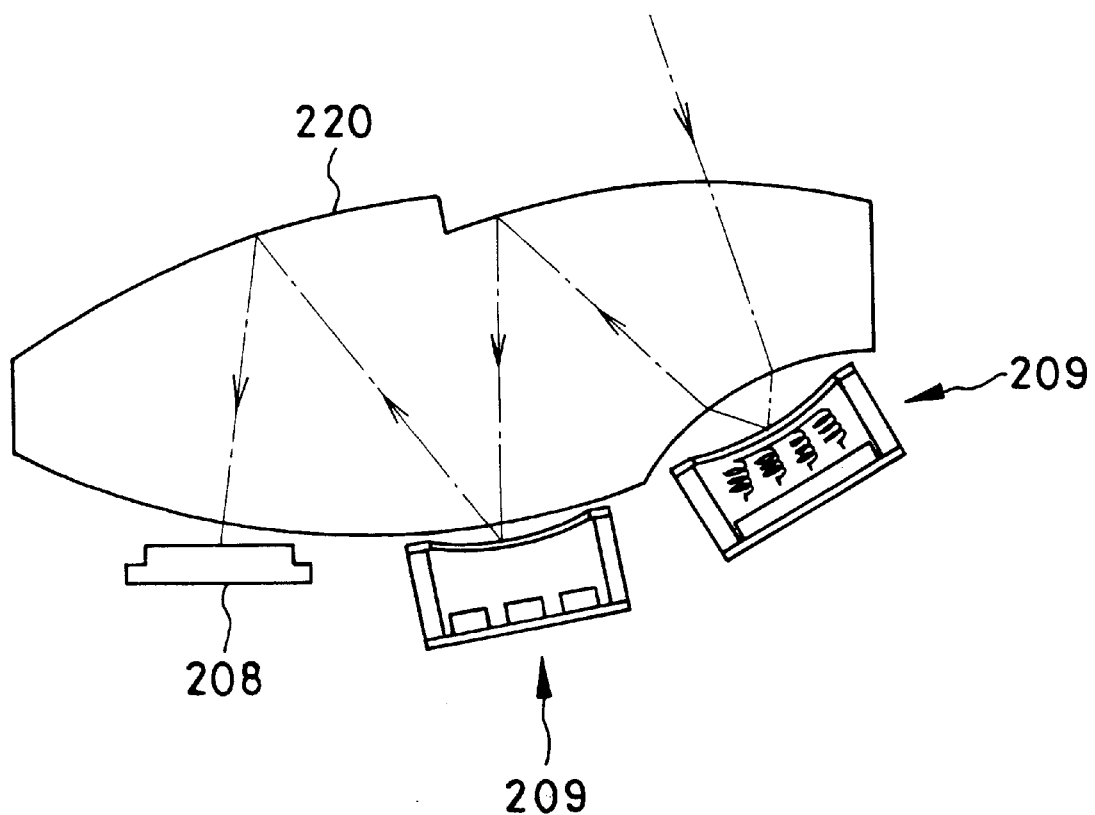

FIG. 59 is a view showing an example of an optical apparatus according to this invention that uses a plurality of variable mirrors.

Figure 60:
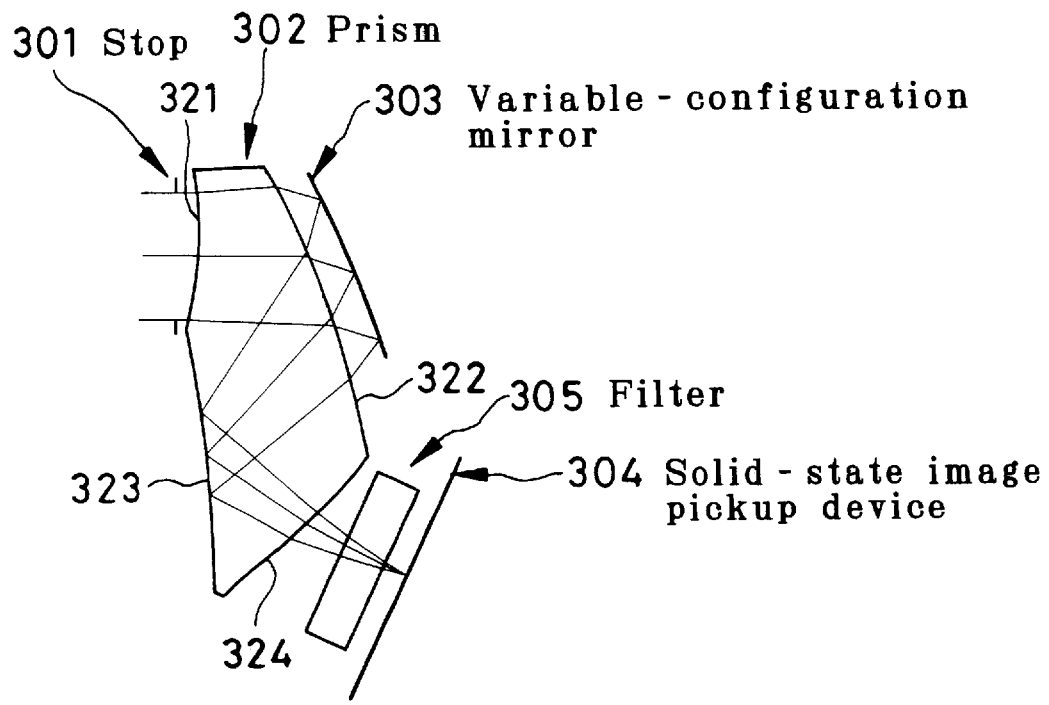

FIG. 60 is a view showing the arrangement of a decentered optical system according an embodiment of a fourth invention in the present invention.

Figure 61:
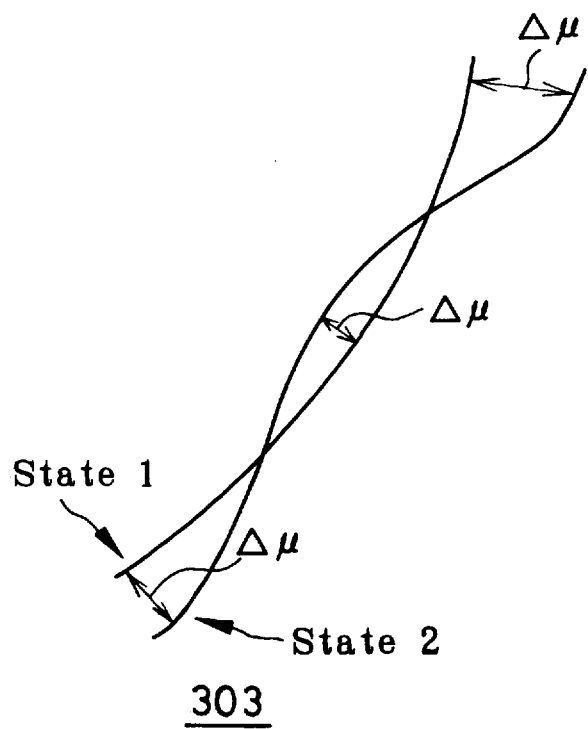

FIG. 61 is a view showing two different states of a variable-configuration mirror.

Figure 62:
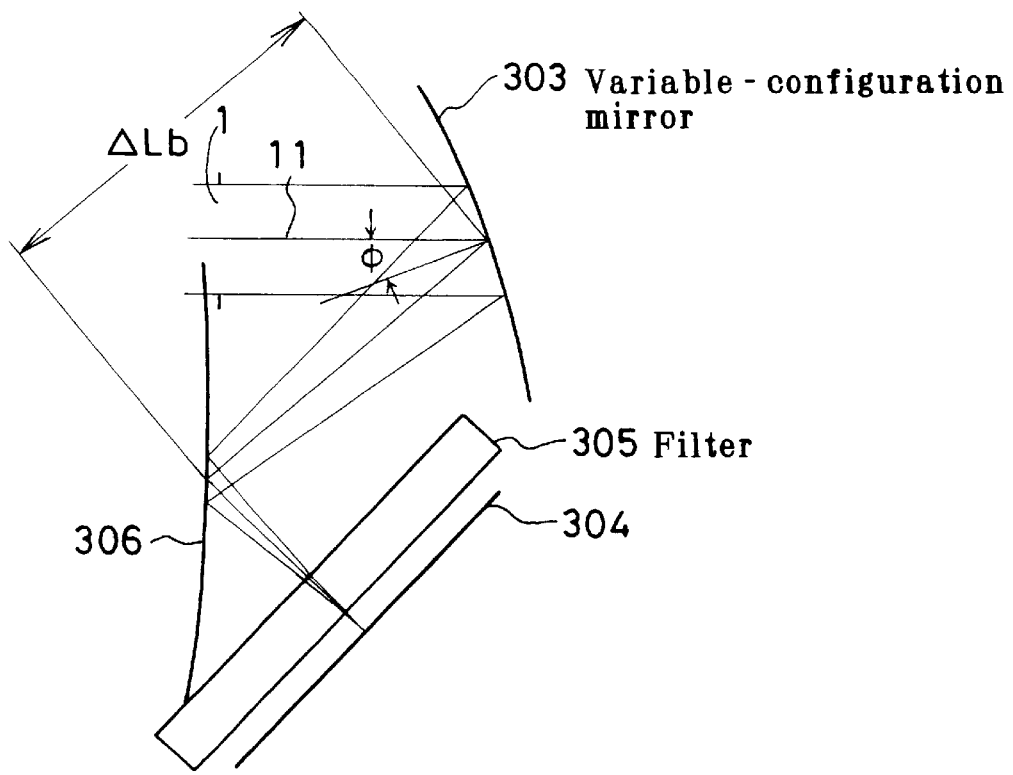

FIG. 62 is a view showing the positional relationship between a reflecting surface of an active reflecting optical element and an optical functional surface adjacent thereto.

Figure 63:
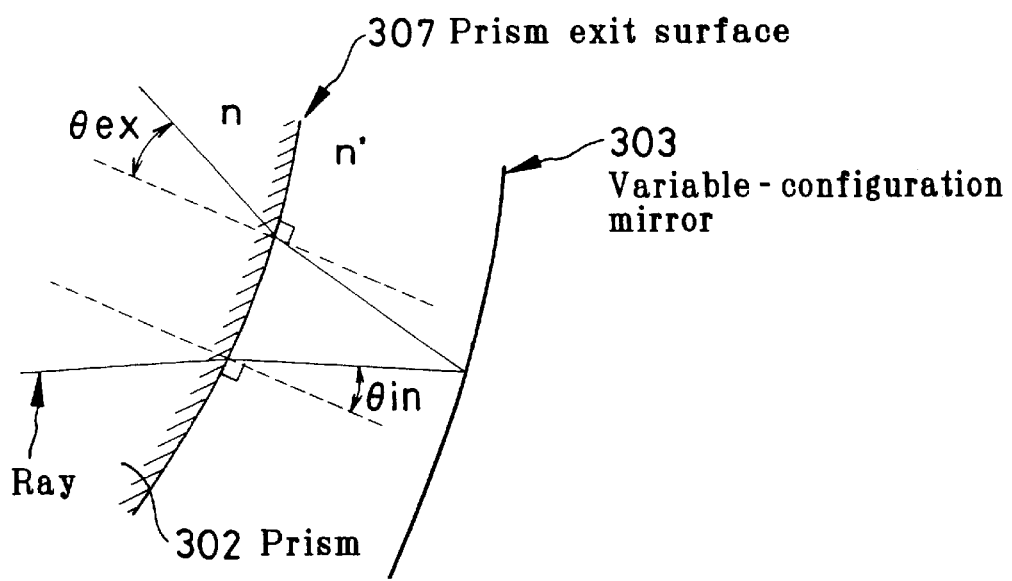

FIG. 63 is a view for describing the definition of $\theta_{ex}$ and $\theta_{in}$.

Figure 64:
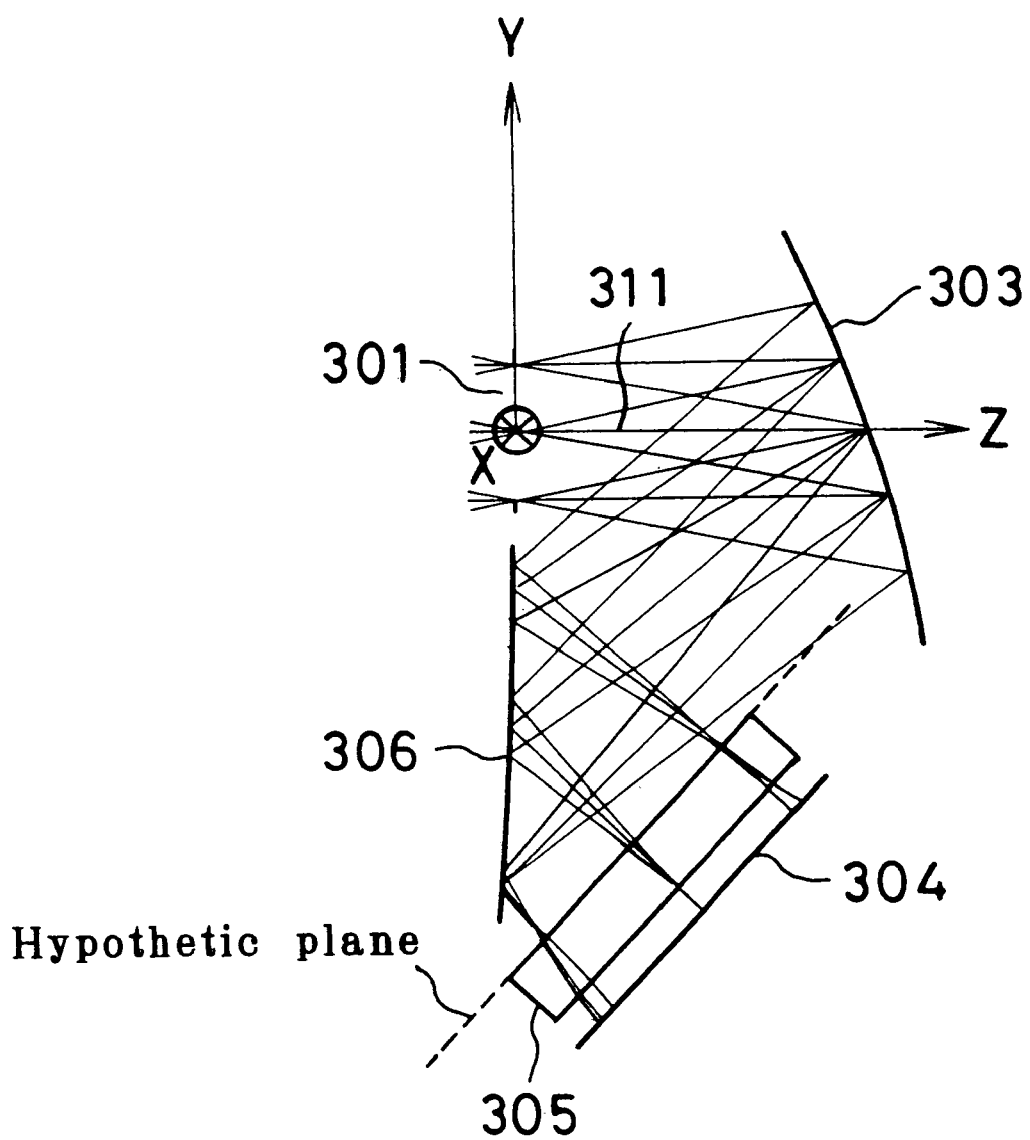

FIG. 64 is a sectional view showing the arrangement of a decentered reflecting optical system according to Example 1.

Figure 65:
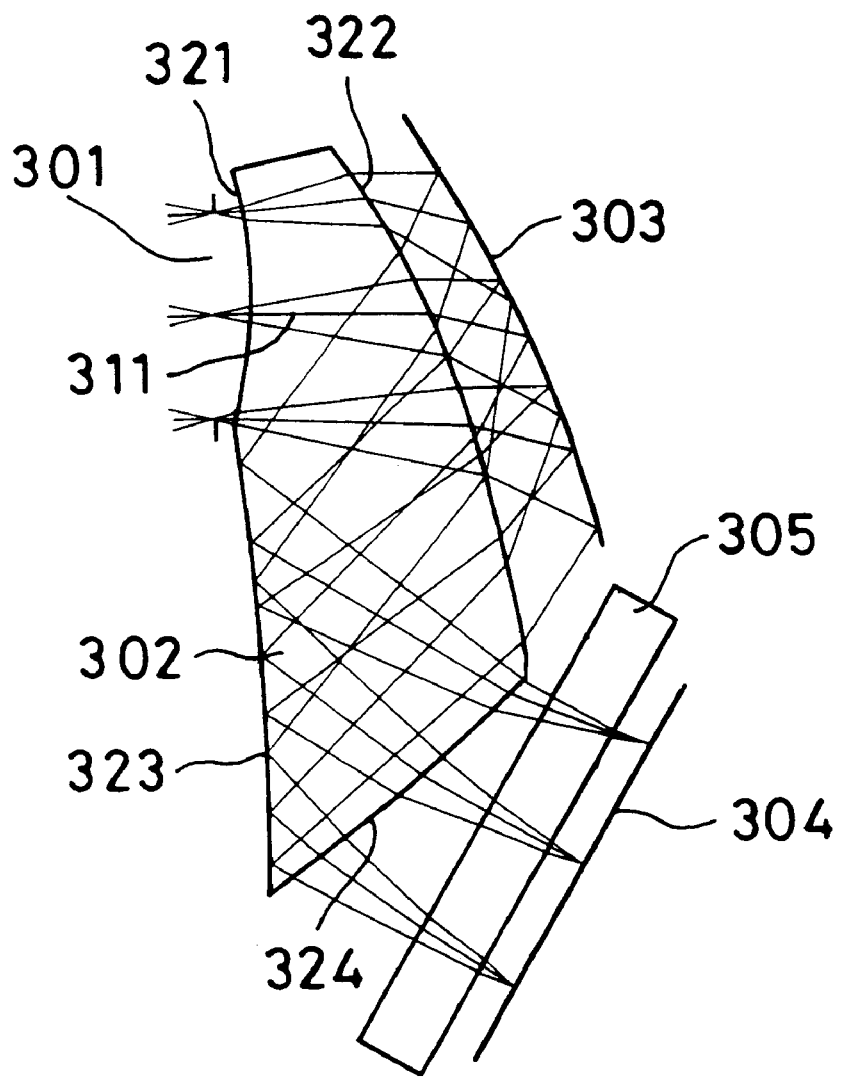

FIG. 65 is a sectional view showing the arrangement of a decentered reflecting optical system according to Example 2.

Figure 66:
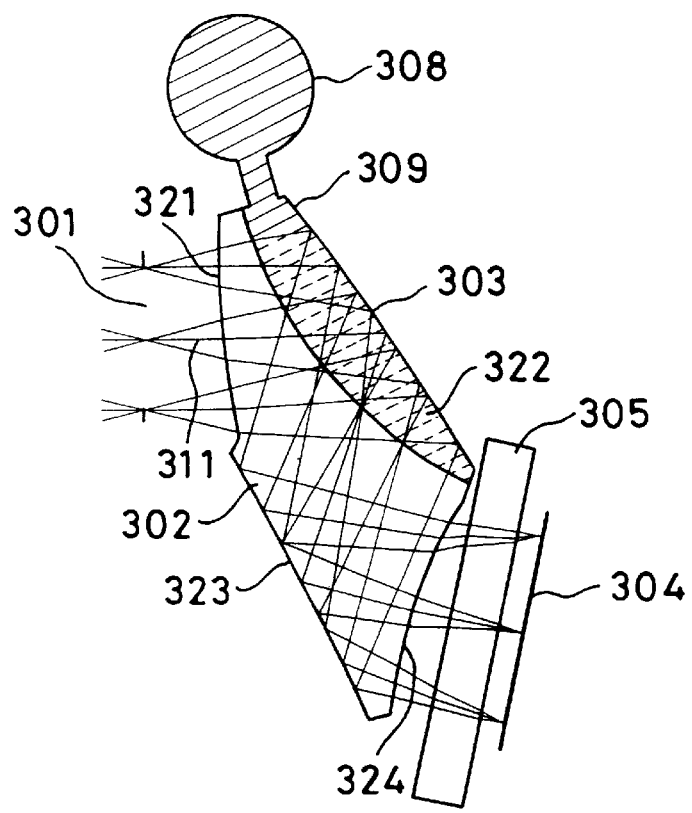

FIG. 66 is a sectional view showing the arrangement of a decentered reflecting optical system according to Example 3.

Figure 67:
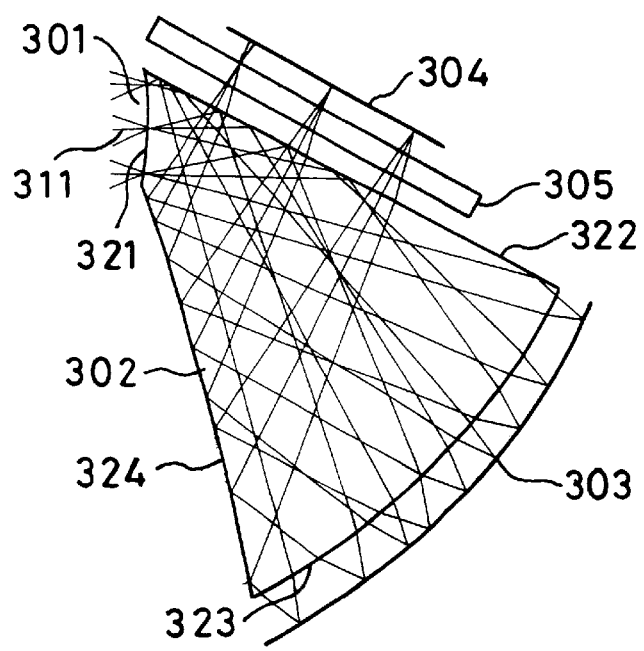

FIG. 67 is a sectional view showing the arrangement of a decentered reflecting optical system according to Example 4.

Figure 68:
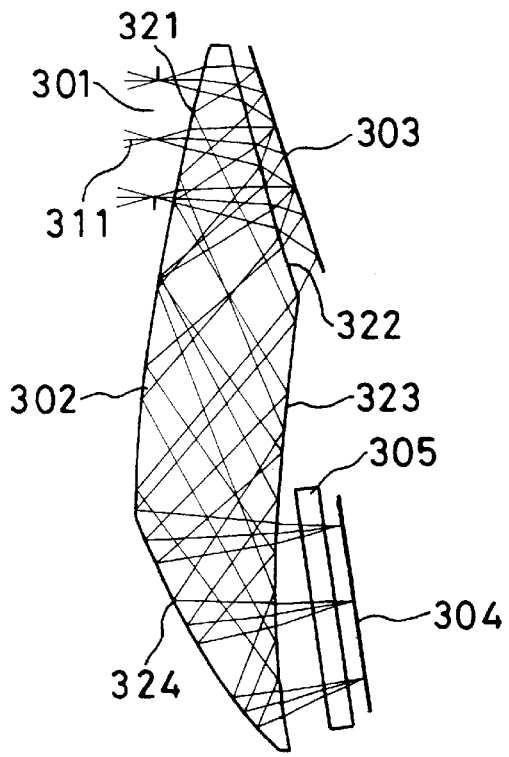

FIG. 68 is a sectional view showing the arrangement of a decentered reflecting optical system according to Example 5.

Figure 69:
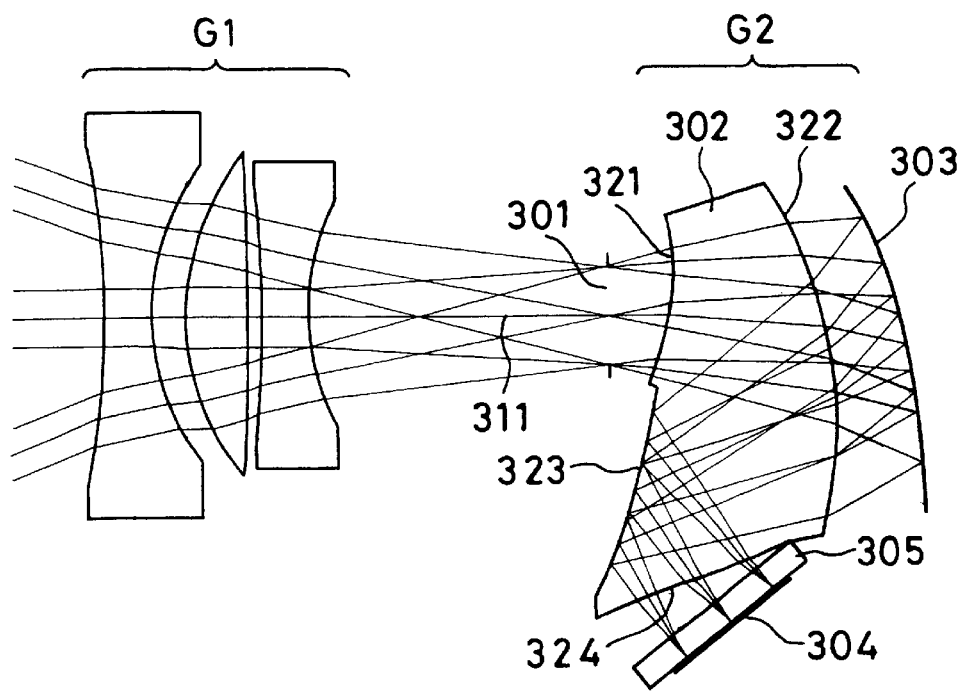

FIG. 69 is a sectional view of a zoom optical system according to Example 6 at a wide-angle end.

Figure 70:
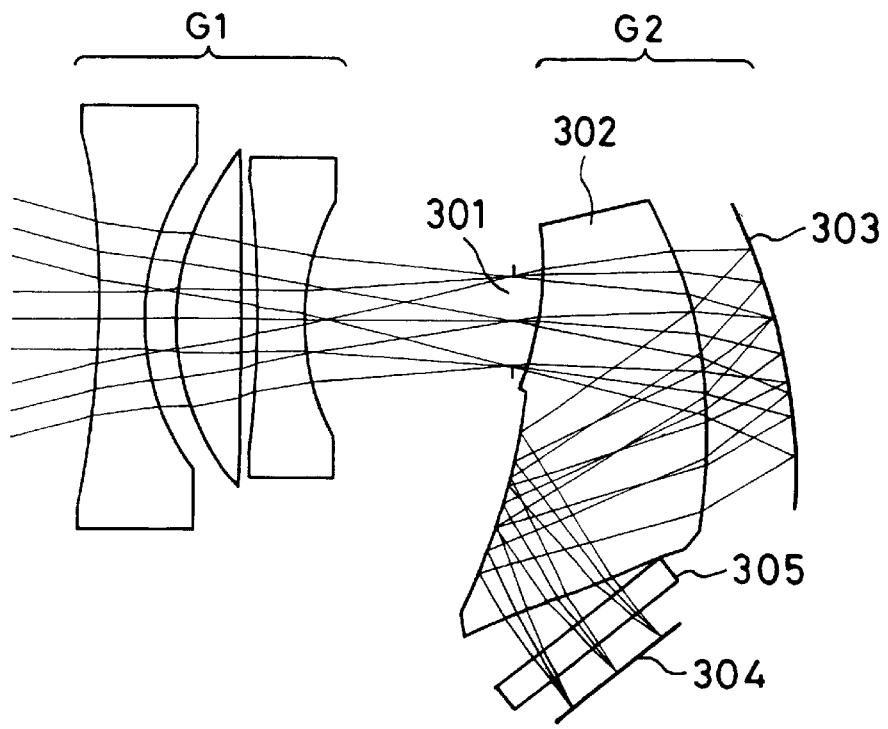

FIG. 70 is a-sectional view of the zoom optical system according to Example 6 at an intermediate position.

Figure 71:
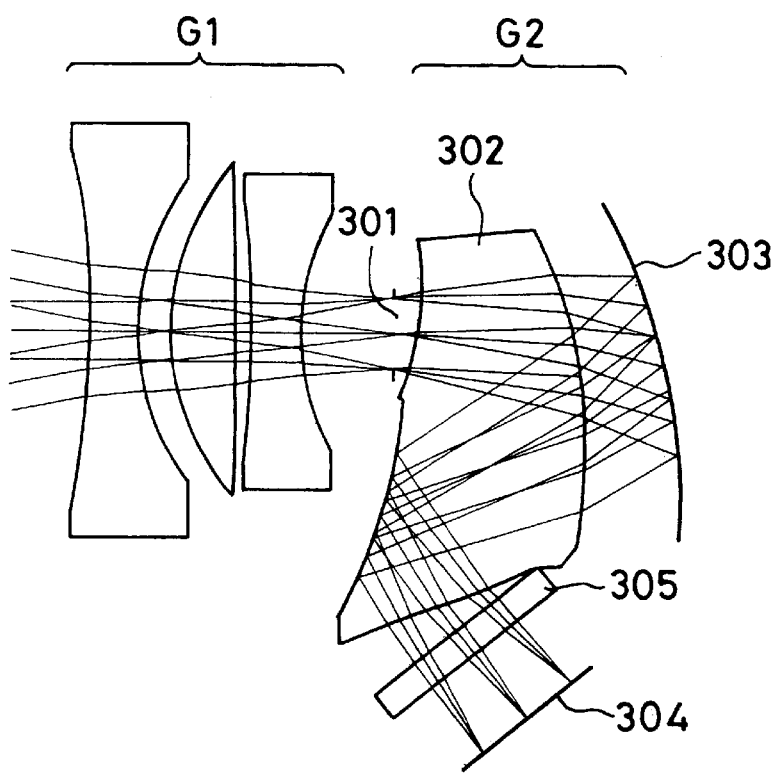

FIG. 71 is a sectional view of the zoom optical system according to Example 6 at a telephoto end.

Figure 72:
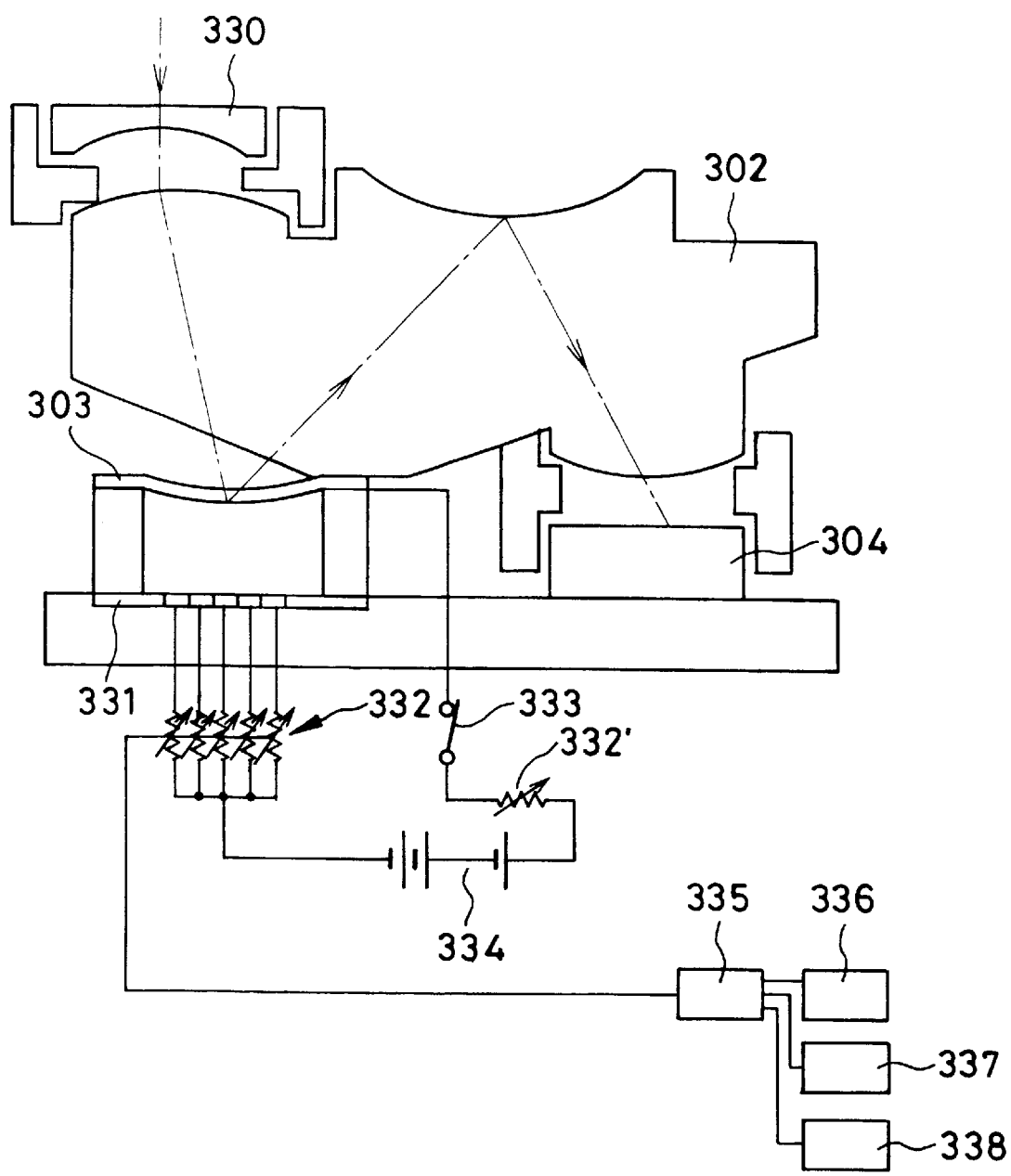

FIG. 72 is a view for describing the configuration changing principle of a variable-configuration mirror in this invention.

Figure 73:
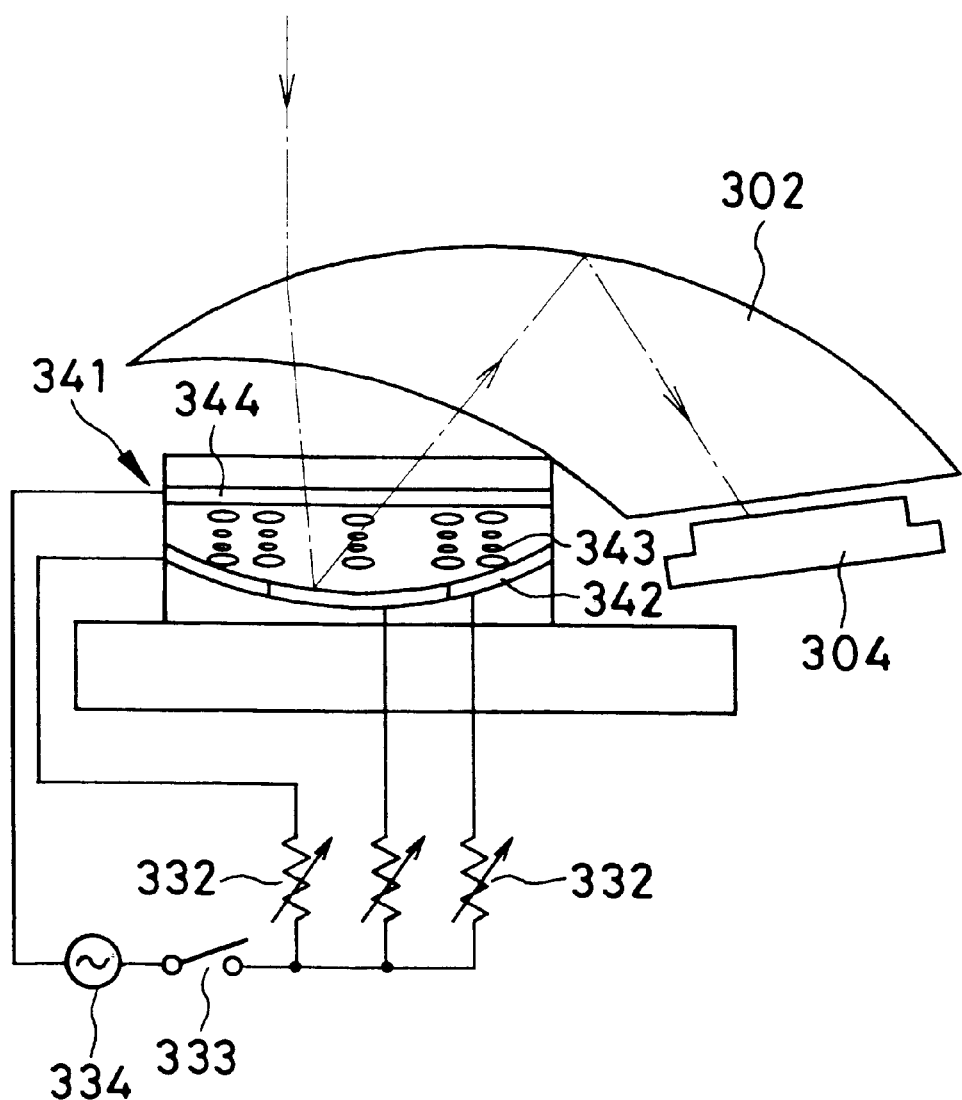

FIG. 73 is a view for describing an example of a variable-refractive-index mirror in this invention.

Figure 74:
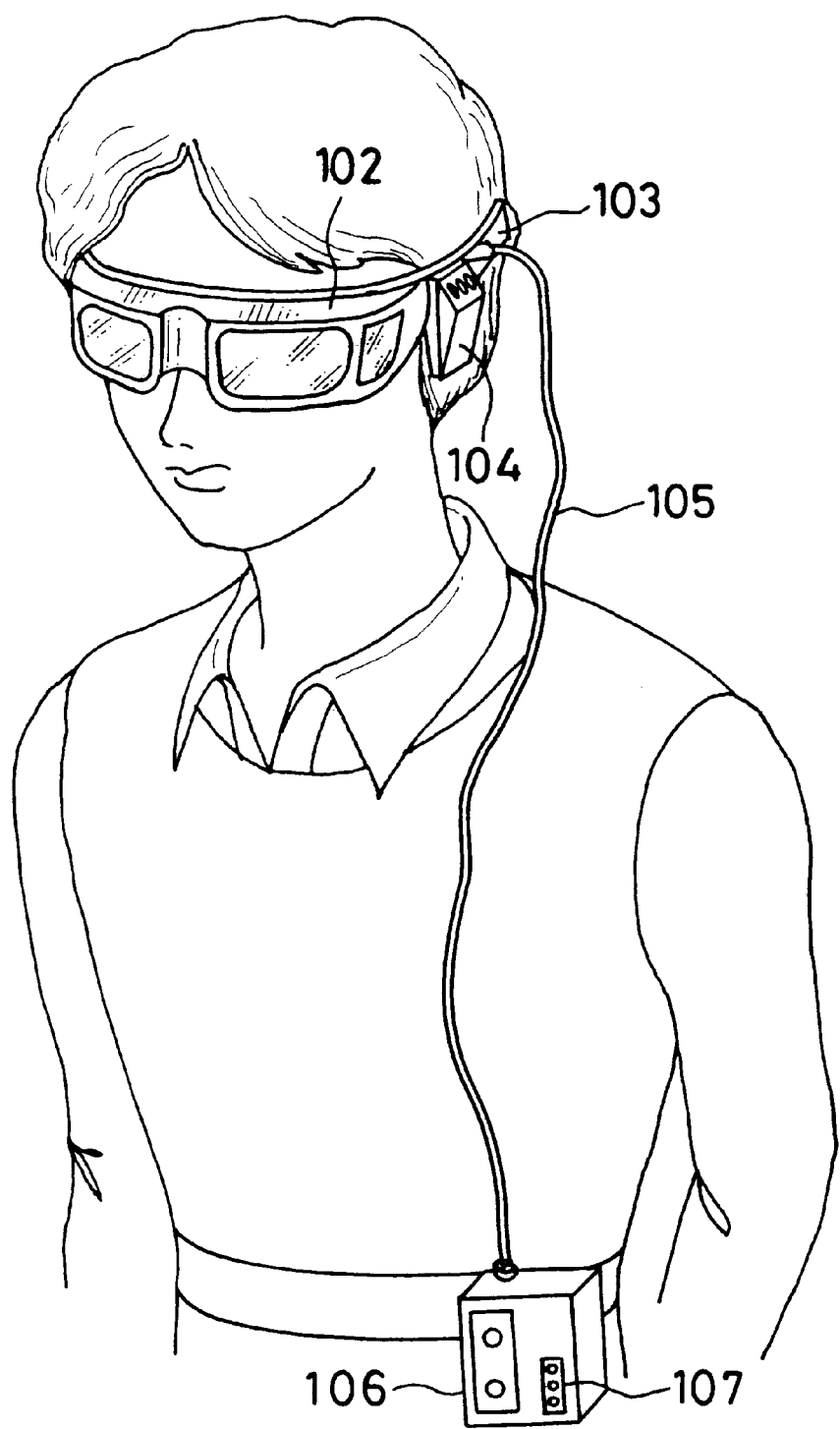

FIG. 74 is a view showing a head-mounted image display apparatus for both eyes using the decentered optical system according to this invention in a state where it is fitted on an observer's head.

Figure 75:
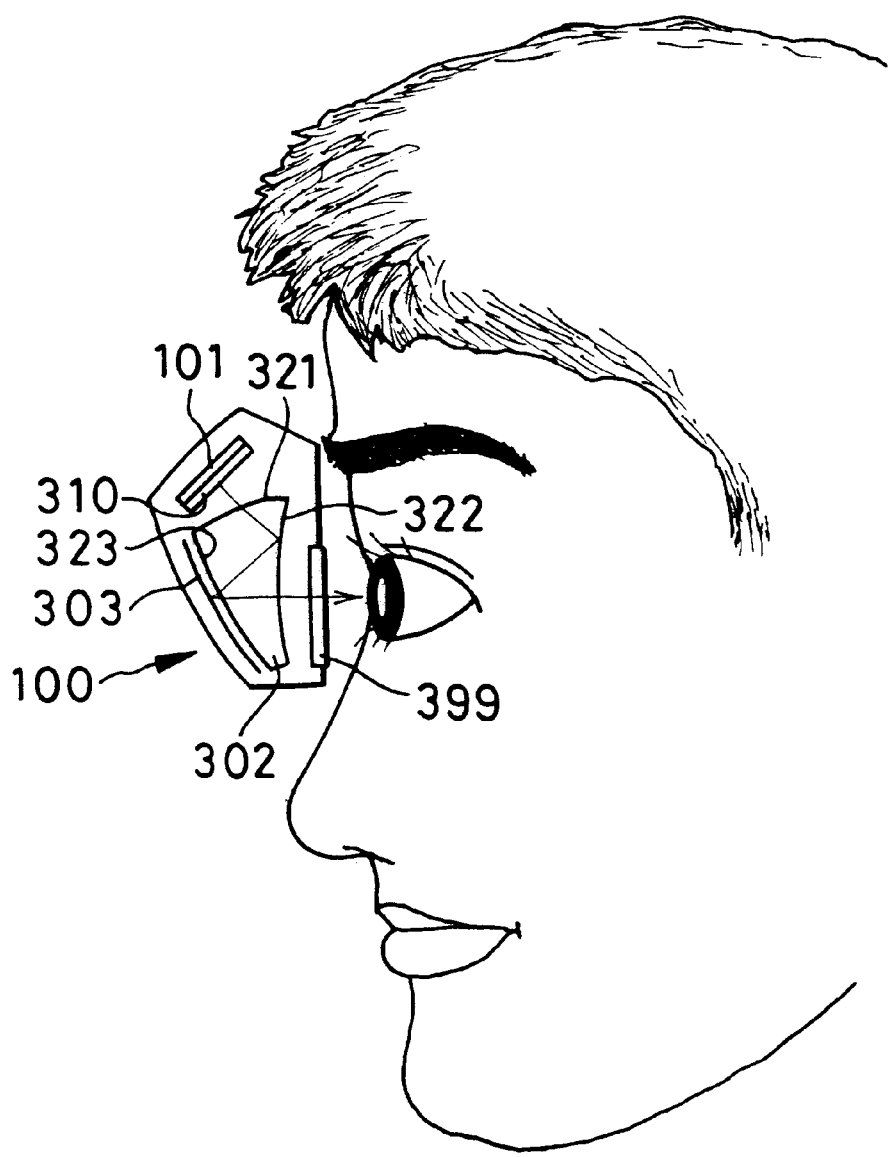

FIG. 75 is a sectional view of FIG. 74.

Figure 76:
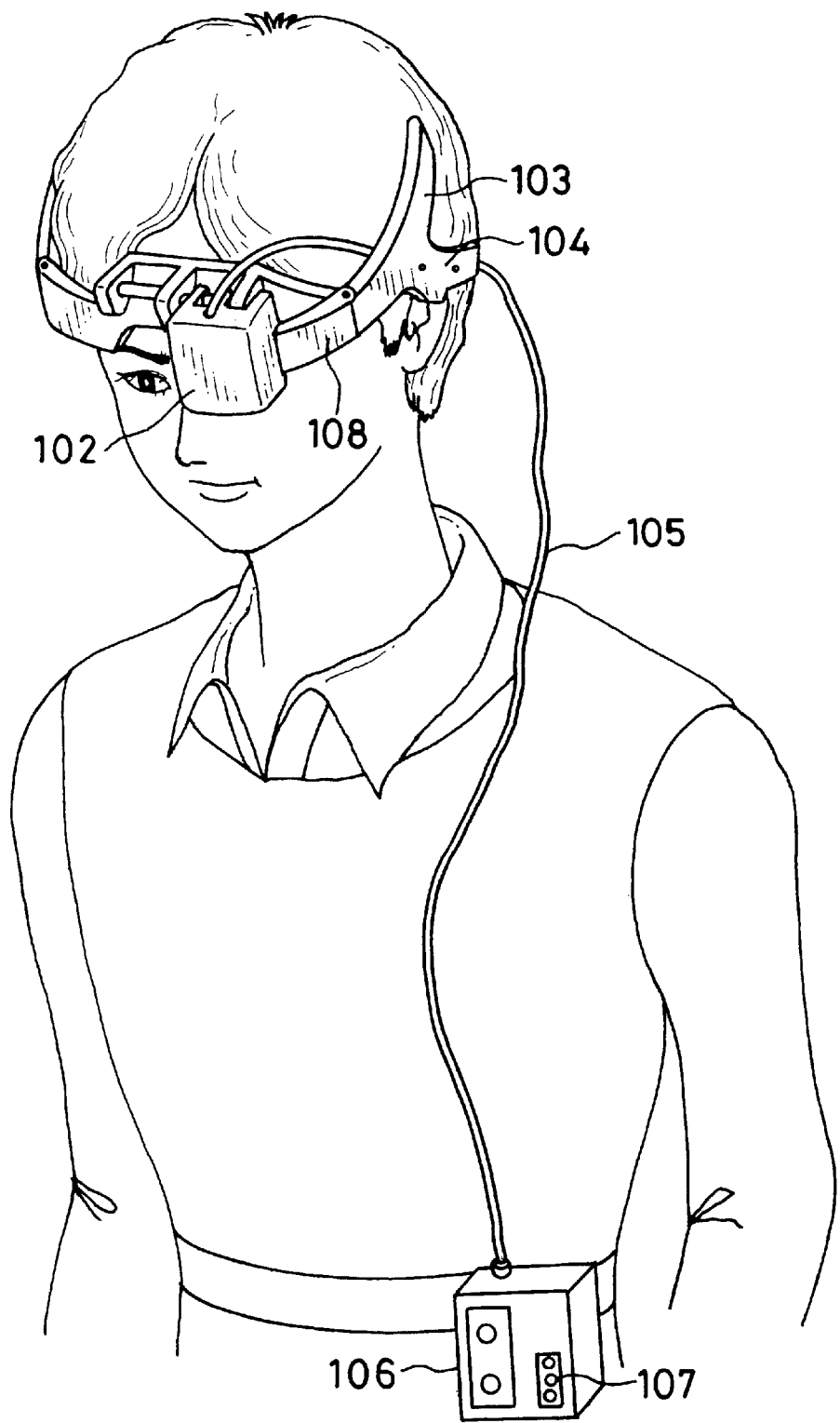

FIG. 76 is a view showing a head-mounted image display apparatus for a single eye using the decentered optical system according to this invention in a state where it is fitted on an observer's head.

Figure 77:
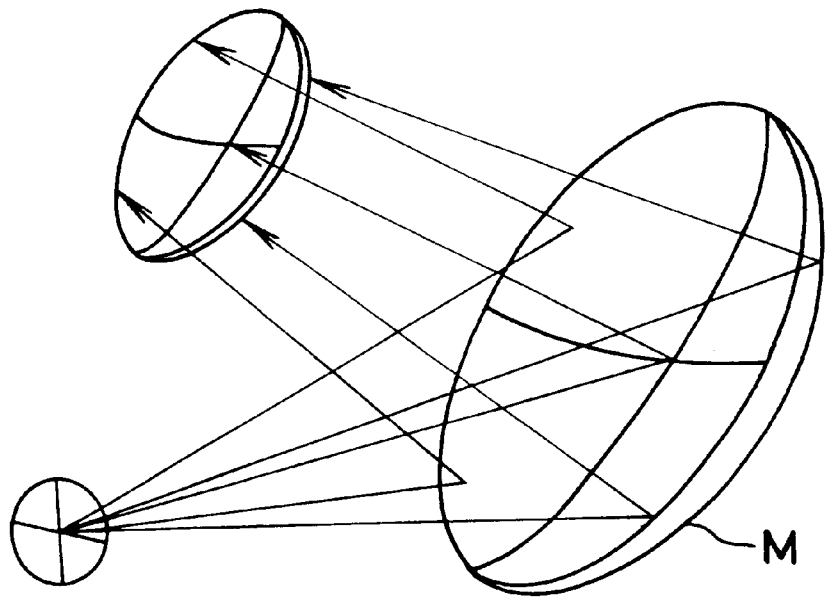

FIG. 77 is a conceptual view for describing curvature of field produced by a decentered reflecting surface.

Figure 78:
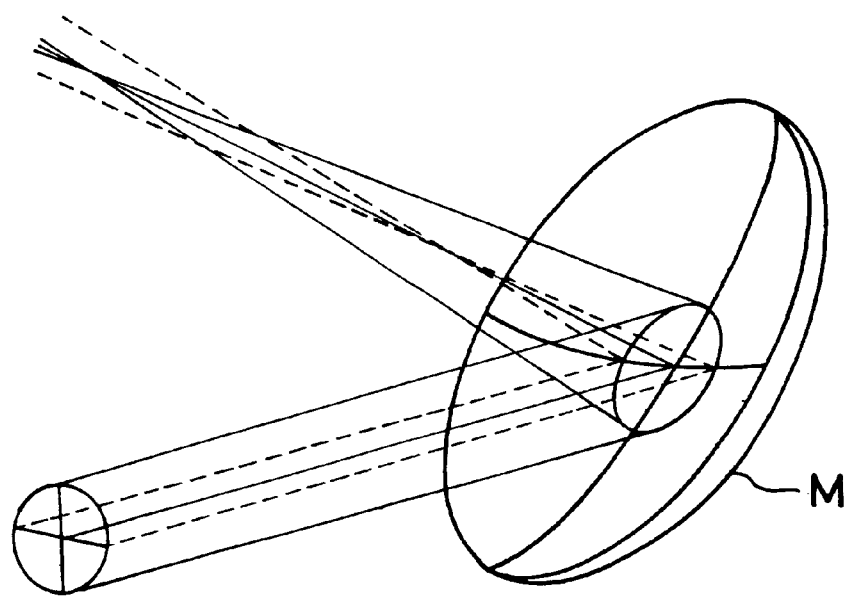

FIG. 78 is a conceptual view for describing astigmatism produced by a decentered reflecting surface.

Figure 79:
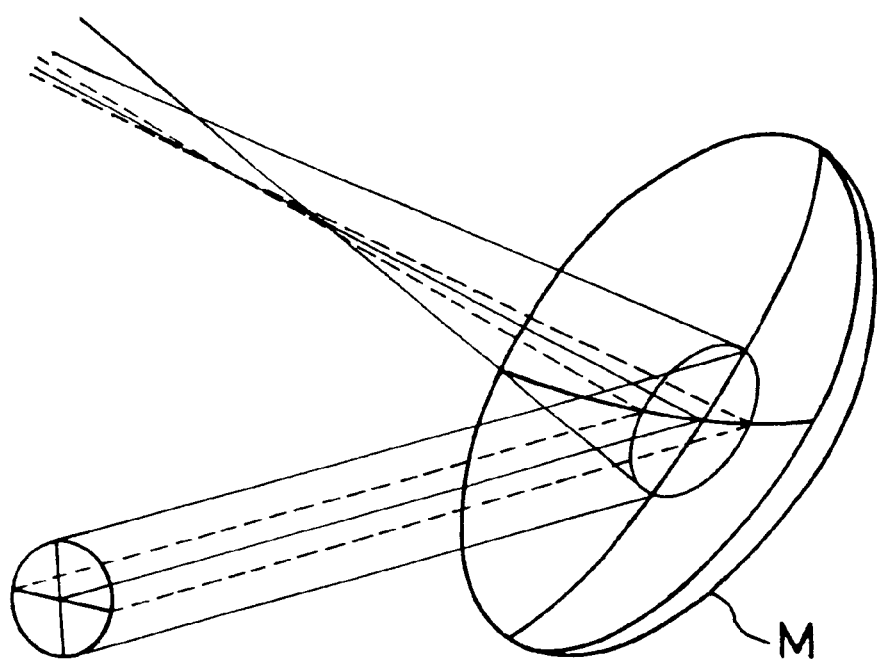

FIG. 79 is a conceptual view for describing coma produced by a decentered reflecting surface.

Parts (A) and (B) of FIG. 80 are schematic vertical sectional views of two different types of conventional variable mirrors.

Figure 81:
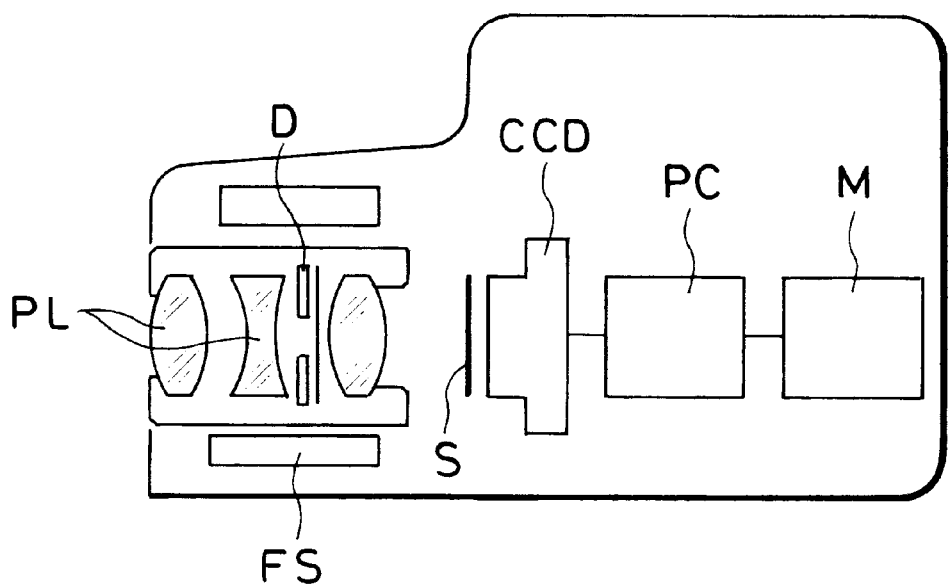

FIG. 81 is a view showing the arrangement of a conventional digital camera.

DESCRIPTION OF THE PREFERRED EMBODIMENTS

Embodiments and examples of the above-described first to fourth inventions will be described below in order.

First, various embodiments of the first invention will be described in detail with reference to the accompanying drawings.

First Embodiment

Figure 1A:
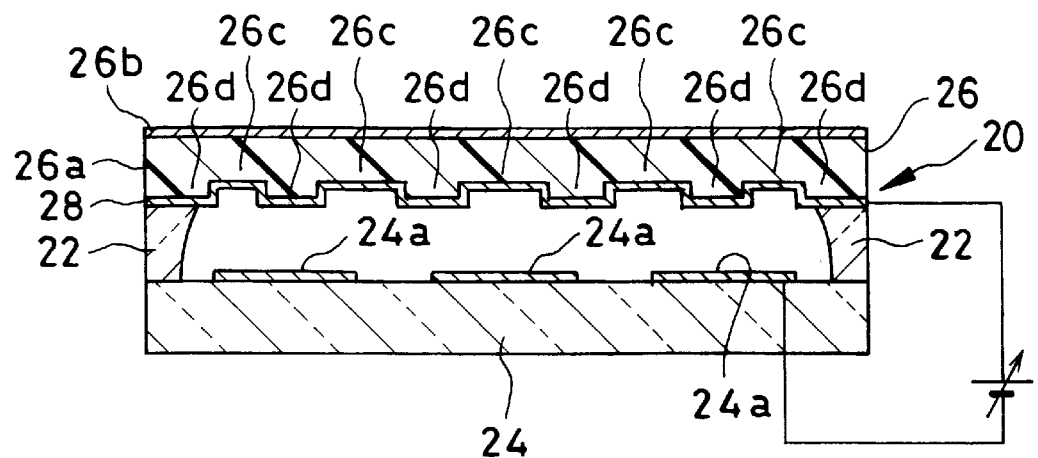
Figure 1B:
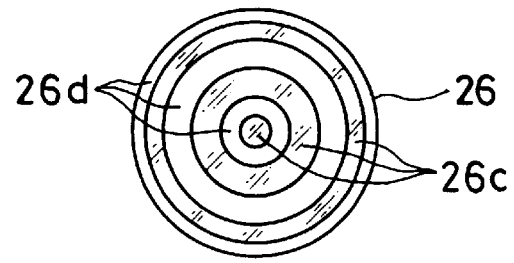

First of all, the arrangement of a variable mirror according to a first embodiment of this invention will be described in detail with reference to parts (A) and (B) of FIG. 1. Part (A) of FIG. 1 is a schematic vertical sectional view of the variable mirror according to the first embodiment, and part (B) of FIG. 1 is a schematic bottom view of a mirror body of the variable mirror in part (A) of FIG. 1.

The variable mirror 20 according to the first embodiment has a glass substrate 24 with a spacer 22 secured to the outer peripheral portion of one surface thereof. In this embodiment, the spacer 22 has a thickness of approximately 100 µm. Control electrodes 24a are formed in a desired pattern on an inner portion of the one surface of the glass substrate 24 that is surrounded by the spacer 22.

A mirror body 26 is placed on and secured to the projecting end of the spacer 22. That is, the glass substrate 24 with the spacer 22 functions as a support means for the mirror body 26. The mirror body 26 has a thin film 26a formed from a polyimide. One surface 26b of the thin film 26a on a side thereof remote from the glass substrate 24 is formed so as to function as a light-reflecting surface. In this embodiment, the one surface 26b is formed by depositing a metal having a high light reflectance, such as gold or aluminum, or depositing a multilayer dielectric thin film having an optimized reflectance.

The other surface of the thin film 26a of the mirror body 26, which faces the glass substrate 24, is formed so as to have a plurality of first portions 26c and second portions 26d, which are different in thickness from each other. The first portions 26c and the second portions 26d each have a flat projecting end surface. In this embodiment, the first portions 26c have a thickness of approximately 15 µm, and the second portions 26d have a thickness of approximately 30 µm. The planar configuration, area and arrangement of the first and second portions 26c and 26d can be set as desired. Variations in thickness produced by the first portions 26c and the second portions 26d produce variations in rigidity of the mirror body 26 along the one surface 26b. In this embodiment, the first portions 26c and the second portions 26d, which are different in thickness from each other, are periodically disposed concentrically with respect to the center of the mirror body 26.

A counter electrode 28 is formed on the other surface of the mirror body 26.

In the variable mirror according to the first embodiment, which is arranged as stated above, when a voltage is applied between the control electrodes 24a on the glass substrate 24 and the counter electrode 28 on the other surface of the mirror body 26, electrostatic attraction acts between the control electrodes 24a and the counter electrode 28, causing the mirror body 26 to curve on the spacer 22 so that the other surface of the mirror body 26 is convex, while the one surface 26b is concave.

At this time, the configuration of the light-reflecting surface, which is formed by the one surface 26b of the mirror body 26, is determined by the distribution of rigidity in a direction parallel to the one surface 26b of the mirror body 26 and the magnitude distribution of electrostatic attraction applied to the mirror body 26 in a direction parallel to the one surface 26b of the mirror body 26. That is, the configuration of the above-described light-reflecting surface is determined by the planar configuration, area and arrangement of the first portions 26c and the second portions 26d of the other surface of the mirror body 26, which are different in thickness from each other, and the pattern in which the control electrodes 24a are arranged on the glass substrate 24, and further the voltage applied between the control electrodes 24a and the counter electrode 28 of the mirror body 26.

The above-described rigidity distribution (i.e. the planar configuration, area and arrangement of the first portions 26c and the second portions 26d of the other surface of the mirror body 26, which are different in thickness from each other), the magnitude distribution of electrostatic attraction (i.e. the pattern in which the control electrodes 24a are arranged on the glass substrate 24 and the voltage applied between the control electrodes 24a and the counter electrode 28), which are required to obtain a desired configuration of the light-reflecting surface when deformed concavely as stated above, can be readily determined by a simulation utilizing a computer. Moreover, even when the external size of the variable mirror according to this invention becomes very small, the flat recesses and projections can be readily formed with precision according to the desired planar configuration, area and arrangement by utilizing a semiconductor manufacturing method or a micromachine manufacturing method.

The degree of deformation of the above-described light-reflecting surface can be measured by using any known deformation measuring means. However, it can also be measured by detecting the electrostatic capacity between the control electrodes 24a on the glass substrate 24 and the counter electrode 28 on the other surface of the mirror body 26. For this purpose, when a desired control voltage of low frequency necessary for generation of electrostatic attraction is applied to the control electrodes 24a, a high-frequency signal in MHz band is also applied thereto. By doing so, it is possible to measure an electrostatic capacity value in correspondence to the intensity of the high-frequency signal received at the counter electrode 28.

On the basis of the measured electrostatic capacity value, means for curving the mirror body 26, that is, means for controlling the voltage supplied to the control electrodes 24a on the glass substrate 24 and the counter electrode 28 on the other surface of the mirror body 26, is feedback-controlled, thereby allowing the light-reflecting surface of the mirror body 26 to be rapidly deformed to a desired degree of curvature and also permitting the attained desired degree of curvature to be maintained precisely.

Next, a method of producing the variable mirror 20 according to the first embodiment of this invention, which is characterized by being arranged as stated above, will be described in detail with reference to parts (A) to (G) of FIG. 2. Parts (A) to (G) of FIG. 2 schematically show vertical sectional views at a plurality of steps of the method of producing the variable mirror 20.

Figure 2:
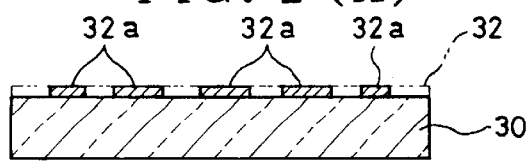
Figure 2:
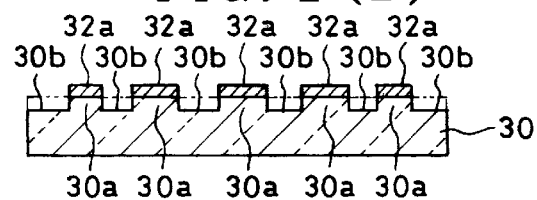
Figure 2:
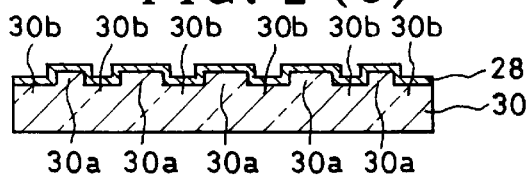
Figure 2:
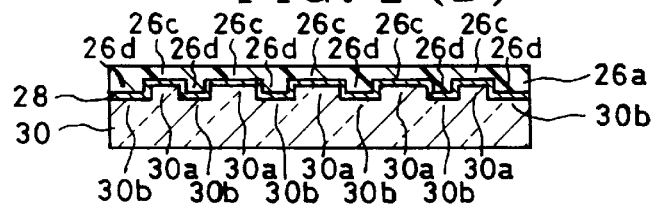
Figure 2:
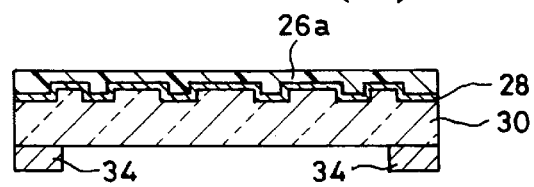
Figure 2:
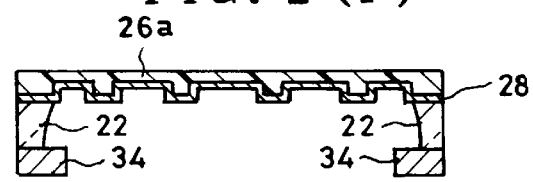
Figure 2:
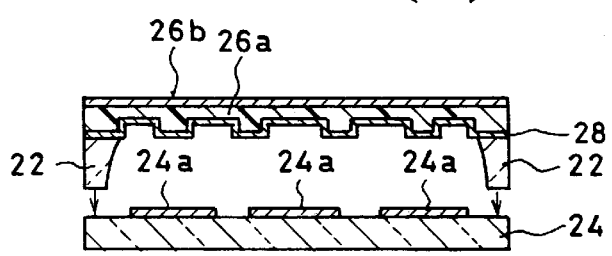

First of all, as shown by the chain double-dashed line in part (A) of FIG. 2, one surface of a silica glass substrate 30 with a thickness of approximately 100 μm is uniformly coated with a positive photoresist 32. Next, the photoresist 32 is exposed to light by using a photomask (not shown) having light-transmitting portions at positions corresponding to the thick second portions 26d of the other surface of the mirror body 26 and light-blocking portions at positions corresponding to the thin first portions 26c of the other surface. As a result of this exposure, the photoresist 32 is cured at the positions corresponding to the thin first portions 26c of the other surface of the mirror body 26 but decomposed at the positions corresponding to the thick second portions 26d of the other surface of the mirror body 26, which were exposed to light through the photomask.

Thereafter, the photoresist 32 is washed. Consequently, as shown by the solid line in part (A) of FIG. 2, the decomposed photoresist 32 at the positions corresponding to the thick second portions 26d of the other surface of the mirror body 26, which were exposed to light through the photomask, flows out from the one surface of the silica glass substrate 30. As a result, only the cured photoresists 32a at the positions corresponding to the thin first portions 26c of the other surface of the mirror body 26 are left on the one surface of the silica glass substrate 30.

Next, the one surface of the silica glass substrate 30 is etched to a depth of approximately 15 μm by RIE (reactive ion etching). During this etching, as shown in part (B) of FIG. 2, portions 30a of the one surface of the silica glass substrate 30 where the cured photoresists 32a are left (i.e. positions corresponding to the thin first portions 26c of the other surface of the mirror body 26) are not etched, but only portions 30b not covered with the cured photoresists 32a (i.e. positions corresponding to the thick second portions 26d of the other surface of the mirror body 26, which are shown by the chain double-dashed lines) are etched to a depth of approximately 15 μm.

Next, the cured photoresists 32a are removed by a well-known method. Thereafter, as shown in part (C) of FIG. 2, a counter electrode 28 is formed on the one surface of the silica glass substrate 30 from one of various metals of high electric conductivity, e.g. gold, aluminum, and platinum, by using a well-known sputtering, vacuum deposition or thermal resistance heating deposition system for metal. Further, copper may be deposited on the counter electrode 28.

Next, as shown in part (D) of FIG. 2, the counter electrode 28 on the one surface of the silica glass substrate 30 is coated with a paste as a base material of a polyimide so as to form a flat surface by a well-known coating method, e.g. a printing method or a spin coating method. Then, the paste is fired at a high temperature to form a thin film 26a for the mirror body 26.

Next, as shown in part (E) of FIG. 2, an etching mask 34 is formed on the other surface of the silica glass substrate 30, which is reverse to the one surface where the counter electrode 28 and the thin film 26a are formed, so that the etching mask 34 covers a position corresponding to the outer peripheral portion of the counter electrode 28 and the thin film 26a.

Then, the other surface of the silica glass substrate 30 is etched with an etching liquid containing hydrofluoric acid. Consequently, only a portion of the silica glass substrate 30 at a position corresponding to the outer peripheral portion of the counter electrode 28 and the thin film 26a, which is covered with the etching mask 34, is left, and an inner portion of the counter electrode 28 that is surrounded by the outer peripheral portion is exposed. A portion of the silica glass substrate 30 left at a position corresponding to the outer peripheral portion of the counter electrode 28 and the thin film 26a functions as a spacer 22. It should be noted that upon completion of the above-described etching, the etching mask 34 is removed by a well-known method.

Next, a light-reflecting film of a metal or the like is formed, if necessary, on the one surface 26b of the thin film 26a on a side thereof reverse to a side where the counter electrode 28 is formed by a well-known method, e.g. a vacuum deposition method, to allow the one surface 26b to function as a light-reflecting surface. Thus, the mirror body 26 with the spacer 22 on the outer peripheral portion thereof is formed, as shown in part (G) of FIG. 2.

Independently of the formation of the mirror body 26, a glass substrate 24 having control electrodes 24a formed in a desired pattern on one surface thereof by a well-known method is prepared. The control electrodes 24a on the one surface of the glass substrate 24 can be readily formed, for example, by carrying out a well-known photo-etching method after an electrically conductive film, e.g. gold, has been formed on the whole of the one surface of the glass substrate 24.

Finally, as shown in part (G) of FIG. 2, the mirror body 26 is secured to a predetermined position on the one surface of the glass substrate 24 through the spacer 22.

Although only one variable mirror 20 is produced in the method of producing the variable mirror 20 according to the first embodiment described with reference to parts (A) to (G) of FIG. 2, it should be noted that a plurality of variable mirrors 20 can also be readily produced within a short period of time. That is, a plurality of mirror bodies 26 with respective spacers 22 are simultaneously formed from a silica glass substrate having a plane area corresponding to the sum total of the plane areas of the mirror bodies 26. In addition, a plurality of glass substrates 24 with respective control electrodes 24a are simultaneously formed from a silica glass substrate having a plane area corresponding to the sum total of the plane areas of the glass substrates 24. Thereafter, the plurality of mirror bodies 26 with respective spacers 22, which were simultaneously formed, are cut into individual mirror bodies 26, and the plurality of glass substrates 24 with respective control electrodes 24a, which were simultaneously formed, are also cut into individual glass substrates 24. Finally, each individual mirror body 26 with a spacer 22 and each individual glass substrate 24 with control electrodes 24a are secured to each other at a predetermined position as shown in part (G) of FIG. 2.

Second Embodiment

Next, the arrangement of a variable mirror according to a second embodiment of this invention, together with a process for producing the variable mirror, will be described in detail with reference to parts (A) to (G) of FIG. 3. Parts (A) to (G) of FIG. 3 schematically show vertical sectional views at a plurality of steps of a method of producing the variable mirror according to the second embodiment.

First of all, the arrangement of the variable mirror 40 according to the second embodiment will be described with reference to part (G) of FIG. 3. As shown in part (G) of FIG. 3, the variable mirror 40 according to this embodiment has a glass substrate 44 with a spacer 42 secured to the outer peripheral portion of one surface thereof. In this embodiment, the spacer 42 has a thickness of approximately 100 $\mu$m. Control electrodes 44a are formed in a desired pattern on an inner portion of the one surface of the glass substrate 44 surrounded by the spacer 42.

A mirror body 46 is placed on and secured to the projecting end of the spacer 42. That is, the glass substrate 44 with the spacer 42 functions as a support means for the mirror body 46. The mirror body 46 has a thin film 46a formed from a metal. One surface 46b of the thin film 46a on a side thereof remote from the glass substrate 24, is formed so as to function as a light-reflecting surface. In this embodiment, the one surface 46b has been subjected to smoothing treatment.

The other surface of the thin film 46a of the mirror body 46, which faces the glass substrate 44, is formed so as to have a plurality of first portions 46c and second portions 46d, which are different in thickness from each other. The first portions 46c and the second portions 46d each have a flat projecting end surface. In this embodiment, the first portions 46c have a thickness of approximately 15 $\mu$m, and the second portions 46d have a thickness of approximately 30 $\mu$m. The planar configuration, area and arrangement of the first and second portions 46c and 46d can be set as desired. Variations in thickness produced by the first portions 46c and the second portions 46d produce variations in rigidity of the mirror body 46 along the one surface 46b. In this embodiment, the first portions 46c and the second portions 46d, which are different in thickness from each other, are periodically disposed concentrically with respect to the center of the mirror body 46.

A counter electrode 48 is formed on the other surface of the mirror body 46.

In the variable mirror according to the second embodiment, which is arranged as stated above, when a voltage is applied between the control electrodes 44a on the glass substrate 44 and the counter electrode 48 on the other surface of the mirror body 46, electrostatic attraction acts between the control electrodes 44a and the counter electrode 48, causing the mirror body 46 to curve on the spacer 42 so that the other surface of the mirror body 46 is convex, while the one surface 46b is concave.

At this time, the configuration of the light-reflecting surface, which is formed by the one surface 46b of the mirror body 46, is determined by the distribution of rigidity in a direction parallel to the one surface 46b of the mirror body 46 and the magnitude distribution of electrostatic attraction applied to the mirror body 46 in a direction parallel to the one surface 46b of the mirror body 46. That is, the configuration of the above-described light-reflecting surface is determined by the planar configuration, area and arrangement of the first portions 46c and the second portions 46d of the other surface of the mirror body 46, which are different in thickness from each other, and the pattern in which the control electrodes 44a are arranged on the glass substrate 44, and further the voltage applied between the control electrodes 44a and the counter electrode 48 of the mirror body 46.

The above-described rigidity distribution (i.e. the planar configuration, area and arrangement of the first portions 46c and the second portions 46d of the other surface of the mirror body 46, which are different in thickness from each other), the magnitude distribution of electrostatic attraction (i.e. the pattern in which the control electrodes 44a are arranged on the glass substrate 44 and the voltage applied between the control electrodes 44a and the counter electrode 48), which are required to obtain a desired configuration of the light-reflecting surface when deformed concavely as stated above, can be readily determined by a simulation utilizing a computer. Moreover, even when the external size of the variable mirror according to this invention becomes very small, the flat recesses and projections can be readily formed with precision according to the desired planar configuration, area and arrangement by utilizing a semiconductor manufacturing method or a micromachine manufacturing method.

The degree of deformation of the above-described light-reflecting surface can be measured by using any known deformation measuring means. However, it can also be measured by detecting the electrostatic capacity between the control electrodes 44a on the glass substrate 44 and the counter electrode 48 on the other surface of the mirror body 46. For this purpose, when a desired control voltage of low frequency necessary for generation of electrostatic attraction is applied to the control electrodes 44a, a high-frequency signal in MHz band is also applied thereto. By doing so, it is possible to measure an electrostatic capacity value in correspondence to the intensity of the high-frequency signal received at the counter electrode 48.

On the basis of the measured electrostatic capacity value, means for curving the mirror body 46, that is, means for controlling the voltage supplied to the control electrodes 44a on the glass substrate 44 and the counter electrode 48 on the other surface of the mirror body 46, is feedback-controlled, thereby allowing the light-reflecting surface of the mirror body 46 to be rapidly deformed to a desired degree of curvature and also permitting the attained desired degree of curvature to be maintained precisely.

Next, a method of producing the variable mirror 40 according to the above-described second embodiment will be described in detail with reference to parts (A) to (G) of FIG. 3.

First of all, as shown by the chain double-dashed line in part (A) of FIG. 3, one surface of a silica glass substrate 50 with a thickness of approximately 100 μm is uniformly coated with a positive photoresist 52. Next, the photoresist 52 is exposed to light by using a photomask (not shown) having light-transmitting portions at positions corresponding to the thick second portions 46d of the other surface of the mirror body 46 of the variable mirror 40 according to the second embodiment and light-blocking portions at positions corresponding to the thin first portions 46c of the other surface. As a result of this exposure, the photoresist 52 is cured at the positions corresponding to the thin first portions 46c of the other surface of the mirror body 46 but decomposed at the positions corresponding to the thick second portions 46d of the other surface of the mirror body 46, which were exposed to light through the photomask.

Thereafter, the photoresist 42 is washed. Consequently, as shown by the solid line in part (A) of FIG. 3, the decomposed photoresist 52 at the positions corresponding to the thick second portions 46d of the other surface of the mirror body 46, which were exposed to light through the photomask, flows out from the one surface of the silica glass substrate 50. As a result, only the cured photoresists 52a at the positions corresponding to the thin first portions 46c of the other surface of the mirror body 46 are left on the one surface of the silica glass substrate 50.

Next, the one surface of the silica glass substrate 50 is etched to a depth of approximately 15 μm by RIE (reactive ion etching). During this etching, as shown in part (B) of FIG. 3, portions 50a of the one surface of the silica glass substrate 50 where the cured photoresists 52a are left (i.e. positions corresponding to the thin first portions 46c of the other surface of the mirror body 46) are not etched, but only portions 50b not covered with the cured photoresists 52a (i.e. positions corresponding to the thick second portions 46d of the other surface of the mirror body 46, which are shown by the chain double-dashed lines) are etched to a depth of approximately 15 μm.

Next, the cured photoresists 52a are removed by a well-known method. Thereafter, as shown in part (C) of FIG. 3, a counter electrode 48 is formed on the one surface of the silica glass substrate 50 from one of various metals of high electric conductivity, e.g. gold, aluminum, and platinum, by using a well-known sputtering, vacuum deposition or thermal resistance heating deposition system for metal. Further, copper may be deposited on the counter electrode 28.

Next, as shown in part (D) of FIG. 3, a thin metal film TMF of desired thickness is formed on the counter electrode 48 on the one surface of the silica glass substrate 50 by a well-known metal film forming method, e.g. a deposition method.

Next, as shown in part (E) of FIG. 3, one surface 46b of the thin metal film TMF on a side thereof remote from the silica glass substrate 50 is planarized by a well-known method so as to function as a light-reflecting surface. Thus, a thin film 46a for the mirror body 46 is formed. For the planarization, it is possible to use, for example, a method wherein after the one surface of the thin film TMF has been coated with a resist, etch-back is carried out under conditions that there is no selectivity, or a chemical/mechanical polishing (CMP) method.

The required degree of planarization depends on the use application of the light-reflecting surface. For example, when the variable mirror 40 according to the second embodiment is used in an optical system using a lens, the one surface 46b of the thin film 46a is required to be about $\lambda/20$ (where $\lambda$ is the wavelength of light used in the above-described optical system).

If necessary, a metal film or a dielectric multilayer film may be formed on the one surface 46b of the thin film 46a to reflect light even more efficiently.

Further, as shown in part (E) of FIG. 3, an etching mask 54 is formed on the other surface of the silica glass substrate 50, which is reverse to the one surface where the counter electrode 48 and the thin film 46a are formed, so that the etching mask 54 covers a position corresponding to the outer peripheral portion of the counter electrode 48 and the thin film 46a.

Then, the other surface of the silica glass substrate 50 is etched with an etching liquid containing hydrofluoric acid. Consequently, only a portion of the silica glass substrate 50 at a position corresponding to the outer peripheral portion of the counter electrode 48 and the thin film 46a, which is covered with the etching mask 54 is left, and an inner portion of the counter electrode 48 that is surrounded by the outer peripheral portion is exposed. A portion of the silica glass substrate 50 left at a position corresponding to the outer peripheral portion of the counter electrode 48 and the thin film 46a functions as a spacer 42. It should be noted that upon completion of the above-described etching, the etching mask 54 is removed by a well-known method.

Thus, the mirror body 46 with the spacer 42 on the outer peripheral portion thereof is formed, as shown in part (G) of FIG. 3.

Independently of the formation of the mirror body 46, a glass substrate 44 having control electrodes 44a formed in a desired pattern on one surface thereof by a well-known method is prepared. The control electrodes 44a on the one surface of the glass substrate 44 can be readily formed, for example, by carrying out a well-known photo-etching method after an electrically conductive film, e.g. gold, has been formed on the whole of the one surface of the glass substrate 44.

Finally, as shown in part (G) of FIG. 3, the mirror body 46 is secured to a predetermined position on the one surface of the glass substrate 44 through the spacer 42.

Although only one variable mirror 40 is produced in the method of producing the variable mirror 40 according to the second embodiment described with reference to parts (A) to (G) of FIG. 3, it should be noted that a plurality of variable mirrors 40 can also be readily produced within a short period of time. That is, a plurality of mirror bodies 46 with respective spacers 42 are simultaneously formed from a silica glass substrate having a plane area corresponding to the sum total of the plane areas of the mirror bodies 46. In addition, a plurality of glass substrates 44 with respective control electrodes 44a are simultaneously formed from a silica glass substrate having a plane area corresponding to the sum total of the plane areas of the glass substrates 44. Thereafter, the plurality of mirror bodies 46 with respective spacers 42, which were simultaneously formed, are cut into individual mirror bodies 46, and the plurality of glass substrates 44 with respective control electrodes 44a, which were simultaneously formed, are also cut into individual glass substrates 44. Finally, each individual mirror body 46 with a spacer 42 and each individual glass substrate 44 with control electrodes 44a are secured to each other at a predetermined position as shown in part (G) of FIG. 3.

In the variable mirror 40 according to the second embodiment, the thin film 46a of the mirror body 46 and the counter electrode 48 and further the one surface 46b, which functions as a light-reflecting surface, can be basically formed from one kind of material. Therefore, the design for curving of the one surface 46b, which functions as a light-reflecting surface, is facilitated in comparison to the variable mirror 20 according to the first embodiment, in which at least the counter electrode 28, preferably together with the one surface 26b that functions as a light-reflecting surface, is formed from a material different from that of the thin film 26a.

Third Embodiment

Next, the arrangement of a variable mirror 60 according to a third embodiment of this invention will be described in detail with reference to FIG. 4.

The variable mirror 60 according to this embodiment has a glass substrate 64 with a spacer 62 secured to the outer peripheral portion of one surface thereof. In this embodiment, the spacer 62 has a thickness of approximately 100 $\mu$m. Control electrodes 64a are formed in a desired pattern on an inner portion of the one surface of the glass substrate 64 that is surrounded by the spacer 62.

A mirror body 66 is placed on and secured to the projecting end of the spacer 62. That is, the glass substrate 64 with the spacer 62 functions as a support means for the mirror body 66. The mirror body 66 has a thin film 66a formed from a polyimide. One surface 66b of the thin film 66a on a side thereof remote from the glass substrate 64 is formed so as to function as a light-reflecting surface. In this embodiment, the one surface 66b is formed by depositing a metal having a high light reflectance, such as gold or aluminum, or depositing a multilayer dielectric thin film having an optimized reflectance.

The other surface of the thin film 66a of the mirror body 66, which faces the glass substrate 64, is approximately parallel to the one surface 66b. The other surface of the mirror body 66 is formed with a counter electrode 68.

A plurality of thin heterogeneous films 70 are locally buried in the thin film 66a along the one surface 66b. The thin heterogeneous films 70 are formed of a material different from a polyimide, which is a material used to form the thin film 66a. The planar configuration, area and arrangement of the plurality of thin heterogeneous films 70 can be set as desired. Variations in rigidity produced by the thin heterogeneous films 70 produce variations in rigidity of the mirror body 66 along the one surface 66b. In this embodiment, the thin heterogeneous films 70 are periodically disposed concentrically with respect to the center of the mirror body 26.

As a material for the thin heterogeneous films 70, it is possible to use various materials such as a dielectric film, e.g. silicon nitride (SiN) or silicon dioxide ($SiO_2$), or a metal film, e.g. aluminum (Al), or a thin semiconductor film, e.g. polycrystalline silicon.

In the variable mirror 60 according to the third embodiment, which is arranged as stated above, when a voltage is applied between the control electrodes 64a on the glass substrate 64 and the counter electrode 68 on the other surface of the mirror body 66, electrostatic attraction acts between the control electrodes 64a and the counter electrode 68, causing the mirror body 66 to curve on the spacer 62 so that the other surface of the mirror body 66 is convex, while the one surface 66b is concave.

At this time, the configuration of the light-reflecting surface, which is formed by the one surface 66b of the mirror body 66, is determined by the distribution of rigidity in a direction parallel to the one surface 66b of the mirror body 66 and the magnitude distribution of electrostatic attraction applied to the mirror body 66 in a direction parallel to the one surface 66b of the mirror body 66. That is, the configuration of the above-described light-reflecting surface is determined by the planar configuration, area and arrangement of the thin heterogeneous films 70 in the thin film 66a of the mirror body 66, and the pattern in which the control electrodes 64a are arranged on the glass substrate 64, and further the voltage applied between the control electrodes 64a and the counter electrode 68 of the mirror body 66.

The above-described rigidity distribution (i.e. the planar configuration, area and arrangement of the thin heterogeneous films 70 in the thin film 66a of the mirror body 66), the magnitude distribution of electrostatic attraction (i.e. the pattern in which the control electrodes 64a are arranged on the glass substrate 64 and the voltage applied between the control electrodes 64a and the counter electrode 68), which are required to obtain a desired configuration of the light-reflecting surface when deformed concavely as stated above, can be readily determined by a simulation utilizing a computer. Moreover, even when the external size of the variable mirror according to this invention becomes very small, thin heterogeneous films 70 of desired planar configuration and area can be readily formed as desired in the thin film 66a of the mirror body 66 by utilizing a semiconductor manufacturing method or a micromachine manufacturing method.

In the variable mirror 60, further, the thin heterogeneous films 70 should preferably be disposed in the middle of the thin film 66a of the mirror body 66 between the one surface 66b and the other surface, on which the counter electrode 68 is formed, that is, in the center of the thin film 66a in the direction of thickness thereof. The reason for this is that the calculation of the deformation of the light-reflecting surface into a concave surface by a simulation using a computer is facilitated by disposing the thin heterogeneous films 70 at the above-described position.

The degree of deformation of the above-described light-reflecting surface can be measured by using any known deformation measuring means. However, it can also be measured by detecting the electrostatic capacity between the control electrodes 64a on the glass substrate 64 and the counter electrode 68 on the other surface of the mirror body 66. For this purpose, when a desired control voltage of low frequency necessary for generation of electrostatic attraction is applied to the control electrodes 64a, a high-frequency signal in MHz band is also applied thereto. By doing so, it is possible to measure an electrostatic capacity value in correspondence to the intensity of the high-frequency signal received at the counter electrode 68.

On the basis of the measured electrostatic capacity value, means for curving the mirror body 66, that is, means for adjusting the value of voltage supplied to the control electrodes 64a on the glass substrate 64 and the counter electrode 68 on the other surface of the mirror body 66, is feedback-controlled, thereby allowing the light-reflecting surface of the mirror body 66 to be deformed to a desired degree even more rapidly and also permitting the desired degree of deformation to be maintained precisely at all times.

The variable mirror 60 according to the third embodiment described with reference to FIG. 4 can be produced one by one independently of each other by combining together an individually formed mirror body 66 with a spacer 62 and an individually formed glass substrate 64 with control electrodes 64a. It should be noted, however, that a plurality of variable mirrors 60 can also be readily produced within a short period of time. That is, a plurality of mirror bodies 66 with respective spacers 62 are simultaneously formed from a silica glass substrate having a plane area corresponding to the sum total of the plane areas of the mirror bodies 66. In addition, a plurality of glass substrates 64 with respective control electrodes 64a are simultaneously formed from a silica glass substrate having a plane area corresponding to the sum total of the plane areas of the glass substrates 64. Thereafter, the plurality of mirror bodies 66 with respective spacers 62, which were simultaneously formed, are cut into individual mirror bodies 66, and the plurality of glass substrates 64 with respective control electrodes 64a, which were simultaneously formed, are also cut into individual glass substrates 64. Finally, each individual mirror body 46 with a spacer 62 and each individual glass substrate 64 with control electrodes 64a are secured to each other at a predetermined position as shown in FIG. 4.

Fourth Embodiment

Next, the arrangement of a variable mirror 80 according to a fourth embodiment of this invention will be described in detail with reference to FIG. 5.

The greater part of the arrangement of the variable mirror 80 according to this embodiment is the same as the greater part of the arrangement of the variable mirror 60 according to the third embodiment described above with reference to FIG. 4. Therefore, in FIG. 5, which shows the variable mirror 80 according to the fourth embodiment, the same constituent members as those of the variable mirror 60 according to the third embodiment shown in FIG. 4 are denoted by the same reference symbols as those which denote the corresponding constituent members of the variable mirror 60 according to the third embodiment, and a detailed description thereof is omitted.

The variable mirror 80 according to this embodiment differs from the variable mirror 60 according to the third embodiment described above in the arrangement for deforming the mirror body 66 into a desired configuration. This will be described in detail. In the variable mirror 80 according to this embodiment, the mirror body 66 is driven by electromagnetic force. Electromagnetic force produces greater driving force per unit of electric power input than electrostatic force. Therefore, the use of electromagnetic force is useful when the variable mirror is formed with a size not smaller than millimeter sizes.

Because of the mirror body 66 is driven by electromagnetic force, a coil 82 is formed in the inner portion of the upper surface of the glass substrate 64. The coil 82 extends spirally from the outer peripheral portion to the center of the inner portion. On the other hand, a thin ferromagnetic film 84 is formed on the other surface of the thin film 66a of the mirror body 66, which faces the coil 82 on the upper surface of the glass substrate 64. The thin ferromagnetic film 84 is formed from a ferromagnetic material, e.g. iron or cobalt.

In the variable mirror 80 according to the fourth embodiment, which is arranged as stated above, when an electric current is passed through the coil 82 on the glass substrate 64, the coil 82 produces a magnetic field to attract the thin ferromagnetic film 84 on the other surface of the thin film 66a of the mirror body 66. Consequently, the mirror body 66 curves on the spacer 62 so that the other surface of the mirror body 66 is convex, while the one surface 66b is concave.

At this time, the configuration of the light-reflecting surface, which is formed by the one surface 66b of the mirror body 66, is determined by the distribution of rigidity in a direction parallel to the one surface 66b of the mirror body 66 and the magnitude distribution of electromagnetic force applied to the mirror body 66 in a direction parallel to the one surface 66b of the mirror body 66. That is, the configuration of the above-described light-reflecting surface is determined by the planar configuration, area and arrangement of the thin heterogeneous films 70 in the thin film 66a of the mirror body 66, and the pattern in which the coil 82 is arranged on the glass substrate 64, and further the value of electric current supplied to the coil 82.

The above-described rigidity distribution (i.e. the planar configuration, area and arrangement of the thin heterogeneous films 70 in the thin film 66a of the mirror body 66), the magnitude distribution of electrostatic attraction (i.e. the pattern in which the control electrodes 64a are arranged on the glass substrate 64 and the voltage applied between the control electrodes 64a and the counter electrode 68), which are required to obtain a desired configuration of the light-reflecting surface when deformed concavely as stated above, can be readily determined by a simulation utilizing a computer. Moreover, even when the external size of the variable mirror according to this invention becomes very small, thin heterogeneous films 70 of desired planar configuration and area can be readily formed as desired in the thin film 66a of the mirror body 66 by utilizing a semiconductor manufacturing method or a micromachine manufacturing method.

The degree of deformation of the above-described light-reflecting surface can be measured by using any known deformation measuring means. However, it can also be measured by providing wiring in the thin ferromagnetic film 84 on the other surface of the thin film 66a of the mirror body 66 and detecting the electrostatic capacity between the coil 82 on the glass substrate 64 and the thin ferromagnetic film 84 on the mirror body 66. For this purpose, when a desired control voltage of low frequency necessary for generation of electrostatic attraction is applied to the coil 82, a high-frequency signal in MHz band is also applied thereto. By doing so, it is possible to measure an electrostatic capacity value in correspondence to the intensity of the high-frequency signal received at the thin ferromagnetic film 84. On the basis of the measured electrostatic capacity value, means for curving the mirror body 66, that is, means for adjusting the value of electric current supplied to the coil 82, is feedback-controlled, thereby allowing the light-reflecting surface of the mirror body 66 to be deformed to a desired degree even more rapidly and also permitting the desired degree of deformation to be maintained precisely at all times.

The thin magnetic film 84 may have a single-piece structure such as that shown in part (A) of FIG. 6, or a structure in which the thin magnetic film 84 is divided by n in the circumferential direction (Θ direction) as shown in part (B) of FIG. 6, or a structure in which the thin magnetic film 84 is two-dimensionally divided in X- and Y-directions into a plurality of portions as shown in part (C) of FIG. 6, or a structure in which the thin magnetic film 84 is concentrically divided as shown in part (D) of FIG. 6, or a structure obtained by combining some of the structures shown in parts (A) to (D) of FIG. 6.

In general, when the thin magnetic film 84 is divided into a plurality of portions, it becomes easy to control the degree of curvature of the light-reflecting surface of the mirror body 66. However, if the thin magnetic film 84 is divided into excessively small portions, the value of the above-described electrostatic capacity decreases. Consequently, the S/N ratio of a position detection signal relating to the thin magnetic film 84 lowers, and the structure for detecting a signal from the thin magnetic film 84 divided into a large number of portions becomes complicated. Accordingly, it is preferable to limit the number of divisions of the thin magnetic film 84 to a minimum necessary number for realizing the desired curving accuracy of the light-reflecting surface of the mirror body 66.

Further, in the variable mirror 80 also, the thin heterogeneous films 70 should preferably be disposed in the middle of the thin film 66a of the mirror body 66 between the one surface 66b and the other surface, on which the counter electrode 68 is formed, that is, in the center of the thin film 66a in the direction of thickness thereof. The reason for this is that the calculation of the deformation of the light-reflecting surface into a concave surface by a simulation using a computer is facilitated by disposing the thin heterogeneous films 70 at the above-described position.

Although in this embodiment the coil 82 is formed on the glass substrate 64 and the thin magnetic film 84 is formed on the other surface of the thin film 66a of the mirror body 66, the arrangement may be such that the thin magnetic film 84 is formed on the glass substrate 64 and the coil 82 is formed on the thin film 66a of the mirror body 66 in reverse relation to the above. With this arrangement also, the variable mirror 80 can function in the same way as in the case of the above.

The variable mirror 80 according to the fourth embodiment described with reference to FIG. 5 can be produced one by one independently of each other by combining together an individually formed mirror body 66 with a spacer 62 and an individually formed glass substrate 64 with a coil 82. It should be noted, however, that a plurality of variable mirrors 60 can also be readily produced within a short period of time. That is, a plurality of mirror bodies 66 with respective spacers 62 are simultaneously formed from a silica glass substrate having a plane area corresponding to the sum total of the plane areas of the mirror bodies 66. In addition, a plurality of glass substrates 64 with respective coils 82 are simultaneously formed from a silica glass substrate having a plane area corresponding to the sum total of the plane areas of the glass substrates 64. Thereafter, the plurality of mirror bodies 66 with respective spacers 62, which were simultaneously formed, are cut into individual mirror bodies 66, and the plurality of glass substrates 64 with respective coils 82, which were simultaneously formed, are cut into individual glass substrates 64. Finally, each individual mirror body 46 with a spacer 62 and each individual glass substrate 64 with a coil 82 are secured to each other at a predetermined position as shown in FIG. 5.

As will be clear from the foregoing detailed description, the variable mirror according to this invention can be stated as follows:

1. A variable mirror that has a mirror body formed of an elastic or flexible material and having one surface functioning as a reflecting surface, the mirror body being capable of changing the reflecting surface configuration, which is characterized in that the rigidity of the mirror body varies in a direction parallel to the one surface.

2. A variable mirror as stated in the above paragraph 1, which is characterized in that the other surface of the mirror body, which is reverse to the one surface, is formed from a plurality of flat portions of different thicknesses, whereby the rigidity of the mirror body varies in a direction parallel to the one surface.

3. A variable mirror as stated in the above paragraph 1, which is characterized in that the material of the mirror body varies in a direction parallel to the one surface thereof, whereby the rigidity of the mirror body varies in a direction parallel to the one surface.

4. A variable mirror as stated in the above paragraph 2, which is characterized in that at least one of the planar configuration, area and arrangement of the plurality of portions of different thicknesses is varied, whereby the rigidity of the mirror body varies in a direction parallel to the one surface.

5. A variable mirror as stated in the above paragraph 3, which is characterized in that at least one of the planar configuration, area and arrangement of the portions different in material from each other is varied, whereby the rigidity of the mirror body varies in a direction parallel to the one surface.

6. A variable mirror as stated in any of the above paragraphs 1 to 5, which is characterized in that a first electrode is formed on the other surface of the mirror body, which faces in a direction reverse to the direction in which the one surface of the mirror body faces, and the variable mirror has a mirror body support means having a surface facing the other surface of the mirror body, and further a second electrode is formed on the surface of the mirror body support means so that the first electrode and the second electrode cooperate with each other to generate driving force for curving the mirror body.

7. A variable mirror as stated in the above paragraph 6, which is characterized in that the electrostatic capacity between the first electrode and the second electrode is measured to thereby measure the degree of curvature of the one surface of the mirror body that functions as a light-reflecting surface.

8. A variable mirror as stated in any of the above paragraphs 1 to 7, which is characterized in that driving force for curving the mirror body is electrostatic attraction or electromagnetic force.

According to the foregoing first invention, when the deformation of the variable mirror is expressed by polar coordinates in which the center coordinates are set to r=0, it can be expressed by a polynomial involving r and peripheral coordinates (radial coordinates) Θ. Regarding r, it is often necessary to perform deformation control of second or higher order. It is actually difficult to curve a mirror body of uniform thickness and uniform rigidity so that a light-reflecting surface formed by one surface thereof has a desired curved configuration as in the prior art described above, or it is actually difficult to form a mirror body in which the thickness of the other surface varies continuously along the one surface so that the light-reflecting surface of the one surface as curved forms a desired curved configuration.

However, if the rigidity of the mirror body is varied in a direction parallel to the one surface as in the variable mirror according to the invention of this application, the variable mirror is readily formable and can be readily and precisely deformed into any of various configurations as desired.

Variable mirrors according to various embodiments of the second invention will be described below in detail with reference to the accompanying drawings.

First Embodiment

First of all, a variable mirror according to a first embodiment of this invention will be described in detail with reference to parts (A), (B) and (C) of FIG. 7 and FIG. 8, in which: part (A) of FIG. 7 is a vertical sectional view schematically showing the variable mirror according to the first embodiment of this invention in a stationary state; part (B) of FIG. 7 is an enlarged vertical sectional view of a mirror body of the variable mirror in part (A) of FIG. 7; part (C) of FIG. 7 is a schematic plan view of the variable mirror in part (A) of FIG. 7; and FIG. 8 is a vertical sectional view showing the variable mirror in part (A) of FIG. 7 in an operative state.

The variable mirror 120 according to the first embodiment has a base 124 with a spacer 122 secured to the outer peripheral portion of one surface thereof. In this embodiment, the base 124 is formed of an electrically conductive material, and the spacer 122 is formed of an electrically non-conductive material.

A mirror body 126 is placed on and secured to the projecting end of the spacer 122. That is, in this embodiment, the base 124 with the spacer 122 functions as a support member for the mirror body 126.

The mirror body 126 is formed of a material, e.g. a polyimide, which can be deformed to a considerable extent with a small force. As clearly shown in part (B) of FIG. 7, the center of the surface of the mirror body 126 on a reverse side thereof that is remote from the base 124 is coated with a material having a high light reflectance to form a light-reflecting surface 126a. It should be noted that an example of the coating material having a high light reflectance is evaporated aluminum. In this case, it is preferable for the coating material to be coated with an anti-oxidizing film. In this embodiment, the light-reflecting surface 126a has a circular shape concentric with respect to the above-described center.

The mirror body 126 has a two-layer structure. An electrically conductive film 126b, e.g. gold, is formed between the two layers. A terminal 126c is placed on the surface on the reverse side of the mirror body 126. The terminal 126c is connected to the electrically conductive film 126b. Two electrodes of a voltage source 128 are connected to the electrically conductive film 126b of the mirror body 126 and the electrically conductive base 124, respectively.

In this embodiment, the planar configuration of the inner peripheral surface of the spacer 122 is circular as shown in part (C) of FIG. 7. A driving force transmitting means 130 is provided on a circular portion 126d of the surface of the mirror body 126 on a side thereof closer to the base 124, which is surrounded by the inner peripheral surface of the spacer 122. The driving force transmitting means 130 has a shaft 130a secured at one end thereof to the center of the circular portion 126d. A driving force receiving member 130b is secured concentrically to the other end of the shaft 130a. The driving force receiving member 130b extends approximately parallel to the light-reflecting surface 126a. In this embodiment, the driving force receiving member 130b is approximately flat and has a circular planar configuration corresponding to the circular portion 126d of the mirror body 126.

The shaft 130a and the driving force receiving member 130b can be integrally molded from the same material. Alternatively, they may be formed independently of each other and thereafter connected to each other. However, the shaft 130a and the driving force receiving member 130b need to be formed from a semiconductor or a conductor. In this embodiment, they are formed from silicon.

It is desired that the diameter of the shaft 130a be as small as possible in comparison to the diameter of the light-reflecting surface 126a and the rigidity of the shaft 130a be higher than that of the mirror body 126. The driving force receiving member 130b is electrically connected to the electrically conductive film 126b of the mirror body 126 through the shaft 130a.

The circular portion 126d of the mirror body 126 is formed with grooves 132 in a desired pattern. An inner portion of the one surface of the base 124 that is surrounded by the spacer 122 is formed with an electrode surface 124a that is away from and parallel to the driving force receiving member 130b.

The following is a description of the operation of the first embodiment arranged as stated above.

When a voltage is applied between the base 124, which is grounded, and the electrically conductive film 126b of the mirror body 126 from the voltage source 128, electrostatic attraction occurs between the electrode surface 124a of the base 124 and the driving force receiving member 130b of the driving force transmitting means 130 of the mirror body 126, which face each other. Consequently, the driving force receiving member 130b is brought closer to the electrode surface 124a, as shown in FIG. 8.

As a result, the center of the mirror body 126, together with the driving force receiving member 130b, is brought closer to the electrode surface 124a through the shaft 130a of the driving force transmitting means 130, causing the light-reflecting surface 126a to be concaved about the center of the mirror body 126. The three-dimensional configuration formed by the concaved light-reflecting surface 126a at this time can be controlled to a certain extent according to the pattern of the grooves 132 on the circular portion 126d of the mirror body 126. In this embodiment, in order that the three-dimensional configuration formed by the concaved light-reflecting surface 126a shall be a paraboloid, a plurality of grooves 132 are formed concentrically about the shaft 130a of the driving force transmitting means 130. The configuration of the paraboloid formed by the concaved light-reflecting surface 126a can be controlled at will by changing the width and depth of each of the grooves 132 and the pitch therebetween.

In this embodiment, it is also possible to change the amount by which the light-reflecting surface 126a is concaved (i.e. the size of the paraboloid formed by the concaved light-reflecting surface 126a) by changing the voltage applied from the voltage source 128 between the base 124 and the electrically conductive film 126b of the mirror body 126 to thereby change the magnitude of electrostatic attraction produced between the electrode surface 124a of the base 124 and the driving force receiving member 130b of the driving force transmitting means 130 on the mirror body 126, which face each other, or by changing the planar configuration or area of the driving force receiving member 130b to thereby change the magnitude of electrostatic attraction accumulated in the driving force receiving member 130b, or by changing the distance between the electrode surface 124a of the base 124 and the driving force receiving member 130b of the driving force transmitting means 130 on the mirror body 126 when no voltage is applied. Further, the three-dimensional configuration formed by the concaved light-reflecting surface 126a can be controlled to a certain extent by changing the pattern of the grooves 132. Furthermore, even when the variable mirror according to this embodiment is produced with such a small external size that the variable mirror can be used in a micromachine, it is easy to change the depth or pattern of the grooves 132, or to change the planar configuration or area of the driving force receiving member 130b, or to change the voltage applied from the voltage source 128, or to change the distance between the electrode surface 124a of the base 124 and the driving force receiving member 130b of the driving force transmitting means 130 on the mirror body 126 when no voltage is applied.

Accordingly, even when the variable mirror according to this embodiment is produced with such a small external size that the variable mirror can be used in a micromachine, a desired degree of curvature can be readily obtained with small electric power.

Although in the above-described embodiment the base 124 is formed from an electrically conductive material, the arrangement may be such that the base 124 is formed from an electrically non-conductive material such as glass, and a control electrode 124b is formed in a desired pattern on the electrode surface 124a of the base 124 as shown by the chain double-dashed line in part (A) of FIG. 7, and further the control electrode 124b is connected to the other end of the voltage source 128. With this arrangement also, the variable mirror 120 can be operated as in the case of the above-described first embodiment. In this case, moreover, by changing the pattern of the control electrode 124b, the magnitude of electrostatic attraction acting between the control electrode 124b and the driving force receiving member 130b can be varied with the same voltage, and hence it is possible to change the amount by which the light-reflecting surface 126a is concaved (i.e. the size of the paraboloid formed by the concaved light-reflecting surface 126a).

Second Embodiment

Next, a variable mirror according to a second embodiment of this invention will be described in detail with reference to FIG. 9 and parts (A) and (B) of FIG. 10, in which: FIG. 9 is a vertical sectional view schematically showing the variable mirror according to the second embodiment in a stationary state; part (A) of FIG. 10 is a vertical sectional view showing the variable mirror in FIG. 9 in a first operative state; and part (B) of FIG. 10 is a vertical sectional view showing the variable mirror in FIG. 9 in a second operative state.

The greater part of the arrangement of the variable mirror 140 according to the second embodiment is the same as the greater part of the arrangement of the variable mirror 120 according to the first embodiment of this invention described above with reference to parts (A), (B) and (C) of FIG. 7 and FIG. 8. Accordingly, the same portions in the arrangement of the variable mirror 140 according to the second embodiment as those of the arrangement of the variable mirror 120 according to the above-described first embodiment are denoted by the same reference symbols, and a detailed description of these portions is omitted.

The arrangement of the variable mirror 140 according to the second embodiment differs from the arrangement of the variable mirror 120 according to the above-described first embodiment in that an additional electrically conductive member 142 is interposed between the spacer 122 and the base 124, and the electrically conductive member 142 extends between the mirror body 126 and the driving force receiving member 130b of the driving force transmitting means 130. The driving force receiving member 130b has a center hole 142 formed in the center thereof. The shaft 130a of the driving force transmitting means 130 extends through the center hole 142a so as to be freely movable therein. The other end of the voltage source 128 is selectively connected to the base 124 or the additional electrically conductive member 142 through a selector switch 128a. Further, it is preferable to ground the electrically conductive film 126b of the mirror body 126 which is connected with the one end of the voltage source 128. Here, the base 124 and the additional electrically conductive member 142 form first and second electrode portions, respectively.

The operation of the variable mirror 140 according to the second embodiment arranged as stated above will be described below.

In the variable mirror 140 according to the second embodiment, when the other end of the voltage source 128 is connected to the base 124 through the selector switch 128a, electrostatic attraction occurs between the electrode surface 124a of the base 124 and the driving force receiving member 130b of the driving force transmitting means 130 on the mirror body 126, which face each other. Consequently, the driving force receiving member 130b is brought closer to the electrode surface 124a as shown in part (A) of FIG. 10.

As a result, the center of the mirror body 126, together with the driving force receiving member 130b, is brought closer to the electrode surface 124a through the shaft 130a of the driving force transmitting means 130, causing the light-reflecting surface 126a to be concaved about the center of the mirror body 126. Consequently, the light-reflecting surface 126a of the mirror body 126 has a concaved paraboloidal configuration to form a concave mirror as in the case of the variable mirror 120 according to the above-described first embodiment.

The three-dimensional configuration formed by the light-reflecting surface 126a when concaved and the size thereof can be set at will as in the case of the variable mirror 120 according to the above-described first embodiment. In the variable mirror 140 according to the second embodiment, when the other end of the voltage source 128 is connected to the additional electrically conductive member 142 through the selector switch 128a, electrostatic attraction occurs between the additional electrically conductive member 142 and the driving force receiving member 130b of the driving force transmitting means 130 on the mirror body 126, which face each other. Consequently, the driving force receiving member 130b is brought closer to the additional electrically conductive member 142 as shown in part (B) of FIG. 10.

As a result, the center of the mirror body 126 is brought away from the additional electrically conductive member 142 through the shaft 130a of the driving force transmitting means 130, causing the light-reflecting surface 126a to protuberate about the center of the mirror body 126. Consequently, the light-reflecting surface 126a of the mirror body 126 has a protuberating paraboloidal shape to form a convex mirror in reverse relation to the variable mirror 120 according to the above-described first embodiment.

The three-dimensional configuration formed by the light-reflecting surface 126a when protuberating and the size thereof can also be controlled to a certain extent according to the pattern of the grooves 132 on the circular portion 126d of the mirror body 126. In this embodiment also, in order that the three-dimensional configuration formed by the protuberating light-reflecting surface 126a shall be a paraboloid, a plurality of grooves 132 are formed concentrically about the shaft 130a of the driving force transmitting means 130. The configuration of the paraboloid formed by the protuberating light-reflecting surface 126a can be controlled at will by changing the width and depth of each of the grooves 132 and the pitch therebetween.

In this embodiment, it is also possible to change the amount by which the light-reflecting surface 126a is concaved (i.e. the size of the paraboloid formed by the concaved light-reflecting surface 126a) by changing the voltage applied from the voltage source 128 between the additional electrically conductive member 142 and the electrically conductive film 126b of the mirror body 126 to thereby change the magnitude of electrostatic attraction produced between the additional electrically conductive member 142 and the driving force receiving member 130b of the driving force transmitting means 130 on the mirror body 126, which face each other, or by changing the planar configuration or area of the additional electrically conductive member 142 and changing the voltage applied from the voltage source 128 between the additional electrically conductive member 142 and the electrically conductive film 126b of the mirror body 126 to thereby change the magnitude of electrostatic attraction produced between the additional electrically conductive member 142 and the driving force receiving member 130b of the driving force transmitting means 130 on the mirror body 126, which face each other, or by changing the planar configuration or area of the driving force receiving member 130b to thereby change the magnitude of electrostatic attraction accumulated in the driving force receiving member 130b, or by changing the distance between the additional electrically conductive member 142 and the driving force receiving member 130b of the driving force transmitting means 130 on the mirror body 126 when no voltage is applied. Further, the three-dimensional configuration formed by the protuberating light-reflecting surface 126a can be controlled to a certain extent by changing the pattern of the grooves 132. Furthermore, even when the variable mirror according to this embodiment is produced with such a small external size that the variable mirror can be used in a micromachine, it is easy to change the depth or pattern of the grooves 132, or to change the planar configuration or area of the driving force receiving member 130b or the additional electrically conductive member 142, or to change the voltage applied from the voltage source 128, or to change the distance between the additional electrically conductive member 142 and the driving force receiving member 130b of the driving force transmitting means 130 on the mirror body 126 when no voltage is applied.

Accordingly, even when the variable mirror according to this embodiment is produced with such a small external size that the variable mirror can be used in a micromachine, a desired degree of curvature can be readily obtained with small electric power.

Although in the above-described embodiment the base 124 is formed from an electrically conductive material, the arrangement may be such that the base 124 is formed from an electrically non-conductive material such as glass, and a control electrode 124b is formed in a desired pattern on the electrode surface 124a of the base 124 as shown by the chain double-dashed line in FIG. 9, and further the control electrode 124b is connected to the other end of the voltage source 128 through the selector switch 128a. With this arrangement also, the variable mirror can be operated as in the case of the above-described second embodiment. In this case, moreover, by changing the pattern of the control electrode 124b, the magnitude of electrostatic attraction acting between the control electrode 124b and the driving force receiving member 130b can be varied with the same voltage, and hence it is possible to change the amount by which the light-reflecting surface 126a is concaved (i.e. the size of the paraboloid formed by the concaved light-reflecting surface 126a).

Third Embodiment

Next, a variable mirror according to a third embodiment of this invention will be described in detail with reference to parts (A), (B) and (C) of FIG. 11 and parts (A) and (B) of FIG. 12, in which: part (A) of FIG. 11 is a vertical sectional view schematically showing the variable mirror according to the third embodiment of this invention in a stationary state; part (B) of FIG. 11 is a schematic plan view of the variable mirror in part (A) of FIG. 11; part (C) of FIG. 11 is an enlarged vertical sectional view of a mirror body of the variable mirror in part (A) of FIG. 11; part (A) of FIG. 12 is a vertical sectional view schematically showing the variable mirror in part (A) of FIG. 11 in a first operative state; and part (B) of FIG. 12 is a vertical sectional view schematically showing the variable mirror in part (A) of FIG. 11 in a second operative state.

The variable mirror 150 according to the third embodiment has a base 154 with a permanent magnet 152 secured to a central region of one surface thereof. The outer peripheral portion of the one surface of the base 154 that surrounds the central region is raised higher than the permanent magnet 152. A plurality of connecting pieces 156a at the periphery of a driving membrane 156 disposed away from the permanent magnet 152 are secured to the raised outer peripheral portion of the one surface of the base 154. The plurality of connecting pieces 156a are formed at predetermined uniform intervals around the periphery.

As will be clear from part (B) of FIG. 11, the central region of the one surface of the base 154 has an approximately regular quadrangle-shaped planar configuration. In correspondence to this, the driving membrane 156 is also formed with an approximately regular quadrangle-shaped planar configuration. The driving membrane 156 is formed with a planar electrically conductive coil 158. A pair of terminals 158a of the planar electrically conductive coil 158 are led out to the raised outer peripheral portion of the one surface of the base 154 through a pair of connecting pieces 156a which are at symmetric positions. The remaining connecting pieces 156a are formed with respective dummy terminals 158b substantially equal to the pair of terminals 158a to equalize the operations of all the connecting pieces 156a.

Further, a spacer 160 is secured to the raised outer peripheral portion of the one surface of the base 154 such that the outer ends of the connecting pieces 156a of the driving membrane 156 are interposed therebetween. The spacer 160 is formed from an electrically non-conductive material.

A mirror body 162 is placed on and secured to the projecting end of the spacer 160. That is, in this embodiment, the base 154 with the spacer 160 and the driving membrane 156 functions as a support member for the mirror body 162.

The mirror body 162 is formed of a material, e.g. a polyimide, which can be deformed to a considerable extent with a small force. As clearly shown in part (B) of FIG. 11, the center of the surface of the mirror body 162 on a reverse side thereof that is remote from the base 154 is coated with a material having a high light reflectance to form a light-reflecting surface 162a. It should be noted that an example of the coating material having a high light reflectance is evaporated aluminum. In this case, it is preferable for the coating material to be coated with an anti-oxidizing film. In this embodiment, the light-reflecting surface 162a has a circular shape concentric with respect to the above-described center.

The mirror body 126 may have a multilayer structure so as to obtain desired deflection characteristics. The mirror body 126 may also have a laminated structure comprising a polyimide layer and a thin layer of a material other than the polyimide.

Terminal connecting openings 164 for connecting terminals are formed in a pair of portions of the stack of the mirror body 126 and the spacer 160 that correspond to the pair of terminals 158 a of the planar electrically conductive coil 158 disposed on the raised outer peripheral portion of the one surface of the base 154.

The pair of terminals 158a are connected to a voltage source 168 with a selector switch 166 through the pair of terminal connecting openings 164.

In this embodiment, the planar configuration of the inner peripheral surface of the spacer 122 is circular as shown in part (B) of FIG. 11. A driving force transmitting means 170 is provided on a circular portion 162b of the surface of the mirror body 162 on a side thereof closer to the driving membrane 156, which is surrounded by the inner peripheral surface of the spacer 122. The driving force transmitting means 170 has a shaft 170a secured at one end thereof to the center of the circular portion 162b. A driving force receiving member 170b is secured concentrically to the other end of the shaft 170a. The driving force receiving member 170b extends approximately parallel to the light-reflecting surface 162a. In this embodiment, the driving force receiving member 170b is approximately flat and has a circular planar configuration corresponding to the circular portion 162b of the mirror body 162.

The shaft 170a and the driving force receiving member 170b can be integrally molded from the same material. Alternatively, they may be formed independently of each other and thereafter connected to each other. It is desired that the diameter of the shaft 170a be as small as possible in comparison to the diameter of the light-reflecting surface 162 a and the rigidity of the shaft 170a be higher than that of the mirror body 162.

The driving force receiving member 170b is secured to the driving membrane 156 by a known securing means, e.g. an adhesive, so as to move together with the driving membrane 156 as one unit.

The circular portion 162b of the mirror body 162 is formed with grooves 172 in a desired pattern.

The following is a description of the operation of the third embodiment arranged as stated above.

When a voltage is applied from the voltage source 168 to the pair of terminals 158a of the planar electrically conductive coil 158 on the driving membrane 156, force expressed by the following equation is generated in a magnetic field containing magnetic flux produced along the driving membrane 156 by the permanent magnet 152:

$$F=nI*B$$

where F is driving force; n is the number of turns of the planar electrically conductive coil 158; I is the amount of electric current flowing through the planar electrically conductive coil 158; and B is the mean density of magnetic flux produced along the driving membrane 156 by the permanent magnet 152.

The driving force F is uniform throughout the planar electrically conductive coil 158 and causes the driving membrane 156 to be brought closer to the permanent magnet 152 as shown in part (A) of FIG. 12 or away from the permanent magnet 152 as shown in part (B) of FIG. 12. The direction in which the driving force F acts on the driving membrane 156 depends on the direction of the electric current applied to the pair of terminals 158a of the planar electrically conductive coil 158 from the voltage source 168. The direction of the electric current can be selected at will by actuating the selector switch 166 of the voltage source 168.

When the driving membrane 156 is brought closer to the magnet 152 as shown in part (A) of FIG. 12, the center of the mirror body 162, together with the driving force receiving member 170b, is brought closer to the magnet 152 through the shaft 170a of the driving force transmitting means 170, causing the light-reflecting surface 162a to be concaved about the center of the mirror body 162. The three-dimensional configuration formed by the concaved light-reflecting surface 162a at this time can be controlled to a certain extent according to the pattern of the grooves 172 on the circular portion 162b of the mirror body 162. In this embodiment, in order that the three-dimensional configuration formed by the concaved light-reflecting surface 162a shall be a paraboloid, a plurality of grooves 172 are formed concentrically about the shaft 170a of the driving force transmitting means 170. The configuration of the paraboloid formed by the concaved light-reflecting surface 162a can be controlled at will by changing the width and depth of each of the grooves 172 and the pitch therebetween.

In this embodiment, it is also possible to change the amount by which the light-reflecting surface 162a is concaved (i.e. the size of the paraboloid formed by the concaved light-reflecting surface 162a) by changing the magnitude of driving force occurring between the planar electrically conductive coil 158 and the permanent magnet 152 by changing the voltage or electric current applied from the voltage source 168 to the planar electrically conductive coil 158 of the driving membrane 156 so as to change the amount of electric current I flowing through the planar electrically conductive coil 158, or by changing the number n of turns of the planar electrically conductive coil 158, or by changing the intensity of magnetic force produced by the permanent magnet 152 or changing the distance between the permanent magnet 152 and the driving membrane 156 so as to change the mean density B of magnetic flux produced along the driving membrane 156 by the permanent magnet 152. Further, the three-dimensional configuration formed by the concaved light-reflecting surface 162a can be controlled to a certain extent by changing the pattern of the grooves 172.

When the driving membrane 156 is brought away from the magnet 152 as shown in part (B) of FIG. 12, the center of the mirror body 162, together with the driving force receiving member 170b, is brought away from the magnet 152 through the shaft 170a of the driving force transmitting means 170, causing the light-reflecting surface 162a to protuberate about the center of the mirror body 162. The three-dimensional configuration formed by the protuberating light-reflecting surface 162a at this time can be controlled to a certain extent according to the pattern of the grooves 172 on the circular portion 162b of the mirror body 162. The configuration of the paraboloid formed by the protuberating light-reflecting surface 162a can be controlled at will by changing the width and depth of each of the grooves 172 and the pitch therebetween.

It is also possible to change the amount by which the light-reflecting surface 162a protuberates (i.e. the size of the paraboloid formed by the protuberating light-reflecting surface 162a) to a certain extent by changing the magnitude of driving force occurring between the planar electrically conductive coil 158 and the permanent magnet 152 by changing the voltage or electric current applied from the voltage source 168 to the planar electrically conductive coil 158 of the driving membrane 156 so as to change the amount of electric current I flowing through the planar electrically conductive coil 158, or by changing the number n of turns of the planar electrically conductive coil 158, or by changing the intensity of magnetic force produced by the permanent magnet 152 or changing the distance between the permanent magnet 152 and the driving membrane 156 so as to change the mean density B of magnetic flux produced along the driving membrane 156 by the permanent magnet 152 as in the case of changing the amount by which the light-reflecting surface 162a is concaved (i.e. the size of the paraboloid formed by the concaved light-reflecting surface 162a) as stated above.

It should be noted that the permanent magnet 152 in this embodiment may be changed to an electromagnet. When the permanent magnet 152 is changed to an electromagnet, it is possible to control even more easily the amount by which the light-reflecting surface 162a protuberates (i.e. the size of the paraboloid formed by the protuberating light-reflecting surface 162a) and the amount by which the light-reflecting surface 162a is concaved (i.e. the size of the paraboloid formed by the concaved light-reflecting surface 162a) by controlling the intensity of magnetic force produced by the electromagnet.

Furthermore, even when the variable mirror 150 according to this embodiment is produced with such a small external size that the variable mirror can be used in a micromachine, it is easy to change the depth or pattern of the grooves 132, or to change the amount of electric current I flowing through the planar electrically conductive coil 158 by changing the voltage or electric current applied from the voltage source 168 to the planar electrically conductive coil 158 of the driving membrane 156, or to change the number n of turns of the planar electrically conductive coil 158, or to change the mean density B of magnetic flux produced along the driving membrane 156 by the permanent magnet 152 by changing the intensity of magnetic force produced by the permanent magnet 152 or changing the distance between the permanent magnet 152 and the driving membrane 156.

Accordingly, even when the variable mirror 150 according to this embodiment is produced with such a small external size that the variable mirror 150 can be used in a micromachine, a desired degree of curvature can be readily obtained with small electric power.

Fourth Embodiment

Next, a variable mirror according to a fourth embodiment of this invention will be described in detail with reference to parts (A), (B) and (C) of FIG. 13 and FIG. 14, in which: part (A) of FIG. 13 is a vertical sectional view schematically showing the variable mirror according to the fourth embodiment of this invention in a stationary state; part (B) of FIG. 13 is a schematic plan view of the variable mirror in part (A) of FIG. 13; part (C) of FIG. 13 is an enlarged vertical sectional view of a mirror body of the variable mirror in part (A) of FIG. 13; and FIG. 14 is a vertical sectional view schematically showing the variable mirror in part (A) of FIG. 13 in an operative state.

The variable mirror 180 according to the fourth embodiment has a base 182 with a recess 182a formed in a central region of one surface thereof. A plurality of actuator members 184 having the same size and shape and the same structure are disposed on an outer peripheral portion of the one surface of the base 182 that surrounds the central region. The actuator members 184 extend radially at uniform intervals. In this embodiment, each of the actuator members 184 is a bimorph type actuator. One end of each actuator member 184 is secured to the outer peripheral portion, and the other end of the actuator member 184 extends toward the center line of the recess 182a of the base 182. The lengths by which the actuator members 184 project from the outer peripheral portion are the same as each other. The other ends of the actuator members 184 are not in contact with each other but on the same circle centered at the center line.

A spacer 186 is secured to the outer peripheral portion of the one surface of the base 182 such that the one end of each of the actuator members 184 is interposed therebetween. The base 182 is formed from a semiconductor or a conductor. The spacer 186 is formed from an electrically non-conductive material. In this embodiment, the base 182 is formed from silicon.

A mirror body 188 is placed on and secured to the projecting end of the spacer 186. That is, in this embodiment the base 182 with the spacer 186 and the actuator members 184 functions as a support member for the mirror body 188.

The mirror body 188 is formed of a material, e.g. a polyimide, which can be deformed to a considerable extent with a small force. As clearly shown in part (B) of FIG. 13, the center of the surface of the mirror body 188 on a reverse side thereof that is remote from the base 182 is coated with a material having a high light reflectance to form a light-reflecting surface 188a. It should be noted that an example of the coating material having a high light reflectance is evaporated aluminum. In this case, it is preferable for the coating material to be coated with an anti-oxidizing film. In this embodiment, the light-reflecting surface 188a has a circular shape concentric with respect to the above-described center.

The mirror body 188 may have a multilayer structure so as to obtain desired deflection characteristics. The mirror body 188 may also have a laminated structure comprising a polyimide layer and a thin layer of a material other than the polyimide.

Terminal connecting openings 190 for connecting terminals are formed in a plurality of portions of the stack of the mirror body 188 and the spacer 186, each of which corresponds to the one end of each of the actuator members 184 disposed on the outer peripheral portion of the one surface of the base 182.

The one end of each of the actuator members 184 is connected to one end of a voltage source 192 through the terminal connecting openings 190.

In this embodiment, the planar configuration of the inner peripheral surface of the spacer 186 is circular as shown in part (B) of FIG. 13. A driving force transmitting means 194 is provided on a circular portion 188*b* of the surface of the mirror body 188 on a side thereof closer to the actuator members 184, which is surrounded by the inner peripheral surface of the spacer 186. The driving force transmitting means 194 has a shaft 194*a* secured at one end thereof to the center of the circular portion 188*b*. A driving force receiving member 194*b* is secured concentrically to the other end of the shaft 194*a*.

The driving force receiving member 194*b* extends approximately parallel to the light-reflecting surface 188*a* between the bottom surface of the recess 182*a* of the base 182 and the actuator members 184. In this embodiment, the driving force receiving member 194*b* is approximately flat and has a circular planar configuration corresponding to the circular portion 188*b* of the mirror body 188. The shaft 194*a* extends through the center of the gap between the respective other ends of the actuator members 184.

The shaft 194*a* and the driving force receiving member 194*b* can be integrally molded from the same material. Alternatively, they may be formed independently of each other and thereafter connected to each other. It is desired that the diameter of the shaft 194*a* be as small as possible in comparison to the diameter of the light-reflecting surface 188*a* and the rigidity of the shaft 194*a* be higher than that of the mirror body 188.

The circular portion 188*b* of the mirror body 188 is formed with grooves 196 in a desired pattern.

The following is a description of the operation of the third embodiment arranged as stated above.

When a voltage is applied from the voltage source 192 to the one end of each of the actuator members 184, as shown in FIG. 14, the other ends of the actuator members 184, which are free ends, are bent toward the bottom surface of the recess 182*a* of the base 182 by an amount corresponding to the magnitude of the voltage.

When the other ends of the actuator members 184 are bent as shown in FIG. 14, the center of the mirror body 162, together with the driving force receiving member 194*b*, is brought closer to the bottom surface of the recess 182*a* of the base 182 through the shaft 194*a* of the driving force transmitting means 194, causing the light-reflecting surface 188*a* to be concaved about the center of the mirror body 188. The three-dimensional configuration formed by the concaved light-reflecting surface 188*a* at this time can be controlled to a certain extent according to the pattern of the grooves 196 on the circular portion 188*b* of the mirror body 188. In this embodiment, in order that the three-dimensional configuration formed by the concaved light-reflecting surface 188*a* shall be a paraboloid, a plurality of grooves 196 are formed concentrically about the shaft 194*a* of the driving force transmitting means 194. The configuration of the paraboloid formed by the concaved light-reflecting surface 188*a* can be controlled at will by changing the width and depth of each of the grooves 196 and the pitch therebetween.

In this embodiment, it is also possible to change the amount by which the light-reflecting surface 188*a* is concaved (i.e. the size of the paraboloid formed by the concaved light-reflecting surface 188*a* ) by changing the voltage or electric current applied from the voltage source 192 to the one end of each of the actuator members 184 so as to change the distance to be traveled by the other ends of the actuator members 184, or by changing the size, configuration or material of each of the actuator members 184. Further, the three-dimensional configuration formed by the concaved light-reflecting surface 188*a* can be controlled to a certain extent by changing the pattern of the grooves 196.

Furthermore, even when the variable mirror 150 according to this embodiment is produced with such a small external size that the variable mirror can be used in a micromachine, it is easy to change the depth or pattern of the grooves 196, or to change the distance to be traveled by the other ends of the actuator members 184 by changing the voltage or electric current applied from the voltage source 180 to the one end of each of the actuator members 184, or to change the size, configuration or material of each of the actuator members 184.

The above-described fourth embodiment may be arranged such that when a voltage is applied to the actuator members 184, the other ends of the actuator members 184 are bent toward the mirror body 188, and the driving force receiving member 194*b* of the driving force transmitting means 194 is connected to the other ends of the actuator members 184 so as to be movable together with the other ends. In this case, when a voltage is applied to the one end of each of the actuator members 184 from the voltage source 192, the center of the mirror body 162, together with the driving force receiving member 194*b*, is brought away from the bottom surface of the recess 182*a* of the base 182 through the shaft 194*a* of the driving force transmitting means 194 in a direction reverse to that shown in FIG. 14, causing the light-reflecting surface 188*a* to protuberate about the center of the mirror body 188. The three-dimensional configuration formed by the protuberating light-reflecting surface 188*a* at this time can also be controlled to a certain extent according to the pattern of the grooves 196 on the circular portion 188*b* of the mirror body 188. The configuration of the paraboloid formed by the protuberating light-reflecting surface 188*a* can be controlled at will by changing the width and depth of each of the grooves 196 and the pitch therebetween.

In this modification, it is also possible to change the amount by which the light-reflecting surface 188*a* protuberates (i.e. the size of the paraboloid formed by the concaved light-reflecting surface 188*a*) by changing the voltage or electric current applied from the voltage source 180 to the one end of each of the actuator members 184 so as to change the distance to be traveled by the other ends of the actuator members 184, or by changing the size, configuration or material of each of the actuator members 184. Further, the three-dimensional configuration formed by the protuberating light-reflecting surface 188*a* can be controlled to a certain extent by changing the pattern of the grooves 196.

Furthermore, even when the variable mirror 150 according to this embodiment is produced with such a small external size that the variable mirror can be used in a micromachine, it is easy to change the depth or pattern of the grooves 196, or to change the distance to be traveled by the other ends of the actuator members 184 by changing the voltage or electric current applied from the voltage source 180 to the one end of each of the actuator members 184, or to change the size, configuration or material of each of the actuator members 184.

Accordingly, even when the variable mirror 180 according to this embodiment or the variable mirror according to the above-described modification are produced with such a small external size that the variable mirror can be used in a micromachine, a desired degree of curvature can be readily obtained with small electric power.

The coil wiring production process in this invention uses the same wiring steps as those for a solenoid-driven torsion bar type mirror prepared by a machine manufacturing method, for example. The structure of the mirror and the wiring production steps therefor will be described below.

As shown in FIGS. 15 to 17, the solenoid-driven torsion bar type mirror comprises a support 602, a movable plate 601, an elastic film 603, a driving coil 604, a speed detection coil 605 for detecting the speed of the movable plate 601, lead wires 606, feeder pads 607, and a magnet 608. FIG. 16 is a view of the device in FIG. 15 as seen from above. FIG. 17 is a sectional view taken along the line E—F in FIG. 16. In FIG. 16, only regions where the driving coil 604 and the detection coil 605 are formed are indicated; in actuality, each coil comprises a plurality of wires, as shown in FIG. 15 or 17.

As shown in FIGS. 15 to 17, the elastic film 603 is formed from an insulating elastic film 609, e.g. a polyimide resin. The lead wires 606 are formed in the elastic film 603. The lead wires 606 connect the driving coil 604 and the speed detection coil 605 with the pads 607. A mirror 611 is formed on the reverse side of the movable plate 601 (the side where no coil is formed). By pivotally moving the movable plate 601, reflected light from the mirror 611 is scanned. It should be noted that the support 602 and the movable plate 601 are formed by selectively removing desired portions of a silicon substrate by an etching method. The insulating elastic film 609, which constitutes the elastic film 603, is also formed on the surface of the movable plate 601 to function as an interlayer insulator for the driving coil 604, the speed detection coil 605 and the lead wires 606. The driving coil 604 and the speed detection coil 605 are insulated from the movable plate 601 by a silicon oxide film 610.

The production steps of the process for manufacturing the variable mirror according to this invention will be described below.

FIGS. 18 to 21 are views showing an example of the process for producing mainly the coils of the solenoid-driven variable mirror shown in FIG. 19 in the sequence of production steps.

First, as shown in FIG. 18, an insulating film 902, e.g. a silicon oxide film, and a conductor film 903 of aluminum or the like are successively deposited on a surface of a silicon substrate 901. Thereafter, a resist pattern 904 is formed.

Next, as shown in FIG. 19, a portion of the conductor film 903 that is not covered with the resist pattern 904 is removed by etching to form a group of coils, including a coil 905 and a coil 906.

Next, after the resist pattern 904 has been removed, as shown in FIG. 20, an insulating film 907 of a polyimide or the like is formed. Thereafter, via holes 909 are formed in the insulating film 907 by using a resist pattern 908 as a mask.

Subsequently, the resist pattern 908 is removed. Thereafter, as shown in FIG. 21, coil lead wires 910 and pad portions are formed with a resist pattern 911 used as a mask by a method similar to the method of forming the coils 905 and 906 in FIG. 19.

It should be noted that a mirror is formed from a thin metal film on a side reverse to the side where the coils are formed, although not shown in the figures. The mirror is formed by a vacuum deposition method or a sputtering method.

As will be clear from the foregoing detailed description, the variable mirror according to this invention can also be stated as follows:

1. A variable mirror capable of changing the configuration of a reflecting surface, which is characterized by including: a mirror body having a light-reflecting surface for reflecting light; a support member for supporting a part of the mirror body; and a driving force transmitting means provided to project from the mirror body so as to transmit input driving force for changing the configuration of the reflecting surface to the mirror body.

Corresponding Embodiments

The variable mirror arranged as stated above corresponds to all the above-described first to fourth embodiments and modification.
Operation/working-effect
Because the mirror body itself is not provided with an arrangement for generating driving force, it is easy to design driving force for deforming the mirror body and the area of the mirror body independently of each other, and it becomes easy to give great force for deformation to a part of the mirror body and to analyze the deformation of the mirror body. Consequently, it becomes easy to design and actually produce the mirror body so that it is deformable into a desired configuration.

2. A variable mirror as stated in the above paragraph 1, which is characterized in that the mirror body is secured at an outer peripheral portion thereof to the support member, and the driving force transmitting means projects from the center of the mirror body.

Corresponding Embodiments

The variable mirror arranged as stated above also corresponds to all the above-described first to fourth embodiments and modification.
Operation/working-effect
With the above-described arrangement, the mirror body can be deformed into a paraboloidal configuration, and it is possible to focus reflected light from the mirror body deformed into a paraboloidal configuration.

3. A variable mirror as stated in the above paragraph 1 or 2, which is characterized in that the driving force transmitting means includes a rod-shaped member projecting from the mirror body.

Corresponding Embodiments

The variable mirror arranged as stated above also corresponds to all the above-described first to fourth embodiments and modification.
Operation/working-effect
The above-described arrangement makes it possible to minimize the area of a portion at which the driving force transmitting means is connected to the mirror body. Consequently, driving force is transmitted from the driving force transmitting means to the mirror body with a minimal area, and it becomes possible to readily analyze the deformation of the mirror body made by the driving force.

4. A variable mirror as stated in any of the above paragraphs 1 to 3, which is characterized in that the driving force transmitting means has a driving force receiving member extending along the reflecting surface of the mirror body at a position away from the mirror body on a side thereof reverse to the reflecting surface so that the above-described driving force is input to the driving force receiving member.

Corresponding Embodiments

The variable mirror arranged as stated above also corresponds to all the above-described first to fourth embodiments and modification.

Operation/working-effect

By changing the planar configuration or area of the driving force receiving member, it is possible to readily control the magnitude of driving force input to the driving force transmitting means and hence possible to readily control the degree of deformation of the reflecting surface of the mirror body.

5. A variable mirror as stated in the above paragraph 4, which is characterized by further having an electrode facing the driving force receiving member, wherein the driving force receiving member has electrical conductivity, and electrostatic force produced between the driving force receiving member and the electrode facing it is used as the above-described driving force.

Corresponding Embodiments

The variable mirror arranged as stated above corresponds to the above-described first and second embodiments.

Operation/working-effect

By uniformly producing the above-described electrostatic force between the driving force receiving member and the electrode facing it, driving force loaded onto the driving force receiving member can be readily analyzed. In addition, the magnitude of the electrostatic force produced between the driving force receiving member and the electrode facing it can be readily controlled by changing the area or configuration of the driving force receiving member. Moreover, only a relatively low voltage is required to produce the electrostatic force.

6. A variable mirror as stated in the above paragraph 5, which is characterized in that the mirror body has an electrically conductive film, and the driving force receiving member, which has electrical conductivity, is connected to a power source through the electrically conductive film of the mirror body.

Corresponding Embodiments

The variable mirror arranged as stated above corresponds to the above-described first and second embodiments.

Operation/working-effect

The arrangement for connecting the driving force receiving member, which has electrical conductivity, to the power source is facilitated, and the production cost is reduced.

7. A variable mirror as stated in the above paragraph 5, which is characterized in that an additional electrode is disposed on a side of the driving force receiving member remote from the electrode facing the driving force receiving member to lie between the mirror body and the driving force receiving member away from these members, and electrostatic force selectively produced between the driving force receiving member and the electrode facing it or between the additional electrode and the driving force receiving member is used as the driving force.

Corresponding Embodiments

The variable mirror arranged as stated above corresponds to the above-described second embodiment.

Operation/working-effect

By using electrostatic force selectively produced between the driving force receiving member and the electrode facing it or between the additional electrode and the driving force receiving member as the driving force, the driving force receiving member and hence the mirror body, which is driven by the driving force receiving member, can be selectively deformed in the exact opposite directions.

8. A variable mirror as stated in the above paragraph 4, which is characterized in that the driving force receiving member is provided with a planar coil, and further a magnet is disposed on a side of the driving force receiving member remote from the mirror body away from the driving force receiving member, and electromagnetic force produced between the planar coil and the magnet is used as the driving force.

Corresponding Embodiments

The variable mirror arranged as stated above corresponds to the above-described third embodiment.

Operation/working-effect

Electromagnetic force is much stronger than electrostatic force. Accordingly, deformation of the mirror body can be set to a high degree.

9. A variable mirror as stated in the above paragraphs 1 to 4, which is characterized in that an actuator member is supported by the support member to act on the driving force transmitting means, and the driving force transmitting means is moved by deformation of the actuator member, whereby the driving force transmitting means is driven by the actuator member.

Corresponding Embodiments

The variable mirror arranged as stated above corresponds to the above-described fourth embodiment and modification thereof.

Operation/working-effect

The actuator member transmits driving force much greater than the above-described electromagnetic force or electrostatic force to the driving force transmitting means. Accordingly, deformation of the mirror body can be set to a high degree.

10. A variable mirror as stated in the above paragraph 4, which is characterized in that an actuator member is supported by the support member to act on the driving force receiving member of the driving force transmitting means, and the driving force transmitting means is moved by deformation of the actuator member, whereby the driving force transmitting means is driven by the actuator member.

Corresponding Embodiments

The variable mirror arranged as stated above corresponds to the above-described fourth embodiment and modification thereof.

Operation/working-effect

The driving force receiving member can surely receive driving force produced by the actuator member, which is much greater than the above-described electromagnetic force or electrostatic force, and surely transmit it to a desired position on the mirror body through a shaft of the driving force transmitting means.

11. A variable mirror as stated in any of the above paragraphs 1 to 10, which is characterized in that a side of the mirror body that is reverse to the reflecting surface is formed with grooves in a predetermined pattern for changing the reflecting surface of the mirror body into a desired configuration when the driving force is transmitted to the mirror body by the driving force transmitting means.

Corresponding Embodiments

The variable mirror arranged as stated above corresponds to all the above-described first to fourth embodiment and modification.

Operation/working-effect

By changing the pattern of the grooves, including the size and configuration thereof, it is possible to readily control the configuration into which the mirror body is deformed when the driving force is transmitted to the mirror body by the driving force transmitting means. Moreover, it is easy to produce grooves with varied patterns, including the size and configuration thereof.

As will be clear from the foregoing detailed description, even when the variable mirror according to the second invention is produced with such a small external size that the variable mirror can be used in a micromachine, a desired degree of curvature can be readily obtained with small electric power.

Next, embodiments of a third invention in the present invention will be described on the basis of illustrated embodiments.

First Embodiment

FIG. 22 is a view showing a first embodiment of an optical apparatus according to this invention. In the figure: 201 and 202 denote lenses made of a synthetic resin, which are held by a lens frame 203; 204 denotes a prism made of a synthetic resin; 205 denotes a mirror; 206 denotes a lens made of a synthetic resin, which is held by a lens frame 207; 208 denotes a solid-state image pickup device held by the lens frame 207; 209 denotes a variable-optical-characteristic mirror (hereinafter referred to as simply "variable mirror") comprising an aluminum-coated thin film (reflecting surface) 209a and a plurality of electrodes 209b; 210 denotes a substrate; 211 denotes a plurality of variable resistors connected to the electrodes 209b, respectively; 212 denotes a power source connected between the thin film 209a and the electrodes 209b through the variable resistors 211 and a power switch 213; 214 denotes a computing unit for controlling the resistance values of the variable resistors 211; and 215, 216 and 217 denote a temperature sensor, a humidity sensor, and a distance sensor, respectively, which are connected to the computing unit 214. These are disposed as shown in the figure to constitute one optical apparatus. It should be noted that the surfaces of the lenses 201, 202 and 206 and the prism 204 may have any configuration, e.g. a spherical surface, a plane surface, a rotationally symmetric aspherical surface, a spherical surface decentered with respect to an optical axis, a plane surface decentered with respect to an optical axis, a rotationally symmetric aspherical surface decentered with respect to an optical axis, an aspherical surface having planes of symmetry, an aspherical surface having only one plane of symmetry, an aspherical surface having no plane of symmetry, a free-form surface, or a surface having non-differentiable points or lines. The surfaces may be any surfaces that can have some effect on light, whether reflecting surfaces or refracting surfaces. These surfaces will hereinafter be generally called "extended curved surfaces".

The definition of extended curved surfaces used in the present invention is as follows.

The surfaces may have any configuration, e.g. a spherical surface, a plane surface, a rotationally symmetric aspherical surface, a spherical surface decentered with respect to an optical axis, a plane surface decentered with respect to an optical axis, a rotationally symmetric aspherical surface decentered with respect to an optical axis, an aspherical surface having planes of symmetry, an aspherical surface having only one plane of symmetry, an aspherical surface having no plane of symmetry, a free-form surface, or a surface having non-differentiable points or lines. The surfaces may be any surfaces that can have some effect on light, whether reflecting surfaces or refracting surfaces. These surfaces will hereinafter be generally called "extended curved surfaces".

The term "extended curved surface optical element" means an optical element, e.g. a prism, a reflecting mirror, or a lens, which has at least one extended curved surface. A decentered prism, a decentered mirror, etc. are also included in the extended curved surface optical elements. Both an extended curved surface prism and an extended curved surface reflecting mirror are optical blocks.

The thin film 209a is adapted to be deformed by electrostatic force when a voltage is applied between the plurality of electrodes 209b so that the surface configuration thereof is changed as in the case of membrane mirrors described, for example, in Handbook of Microlithography, Micromachining and Microfabrication, Volume 2: Micromachining and Microfabrication, P. 495, FIG. 8. 58, compiled by P. Raichoudhury, SPIE PRESS, and Optics Communications, Vol. 140 (1997), p. 187–190. Thus, the thin film 209a suppresses degradation in image-forming performance caused by deformation or variations in refractive index of the lenses 201, 202, 206 and/or the prism 204 or expansion, contraction or deformation of the lens frames 203 and 207 due to changes in temperature and humidity and assembling errors of components such as optical elements and frames, thereby making it possible to effect focusing correctly and to correct aberrations arising from the focusing at all times.

According to this embodiment, light from an object is refracted by the entrance and exit surfaces of the lenses 201 and 202 and the prism 204 and reflected by the variable mirror 209 and further reflected by the mirror 205 to enter the solid-state image pickup device 208 through the lens 206. Thus, the lenses 201, 202 and 206, the prism 204, the mirror 205 and the variable mirror 209 constitute an image-pickup optical system of the optical apparatus according to this embodiment. By optimizing the surfaces and thicknesses of these optical elements, it is possible to minimize aberrations of the object image. That is, the configuration of the thin film 209a, which servers as a reflecting surface, is controlled by changing the resistance value of each variable resistor 211 on the basis of a signal from the computing unit 214 so that the image-forming performance is optimized. More specifically, the computing unit 214 is supplied with input signals having magnitudes corresponding to the ambient temperature and humidity and the distance to the object from the temperature sensor 215, the humidity sensor 216 and the distance sensor 217. On the basis of these input signals, the computing unit 214 outputs a signal for determining the resistance values of the variable resistors 211 so that such a voltage is applied to each of the electrodes 209b that the configuration of the thin film 209a is determined so as to compensate for degradation in image-forming performance due to the ambient temperature and humidity conditions and the distance to the object. Thus, the thin film 209a is deformed by the voltage applied to each of the electrodes 209b, that is, electrostatic force. Therefore, the thin film 209a assumes various configurations, including an aspherical surface, according to circumstances. It should be noted that the distance sensor 217 may be omitted. In such a case, focusing can be effected if the configuration of the thin film 209a is determined so that the high-frequency component of the image signal from the solid-state image pickup device substantially reaches a maximum by changing the configuration of the thin film 209a more or less.

In this embodiment, the solid-state image pickup device 208 and the variable mirror 209 are disposed on the substrate 210 separately from each other. However, because the variable mirror 209 can be produced by a silicon lithography process or the like, it is also possible to form the substrate 210 from silicon and to form at least a part of the variable mirror 209 on the substrate 210, together with the solid-state image pickup device 208, by a lithography process. This process is favorable from the viewpoint of achieving a reduction in size of the apparatus and a reduction in cost of the apparatus. If the thin film 209a is produced from a synthetic resin, e.g. a polyimide, the thin film 209a can be deformed to a considerable extent with a low voltage, advantageously. It should be noted that the solid-state image pickup device 208, the variable mirror 209 and the substrate 210 can be integrally formed into one unit as stated above, and this unit is an example of the optical apparatus according to this invention.

Although not shown in the figure, a display device, e.g. a reflection or transmission type liquid crystal display, may be integrally formed on the substrate 210 by a lithography process. It should be noted that the substrate 210 may be formed from a transparent substance, e.g. glass or quartz. In that case, a solid-state image pickup device and a liquid crystal display should be formed on the glass substrate by using a thin-film transistor technique or the like. Alternatively, such a display device may be produced separately and placed on the substrate 210.

If the optical elements 201, 202, 204, 205 and 206 are formed by plastic molding or the like, curved surfaces of desired configurations can be readily formed at will, and the production is facilitated. Although in the image pickup apparatus according to this embodiment only the lens 201 is formed away from the prism 204, if the optical elements 202, 204, 206 and 209 are designed so that aberrations can be removed without providing the lens 201, the optical elements, exclusive of the variable mirror 209, are constructed in the form of a single optical block. Accordingly, the assembly is facilitated. Some or all of the optical elements 201, 202, 204, 205 and 206 may be made of glass. By doing so, an image pickup apparatus of higher accuracy can be obtained.

Second Embodiment

FIG. 23 is a view showing a second embodiment of the optical apparatus according to this invention. In the figure, members that are substantially the same as the members shown in the first embodiment are denoted by the same reference symbols. In this embodiment, on a single silicon substrate 218, a reflecting surface 209a and a micro-shutter 219 produced by a micromachine technique to operate on electrostatic force, together with an image pickup device 208, etc., are fabricated by a lithography process. By combining together the silicon substrate 218 and an extended curved surface prism 220 produced by molding, an image pickup unit for a small-sized digital camera is completed as an optical apparatus. It should be noted that the micro-shutter 219 can serve also as a stop. The extended curved surface prism 220 can be produced at low cost by plastic molding. It is preferable to form the extended curved surface prism 220 from an energy-curing resin because it exhibits higher durability than in the case of a thermoplastic resin. The extended curved surface prism 220 may also be formed by using a material having the property of absorbing infrared light so as to have an infrared cutoff filter effect. Alternatively, an interference film that reflects infrared light may be provided on any surface in the optical path of the extended curved surface prism 220 to cut off infrared light. A mirror 221 is formed by forming a concave surface on the silicon substrate 218 and coating it with aluminum. The micro-shutter 219 can use, for example, an improvement on a shutter such as that shown in FIGS. 8 and 9 of Japanese Patent Application Unexamined Publication (KOKAI) No. 10-39239.

FIG. 24 is an enlarged view of the micro-shutter 219 and its vicinities, showing the optical apparatus in FIG. 23 as seen from above with the extended curved surface prism omitted therefrom. The micro-shutter 219 is arranged such that two light-blocking plates 219b can be opened and closed laterally with electrostatic force by giving an electric potential between each fixed electrode 219a and an electrode 219c provided on each light-blocking plate 219b. The two light-blocking plates 219b each have a triangular recess provided in the center of an end thereof closer to the other light-blocking plate 219b. Moreover, the two light-blocking plates 219b are installed at different levels so that when imaging is performed in a state where the light-blocking plates 219b are opened to an intermediate position, the light-blocking plates 219b operate as a stop, whereas when closed completely, the light-blocking plates 219b form a shutter. The power source 212 is arranged such that plus and minus electrodes thereof can be changed to each other. In response to a change in polarity, the two light-blocking plates 219b move in a reverse direction. The two light-blocking plates 219b are designed so as to somewhat overlap each other, as shown in FIG. 23, when closed completely.

The micro-shutter 219 has an advantage in that it can be fabricated by a lithography process, together with the reflecting surface 209a and the solid-state image pickup device 208. It should be noted that as the micro-shutter 219, a micro-shutter such as that shown in FIG. 26 of Japanese Patent Application Unexamined Publication (KOKAI) No. 10-39239 may be used in addition to the above. Alternatively, as a shutter used in the image pickup apparatus according to this embodiment, a shutter that operates on a spring, electromagnetic force, etc. as in the case of the shutter of an ordinary film-camera may be produced and installed on the silicon substrate 218.

In addition, the image pickup apparatus according to this embodiment may be provided with a stop 222 separately as shown for example in FIG. 23. The stop 222 may be an iris diaphragm such as that used for the lens of a film-camera, or may be a plate with a plurality of holes that is driven to slide, as shown in FIG. 25. Alternatively, the stop 222 may be a fixed stop in which the stop aperture area is invariable. The arrangement may be such that the micro-shutter 219 is operated as only a stop, and a shutter function is performed by using the device shutter of the solid-state image pickup device 208. The image pickup apparatus according to this embodiment may be arranged such that at least one of the group of electrodes 209b, the mirror 221, the micro-shutter 219 and the solid-state image pickup device 208 is produced as a separate component, and it is placed on a single substrate, together with the remaining members.

FIG. 26 shows another example of the variable mirror 209 that is different from those used in the first and second embodiments. In this example, a piezoelectric element 209c is interposed between the thin film 209a and the electrodes 209b, and these members are provided on a support plate 223. By changing the voltage applied to the piezoelectric element 209c for each electrode 209b, the piezoelectric element 209c is caused to have expansion or contraction varying from region to region, thereby allowing the configuration of the thin film 209a to be changed. Regarding the configuration of the electrodes 209b, the electrodes 209b may be concentrically divided as shown in FIG. 27 or rectangularly divided as shown in FIG. 28. In addition, it is possible to select any appropriate configuration. Numeral 224 denotes a shake (blur) sensor connected to the computing unit 214. The shake sensor 224 senses a shake at the time of photographing with a digital camera, for example, and causes the voltage applied to the electrodes 209b to be changed through the computing unit 214 and the variable resistors 211 to deform the thin film 209a so as to compensate for disorder of the image due to the shake. At this time, signals from the temperature sensor 215, the humidity sensor 216 and the distance sensor 217 are also simultaneously taken into consideration, and thus focusing, temperature and humidity compensation, etc. are performed. In this case, the thin film 209a is subjected to stress accompanying the deformation of the piezoelectric element 209c. Therefore, the thin film 209a should preferably be made thick to a certain extent so as to have appropriate strength.

FIG. 29 shows a further example of the variable mirror 209. This example differs from the example shown in FIG. 26 in that a piezoelectric element interposed between the thin film 209a and the electrodes 209b comprises two piezoelectric elements 209c and 209c' made of respective materials having piezoelectric characteristics opposite in direction to each other. That is, if the piezoelectric elements 209c and 209c' are made of ferroelectric crystals, the crystals are disposed so that the directions of the crystal axes are opposite to each other. In this case, when a voltage is applied thereto, the piezoelectric elements 209c and 209c' expand or contract in opposite directions. Therefore, force for deforming the thin film 209a is stronger than in the case of the example shown in FIG. 26. Consequently, the configuration of the mirror surface can be changed to a considerable extent, advantageously.

Examples of materials usable for the piezoelectric elements 209c and 209c' include piezoelectric substances, i.e. barium titanate, Rochelle salt, rock crystal, tourmaline, potassium dihydrogenphosphate (KDP), ammonium dihydrogenphosphate (ADP), and lithium niobate, polycrystals of the piezoelectric substances, crystals of the piezoelectric substances, piezoelectric ceramics comprising a solid solution of $PbZrO_3$ and $PbTiO_3$, organic piezoelectric substances, i.e. polyvinyl difluoride (PVDF), and other ferroelectric materials. Organic piezoelectric substances are particularly preferable because they have a small Young's modulus and are deformable to a considerable extent with a low voltage. It should be noted that when these piezoelectric elements are used, if the thickness thereof is made non-uniform, the configuration of the thin film 209a can be changed appropriately in the above-described embodiment.

FIG. 30 shows a further example of the variable mirror 209. In this example, the piezoelectric element 209c is sandwiched between the thin film 209a and an electrode 209d, and a voltage is applied between the thin film 209a and the electrode 209d through a driving circuit 225 controlled by the computing unit 214. In addition to this, a voltage is applied to each of the electrodes 209b provided on the support plate 223 through each driving circuit 225 controlled by the computing unit 214. Accordingly, in this example the thin film 209a can be deformed double by the voltage applied between it and the electrode 209d and electrostatic force produced by the voltage applied to each electrode 209b. Thus, the thin film 209a can provide a larger number of deformation patterns and exhibit faster response than any of those shown in the foregoing examples, advantageously.

FIG. 31 shows a further example of the variable mirror 209. This example utilizes electromagnetic force to allow the configuration of a reflecting surface to be changed. A permanent magnet 226 is provided on the bottom surface inside a support plate 223, and the peripheral edge portion of a substrate 209e made of silicon nitride or a polyimide is placed on and secured to the top of the support plate 223. The surface of the substrate 209e is provided with a thin film 209a formed from a metal coating, e.g. aluminum, to form a variable mirror 209. A plurality of coils 227 are provided on the lower side of the substrate 209e. The coils 227 are connected to the computing unit 214 through respective driving circuits 228. Accordingly, when an appropriate electric current is supplied to each coil 227 from the associated driving circuit 228 according to an output signal from the computing unit 214 corresponding to changes in the optical system obtained by the computing unit 214 on the basis of signals from the sensors 215, 216, 217 and 224, each coil 227 is repelled or attracted by electromagnetic force acting between it and the permanent magnet 226, causing the substrate 209e and the thin film 209a to be deformed.

In this case, the coils 227 may be supplied with different amounts of electric current. The number of coils 227 may be one. The arrangement may be such that the permanent magnet 226 is provided on the substrate 209e and the coils 227 are provided on the bottom surface inside the support plate 223. The coils 227 should preferably be formed by a technique, e.g. lithography. Further, a core made of a ferromagnetic material may be inserted into each coil 227.

FIG. 32 shows a further example of the variable mirror 209. In this example, a thin-film coil 228 is provided on the lower surface of the substrate 209e, and coils 227 are provided on the bottom surface inside the support plate 223 to face the thin-film coil 228. The thin-film coil 228 is connected with a variable resistor 211, a power source 212 and a power switch 213. Each coil 227 is connected with a variable resistor 211. In addition, a power source 212 is provided to supply an electric current to the coils 227 and the variable resistors 211, and a switch 229 serving as both a selector switch and a power on/off switch is provided to change the direction of electric current flowing through the coils 227. Therefore, according to this embodiment, by changing the resistance value of each variable resistor 211, electromagnetic force acting between each coil 227 and the thin-film coil 228 is varied, and thus the substrate 209e and the thin film 209a are deformed. In this way, the thin film 209a can be operated as a movable mirror. By reversing the switch 229 so as to change the direction of electric current flowing through the coils 227, the thin film 209a can be changed into either a concave surface or a convex surface.

In this case, it is also possible to deform the substrate 209e and the thin film 209a as desired by varying the winding density of the thin-film coil 228 according to the position, as shown in FIG. 33. As shown in FIG. 34, the number of coils 227 may be one. Further, a core made of a ferromagnetic material may be inserted into each coil 227. If a magnetic fluid is filled into a space formed by the support plate 223, the electromagnetic force is further enhanced.

FIG. 35 shows a further example of the variable mirror 209. In this example, a substrate 209e is made of a ferromagnetic material, e.g. iron, and a thin film 209a as a reflecting film is made of aluminum or the like. In this case, a thin-film coil need not be provided. Therefore, the structure is simple in comparison to the example shown in FIG. 32, for example, and the production cost can be reduced. If the power switch 213 is replaced with the switch 229 serving as both a selector switch and a power on/off switch (see FIG. 32), it is possible to change the direction of electric current flowing through the coils 227 and to freely change the configuration of the stack of the substrate 209e and the thin film 209a. FIG. 36 shows the arrangement of the coils 227 in this example, and FIG. 37 shows another example of the arrangement of the coils 227. These arrangements are also applicable to the examples shown in FIGS. 31 and 32. It should be noted that FIG. 38 shows an arrangement of permanent magnets 226 that is suitable in a case where in the example shown in FIG. 31 the coils 227 are arranged as shown in FIG. 37. That is, if the permanent magnets 226 are radially arranged as shown in FIG. 38, the substrate 209e and the thin film 209a can be deformed even more delicately than in the embodiment shown in FIG. 31. In addition, in a case where the substrate 209e and the thin film 209a are deformed by using electromagnetic force in this way (the examples shown in FIGS. 31, 32 and 35), they can be driven at a lower voltage than in the case of using electrostatic force, advantageously.

Third Embodiment

FIG. 39 is a view showing a third embodiment of the optical apparatus according to this invention. In the figure, members that are substantially the same as those used in the first and second embodiments are denoted by the same reference symbols, and a description thereof is omitted. This embodiment differs from the already-described embodiments in that light from an object is led to the solid-state image pickup device 208 through a prism 230 by using a liquid crystal variable mirror 231 having a liquid crystal variable-focus lens placed in front of a mirror. The liquid crystal variable mirror 231 is formed by filling a twisted nematic liquid crystal material 231d between a transparent electrode 231a and a split electrode 231c formed on the surface of a curved substrate 231b by coating to serve also as a mirror. The helical pitch P of the twisted nematic liquid crystal material 231d satisfies $$P<5\lambda \qquad (Q1)$$

where λ is the wavelength of light, which is equal to about 380 nm to about 700 nm in the case of visible light.

When the twisted nematic liquid crystal material 231d satisfies the above condition (Q1), the refractive index becomes approximately isotropic independently of the polarization direction of the incident light. Accordingly, a variable-focus mirror free from unsharpness can be obtained without providing a polarizer.

It should be noted that when this optical apparatus is used as a low-cost digital camera, the helical pitch P of the twisted nematic liquid crystal material 231d may be set to satisfy the following condition for practical use:

$$P<15\lambda \qquad (Q2)$$

It is also possible to use a liquid crystal material having a helical structure that satisfies the above condition (Q1) or (Q2), e.g. a cholesteric liquid crystal material or a smectic liquid crystal material, in place of the twisted nematic liquid crystal material. A polymer dispersion liquid crystal material or a polymer stabilized liquid crystal material may also be used in place of the twisted nematic liquid crystal material. It is also possible to use a substance whose refractive index is variable by electricity in place of a liquid crystal material.

In the above-described liquid crystal variable mirror 231, when a voltage is applied between the electrodes 231a and 231c, the orientation of the liquid crystal material 231d changes as shown in FIG. 40, resulting in a reduction in the refractive index with respect to the incident light. Consequently, the reflecting action of the liquid crystal variable mirror 231, for example, the focal length, changes. Therefore, if the resistance value of each variable resistor 211 is appropriately adjusted in correspondence to a temperature change and shake during photographing at the same time as autofocusing is effected, it is possible to compensate for a change in temperature of the prism 230 and to prevent shake at the time of photographing. If the voltage applied to the electrode 231c is slightly changed to shift the position of the image during photographing, the liquid crystal variable mirror 231 is allowed to act as a low-pass filter and to serve for removing moire.

Fourth Embodiment

FIG. 41 is a view showing a fourth embodiment of the optical apparatus according to this invention. This embodiment is an example of a digital camera, which is one of electronic image pickup apparatus. The embodiment has a shake preventing function. also, members that are substantially the same as those in the already-described embodiments are denoted by the same reference symbols. Prevention of shake at the time of photographing is performed by variable-optical-characteristic prisms 234 and 235 placed between taking lenses 232 near a stop 233. The detailed structure and operation of the variable-optical-characteristic prism 234 will be described below by using FIG. 42. In the figure: 234a, 234e and 234i denote transparent substrates made of glass or a synthetic resin, for example; 234b and 234h denote transparent electrodes each divided into some portions; 234d and 234f denote transparent electrodes; and 234c and 234g denote liquid crystal materials. The refractive index nk of the transparent substrates 234a, 234e and 234i is selected so as to be equal to the refractive index of the liquid crystal material 234c when oriented as shown in FIG. 42 (when no voltage is applied between the electrodes 234b and 234d). That is, assuming that the refractive index of the liquid crystal material 234c for ordinary light is $n_o$ and the refractive index for extraordinary light is ne, the refractive index nk is given by $$nk \approx (no+ne)/2 \qquad (Q3)$$

If the helical pitch P of both the liquid crystal materials 234c and 234g satisfies the condition (Q1) or (Q2), a polarizer need not be inserted in the optical path, which is advantageous.

In a case where ne>no, the index ellipsoid of the liquid crystal becomes as shown in FIG. 43. It is assumed that no voltage is applied to the liquid crystal material 234c. In this case, the above condition (Q3) is satisfied. Therefore, incident rays are not refracted by the transparent substrate 234, the liquid crystal material 234c and the transparent substrate 234e. However, the liquid crystal material 234g is oriented in the direction of the optical axis (it is assumed that a voltage of from several volts to several ten volts is applied to the liquid crystal material 234g). Therefore, the refractive index thereof is $n_o$. Accordingly, the incident rays are refracted downwardly by the liquid crystal material 234g. On the other hand, if a similar voltage is applied to the liquid crystal material 234c and no voltage is applied to the liquid crystal material 234g, the incident rays are refracted upwardly. If no voltage is applied to either of the liquid crystal materials 234c and 234g, the incident rays travel in straight lines without being refracted.

The variable-optical-characteristic prism 235 is disposed to assume a position as reached by the variable-optical-characteristic prism 234 when rotated through 90° around the optical axis. The variable-optical-characteristic prism 235 can refract the incident rays in a direction perpendicular to the plane of FIG. 42 by a method similar to that in the case of the variable-optical-characteristic prism 234. Accordingly, if the incident rays are deflected by changing the voltage applied to each of the liquid crystal materials 234c, 234g, 235c and 235g during photographing in the direction for canceling shake at the time of photographing, it is possible to obtain an image with reduced shake.

The reason why the transparent electrodes 234b and 234h are divided into a plurality of portions is as follows.

If the voltage applied to each of the liquid crystal materials 234c and 234g is set to a medium value so that the refractive index of each liquid crystal material is middle between (ne+no)/2 and no, the amount of deflection of the incident rays can be reduced to several ten percents of the angle θ shown in FIG. 42. In order to realize this, it is necessary that the electric field applied to each of the liquid crystal materials 234c and 234g be kept at a uniform value irrespective of the thickness of the liquid crystal layer. Accordingly, it is necessary to apply a somewhat high voltage to a thick portion of the liquid crystal layer and to apply a somewhat low voltage to a thin portion of the liquid crystal layer. For this reason, the electrodes 234b and 234h are divided. A small amount of deflection of incident rays is useful in the course of imaging. If the amount of deflection is changed continuously, even more excellent shake prevention can be realized. It should be noted that when the wedge angle β (see FIG. 42) of the liquid crystal materials 234c and 234g is small and, consequently, the change in thickness of each liquid crystal layer is small, each electrode need not be divided but may be used as a single electrode.

To change the orientation of the liquid crystal materials 234c and 234g to thereby change the direction of travel of the incident rays, not the magnitude of the voltage applied to each of the liquid crystal materials 234c and 234g but the frequency of the electric field applied to each of the liquid crystal materials 234c and 234g may be changed. When the frequency is low (several Hz to several kilo Hz), the alignment of the liquid crystal molecules is such as that in the liquid crystal material 234g in FIG. 42. In the case of a high frequency (about 1 MHz or more), the molecular alignment is such as that in the liquid crystal material 234c in FIG. 42. Therefore, the direction of the incident rays can be changed by changing the above-described frequency. If the frequency is changed continuously, the direction of the incident rays can be changed continuously. Such a liquid crystal driving method can also be applied to the embodiment shown in FIG. 40.

It should be noted that if high voltages are applied to both the liquid crystal materials 234c and 234g, the refractive indices of both the liquid crystal layers reduce to no. However, because the prism actions of both the liquid crystal layers cancel each other, deflection of the incident rays does not occur. However, there is a change in optical path length along the optical axis. Therefor, it is possible to effect focusing of the image pickup system. That is, the optical characteristics of the variable-optical-characteristic prisms 234 and 235 are changed on the basis of a signal from the distance sensor 217 (see FIG. 41) to thereby change the optical path length. By doing so, auto-focusing can be realized. In addition, if the variable-optical-characteristic prisms 234 and 235 are changed by using signals from the temperature sensor 215 and the humidity sensor 216, it is also possible to effect temperature and humidity compensation for the taking lenses 232 and the variable-optical-characteristic prisms 234 and 235 themselves. The auto-focusing and temperature and humidity compensation may be effected together with shake prevention. In that case, the voltages applied to the transparent electrodes 234b and 234h may be changed for each electrode. However, the voltages do not always need to be changed. In this case, the refractive index of each of the liquid crystal materials 234c, 234g, 235c and 235g may be any value selected from the range of from (ne+no)/2 to no.

In addition to shake prevention, a high-definition image practically similar to that obtained by increasing the number of pixels of the solid-state image pickup device 208 can be obtained by controlling the voltage applied to each of the liquid crystal materials 234c, 234g, 235c and 235g so that the image is shifted by ½ of one pixel of the solid-state image pickup device 208 and successively performing image pickup operations to record two or more images that are shifted and not shifted, respectively, and then superimposing them on one another by shifting them relative to each other by the same amount as the amount of shift at the time of the image pickup operation. This process for achieving high resolution may be carried out at the same time as temperature and humidity compensation and focusing are performed.

FIG. 44 is a view showing an example of a variable-refractive-characteristic prism 236 that is also applicable to the above-described fourth embodiment (see FIG. 41). The prism 236 includes transparent substrates 236a and 236b each having two plane surfaces tilted so as to form an angle β. A liquid crystal material 236c is sandwiched between the transparent substrates 236a and 236b. Symbols 236d and 236e denote alignment films; 236f denotes a transparent electrode provided on the transparent substrate 236a; 236g and 236h denote transparent electrodes provided on the respective slant surfaces of the transparent substrate 236b independently of each other; 211a, 212a and 213a denote a variable resistor, a power source and a power switch, respectively, which are connected in series between the electrodes 236f and 236g; and 211b, 212b and 213b denote a variable resistor, a power source and a power switch, respectively, which are connected in series between the electrodes 236f and 236h.

In this example, when the refractive index of the transparent substrate 236a is denoted by $n_1$ and the refractive index of the transparent substrate 236b is denoted by $n_2$, $n_1$=no, and $n_2$=(ne+no)/2. As shown in FIG. 44, if the power switch 213a is on and the power switch 213b is off, both incident rays $L_1$ and $L_2$ travel in straight lines without being deflected. On the other hand, when the power switch 213a is off and the power switch 213b is on, both the incident rays $L_1$ and $L_2$ are bent downwardly as shown in FIG. 45. Accordingly, the prism 236 has the same optical effect as that of the variable-optical-characteristic prism 234 in the above-described fourth embodiment (FIG. 41). However, this refractive characteristic deviation prism 236 allows the thickness of the liquid crystal layer to be reduced to a half in comparison to the variable-optical-characteristic prism 234 and is therefore excellent in that it exhibits fast response and favorable light transmittance. In this case, it is possible to use other variable-refractive-index substances satisfying the conditions of $n_1$=no and $n_2$=(ne+no)/2 in place of the liquid crystal material 236c.

FIG. 46 is a view showing an example of a variable-focus lens 237 that is also applicable to the fourth embodiment. The variable-focus lens 237 includes a transparent substrate 237a having a curved surface at a peripheral portion thereof and a plane surface at a central portion thereof and further includes a transparent substrate 237b having a plane surface at a peripheral portion thereof and a concave surface at a central portion thereof. A liquid crystal material 237c is sandwiched between the transparent substrates 237a and 237b. Symbols 237d and 237e denote alignment films; 237f denotes a transparent electrode provided on the transparent substrate 237a; and 237g and 237h denote insular and annular transparent electrodes respectively provided on the concave surface and plane surface of the transparent substrate 237b independently of each other. A common power source 212, a variable resistor 211a and a power switch 213a are connected in series between the electrodes 237f and 237g, and the common power source 212, a variable resistor 211b and a power switch 213b are connected in series between the electrodes 237f and 237h.

In this variable-focus lens 237 also, when the refractive index of the transparent substrate 237a is denoted by $n_1$ and the refractive index of the transparent substrate 237b is denoted by $n_2$, $n_1$=no, and $n_2$=(ne+no)/2. As shown in FIG. 46, if the power switch 213a is off and the power switch 213b is on, incident rays $L_1$ and $L_2$ travel in straight lines. However, when the power switch 213a is on and the power switch 213b is off, the liquid crystal material 237c is oriented as shown in FIG. 47. Consequently, the variable-focus lens 237 has a concave lens action, causing the incident light $L_1$ and $L_2$ to travel divergently as shown in FIG. 47. Thus, the variable-focus lens 237 operates as a variable-focus lens. This example allows the liquid crystal layer to be reduced in thickness. Accordingly, it is possible to provide an optical apparatus of fast response and high transmittance, advantageously. This variable-focus lens 237 can be used in the optical apparatus according to the fourth embodiment in place of the variable-optical-characteristic element 234 to effect focusing. If a control apparatus including various sensors, a computing unit and a driving circuit as already described is connected to the electrodes 237f, 237g and 237h, the variable-focus lens 237 can be used for temperature and humidity compensation and so forth. In addition, the variable-focus lens 237 can also be used in various optical apparatus such as diopter adjustment apparatus, e.g. variable-focus eyeglasses, a microscope, and a camera finder, and an optical disk pickup auto-focusing apparatus.

Fifth Embodiment

FIG. 48 is a view showing a fifth embodiment of the optical apparatus according to this invention. This embodiment is an example of variable-focus eyeglasses using the above-described variable-focus lens 237. In the figure: 238 denotes frames for supporting a pair of variable-focus lenses 237 so that these lenses 237 can be used as eyeglasses; 239 denotes a driving unit accommodating a power source 212, power switches 213a and 213b, variable resistors 211a and 211b, etc.; and 40 denotes cords for connecting each variable-focus lens 237 and the driving unit 239. , if the resistance values of the variable resistors 211a and 211b (see FIG. 46) accommodated in the driving unit 239 are changed continuously, the focal lengths of the variable-focus lenses 237a can be changed continuously. Accordingly, it is possible to provide eyeglasses extremely convenient for practical use. Continuous change in optical characteristics made by continuously changing the resistance value of a variable resistor as stated above applies similarly in the already-described various embodiments.

Sixth Embodiment

FIG. 49 is a view showing a sixth embodiment of the optical apparatus according to this invention. This embodiment is an example of a digital camera with a shake preventing device that utilizes the above-described variable-focus lens 237. , the transparent electrodes 237g and 237h of the variable-focus lens 237 are divided into a large number of portions, and each of the divided electrodes is connected to the driving circuit 225. The voltage applied to each of the electrodes 237g and 237h from the driving circuit 225 is appropriately adjusted on the basis of signals from the sensors 215, 216, 217 and 224, thereby allowing not only shake prevention but also auto-focusing and temperature and humidity compensation for the taking lenses 232 to be effected.

Seventh Embodiment

FIG. 50 is a view showing a seventh embodiment of the optical apparatus according to this invention. In the figure, members that are substantially the same as those used in the already-described embodiments are denoted by the same reference symbols, and a detailed description thereof is omitted. This embodiment differs from the first embodiment, which is shown in FIG. 22, in that the prism 204 is replaced with a plate-shaped transparent substrate 241 preferably made of glass or a resin, and the transparent substrate 241 is provided with a lens 242, which is newly provided, and a variable mirror 243 having the same structure as that shown in FIG. 29, together with an IC 244 and a display 245. Numeral 246 denotes light-blocking films for removing stray light that are formed, for example, by vacuum deposition of three layers, i.e. Cr—$CrO_2$—Cr, or coating or printing with a black paint. The light-blocking films 246 may be provided on the surface or side of the transparent substrate 241 or in the transparent substrate 241 according to need, as shown in the figure. There are cases where the light-blocking films 246 need not be provided. The lenses 202 and 242 may be formed by pasting curved surface-shaped thin resin films on the surface of the transparent substrate 241. The lenses 202 and 242 may be formed by integrally molding when the transparent substrate 241 is produced.

As an example of the display 245, a liquid crystal display can be fabricated on a transparent substrate, e.g. glass, by a thin-film transistor technique. However, the solid-state image pickup device 208 and so forth cannot readily be fabricated on a substrate other than a silicon substrate. , the solid-state image pickup device 208 and the display 245 are provided on respective substrates separately from each other. This is advantageous from the viewpoint of cost in comparison to an arrangement in which the solid-state image pickup device 208 and the display 245 are provided on the same substrate. It should be noted that the transparent substrate 241 or the material of the lenses 202 and 242 may be arranged to have the effect of absorbing infrared light and to function as an infrared cutoff filter. For the purpose of cutting off infrared rays, an interference film having an infrared cutoff function may be provided on the thin film 209a of the variable mirror 209 or the surface of the lens 242 or the transparent substrate 241. Further, this embodiment may be formed as a display apparatus in which the optical system is arranged to have a viewing function such as that of opera glasses, for example, with the solid-state image pickup device 208 removed therefrom.

, two variable mirrors 209 and 243 capable of changing the configuration of a reflecting surface are used. Therefore, zooming and focusing can be simultaneously performed by driving these variable mirrors 209 and 243. In addition, it is possible to realize shake prevention, temperature and humidity compensation, compensation for errors arising at the time of assembling the components, moire removal and achievement of high-definition images by applying an appropriate voltage to one or a plurality of electrodes of these variable mirrors 209 and 243 as in the case of the already-described various embodiments.

Eighth Embodiment

FIG. 51 is a view showing an eighth embodiment of the optical apparatus according to this invention. This embodiment is an example of a signal processing apparatus for optical computation and optical interconnection used in optical signal processing in an optical computer or the like. In the figure, members that are substantially the same as those in the already-described embodiments are denoted by the same reference symbols, and a detailed description thereof is omitted. Numeral 247 denotes a two-dimensional array of laser diodes having input signal terminals 247a; 248 denotes a computer connected to a computing unit 214 for driving a variable mirror 209 having the structure shown in FIG. 26; and 249 denotes a two-dimensional photodiode array for receiving light that has output signal terminals 249a.

According to this embodiment, light emerging from the two-dimensional array 247 of laser diodes on the basis of an input signal travels along a path as shown by the arrows in the figure and is caused to form an image on the two-dimensional photodiode array 249 by the prism 220. Thus, output signals are obtained from the output signal terminals 249a in correspondence to signals input to the input signal terminals 247a. In this case, the variable mirror 209 compensates for a change in configuration of the prism 220 caused by a change in temperature or humidity so that an optical signal emerging from the two-dimensional array 247 of laser diodes forms an image correctly on the two-dimensional photodiode array 249. It is also possible to selectively switch between the photodiodes in the two-dimensional photodiode array 249 for receiving light from the two-dimensional array 247 of laser diodes to perform various calculations by deforming the reflecting surface (thin film 209a) of the variable mirror 209 on the basis of signals from the computer 248 so as to shift the image position of the two-dimensional array 247 of laser diodes on the light-receiving surface of the two-dimensional photodiode array 249.

When the deformation of the prism 220 due to a change in temperature or humidity is small or it is not necessary to perform the above-described various calculations, the variable mirror 209 may be omitted as shown in FIG. 52. It should be noted that an aluminum coating or the like should preferably be provided on the surface of the prism 220 to reflect light according to need, and the coated surface may be a totally reflecting surface. A part or the whole of the surface of the apparatus shown in FIGS. 51 and 52, exclusive of the prism 220, may be fabricated by a micromachining technique, e.g. lithography.

Ninth Embodiment

FIG. 53 is a view showing a ninth embodiment of the optical apparatus according to this invention. This embodiment is an example of a film camera having a shake preventing function and other functions. In the figure, members that are substantially the same as those in the already-described embodiments are denoted by the same reference symbols, and a detailed description thereof is omitted. Numeral 250 denotes a silver halide film. As a variable mirror 209, a variable mirror having any of the structure shown in FIG. 22, the structure shown in FIG. 26, the structure shown in FIG. 29 and the structure shown in FIG. 30 is used. A liquid crystal variable mirror 231 may be used in place of the variable mirror 209.

, light from an object that passes through a taking lens 232 is reflected by the variable mirror 209 (liquid crystal variable mirror 231) to form an image on the silver halide film 250. By properly controlling a voltage applied to the variable mirror 209 (liquid crystal variable mirror 231), shake prevention, temperature and humidity compensation, focusing, etc. can be performed.

Here, the way in which the reflecting surfaces (thin films 209a) of the above-described various variable mirrors 209 are changed will be described with reference to the first embodiment (FIG. 22). When the object is relatively far away, the power switch 213 is turned off to set the variable mirror 209 so that the thin film 209a is flat as shown in FIG. 54. When the object is at a short distance, the power switch 213 is turned on to apply a voltage to the electrode 209a so that the thin film 209a is concaved as shown in FIG. 55 to increase the power for converging a light beam. In this case, when rays are obliquely incident, it is preferable that the thin film 209a be formed into a configuration close to an ellipsoid having a larger radius of curvature in the direction of the incidence plane of rays to remove aberrations.

When there are aberrations in the optical system due to manufacturing errors, it is preferable to correct aberrations by varying the voltages applied to the thin film 209a for each electrode section so that the thin film 209a has an asymmetric surface configuration as shown in FIG. 55. It is also possible to add a change in surface configuration for focusing to the asymmetric surface configuration. When the optical system changes owing to a change in temperature or humidity and this causes aberrations to occur or the focus position to be shifted, the way in which the surface configuration of the thin film 209a is changed is the same as the above. To perform shake prevention or to shift a light beam in optical signal processing, for example, the thin film 209a should preferably be deformed so as to change the direction of the optical axis. That is, as shown in FIG. 56, voltages should preferably be applied so as to tilt the thin film 209a. FIG. 57 shows the configuration of the thin film 209a in a case where the direction of the optical axis is changed in the opposite direction.

Assuming that the variable mirror 209 (see FIGS. 22, 26 and 29), the liquid crystal variable mirror 231 (see FIG. 30) and the variable-optical-characteristic prisms 234 and 235 (see FIG. 41) are each disposed in the vicinity of the stop position of the optical system and that the above-described tilt angle of the thin film 209a is φ (see FIG. 56) and the focal length of an optical system behind the thin film 209a, that is, behind the reflecting surface and before the image-formation plane is $f_2$, when the thin film 209a tilts at an angle φ, the amount of shift S of the optical axis to the image-formation plane is given by $$S = 2|f_2|\phi \tag{Q4}$$

Assuming that the size of one pixel of the solid-state image pickup device 208 is P, it is necessary in order to produce a shake preventing effect to satisfy the following condition:

$$S \geq (½)P \tag{Q5}$$

When the shake is large, it is preferable to satisfy the following condition:

$$S \geq P \tag{Q6}$$

When it is desired to correct a large shake as occurs in photographing on a boat, in particular, it is preferable to satisfy the following condition:

$$S \geq 3P \tag{Q7}$$

Substituting the above equation (Q4) for the above conditions (Q5), (Q6) and (Q7), we obtain the following conditions (Q8), (Q9) and (Q10):

$$4|f_2|\phi \geq P \tag{Q8}$$

$$2|f_2|\phi \geq P \tag{Q9}$$

$$|f_2|\phi \geq P \tag{Q10}$$

Accordingly, if any one of the above conditions (Q8), (Q9) and (Q10) is satisfied, an anti-shake optical apparatus can be realized.

The conditions (Q8), (Q9) and (Q10) are also applicable in a case where shake prevention or the like is performed in the example of the liquid crystal variable mirror 231 shown in FIG. 39. In this case, however, ½ of the change in angle of the optical axis of light emerging from the liquid crystal variable mirror 231 should be used as $\phi$. In the embodiment shown in FIG. 41, ½ of the angle of refraction of the optical axis by the variable-optical-characteristic prism 234 should be used as $\phi$. By doing so, the conditions (Q8), (Q9) and (Q10) hold true as in the case of the above.

Because the following condition holds $$(\tfrac{1}{2})\phi \leq |\beta[(ne-no)/2]| \text{(for } \beta, \text{ see FIG. } \mathbf{42}) \tag{Q11}$$

the following conditions are obtained from the conditions (Q8), (Q9) and (Q10):

$$2|\beta[(ne-no)/2]| \geq P/(4f_2|) \tag{Q12}$$

$$2|\beta[(ne-no)/2]| \geq P/(2f_2|) \tag{Q13}$$

$$2|\beta[(ne-no)/2]| \geq P/|f_2| \tag{Q14}$$

If any of the above conditions (Q12),(Q13) and (Q14) is satisfied, shake is favorably corrected. When shake prevention is used for a silver halide camera or the like, if the average grain size of film is used as P, the above conditions hold true.

Although in some embodiments of this invention the extended curved surface prisms 220, 230, etc. are used, it should be noted that a reflecting mirror 250 having an extended curved surface may be used in place of them as shown in FIG. 58. The configuration of the reflecting surface of the reflecting mirror 250 is an extended curved surface. In this case, because of the hollow structure of the apparatus, the weight is advantageously lighter than in the case of the extended curved surface prism. FIG. 58 shows an example of electronic image pickup apparatus (bar code scanner). It is also possible to form an optical system by using two or more variable mirrors according to this invention as shown in FIG. 59. In this case, for example, shake prevention and focusing can be effected by the respective variable mirrors, and thus the degree of freedom for optical design increases. It is also possible to use two or more variable mirrors according to this invention in one optical system to effect zooming, focusing, shake prevention, etc. of the optical system. FIG. 59 shows an example of a digital camera. It is preferable to place the variable mirror in the vicinity of the stop of the optical system, which is common to the optical apparatuses according to this invention. Because the ray height is low in the vicinity of the stop, the variable mirror can be made compact in size, and this is favorable from the viewpoint of response speed, cost and weight.

As has been stated above, the optical apparatus according to this invention has the following features in addition to the features set forth in the claims:

(1) A variable-optical-characteristic optical element.

(2) A variable-optical-characteristic mirror.

(3) A variable-optical-characteristic mirror made of an organic material or a synthetic resin.

(4) A variable-optical-characteristic mirror using electromagnetic force.

(5) A variable-optical-characteristic mirror having a permanent magnet and using electromagnetic force.

(6) A variable-optical-characteristic mirror having a coil and a permanent magnet and using electromagnetic force.

(7) A variable-optical-characteristic mirror having a permanent magnet and a coil integrated with a mirror substrate and using electromagnetic force.

(8) A variable-optical-characteristic mirror having a coil and a permanent magnet integrated with a mirror substrate and using electromagnetic force.

(9) A variable-optical-characteristic mirror having a plurality of coils and a permanent magnet integrated with a mirror substrate and using electromagnetic force.

(10) A variable-optical-characteristic mirror having a plurality of coils and a permanent magnet and using electromagnetic force.

(11) A variable-optical-characteristic mirror having a permanent magnet and a plurality of coils integrated with a mirror substrate and using electromagnetic force.

(12) A variable-optical-characteristic mirror having a coil and using electromagnetic force.

(13) A variable-optical-characteristic mirror having a plurality of coils and using electromagnetic force.

(14) A variable-optical-characteristic mirror having a ferromagnetic material and using electromagnetic force.

(15) A variable-optical-characteristic mirror having a ferromagnetic material and a coil disposed to face opposite to the ferromagnetic material and using electromagnetic force.

(16) A variable-optical-characteristic mirror having a mirror substrate of a ferromagnetic material and a coil and using electromagnetic force.

(17) A variable-optical-characteristic mirror formed by combining together a variable-optical-characteristic lens and a mirror.

(18) A variable-optical-characteristic extended curved surface optical element.

(19) A variable-optical-characteristic optical element having a plurality of electrodes.

(20) A variable-optical-characteristic mirror having a plurality of electrodes.

(21) A variable-optical-characteristic optical element as stated in the above paragraph (1) or (19), which is driven by electrostatic force.

(22) A variable-optical-characteristic mirror as stated in the above paragraph (2) or (20), which is driven by electrostatic force.

(23) A variable-optical-characteristic extended curved surface optical element as stated in the above paragraph (18), which is driven by electrostatic force.

(24) A variable-optical-characteristic optical element as stated in the above paragraph (1) or (19), which uses a piezoelectric substance.

(25) A variable-optical-characteristic mirror as stated in the above paragraph (2) or (20), which uses a piezoelectric substance.

(26) A variable-optical-characteristic extended curved surface optical element as stated in the above paragraph (18), which uses a piezoelectric substance.

(27) A variable-optical-characteristic lens having a plurality of electrodes.

(28) A variable-optical-characteristic prism having a plurality of electrodes.

(29) A variable-optical-characteristic lens as stated in the above paragraph (27), which has two surfaces intersecting each other.

(30) A variable-optical-characteristic prism as stated in the above paragraph (28), which has two surfaces intersecting each other.

(31) A variable-optical-characteristic optical element as stated in the above paragraph (1) or (19), which uses a liquid crystal.

(32) A variable-optical-characteristic mirror as stated in the above paragraph (2) or (17), which uses a liquid crystal.

(33) A variable-optical-characteristic extended curved surface optical element as stated in the above paragraph (18), which uses a liquid crystal.

(34) A variable-optical-characteristic lens as stated in the above paragraph (27), which uses a liquid crystal.

(35) A variable-optical-characteristic prism as stated in the above paragraph (28), which uses a liquid crystal.

(36) A variable-optical-characteristic optical element as stated in the above paragraph (31), in which the orientation of the liquid crystal is changed by changing the frequency of the applied voltage.

(37) A variable-optical-characteristic mirror as stated in the above paragraph (32), in which the orientation of the liquid crystal is changed by changing the frequency of the applied voltage.

(38) A variable-optical-characteristic extended curved surface optical element as stated in the above paragraph (33), in which the orientation of the liquid crystal is changed by changing the frequency of the applied voltage.

(39) A variable-optical-characteristic lens as stated in the above paragraph (34), in which the orientation of the liquid crystal is changed by changing the frequency of the applied voltage.

(40) A variable-optical-characteristic prism as stated in the above paragraph (35), in which the orientation of the liquid crystal is changed by changing the frequency of the applied voltage.

(41) A stop or a micro-shutter or a micro-shutter serving also as a stop, which operates on electrostatic force.

(42) A stop or a micro-shutter or a micro-shutter serving also as a stop, which is fabricated by a lithography technique.

(43) An optical system having a variable-optical-characteristic optical element as stated in the above paragraph (1), (19), (21), (24), (31) or (36).

(44) An optical system having a variable-optical-characteristic mirror as stated in any of the above paragraphs (2) to (17) or the above paragraph (20), (22), (25), (32) or (37).

(45) An optical system having a variable-optical-characteristic extended curved surface optical element as stated in the above paragraph (18), (23), (26), (33) or (38).

(46) An optical system having a variable-optical-characteristic lens as stated in the above paragraph (27), (29), (34) or (39).

(47) An optical system having a variable-optical-characteristic prism as stated in the above paragraph (28), (30), (35) or (40).

(48) An optical system having a stop or a micro-shutter or a micro-shutter serving also as a stop as stated in the above paragraph (41) or (42).

(49) An optical system as stated in any of the above paragraphs (43) to (48), which includes an extended curved surface prism.

(50) An optical system as stated in any of the above paragraphs (43) to (48), which includes an extended curved surface reflecting mirror.

(51) An optical system as stated in any of the above paragraphs (43) to (50), which includes a plate-shaped unit.

(52) An optical system having a variable mirror in which light rays are obliquely incident on an entrance surface of the variable mirror.

(53) An optical system having a stop or a micro-shutter or a micro-shutter serving also as a stop as stated in the above paragraph (41) or (42).

(54) An optical system as stated in any of the above paragraphs (43) to (52), which includes an optical element using a synthetic resin or a frame using a synthetic resin.

(55) An optical system characterized by compensating for a change in image-forming condition of the optical system by changing optical characteristics of a variable-optical-characteristic optical element.

(56) An optical system arranged to compensate mainly for at least one of a temperature change, a humidity change, a manufacturing error, a shake and out-of-focus condition of the optical system by changing optical characteristics of a variable-optical-characteristic optical element.

(57) An optical system having a shake preventing function, which includes a variable-optical-characteristic optical element.

(58) An optical system having a resolution improving function, which includes a variable-optical-characteristic optical element.

(59) An optical system having a moire removing function, which includes a variable-optical-characteristic optical element.

(60) An optical system having a zooming function, which includes a variable-optical-characteristic optical element.

(61) An optical system having a signal transmitting or signal processing function, which includes at least one of a variable-optical-characteristic optical element, an extended curved surface prism and a plate-shaped unit.

(62) An optical system as stated in any of the above paragraphs (55) to (61), which has any one of the optical systems as stated in the above paragraphs (43) to (54).

(63) An optical system having a shake preventing function, which includes a variable mirror.

(64) An optical system having a shake preventing function, which includes a variable lens.

(65) An optical system having a variable-optical-characteristic optical element capable of switching between a plurality of focal lengths.

(66) An image pickup apparatus including an optical system as stated in any of the above paragraphs (43) to (65).

(67) An electronic image pickup apparatus including an optical system as stated in any of the above paragraphs (43) to (65).

(68) A viewing apparatus including an optical system as stated in any of the above paragraphs (43) to (65).

(69) An optical apparatus including an optical system as stated in any of the above paragraphs (43) to (65).

(70) An image-forming apparatus including an optical system as stated in any of the above paragraphs (43) to (65).

(71) A signal processing apparatus including an optical system as stated in any of the above paragraphs (43) to (65).

As has been stated above, according to the third invention in the present invention, it is possible to produce easily and compactly various optical apparatus, i.e. an image pickup apparatus, a viewing apparatus, a signal processing apparatus, and a display apparatus, realizing shake prevention, focusing, i.e. focus adjustment, compensation for a change in an optical element due to a change in temperature or humidity, compensation for manufacturing errors of the optical system, etc. by using a variable-optical-characteristic optical element, e.g. a variable mirror.

The following is a description of embodiments and specific examples of an optical system according to a fourth invention in the present invention.

FIG. 60 shows a decentered optical system according to a first embodiment of the fourth invention, in which: 1 denotes a stop; 2 denotes a decentered prism; 3 denotes a variable-configuration mirror; 4 denotes a solid-state image pickup device; and 5 denotes a filter for changing optical characteristics of rays incident on the solid-state image pickup device 4, e.g. an absorption filter, a low-pass filter, or a polarizing filter.

The variable-configuration mirror 3 is one form of a reflecting optical element capable of changing the optical power by freely changing the direction of reflection for each position in a surface. As shown in FIG. 61, which illustrates two states thereof, the variable-configuration mirror 3 can change the surface configuration freely. The variable-configuration mirror 3 may be replaced with a variable-refractive-index mirror capable of freely changing the refractive index of an optical medium adjacent to the entrance side of the reflecting surface and hence capable of changing the optical power by freely changing the direction of reflection for each position in the reflecting surface as shown in examples (described later).

In the decentered optical system in FIG. 60, a light beam from an object that passes through the stop 1 enters the decentered prism 2 through a first surface 21 of the prism 2. The light beam is refracted by a second surface 22 to come out of the prism 2 once so as to be incident on the variable-configuration mirror 3. The incident light beam is reflected by the variable-configuration mirror 3 to reenter the prism 2 through the second surface 22. The light beam is reflected by a third surface 23 this time and refracted by a fourth surface 24 to exit from the prism 2. Then, the light beam passes through the filter 5 and forms an image on the image pickup surface of the solid-state image pickup device 4.

Incidentally, the surface configuration of the mirror surface of the variable-configuration mirror 3 may be rotationally symmetric. However, because the incident ray (axial principal ray) is in decentered positional relationship to the mirror, it is desirable that the mirror surface of the variable-configuration mirror 3 have a rotationally asymmetric surface configuration for the purpose of correcting rotationally asymmetric aberrations produced by the mirror surface.

The reasons for the above will be described below in detail. First, a coordinate system used in the following description and rotationally asymmetric surfaces will be described. An optical axis defined by a straight line along which the axial principal ray travels until it intersects the first surface of the optical system is defined as a Z-axis. An axis perpendicularly intersecting the Z-axis in the decentration plane of each surface constituting the decentered optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 77, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface be a rotationally asymmetric surface having no axis of rotational symmetry in the surface nor out of the surface. Such a rotationally asymmetric surface configuration allows the degree of freedom to increase, and this is favorable for aberration correction.

Next, rotationally asymmetric astigmatism will be described. A decentered concave mirror M produces astigmatism even for axial rays, as shown in FIG. 78, as in the case of the above. The astigmatism can be corrected by appropriately changing the curvatures in the X- and Y-axis directions of the rotationally asymmetric surface as in the case of the above.

Rotationally asymmetric coma will be described below. A decentered concave mirror M produces coma even for axial rays, as shown in FIG. 79, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The decentered optical system according to this invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

Further, it is desirable from the viewpoint of aberration correction that the surface configuration of the variable-configuration mirror or the variable-refractive-index mirror, which is one of the constituent reflecting surfaces of the decentered optical system according to this invention, be a rotationally asymmetric surface.

It should be noted that the above-described rotationally asymmetric surface used in this invention should preferably be a plane-symmetry free-form surface having only one plane of symmetry. Free-form surfaces used in this invention are defined by the following equation (a). It should be noted that the Z-axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 + C_7 X^3 +$$

$$C_8 X^2 Y + C_9 X Y^2 + C_{10} Y^3 + C_{11} X^4 + C_{12} X^3 Y + C_{13} X^2 Y^2 +$$

$$C_{14} X Y^3 + C_{15} Y^4 + C_{16} X^5 + C_{17} X^4 Y + C_{18} X^3 Y^2 + C_{19} X^2 Y^3 +$$

-continued
$$C_{20} X Y^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} X Y^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} X Y^6 + C_{36} Y^7$$

where $C_j$ (j is an integer of 2 or higher) are coefficients.

In general, the above-described free-form surface does not have planes of symmetry in both the XZ- and YZ-planes. In this invention, however, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation, the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

The above defining equation (a) is shown as merely an example, as stated above, and the feature of this invention resides in that rotationally asymmetric aberrations due to decentration are corrected and, at the same time, productivity is improved by using a rotationally asymmetric surface having only one plane of symmetry. It is a matter of course that the same advantageous effect can be obtained for any other defining equation that expresses such a rotationally asymmetric surface.

Incidentally, in the decentered optical system according to this invention as shown in FIG. 60, focusing and so forth can be effected by changing the surface configuration of the variable-configuration mirror 3 to solve the above-described problems to be solved by this invention, i.e. focusing and so forth.

In this case, the amount of movement of the same point on the reflecting surface when the variable-configuration mirror 3 changes from the state 1 to the state 2 in FIG. 61 is assumed to be $\Delta\mu$. Assuming that the maximum amount of change $\Delta\mu$ in the mirror configuration is $\Delta\mu_{max}$, it is preferable to satisfy the following condition:

$$0.0001 < \Delta\mu_{max} < 10 \text{(mm)} \quad (1)$$

If $\Delta\mu_{max}$ is not larger than the lower limit of the condition, i.e. 0.0001 mm, there is substantially no change in configuration of the mirror, which goes against the aims of this invention. If $\Delta\mu_{max}$ is not smaller than the upper limit, i.e. 10 mm, the amount of deformation of the mirror becomes excessively large, so that the mirror interferes with an optical element used in combination with it. In addition, the change in configuration becomes unfavorably remarkable. Consequently, the balance of aberrations corrected by a combination with another surface is destroyed, resulting in the occurrence of over-corrected aberration and aberration left uncorrected. This is unfavorable from the viewpoint of performance.

It is even more desirable to satisfy the following condition:

$$0.001 < \Delta \mu_{max} < 1 \text{(mm)} \tag{1-1}$$

FIG. 62 shows the positional relationship between a reflecting surface of an active reflecting optical element (in FIG. 62, a reflecting surface of a variable-configuration mirror 3) and an optical functional surface 6 adjacent to the entrance or exit side of the reflecting surface in the arrangement of this invention (FIG. 62 corresponds to Example 1, described later, which has an optical functional surface (reflecting surface) 6 only on the exit side). Assuming that the optical path length of the axial principal ray 11 from the optical functional surface previous to the active reflecting optical element to the reflecting surface of the active reflecting optical element is $\Delta L_f$ and the optical path length of the axial principal ray 11 from the reflecting surface of the active reflecting optical element to the optical functional surface subsequent to the active reflecting optical element is $\Delta L_b$, it is preferable to satisfy at least either one of the following conditions:

$$0.001 < \Delta L_f < 1000 \text{(mm)} \tag{2}$$

$$0.001 < \Delta L_b < 1000 \text{(mm)} \tag{3}$$

If $\Delta L_f$ or $\Delta L_b$ is not larger than the lower limit of each condition, i.e. 0.001 mm, the variable-configuration mirror or the variable-refractive-index mirror and the optical functional surface previous or subsequent to the mirror physically interfere with each other, making it impossible to construct the optical system actually. If $\Delta L_f$ or $\Delta L_b$ is not smaller than the upper limit, i.e. 1000 mm, the optical system itself becomes undesirably large in size, and it becomes impossible to provide a compact and high-performance optical system, which is the object of this invention.

It is even more desirable to satisfy at least either one of the following conditions:

$$0.01 < \Delta L_f < 100 \text{(mm)} \tag{2-1}$$

$$0.01 < \Delta L_b < 100 \text{(mm)} \tag{3-1}$$

It is still more desirable to satisfy at least either one of the following conditions:

$$0.1 < \Delta L_f < 10 \text{(mm)} \tag{2-2}$$

$$0.1 < \Delta L_b < 10 \text{(mm)} \tag{3-2}$$

In the case of an optical system formed by combining together a prism 2 and a variable-configuration mirror (or a variable-refractive-index mirror) 3 as shown in FIG. 60, it is important that rays exiting from the exit surface 7 of the prism 2 and incident on the variable-configuration mirror 3 or rays emanating from the variable-configuration mirror 3 and entering the prism 2 satisfy at least one of the following three conditions.

Let us assume that, as shown in FIG. 63, the angle formed between a line normal to the exit surface 7 of the prism 2 at a position where an emergent ray exits from the prism 2 and the ray inside the prism 2 is $\theta_{ex}$ and the angle formed between a line normal to the exit surface 7 of the prism 2 at a position where an incident ray enters the prism 2 and the ray outside the prism 2 is $\theta_{in}$ and further the refractive index of the medium of the prism 2 is n and the refractive index of the medium filling the space between the prism 2 and the variable-configuration mirror 3 (in the case of a variable-refractive-index mirror, the refractive index of an optical medium adjacent to the entrance side of the reflecting surface) is n'.

When n>n', $$0 \leq \sin \theta_{ex} < n'/n \tag{4}$$

When n<n', $$0 \leq -\sin \theta_{in} < n/n' \tag{5}$$

In the above condition (4), if $\sin \theta_{ex}$ is not smaller than the upper limit, rays are undesirably totally reflected at the exit surface 7 and cannot reach the variable-configuration mirror 3. In the above condition (5), if $\sin \theta_{in}$ is not smaller than the upper limit, rays reflected from the variable-configuration mirror 3 are undesirably totally reflected by the exit surface 7 and cannot reenter the prism 2. There is no possibility of $\sin \theta_{ex}$ or $\sin \theta_{in}$ becoming smaller than the lower limit because of the definition of $\theta_{ex}$ and $\theta_{in}$.

In this invention, further, assuming that the angle formed between the axial principal ray incident on the active reflecting optical element and a line normal to the reflecting surface of the active reflecting optical element at a position where the axial principal ray intersects the reflecting surface is $\phi$ (see FIG. 62), it is important to satisfy the following condition:

$$1° < \phi < 85° \tag{6}$$

If the angle $\phi$ is not smaller than the upper limit of the condition, i.e. 85°, the angle of incidence of rays on the active reflecting optical element becomes excessively large, and the amount of decentration of the reflecting surface of the active reflecting optical element becomes excessively large. Consequently, aberrations, for example, rotationally asymmetric distortion and curvature of field, occur to a considerable extent unfavorably, and these aberrations cannot satisfactorily be corrected in a reflecting optical system used in combination. If the angle $\phi$ is not larger than the lower limit, i.e. 1°, rays are incident on the reflecting surface of the active reflecting optical element approximately at right angles. Consequently, the rays undesirably return to the object side, traveling along approximately the same optical path as the optical path for incidence on the active reflecting optical element.

It is even more desirable to satisfy the following condition:

$$15° < \phi < 55° \tag{6-1}$$

Next, Examples 1 to 7 of the decentered optical system according to the fourth invention will be described. It should be noted that constituent parameters of each example will be shown later.

In each example, as shown in FIG. 64, an axial principal ray 11 is defined by a ray emanating from the center of an object and passing through the center of a stop 1 to reach the center of an image plane 4. A hypothetic plane is taken in a plane perpendicular to the axial principal ray 11 exiting from a decentered mirror system (decentered prism). The intersection of the axial principal ray 11 and the stop plane 1 is defined as the origin for decentered optical surfaces present between the subsequent optical surface and the hypothetic plane. A Z-axis is taken in the direction of the incident axial principal ray 11. A positive direction of the Z-axis is taken in the direction of travel of the axial principal ray 11. A plane containing the Z-axis and the center of the image plane 4 is defined as a YZ-plane. An axis passing through the origin at right angles to the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. FIG. 64 shows the hypothetic plane and a coordinate system determined with respect to the center of the stop plane 1. Illustration of the hypothetic plane and the coordinate system is omitted in FIG. 65 and the following figures.

In Examples 1 to 7, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces] with respect to the X-, Y- and Z-axes (α, β and γ, respectively). In this case, the positive α and β mean counterclockwise rotation relative to the positive directions of the corresponding axes, and the positive γ means clockwise rotation relative to the positive direction of the Z-axis.

Among optical functional surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method.

The configuration of each free-form surface used in this invention is defined by the above equation (a). The Z-axis of the defining equation is the axis of the free-form surface.

It should be noted that those terms concerning free-form surfaces for which no data is shown are zero. The refractive index is expressed by the refractive index for the spectral d-line (wavelength: 587.56 nanometers). Lengths are given in millimeters.

Other equations for defining free-form surfaces include Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \quad (b)$$
$$y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$

-continued
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^1 - 1) + D_{27}(15R^6 - 20R^4 + 6R^2)\sin(2A) +$$
$$D_{28}(6R^6 - 5R^4)\sin(4A) + D_{29} R^6 \sin(6A)$$

To design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in this invention are expressed by the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + C_8 y^3 + \quad (c)$$
$$C_9 y^2|x| + C_{10} yx^2 + C_{11}|x^3| + C_{12} y^4 + C_{13} y^3|x| + C_{14} y^2 x^2 +$$
$$C_{15} y|x^3| + C_{16} x^4 + C_{17} y^5 + C_{18} y^4|x| + C_{19} y^3 x^2 + C_{20} y^2|x^3| +$$
$$C_{21} yx^4 + C_{22}|x^5| + C_{23} y^6 + C_{24} y^5|x| + C_{25} y^4 x^2 + C_{26} y^3|x^3| +$$
$$C_{27} y^2 x^4 + C_{28} y|x^5| + C_{29} x^6 + C_{30} y^7 + C_{31} y^6|x| + C_{32} y^5 x^2 +$$
$$C_{33} y^4|x^3| + C_{34} y^3 x^4 + C_{35} y^2|x^5| + C_{36} yx^6 + C_{37}|x^7|$$

Although in the examples of this invention the surface configuration is expressed by a free-form surface using the above equation (a), it should be noted that the same advantageous effect can be obtained by using the above equation (b) or (c).

Examples of this invention will be described below. In all examples, the size of the image plane 4 is 4.88 mm×3.67 mm in breadth and length.

Example 1 is, as shown in FIG. 64, an example in which a decentered reflecting optical system is constructed by using a mirror. In this case, the optical system has a focal length of 7.75 mm and an F-number of 3.9. In this example, a light beam from an object that passes through a stop 1 is incident on a variable-configuration mirror 3. The light beam reflected from the variable-configuration mirror 3 is then reflected by another mirror 6. Thereafter, the light beam passes through a filter 5 and forms an image on an image plane 4. In this example, the optical system is capable of focusing by changing the configuration of the variable-configuration mirror 3 from infinity (position 1) through 1000 mm (position 2) to a near point of 100 mm (position 3). The horizontal half field angle is 14.43°, and the vertical half field angle is 10.92°.

Example 2 is, as shown in FIG. 65, an example in which a decentered reflecting optical system is constructed by using a decentered prism. In this case, the optical system has a focal length of 7.75 mm and an F-number of 2.8. In this example, a light beam from an object that passes through a stop 1 enters a decentered prism 2 through a first surface 21 of the prism 2. The light beam is refracted by a second surface 22 to come out of the prism 2 once so as to be incident on a variable-configuration mirror 3. The light beam is reflected by the variable-configuration mirror 3 to reenter the prism 2 through the second surface 22. The light beam is reflected by a third surface 23 this time and refracted by a fourth surface 24 to exit from the prism 2. Then, the light beam passes through a filter 5 and forms an image on an image plane 4. In this example, the optical system is capable of focusing by changing the configuration of the variable-configuration mirror 3 from infinity (position 1) through 1000 mm (position 2) to a near point of 100 mm (position 3). The horizontal half field angle is 14.43°, and the vertical half field angle is 10.92°.

Example 3 is, as shown in FIG. 66, an example in which a decentered reflecting optical system is constructed by using a decentered prism and the space between a variable-configuration mirror 3 and the prism 2 is filled with a flowable medium (in the case of this example, a liquid). In this case, the optical system has a focal length of 7.75 mm and an F-number of 2.8. In this example, a light beam from an object that passes through a stop 1 enters the decentered prism 2 through a first surface 21 of the prism 2. The light beam is refracted by a second surface 22 to come out of the prism 2 once. The light beam passes through the liquid 9 and is incident on the variable-configuration mirror 3. The light beam is reflected by the variable-configuration mirror 3 and passes through the liquid 9 again to enter the prism 2 through the second surface 22. The light beam is reflected by a third surface 23 this time and refracted by a fourth surface 24 to exit from the prism 2. Then, the light beam passes through a filter 5 and forms an image on an image plane 4. In this example, the optical system is capable of focusing by changing the configuration of the variable-configuration mirror 3 from infinity (position 1) through 1000 mm (position 2) to a near point of 100 mm (position 3). It should be noted that the space between the prism 2 and the variable-configuration mirror 3 is filled with the liquid 9 supplied from a liquid reservoir 8. When the space expands as the variable-configuration mirror 3 is deformed, the liquid 9 is sent from the liquid reservoir 8, whereas when the space contracts, the liquid 9 is sent to the liquid reservoir 8. The horizontal half field angle is 14.43°, and the vertical half field angle is 10.92°.

Example 4 is, as shown in FIG. 67, an example in which a decentered reflecting optical system is constructed by using a decentered prism as in the case of Example 2. In this case, the optical system uses a different type of prism and has a focal length of 4.98 mm and an F-number of 2.8. In this example, a light beam from an object that passes through a stop 1 enters a decentered prism 2 through a first surface 21 of the prism 2. The light beam is totally reflected by a second surface 22, and the reflected light is refracted by a third surface 23 to come out of the prism 2 once so as to be incident on a variable-configuration mirror 3. The light beam is reflected by the variable-configuration mirror 3 to reenter the prism 2 through the third surface 23. The light beam is reflected by a fourth surface 24 this time and incident on the second surface 22 again. The light beam is refracted by the second surface 22 this time to exit from the prism 2. Then, the light beam passes through a filter 5 and forms an image on an image plane 4. In this example, the optical system is capable of focusing by changing the configuration of the variable-configuration mirror 3 from infinity (position 1) through 1000 mm (position 2) to a near point of 100 mm (position 3). The horizontal half field angle is 26.14°, and the vertical half field angle is 20.21°.

Example 5 is, as shown in FIG. 68, an example in which a decentered reflecting optical system is constructed by using a decentered prism as in the case of Example 2. In this case, the optical system uses still another type of prism and has a focal length of 7.75 mm and an F-number of 2.8. In this example, a light beam from an object that passes through a stop 1 enters a decentered prism 2 through a first surface 21 of the prism 2. The light beam is refracted by a second surface 22 to come out of the prism 2 once so as to be incident on a variable-configuration mirror 3. The light beam is reflected by the variable-configuration mirror 3 to reenter the prism 2 through the second surface 22. The light beam is totally reflected by the first surface 21 this time and totally reflected by a third surface 23. The reflected light is reflected by a fourth surface 24 to be incident on the third surface 23 again. The light beam is refracted by the third surface 23 this time to exit from the prism 2. Then, the light beam passes through a filter 5 and forms an image on an image plane 4. Thus, in this example, the optical system has three surfaces each having a reflecting action in the prism 2, and two of the three surfaces utilize total reflection. In this example, the optical system is capable of focusing by changing the configuration of the variable-configuration mirror 3 from infinity (position 1) through 1000 mm (position 2) to a near point of 100 mm (position 3). The horizontal half field angle is 14.43°, and the vertical half field angle is 10.92°.

Example 6 is, as shown in FIGS. 69 to 71, a two-unit zoom optical system comprising a first unit G1 formed from a coaxial refracting optical system and a second unit G 2 formed from a decentered reflecting optical system, in which the space between the first unit G1 and the second unit G2 and the space between the second unit G2 and an image plane 4 are variable, and the rear unit G2 comprises a variable-focus mirror 3 and a decentered prism 2. FIG. 69 is a sectional view at a wide-angle end (position 1). FIG. 70 is a sectional view at an intermediate position (position 2). FIG. 71 is a sectional view at a telephoto end (position 3). This is a zoom optical system with a zoom ratio of 2 in which the focal length is from 5 through 7 to 10 mm (wide-angle end—intermediate position—telephoto end) and the F-number is from 2.8 to 5.6. In this example, a light beam from an object passes through the first unit G1 consisting of three lenses, i.e. a negative lens, a positive lens, and a negative lens, and further passes through a stop 1 to enter the second unit G2 consisting of a decentered prism 2 and a variable-focus mirror (variable-configuration mirror) 3. The light beam incident on the second unit G2 enters the prism 2 through a first surface 21 of the prism 2. The light beam is refracted by a second surface 22 to come out of the prism 2 once and incident on the variable-focus mirror 3. The light beam is reflected by the variable-focus mirror 3 to reenter the prism 2 through the second surface 22. The light beam is reflected by a third surface 23 this time and refracted by a fourth surface 24 to exit from the prism 2. Then, the light beam passes through a filter 5 and forms an image on the image plane 4. In this example, the optical system is capable of favorably holding variations of aberrations due to changes in zooming condition by changing the configuration of the variable-focus mirror 3. The horizontal half field angle is from 26.05 through 13.73 to 9.71° (wide-angle end—intermediate position—telephoto end), and the vertical half field angle is from 20.13 through 14.67 to 10.39° (wide-angle end—intermediate position—telephoto end).

Example 7 is an example in which undulations approximated to manufacturing errors are added to the design configuration $S_0$ of the third surface 23 of the decentered prism 2 in Example 2 to degrade the optical performance intentionally, and aberrations are corrected by changing the configuration of the variable-configuration mirror 3. As the undulations, periodic undulations are assumed. Assuming that the design configuration of the third surface 23 is $S_0$ and the surface configuration of the third surface 23 after the undulations have been added thereto is S, the surface configuration S is expressed by $$S = S_0 + A \cos(2\pi r/R)$$

where A is the amplitude of the undulations; R is the frequency of the undulations; and $r = X^2 + Y^2$.

It should be noted that X and Y are the values of the third surface 23 in a local coordinate system (the same as the coordinates of the equation (a) defining a free-form surface). In this example, A=1.0 μm, and R=1.75 mm. The horizontal half field angle is 14.43°, and the vertical half field angle is 10.92°.

Constituent parameters in the foregoing Examples 1 to 7 are shown below. In these tables: "FFS" denotes a free-form surface; "HRP" denotes a hypothetic plane; and "DSM" denotes a variable-configuration mirror.

Example 1
(Position 1)

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS①(DSM) | | (1) | | |
| 3 | FFS② | | (2) | | |
| 4 | ∞ (HRP) | | (3) | | |
| 5 | ∞ | 1.00 | | 1.5163 | 64.1 |
| 6 | ∞ | 0.50 | | | |
| Image plane | ∞ | | | | |

FFS①

| $C_4$ | $-2.5031 \times 10^{-2}$ | $C_6$ | $-2.2039 \times 10^{-2}$ | $C_8$ | $-2.9317 \times 10^{-5}$ |
| $C_{10}$ | $-1.2937 \times 10^{-4}$ | $C_{11}$ | $-2.9218 \times 10^{-5}$ | $C_{13}$ | $3.7470 \times 10^{-4}$ |
| $C_{15}$ | $-3.5345 \times 10^{-4}$ | | | | |

FFS②

| $C_4$ | $-7.2454 \times 10^{-3}$ | $C_6$ | $-3.6417 \times 10^{-3}$ | $C_8$ | $8.5040 \times 10^{-4}$ |
| $C_{10}$ | $6.1043 \times 10^{-4}$ | $C_{11}$ | $-1.2103 \times 10^{-4}$ | $C_{13}$ | $1.9109 \times 10^{-4}$ |
| $C_{15}$ | $-3.3215 \times 10^{-4}$ | | | | |

Displacement and tilt(1)

| X | 0.00 | Y | 0.00 | Z | 5.51 |
| α | 19.22 | β | 0.00 | γ | 0.00 |

Displacement and tilt(2)

| X | 0.00 | Y | −4.45 | Z | −0.09 |
| α | −2.41 | β | 0.00 | γ | 0.00 |

Displacement and tilt(3)

| X | 0.00 | Y | −6.29 | Z | 1.80 |
| α | −44.00 | β | 0.00 | γ | 0.00 |

(Position 2)

| Surface No. | Radius of curvature | Surface separation | Displacement and tilt | Refractive index | Abbe's No. |
|---|---|---|---|---|---|
| Object plane | ∞ | 1000.00 | | | |
| 1 | ∞ (Stop) | | | | |
| 2 | FFS①(DSM) | | (1) | | |
| 3 | FFS② | | (2) | | |
| 4 | ∞ (HRF) | | (3) | | |
| 5 | ∞ | 1.00 | | 1.5163 | 64.1 |
| 6 | ∞ | 0.50 | | | |
| Image plane | ∞ | | | | |

FFS①

| $C_4$ | $-2.5208 \times 10^{-2}$ | $C_8$ | $-2.2436 \times 10^{-2}$ | $C_8$ | $-7.8378 \times 10^{-5}$ |
| $C_{10}$ | $-4.1752 \times 10^{-5}$ | $C_{13}$ | $-6.4661 \times 10^{-7}$ | $C_{13}$ | $1.6197 \times 10^{-4}$ |
| $C_{15}$ | $-9.9899 \times 10^{-5}$ | | | | |

FFS②

| $C_4$ | $-7.2454 \times 10^{-3}$ | $C_6$ | $-3.6417 \times 10^{-3}$ | $C_8$ | $8.5040 \times 10{-4}$ |
| $C_{10}$ | $6.1043 \times 10^{-4}$ | $C_{11}$ | $-1.2103 \times 10^{-4}$ | C13 | $1.9109 \times 10{-4}$ |
| $C_{15}$ | $-3.3215 \times 10^{-4}$ | | | | |

Displacement and tilt(1)

| X | 0.00 | Y | 0.00 | Z | 5.51 |
| α | 19.22 | β | 0.00 | γ | 0.00 |

Displacement and tilt(2)

| X | 0.00 | Y | −4.45 | Z | −0.09 |
| α | −2.41 | β | 0.00 | γ | 0.00 |

Displacement and tilt(3)

| X | 0.00 | Y | −6.20 | Z | 1.80 |
| α | −44.00 | β | 0.00 | γ | 0.00 |

(Position 3)

| Surface No. | Radius of curvature | Surface separation | Displacement and tilt | Refractive index | Abbe's No. |
|---|---|---|---|---|---|
| Object plane | ∞ | 100.00 | | | |
| 1 | ∞ (Stop) | | | | |
| 2 | FFS①(DSM) | | (1) | | |
| 3 | FFS② | | (2) | | |
| 4 | ∞ (HRF) | | (3) | | |
| 5 | ∞ | 1.00 | | 1.5163 | 64.1 |
| 6 | ∞ | 0.50 | | | |
| Image plane | ∞ | | | | |

FFS①

| $C_4$ | $2.7454 \times 10^{-2}$ | $C_6$ | $-2.4438 \times 10^{-2}$ | $C_8$ | $-9.3711 \times -10^{-5}$ |
| $C_{10}$ | $-3.8656 \times 10^{-5}$ | $C_{11}$ | $-3.2751 \times 10^{-6}$ | $C_{13}$ | $1.4958 \times -10^{-4}$ |
| $C_{15}$ | $-9.5620 \times 10^{-5}$ | | | | |

FFS②

| $C_4$ | $-7.2454 \times 10^{-3}$ | $C_6$ | $-3.6417 \times 10^{-3}$ | $C_8$ | $8.5040 \times 10^{-4}$ |
| $C_{10}$ | $6.1043 \times 10^{-4}$ | $C_{11}$ | $-1.2103 \times 10^{-4}$ | $C_{13}$ | $1.9109 \times 10^{-4}$ |
| $C_{15}$ | $-3.3215 \times 10^{-4}$ | | | | |

Displacement and tilt(1)

| X | 0.00 | Y | 0.00 | Z | 5.51 |
| α | 19.22 | β | 0.00 | γ | 0.00 |

Displacement and tilt(2)

| X | 0.00 | Y | −4.45 | Z | −0.09 |
| α | −2.41 | β | 0.00 | γ | 0.00 |

Displacement and tilt(3)

| X | 0.00 | Y | −6.20 | Z | 1.80 |
| α | −44.00 | β | 0.00 | γ | 0.00 |

Example 2
(Position 1)

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | | |
| 4 | FFS③ (DSM) | | (3) | | |
| 5 | FFS④ | | (2) | 1.5254 | 56.2 |

-continued

| | | | | | |
|---|---|---|---|---|---|
| 6 | FFS④ | | (4) | 1.5254 | 56.2 |
| 7 | FFS⑤ | | (5) | | |
| 8 | ∞ (HRF) | | (6) | | |
| 9 | ∞ | 1.00 | | 1.5163 | 64.1 |
| 10 | ∞ | 0.50 | | | |
| Image plane | ∞ | | | | |

FFS①

| | | | | | |
|---|---|---|---|---|---|
| $C_4$ | $-6.1472 \times 10^{-2}$ | $C_6$ | $-6.5206 \times 10^{-2}$ | $C_8$ | $-2.2839 \times 10^{-2}$ |
| $C_{10}$ | $-1.6839 \times 10^{-2}$ | $C_{11}$ | $-1.2295 \times 10^{-3}$ | $C_{13}$ | $-4.8789 \times 10^{-3}$ |
| $C_{15}$ | $-1.6701 \times 10^{-3}$ | | | | |

FFS②

| | | | | | |
|---|---|---|---|---|---|
| $C_4$ | $-5.8777 \times 10^{-2}$ | $C_6$ | $-4.8740 \times 10^{-2}$ | $C_8$ | $-4.3380 \times 10^{-3}$ |
| $C_{10}$ | $-2.5314 \times 10^{-3}$ | $C_{11}$ | $-2.7163 \times 10^{-4}$ | $C_{13}$ | $-4.6696 \times 10^{-4}$ |
| $C_{15}$ | $2.3035 \times 10^{-4}$ | | | | |

FFS③

| | | | | | |
|---|---|---|---|---|---|
| $C_4$ | $2.4117 \times 10^{-2}$ | $C_6$ | $-2.7676 \times 10^{-2}$ | $C_8$ | $-1.6249 \times 10^{-3}$ |
| $C_{10}$ | $-8.5067 \times 10^{-4}$ | $C_{11}$ | $-37950 \times 10^{-5}$ | $C_{13}$ | $-2.7720 \times 10^{-4}$ |
| $C_{15}$ | $-1.0928 \times 10^{-4}$ | | | | |

FFS④

| | | | | | |
|---|---|---|---|---|---|
| $C_4$ | $-1.2619 \times 10^{-2}$ | $C_6$ | $-1.1670 \times 10^{-2}$ | $C_8$ | $-3.0772 \times 10^{-3}$ |
| $C_{10}$ | $-8.2107 \times 10^{-4}$ | $C_{11}$ | $-4.7837 \times 10^{-5}$ | $C_{13}$ | $2.8954 \times 10^{-4}$ |
| $C_{15}$ | $2.7821 \times 10^{-4}$ | | | | |

FFS⑤

| | | | | | |
|---|---|---|---|---|---|
| $C_4$ | $1.8447 \times 10^{-2}$ | $C_6$ | $-4.1562 \times 10^{-2}$ | $C_8$ | $-9.6013 \times 10^{-3}$ |
| $C_{10}$ | $9.4593 \times 10^{-3}$ | $C_{11}$ | $1.6389 \times 10^{-3}$ | $C_{13}$ | $2.9356 \times 10^{-3}$ |
| $C_{15}$ | $5.4875 \times 10^{-3}$ | | | | |

Displacement and tilt(1)

| X | 0.00 | Y | 0.00 | Z | 0.50 |
|---|---|---|---|---|---|
| α | −4.99 | β | 0.00 | γ | 0.00 |

Displacement and tilt(2)

| X | 0.00 | Y | −0.07 | Z | 2.96 |
|---|---|---|---|---|---|
| α | 22.02 | β | 0.00 | γ | 0.00 |

Displacement and tilt(3)

| X | 0.00 | Y | −0.45 | Z | 4.29 |
|---|---|---|---|---|---|
| α | 22.02 | β | 0.00 | γ | 0.00 |

Displacement and tilt(4)

| X | 0.00 | Y | −4.55 | Z | 0.44 |
|---|---|---|---|---|---|
| α | 1.76 | β | 0.00 | γ | 0.00 |

Displacement and tilt(5)

| X | 0.00 | Y | −6.27 | Z | 2.61 |
|---|---|---|---|---|---|
| α | −50.21 | β | 0.00 | γ | 0.00 |

Displacement and tilt(6)

| X | 0.00 | Y | −6.78 | Z | 3.42 |
|---|---|---|---|---|---|
| α | −32.07 | β | 0.00 | γ | 0.00 |

(Position 2)

| Surface No. | Radius of curvature | Surface separation | Displacement and tilt | Refractive index | Abbe's No. |
|---|---|---|---|---|---|
| Object plane | ∞ | 1000.00 | | | |
| 1 | ∞ (Stop) | | | | |
| 2 | FFS① | | (1) | 1.5254 | 56.2 |
| 3 | FFS② | | (2) | | |
| 4 | FFS③ (DSM) | | (3) | | |
| 5 | FFS③ | | (2) | 1.5254 | 56.2 |
| 6 | FFS④ | | (4) | 1.5254 | 56.2 |
| 7 | FFS⑤ | | (5) | | |
| 8 | ∞ (HRP) | | (6) | | |
| 9 | ∞ | 1.00 | | 1.5163 | 64.1 |
| 10 | ∞ | 0.50 | | | |
| Image plane | ∞ | | | | |

FFS①

| | | | | | |
|---|---|---|---|---|---|
| $C_4$ | $-6.1472 \times 10^{-2}$ | $C_6$ | $-6.5206 \times 10^{-2}$ | $C_8$ | $-2.2839 \times 10^{-2}$ |
| $C_{10}$ | $-1.6839 \times 10^{-2}$ | $C_{11}$ | $-1.2295 \times 10^{-3}$ | $C_{13}$ | $-4.8789 \times 10^{-3}$ |
| $C_{15}$ | $-1.6701 \times 10^{-3}$ | | | | |

FFS②

| | | | | | |
|---|---|---|---|---|---|
| $C_4$ | $-5.8777 \times 10^{-2}$ | $C_6$ | $-4.8740 \times 10^{-2}$ | $C_8$ | $-4.3380 \times 10^{-3}$ |
| $C_{10}$ | $-2.5314 \times 10^{-3}$ | $C_{11}$ | $-2.7163 \times 10^{-4}$ | $C_{13}$ | $-4.6696 \times 10^{-4}$ |
| $C_{15}$ | $2.3035 \times 10^{-4}$ | | | | |

FFS③

| | | | | | |
|---|---|---|---|---|---|
| $C_4$ | $-2.4379 \times 10^{-2}$ | $C_6$ | $-2.7905 \times 10^{-2}$ | $C_8$ | $-1.6233 \times 10^{-3}$ |
| $C_{10}$ | $-8.4937 \times 10^{-4}$ | $C_{11}$ | $-3.6231 \times 10^{-5}$ | $C_{13}$ | $-2.8084 \times 10^{-4}$ |
| $C_{15}$ | $-9.9887 \times 10^{-5}$ | | | | |

FFS④

| | | | | | |
|---|---|---|---|---|---|
| $C_4$ | $-1.2619 \times 10^{-2}$ | $C_6$ | $-1.1670 \times 10^{-2}$ | $C_8$ | $-3.0772 \times 10^{-3}$ |
| $C_{10}$ | $-8.2107 \times 10^{-4}$ | $C_{11}$ | $-4.7837 \times 10^{-5}$ | $C_{13}$ | $2.8954 \times 10^{-4}$ |
| $C_{15}$ | $2.7821 \times 10^{-4}$ | | | | |

FFS⑤

| | | | | | |
|---|---|---|---|---|---|
| $C_4$ | $1.8447 \times 10^{-2}$ | $C_6$ | $-4.1562 \times 10^{-2}$ | $C_8$ | $-9.6013 \times 10^{-3}$ |
| $C_{10}$ | $9.4593 \times 10^{-3}$ | $C_{11}$ | $1.6389 \times 10^{-3}$ | $C_{13}$ | $2.9356 \times 10^{-3}$ |
| $C_{15}$ | $5.4875 \times 10^{-3}$ | | | | |

Displacement and tilt(1)

| X | 0.00 | Y | 0.00 | Z | 0.50 |
|---|---|---|---|---|---|
| α | −4.99 | β | 0.00 | γ | 0.00 |

Displacement and tilt(2)

| X | 0.00 | Y | −0.07 | Z | 2.96 |
|---|---|---|---|---|---|
| α | 22.02 | β | 0.00 | γ | 0.00 |

Displacement and tilt(3)

| X | 0.00 | Y | −0.45 | Z | 4.29 |
|---|---|---|---|---|---|
| α | 22.02 | β | 0.00 | γ | 0.00 |

Displacement and tilt(4)

| X | 0.00 | Y | −4.55 | Z | 0.44 |
|---|---|---|---|---|---|
| α | 1.76 | β | 0.00 | γ | 0.00 |

Displacement and tilt(5)

| X | 0.00 | Y | −6.27 | Z | 2.61 |
|---|---|---|---|---|---|
| α | −50.21 | β | 0.00 | γ | 0.00 |

Displacement and tilt(6)

| X | 0.00 | Y | −6.78 | Z | 3.42 |
|---|---|---|---|---|---|
| α | −32.07 | β | 0.00 | γ | 0.00 |

(Position 3)

| Surface No. | Radius of curvature | Surface separation | Displacement and tilt | Refractive index | Abbe's No. |
|---|---|---|---|---|---|
| Object plane | ∞ | 100.00 | | | |
| 1 | ∞ (Stop) | | | | |
| 2 | FFS① | | (1) | 1.5254 | 56.2 |
| 3 | FFS② | | (2) | | |
| 4 | FFS③ (DSM) | | (3) | | |
| 5 | FFS② | | (2) | 1.5254 | 56.2 |
| 6 | FFS④ | | (4) | 1.5254 | 56.2 |
| 7 | FFS⑤ | | (5) | | |
| 8 | ∞ (HRP) | | (6) | | |
| 9 | ∞ | 1.00 | | 1.5163 | 64.1 |
| 10 | ∞ | 0.50 | | | |
| Image plane | ∞ | | | | |

FFS①

| | | | | | |
|---|---|---|---|---|---|
| $C_4$ | $6.1472 \times 10^{-2}$ | $C_6$ | $6.5206 \times 10^{-2}$ | $C_8$ | $-2.2839 \times 10^{-2}$ |
| $C_{10}$ | $-1.6839 \times 10^{-22}$ | $C_{11}$ | $-L2295 \times 10^{-3}$ | $C_{13}$ | $-4.8789 \times 10^{-3}$ |
| $C_{15}$ | $-1.6701 \times 10^{-3}$ | | | | |

FFS②

| | | | | | |
|---|---|---|---|---|---|
| $C_4$ | $-5.8777 \times 10^{-2}$ | $C_6$ | $-4.8740 \times 10^{-2}$ | $C_5$ | $-4.338O \times 10^{-3}$ |
| $C_{10}$ | $-2.5314 \times 10^{-3}$ | $C_{11}$ | $-2.7163 \times 10^{-4}$ | $C_{13}$ | $-4.6696 \times 10^{-4}$ |
| $C_{15}$ | $2.3035 \times 10^{-4}$ | | | | |

-continued

FFS①

| | | | | | |
|---|---|---|---|---|---|
| $C_4$ | $-2.6700 \times 10^{-2}$ | $C_6$ | $-2.9821 \times 10^{-2}$ | $C_8$ | $-1.5766 \times 10^{-3}$ |
| $C_{10}$ | $-8.0509 \times 10^{-4}$ | $C_{11}$ | $-3.0015 \times 10^{-5}$ | $C_{13}$ | $-2.4754 \times 10^{-4}$ |
| $C_{15}$ | $-9.7984 \times 10^{-5}$ | | | | |

FFS④

| | | | | | |
|---|---|---|---|---|---|
| $C_4$ | $-1.2619 \times 10^{-2}$ | $C_6$ | $-1.1670 \times 10^{-2}$ | $C_8$ | $-3.0772 \times 10^{-3}$ |
| $C_{10}$ | $-8.2107 \times 10^{-4}$ | $C_{11}$ | $-4.7837 \times 10^{-5}$ | $C_{13}$ | $2.8954 \times 10^{-4}$ |
| $C_{15}$ | $2.7821 \times 10^{-4}$ | | | | |

FFS⑤

| | | | | | |
|---|---|---|---|---|---|
| $C_4$ | $1.8447 \times 10^{-2}$ | $C_6$ | $4.1562 \times 10^{-2}$ | $C_5$ | $-9.6013 \times 10^{-3}$ |
| $C_{10}$ | $9.4593 \times 10^{-3}$ | $C_{11}$ | $1.6389 \times 10^{-3}$ | $C_{13}$ | $2.9356 \times 10^{-3}$ |
| $C_{15}$ | $5.4875 \times 10^{-3}$ | | | | |

Displacement and tilt(1)

| X | 0.00 | Y | 0.00 | Z | 0.50 |
|---|---|---|---|---|---|
| α | −4.99 | β | 0.00 | γ | 0.00 |

Displacement and tilt(2)

| X | 0.00 | Y | −0.07 | Z | 2.96 |
|---|---|---|---|---|---|
| α | 22.02 | β | 0.00 | γ | 0.00 |

Displacement and tilt(3)

| X | 0.00 | Y | −0.45 | Z | 4.29 |
|---|---|---|---|---|---|
| α | 22.02 | β | 0.00 | γ | 0.00 |

Displacement and tilt(4)

| X | 0.00 | Y | −4.55 | Z | 0.44 |
|---|---|---|---|---|---|
| α | 1.76 | β | 0.00 | γ | 0.00 |

Displacement and tilt(5)

| X | 0.00 | Y | −6.27 | Z | 2.61 |
|---|---|---|---|---|---|
| α | −50.21 | β | 0.00 | γ | 0.00 |

Displacement and tilt(6)

| X | 0.00 | Y | −6.78 | Z | 3.42 |
|---|---|---|---|---|---|
| α | −32.07 | β | 0.00 | γ | 0.00 |

Example 3
(Position 1)

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.4973 | 69.2 |
| 4 | FFS③ (DSM) | | (3) | 1.4973 | 69.2 |
| 5 | FFS③ | | (2) | 1.5254 | 56.2 |
| 6 | FFS④ | | (4) | 1.5254 | 56.2 |
| 7 | FFS⑤ | | (5) | | |
| 8 | ∞ (HRP) | | (6) | | |
| 9 | ∞ | 1.00 | | 1.5163 | 64.1 |
| 10 | ∞ | 0.50 | | | |
| Image plane | ∞ | | | | |

FFS①

| | | | | | |
|---|---|---|---|---|---|
| $C_4$ | $1.0567 \times 10^{-1}$ | $C_8$ | $3.1074 \times 10^{-2}$ | $C_8$ | $-2.4961 \times 10^{-4}$ |
| $C_{10}$ | $-6.2205 \times 10^{-3}$ | $C_{11}$ | $2.5480 \times 10^{-3}$ | $C_{13}$ | $1.0409 \times 10^{-3}$ |
| $C_{15}$ | $-8.7076 \times 10^{-4}$ | | | | |

FFS②

| | | | | | |
|---|---|---|---|---|---|
| $C_4$ | $2.6681 \times 10^{-1}$ | $C_6$ | $5.0531 \times 10^{-2}$ | $C_8$ | $4.5698 \times 10^{-2}$ |
| $C_{10}$ | $2.5319 \times 10^{-3}$ | $C_{11}$ | $3.2281 \times 10^{-2}$ | $C_{13}$ | $8.1706 \times 10^{-3}$ |
| $C_{15}$ | $7.6660 \times 10^{-4}$ | | | | |

FFS③

| | | | | | |
|---|---|---|---|---|---|
| $C_4$ | $-5.4617 \times 10^{-3}$ | $C_6$ | $-1.6352 \times 10^{-2}$ | $C_8$ | $-1.3703 \times 10^{-3}$ |
| $C_{10}$ | $-4.9315 \times 10^{-4}$ | $C_{11}$ | $5.0470 \times 10^{-3}$ | $C_{13}$ | $7.8514 \times 10^{-5}$ |
| $C_{15}$ | $-1.2385 \times 10^{-4}$ | | | | |

FFS④

| | | | | | |
|---|---|---|---|---|---|
| $C_4$ | $-5.5017 \times 10^{-3}$ | $C_6$ | $4.5534 \times 10^{-4}$ | $C_8$ | $-9.0248 \times 10^{-4}$ |
| $C_{10}$ | $6.9727 \times 10^{-6}$ | $C_{11}$ | $1.8154 \times 10^{-4}$ | $C_{13}$ | $-1.5398 \times 10^{-7}$ |
| $C_{15}$ | $-2.1662 \times 10^{-4}$ | | | | |

FFS⑤

| | | | | |
|---|---|---|---|---|
| $C_4$ | $-8.4794 \times 10^{-2}$ | $C_6$ | $5.5699 \times 10^{-2}$ | |

Displacement and tilt(1)

| X | 0.00 | Y | 0.00 | Z | 1.75 |
|---|---|---|---|---|---|
| α | 4.06 | β | 0.00 | γ | 0.00 |

Displacement and tilt(2)

| X | 0.00 | Y | 0.04 | Z | 3.31 |
|---|---|---|---|---|---|
| α | 35.08 | β | 0.00 | γ | 0.00 |

Displacement and tilt(3)

| X | 0.00 | Y | 0.06 | Z | 5.11 |
|---|---|---|---|---|---|
| α | 35.08 | β | 0.00 | γ | 0.00 |

Displacement and tilt(4)

| X | 0.00 | Y | −4.88 | Z | 3.23 |
|---|---|---|---|---|---|
| α | 27.30 | β | 0.00 | γ | 0.00 |

Displacement and tilt(5)

| X | 0.00 | Y | −5.48 | Z | 5.53 |
|---|---|---|---|---|---|
| α | −18.21 | β | 0.00 | γ | 0.00 |

Displacement and tilt(6)

| X | 0.00 | Y | −5.65 | Z | 6.29 |
|---|---|---|---|---|---|
| α | −12.44 | β | 0.00 | γ | 0.00 |

(Position 2)

| Surface No. | Radius of curvature | Surface separation | Displacement and tilt | Refractive index | Abbe's No. |
|---|---|---|---|---|---|
| Object plane | ∞ | 1000.00 | | | |
| 1 | ∞ (Stop) | | | | |
| 2 | FFS① | | (1) | 1.5254 | 56.2 |
| 3 | FFS② | | (2) | 1.4973 | 69.2 |
| 4 | FFS③ (DSM) | | (3) | 1.4973 | 69.2 |
| 5 | FFS② | | (2) | 1.5254 | 56.2 |
| 6 | FFS④ | | (4) | 1.5254 | 56.2 |
| 7 | FFS⑤ | | (5) | | |
| 8 | ∞ (HRF) | | (6) | | |
| 9 | ∞ | 1.00 | | 1.5163 | 64.1 |
| 10 | ∞ | 0.50 | | | |
| Image plane | ∞ | | | | |

FFS①

| | | | | | |
|---|---|---|---|---|---|
| $C_4$ | $1.0567 \times 10^{-1}$ | $C_8$ | $3.1074 \times 10^{-2}$ | $C_8$ | $-2.4961 \times 10^{-4}$ |
| $C_{10}$ | $-6.2205 \times 10^{-3}$ | $C_{11}$ | $2.5480 \times 10^{-3}$ | $C_{13}$ | $1.0409 \times 10^{-3}$ |
| $C_{15}$ | $-8.7076 \times 10^{-4}$ | | | | |

FFS②

| | | | | | |
|---|---|---|---|---|---|
| $C_4$ | $2.6681 \times 10^{-1}$ | $C_6$ | $5.0531 \times 10^{-2}$ | $C_8$ | $4.5698 \times 10^{-2}$ |
| $C_{10}$ | $2.5319 \times 10^{-3}$ | $C_{11}$ | $3.2281 \times 10^{-2}$ | $C_{13}$ | $8.1706 \times 10^{-3}$ |
| $C_{15}$ | $7.6660 \times 10^{-4}$ | | | | |

FFS③

| | | | | | |
|---|---|---|---|---|---|
| $C_4$ | $-5.7986 \times 10^{-3}$ | $C_6$ | $1.6512 \times 10^{-2}$ | $C_8$ | $-1.3836 \times 10^{-3}$ |
| $C_{10}$ | $-4.8806 \times 10^{-4}$ | $C_{11}$ | $5.1705 \times 10^{-4}$ | $C_{13}$ | $7.7511 \times 10^{-5}$ |
| $C_{15}$ | $-1.2292 \times 10^{-4}$ | | | | |

FFS④

| | | | | | |
|---|---|---|---|---|---|
| $C_4$ | $-5.5017 \times 10^{-3}$ | $C_6$ | $4.5534 \times 10^{-4}$ | $C_8$ | $-9.0248 \times 10^{-4}$ |
| $C_{10}$ | $6.9727 \times 10^{-6}$ | $C_{11}$ | $1.8154 \times 10^{-4}$ | $C_{13}$ | $1.5398 \times 10^{-1}$ |
| $C_{15}$ | $-2.1662 \times 10^{-4}$ | | | | |

FFS⑤

| | | | | |
|---|---|---|---|---|
| $C_4$ | $-8.4794 \times 10^{-2}$ | $C_6$ | $5.5699 \times 10^{-2}$ | |

Displacement and tilt(1)

| X | 0.00 | Y | 0.00 | Z | 1.75 |
|---|---|---|---|---|---|
| α | 4.06 | β | 0.00 | γ | 0.00 |

-continued

| | | | | | | |
|---|---|---|---|---|---|---|
| Displacement and tilt(2) | | | | | | |
| X | 0.00 | Y | 0.04 | Z | 3.31 | |
| α | 35.08 | β | 0.00 | γ | 0.00 | |
| Displacement and tilt(3) | | | | | | |
| X | 0.00 | Y | 0.06 | Z | 5.11 | |
| α | 35.08 | β | 0.00 | γ | 0.00 | |
| Displacement and tilt(4) | | | | | | |
| X | 0.00 | Y | −4.88 | Z | 3.23 | |
| α | 27.30 | β | 0.00 | γ | 0.00 | |
| Displacement and tilt(5) | | | | | | |
| X | 0.00 | Y | −5.48 | Z | 5.53 | |
| α | −18.21 | β | 0.00 | γ | 0.00 | |
| Displacement and tilt(6) | | | | | | |
| X | 0.00 | Y | −5.65 | Z | 6.29 | |
| α | −12.44 | β | 0.00 | γ | 0.00 | |

(Position 3)

| Surface No. | Radius of curvature | Surface separation | Displacement and tilt | Refractive index | Abbe's No. |
|---|---|---|---|---|---|
| Object plane | ∞ | 100.00 | | | |
| 1 | ∞ (Stop) | | | | |
| 2 | FFS①  | | (1) | 1.5254 | 56.2 |
| 3 | FFS② | | (2) | 1.4973 | 69.2 |
| 4 | FFS③ (DSM) | | (3) | 1.4973 | 69.2 |
| 5 | FFS② | | (2) | 1.5254 | 56.2 |
| 6 | FFS④ | | (4) | 1.5254 | 56.2 |
| 7 | FFS⑤ | | (5) | | |
| 8 | ∞ (HRF) | | (6) | | |
| 9 | ∞ | 1.00 | | 1.5163 | 64.1 |
| 10 | ∞ | 0.50 | | | |
| Image plane | ∞ | | | | |

FFS①
C$_4$  1.0567 × 10$^{-1}$   C$_6$  3.1074 × 10$^{-2}$   C$_8$  −2.4961 × 10$^{-4}$
C$_{10}$  −6.2205 × 10$^{-3}$   C$_{11}$  2.5480 × 10$^{-3}$   C$_{13}$  1.0409 × 10$^{-3}$
C$_{15}$  −8.7076 × 10$^{-4}$

FFS②
C$_4$  2.6681 × 10$^{-1}$   C$_6$  5.0531 × 10$^{-2}$   C$_8$  4.5698 × 10$^{-2}$
C$_{10}$  2.5319 × 10$^{-3}$   C$_{11}$  3.2281 × 10$^{-2}$   C$_{13}$  8.1706 × 10$^{-3}$
C$_{15}$  7.6660 × 10$^{-4}$

FFS③
C$_4$  −8.6892 × 10$^{-3}$   C$_6$  1.788 × 10$^{-2}$   C$_8$  −1.2962 × 10$^{-3}$
C$_{10}$  −4.5273 × 10$^{-4}$   C$_{11}$  4.9172 × 10$^{-4}$   C$_{13}$  9.9591 × 10$^{-5}$
C$_{15}$  −1.892 × 10$^{-4}$

FFS④
C$_4$  −5.5017 × 10$^{-3}$   C$_6$  4.5534 × 10$^{-4}$   C$_8$  −9.0248 × 10$^{-4}$
C$_{10}$  6.9727 × 10$^{-6}$   C$_{11}$  1.8154 × 10$^{-4}$   C$_{13}$  1.5398 × 10$^{-1}$
C$_{15}$  −2.1662 × 10$^{-4}$

FFS⑤
C$_4$  −8.4794 × 10$^{-2}$   C$_6$  5.5699 × 10$^{-2}$

| | | | | | | |
|---|---|---|---|---|---|---|
| Displacement and tilt(1) | | | | | | |
| X | 0.00 | Y | 0.00 | Z | 1.75 | |
| α | 4.06 | β | 0.00 | γ | 0.00 | |
| Displacement and tilt(2) | | | | | | |
| X | 0.00 | Y | 0.04 | Z | 3.31 | |
| α | 35.08 | β | 0.00 | γ | 0.00 | |
| Displacement and tilt(3) | | | | | | |
| X | 0.00 | Y | 0.06 | Z | 5.11 | |
| α | 35.08 | β | 0.00 | γ | 0.00 | |
| Displacement and tilt(4) | | | | | | |
| X | 0.00 | Y | −4.88 | Z | 3.23 | |
| α | 27.30 | β | 0.00 | γ | 0.00 | |
| Displacement and tilt(5) | | | | | | |
| X | 0.00 | Y | −5.48 | Z | 5.53 | |
| α | −18.21 | β | 0.00 | γ | 0.00 | |
| Displacement and tilt(6) | | | | | | |
| X | 0.00 | Y | −5.65 | Z | 6.29 | |
| α | −12.44 | β | 0.00 | γ | 0.00 | |

Example 4
(Position 1)

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | | |
| 5 | FFS④ (DSM) | | (4) | | |
| 6 | FFS③ | | (3) | 1.5254 | 56.2 |
| 7 | FFS⑤ | | (5) | 1.5254 | 56.2 |
| 8 | FFS② | | (2) | | |
| 9 | ∞ (HRP) | | (6) | | |
| 10 | ∞ | 0.55 | | 1.5163 | 64.1 |
| 11 | ∞ | 0.50 | | | |
| Image plane | ∞ | | | | |

FFS①
C$_4$  −6.4436 × 10$^{-2}$   C$_6$  −7.3115 × 10$^{-2}$   C$_{11}$  −2.7633 × 10$^{-4}$
C$_{13}$  −1.2071 × 10$^{-3}$   C$_{15}$  −2.3377 × 10$^{-3}$

FFS②
C$_4$  −6.7388 × 10$^{-3}$   C$_6$  3.5615 × 10$^{-3}$   C$_5$  1.0705 × 10$^{-4}$
C$_{10}$  −1.4204 × 10$^{-4}$   C$_{11}$  7.1532 × 10$^{-5}$   C$_{13}$  1.5571 × 10$^{-6}$
C$_{15}$  −2.5317 × 10$^{-5}$

FFS③
C$_4$  −1.2975 × 10$^{-2}$   C$_6$  −3.0719 × 10$^{-3}$   C$_8$  5.0980 × 10$^{-5}$
C$_{10}$  4.3821 × 10$^{-4}$   C$_{11}$  7.6909 × 10$^{-5}$   C$_{13}$  2.6244 × 10$^{-4}$
C$_{15}$  −1.2942 × 10$^{-4}$

FFS④
C$_4$  −3.0681 × 10$^{-2}$   C$_6$  −3.4991 × 10$^{-2}$   C$_5$  2.1369 × 10$^{-4}$
C$_{10}$  −2.3277 × 10$^{-4}$   C$_{11}$  −9.5609 × 10$^{-5}$   C$_{13}$  −2.1372 × 10$^{-4}$
C$_{15}$  −8.7901 × 10$^{-5}$

FFS⑤
C$_4$  9.0329 × 10$^{-3}$   C$_6$  −1.0012 × 10$^{-2}$   C$_8$  7.1220 × 10$^{-4}$
C$_{10}$  −1.0009 × 10$^{-4}$   C$_{11}$  4.5209 × 10$^{-5}$   C$_{13}$  8.8065 × 10$^{-5}$
C$_{15}$  8.5942 × 10$^{-6}$

| | | | | | | |
|---|---|---|---|---|---|---|
| Displacement and tilt(1) | | | | | | |
| X | 0.00 | Y | 0.00 | Z | 0.06 | |
| α | 0.00 | β | 000 | γ | 0.00 | |
| Displacement and tilt(2) | | | | | | |
| X | 0.00 | Y | 0.00 | Z | 2.05 | |
| α | 60.85 | β | 0.00 | γ | 0.00 | |
| Displacement and tilt(3) | | | | | | |
| X | 0.00 | Y | −6.49 | Z | 6.06 | |
| α | −43.38 | β | 0.00 | γ | 0.00 | |
| Displacement and tilt(4) | | | | | | |
| X | 0.00 | Y | −7.37 | Z | 6.44 | |
| α | −43.87 | β | 0.00 | γ | 0.00 | |
| Displacement and tilt(5) | | | | | | |
| X | 0.00 | Y | −4.34 | Z | 0.91 | |
| α | 15.41 | β | 0.00 | γ | 0.00 | |
| Displacement and tilt(6) | | | | | | |
| X | 0.00 | Y | −0.07 | Z | 3.29 | |
| α | 60.64 | β | 0.00 | γ | 0.00 | |

-continued (Position 2)

| Surface No. | Radius of curvature | Surface separation | Displacement and tilt | Refractive index | Abbe's No. |
|---|---|---|---|---|---|
| Object plane | ∞ | 1000.00 | | | |
| 1 | ∞ (Stop) | | | | |
| 2 | FFS①  | | (1) | 1.5254 | 56.2 |
| 3 | FFS② | | (2) | 1.5254 | 56.2 |
| 4 | FFS③ | | (3) | | |
| 5 | FFS④ (DSM) | | (4) | | |
| 6 | FFS③ | | (3) | i.5254 | 56.2 |
| 7 | FFS⑤ | | (5) | 1.5254 | 56.2 |
| 8 | FFS② | | (2) | | |
| 9 | ∞ (HRP) | | (6) | | |
| 10 | ∞ | 0.55 | | 1.5163 | 64.1 |
| 11 | ∞ | 0.50 | | | |
| Image plane | ∞ | | | | |

FFS①

| $C_4$ | $-6.4436 \times 10^{-2}$ | $C_6$ | $-7.3115 \times 10^{-2}$ | $C_{11}$ | $-2.7633 \times 10^{-4}$ |
| $C_{13}$ | $-1.2071 \times 10^{-3}$ | $C_{15}$ | $-2.3377 \times 10^{-3}$ | | |

FFS②

| $C_4$ | $-6.7388 \times 10^{-3}$ | $C_6$ | $3.5615 \times 10^{-3}$ | $C_5$ | $1.0705 \times 10^{-4}$ |
| $C_{10}$ | $-1.4204 \times 10^{-4}$ | $C_{11}$ | $7.1532 \times 10^{-5}$ | $C_{13}$ | $1.5571 \times 10^{-6}$ |
| $C_{15}$ | $-2.5317 \times 10^{-5}$ | | | | |

FFS③

| $C_4$ | $-1.2975 \times 10^{-2}$ | $C_6$ | $-3.0719 \times 10^{-2}$ | $C_8$ | $5.0980 \times 10^{-5}$ |
| $C_{10}$ | $4.3821 \times 10^{-4}$ | $C_{11}$ | $7.6909 \times 10^{-5}$ | $C_{13}$ | $2.6244 \times 10^{-4}$ |
| $C_{15}$ | $-1.2942 \times 10^{-4}$ | | | | |

FFS④

| $C_4$ | $-3.0681 \times 10^{-2}$ | $C_6$ | $-3.4991 \times 10^{-2}$ | $C_5$ | $2.1369 \times 10^{-4}$ |
| $C_{10}$ | $-2.3277 \times 10^{-4}$ | $C_{11}$ | $-9.5609 \times 10^{-5}$ | $C_{13}$ | $-2.1372 \times 10^{-4}$ |
| $C_{15}$ | $-8.7901 \times 10^{-5}$ | | | | |

FFS⑤

| $C_4$ | $9.0329 \times 10^{-3}$ | $C_6$ | $-1.0012 \times 10^{-2}$ | $C_8$ | $7.1220 \times 10^{-4}$ |
| $C_{10}$ | $-1.0009 \times 10^{-4}$ | $C_{11}$ | $4.5209 \times 10^{-5}$ | $C_{13}$ | $8.8065 \times 10^{-5}$ |
| $C_{15}$ | $8.5942 \times 10^{-6}$ | | | | |

Displacement and tilt(1)

| X | 0.00 | Y | 0.00 | Z | 0.06 |
| α | 0.00 | β | 000 | γ | 0.00 |

Displacement and tilt(2)

| X | 0.00 | Y | 0.00 | Z | 2.05 |
| α | 60.85 | β | 0.00 | γ | 0.00 |

Displacement and tilt(3)

| X | 0.00 | Y | -6.49 | Z | 6.06 |
| α | -43.38 | β | 0.00 | γ | 0.00 |

Displacement and tilt(4)

| X | 0.00 | Y | -7.37 | Z | 6.44 |
| α | -43.87 | β | 0.00 | γ | 0.00 |

Displacement and tilt(5)

| X | 0.00 | Y | -4.34 | Z | 0.91 |
| α | 15.41 | β | 0.00 | γ | 0.00 |

Displacement and tilt(6)

| X | 0.00 | Y | -0.07 | Z | 3.29 |
| α | 60.64 | β | 0.00 | γ | 0.00 |

(Position 3)

| Surface No. | Radius of curvature | Surface separation | Displacement and tilt | Refractive index | Abbe's No. |
|---|---|---|---|---|---|
| Object plane | ∞ | 100.00 | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | | |
| 5 | FFS④ (DSM) | | (4) | | |
| 6 | FFS③ | | (3) | i.5254 | 56.2 |
| 7 | FFS⑤ | | (5) | 1.5254 | 56.2 |
| 8 | FFS② | | (2) | | |
| 9 | ∞ (HRP) | | (6) | | |
| 10 | ∞ | 0.55 | | 1.5163 | 64.1 |
| 11 | ∞ | 0.50 | | | |
| Image plane | ∞ | | | | |

FFS①

| $C_4$ | $-6.4436 \times 10^{-2}$ | $C_6$ | $-7.3115 \times 10^{-2}$ | $C_{11}$ | $-2.7633 \times 10^{-4}$ |
| $C_{13}$ | $-1.2071 \times 10^{-3}$ | $C_{15}$ | $-2.3377 \times 10^{-3}$ | | |

FFS②

| $C_4$ | $-6.7388 \times 10^{-3}$ | $C_6$ | $3.5615 \times 10^{-3}$ | $C_5$ | $1.0705 \times 10^{-4}$ |
| $C_{10}$ | $-1.4204 \times 10^{-4}$ | $C_{11}$ | $7.1532 \times 10^{-5}$ | $C_{13}$ | $1.5571 \times 10^{-6}$ |
| $C_{15}$ | $-2.5317 \times 10^{-5}$ | | | | |

FFS③

| $C_4$ | $-1.2975 \times 10^{-2}$ | $C_6$ | $-3.0719 \times 10^{-2}$ | $C_8$ | $5.0980 \times 10^{-5}$ |
| $C_{10}$ | $4.3821 \times 10^{-4}$ | $C_{11}$ | $7.6909 \times 10^{-5}$ | $C_{13}$ | $2.6244 \times 10^{-4}$ |
| $C_{15}$ | $-1.2942 \times 10^{-4}$ | | | | |

FFS④

| $C_4$ | $-3.2086 \times 10^{-2}$ | $C_6$ | $-3.5736 \times 10^{-2}$ | $C_5$ | $1.6242 \times 10^{-4}$ |
| $C_{10}$ | $-2.2742 \times 10^{-4}$ | $C_{11}$ | $-9.2971 \times 10^{-5}$ | $C_{13}$ | $-2.1569 \times 10^{-4}$ |
| $C_{15}$ | $-8.8234 \times 10^{-5}$ | | | | |

FFS⑤

| $C_4$ | $9.0329 \times 10^{-3}$ | $C_6$ | $-1.0012 \times 10^{-2}$ | $C_8$ | $7.1220 \times 10^{-4}$ |
| $C_{10}$ | $-1.0009 \times 10^{-4}$ | $C_{11}$ | $4.5209 \times 10^{-5}$ | $C_{13}$ | $8.8065 \times 10^{-5}$ |
| $C_{15}$ | $8.5942 \times 10^{-6}$ | | | | |

Displacement and tilt(1)

| X | 0.00 | Y | 0.00 | Z | 0.06 |
| α | 0.00 | β | 000 | γ | 0.00 |

Displacement and tilt(2)

| X | 0.00 | Y | 0.00 | Z | 2.05 |
| α | 60.85 | β | 0.00 | γ | 0.00 |

Displacement and tilt(3)

| X | 0.00 | Y | -6.49 | Z | 6.06 |
| α | -43.38 | β | 0.00 | γ | 0.00 |

Displacement and tilt(4)

| X | 0.00 | Y | -7.37 | Z | 6.44 |
| α | -43.87 | β | 0.00 | γ | 0.00 |

Displacement and tilt(5)

| X | 0.00 | Y | -4.34 | Z | 0.91 |
| α | 15.41 | β | 0.00 | γ | 0.00 |

Displacement and tilt(6)

| X | 0.00 | Y | -0.07 | Z | 3.29 |
| α | 60.64 | β | 0.00 | γ | 0.00 |

Example 5
(Position 1)

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ (DSM) | | (3) | | |
| 5 | FFS② | | (2) | 1.5254 | 56.2 |
| 6 | FFS① | | (1) | 1.5254 | 56.2 |
| 7 | FFS④ | | (4) | 1.5254 | 56.2 |
| 8 | FFS⑤ | | (5) | 1.5254 | 56.2 |
| 9 | FFS④ | | (4) | | |
| 10 | ∞ (HRP) | | (6) | | |

-continued

| 11 | ∞ | 0.55 | | 1.5163 | 64.1 |
| 12 | ∞ | 0.50 | | | |
| Image plane | ∞ | | | | |

FFS①

$C_4$ −1.8163 × 10⁻²  $C_6$ −1.1651 × 10⁻²  $C_8$ −3.0002 × 10⁻⁴
$C_{10}$ −3.5383 × 10⁻³  $C_{11}$ −3.3122 × 10⁻³  $C_{13}$ 1.2716 × 10⁻⁴
$C_{15}$ 9.7268 × 10⁻⁶

FFS②

$C_4$ −4.5005 × 10⁻³  $C_6$ 9.0138 × 10⁻⁴  $C_5$ 4.5271 × 10⁻³
$C_{10}$ −1.5303 × 10⁻³  $C_{11}$ 3.3446 × 10⁻⁴  $C_{13}$ 5.9680 × 10⁻⁴
$C_{15}$ −2.3049 × 10⁻⁴

FFS③

$C_4$ −3.9639 × 10⁻³  $C_8$ −2.1776 × 10⁻³  $C_8$ 2.1463 × 10⁻³
$C_{10}$ 1.5585 × 10⁻³  $C_{11}$ −4.7517 × 10⁻⁴  $C_{13}$ 1.3106 × 10⁻⁴
$C_{15}$ −1.0174 × 10⁻⁴

FFS④

$C_4$ −4.3696 × 10⁻²  $C_6$ −1.0430 × 10⁻²  $C_5$ 7.1557 × 10⁻³
$C_{10}$ −1.2829 × 10⁻³  $C_{11}$ −9.5494 × 10⁻⁵  $C_{13}$ −4.0730 × 10⁻⁵
$C_{15}$ 6.5262 × 10⁻⁵

FFS⑤

$C_4$ 4.4714 × 10⁻²  $C_6$ −2.5659 × 10⁻²  $C_8$ 1.9530 × 10⁻³
$C_{10}$ −2.1893 × 10⁻³  $C_{11}$ 1.9650 × 10⁻⁴  $C_{13}$ −9.0025 × 10⁻⁵
$C_{15}$ 2.2762 × 10⁻⁴

Displacement and tilt(1)

| X | 0.00 | Y | −3.33 | Z | 0.14 |
| α | −9.55 | β | 000 | γ | 0.00 |

Displacement and tilt(2)

| X | 0.00 | Y | −0.13 | Z | 2.47 |
| α | 15.33 | β | 0.00 | γ | 0.00 |

Displacement and tilt(3)

| X | 0.00 | Y | −0.35 | Z | 3.21 |
| α | 20.19 | β | 0.00 | γ | 0.00 |

Displacement and tilt(4)

| X | 0.00 | Y | −8.71 | Z | 3.22 |
| α | −3.45 | β | 0.00 | γ | 0.00 |

Displacement and tilt(5)

| X | 0.00 | Y | −11.69 | Z | 1.00 |
| α | 30.06 | β | 0.00 | γ | 0.00 |

Displacement and tilt(6)

| X | 0.00 | Y | −11.27 | Z | 4.09 |
| α | 9.60 | β | 0.00 | γ | 0.00 |

(Position 2)

| Surface No. | Radius of curvature | Surface separation | Displacement and tilt | Refractive index | Abbe's No. |
| --- | --- | --- | --- | --- | --- |
| Object plane | ∞ | 1000.00 | | | |
| 1 | ∞ (Stop) | | | | |
| 2 | FFS① | | (1) | 1.5254 | 56.2 |
| 3 | FFS② | | (2) | | |
| 4 | FFS③ (DSM) | | (3) | | |
| 5 | FFS② | | (2) | 1.5254 | 56.2 |
| 6 | FFS① | | (1) | 1.5254 | 56.2 |
| 7 | FFS④ | | (4) | 1.5254 | 56.2 |
| 8 | FFS⑤ | | (5) | 1.5254 | 56.2 |
| 9 | FFS④ | | (4) | | |
| 10 | ∞ (HRP) | | (6) | | |
| 11 | ∞ | 0.55 | | 1.5163 | 64.1 |
| 12 | ∞ | 0.50 | | | |
| Image plane | ∞ | | | | |

FFS①

$C_4$ −1.8163 × 10⁻²  $C_6$ −1.1651 × 10⁻²  $C_8$ −3.0002 × 10⁻⁴
$C_{10}$ −3.5383 × 10⁻³  $C_{11}$ −3.3122 × 10⁻³  $C_{13}$ 1.2716 × 10⁻⁴
$C_{15}$ 9.7268 × 10⁻⁶

FFS②

$C_4$ −4.5005 × 10⁻³  $C_6$ 9.0138 × 10⁻⁴  $C_5$ 4.5271 × 10⁻³
$C_{10}$ −1.5303 × 10⁻³  $C_{11}$ 3.3446 × 10⁻⁴  $C_{13}$ 5.9680 × 10⁻⁴
$C_{15}$ −2.3049 × 10⁻⁴

FFS③

$C_4$ −3.9639 × 10⁻³  $C_8$ −2.4492 × 10⁻³  $C_8$ 2.1436 × 10⁻³
$C_{10}$ 1.5642 × 10⁻³  $C_{11}$ −4.7070 × 10⁻⁴  $C_{13}$ 1.1929 × 10⁻⁴
$C_{15}$ −7.2076 × 10⁻⁴

FFS④

$C_4$ −4.3696 × 10⁻²  $C_6$ −1.0430 × 10⁻²  $C_5$ 7.1557 × 10⁻³
$C_{10}$ −1.2829 × 10⁻³  $C_{11}$ −9.5494 × 10⁻⁵  $C_{13}$ −4.0730 × 10⁻⁵
$C_{15}$ 6.5262 × 10⁻⁵

FFS⑤

$C_4$ 4.4714 × 10⁻²  $C_6$ −2.5659 × 10⁻²  $C_8$ 1.9530 × 10⁻³
$C_{10}$ −2.1893 × 10⁻³  $C_{11}$ 1.9650 × 10⁻⁴  $C_{13}$ −9.0025 × 10⁻⁵
$C_{15}$ 2.2762 × 10⁻⁴

Displacement and tilt(1)

| X | 0.00 | Y | −3.33 | Z | 0.14 |
| α | −9.55 | β | 000 | γ | 0.00 |

Displacement and tilt(2)

| X | 0.00 | Y | −0.13 | Z | 2.47 |
| α | 15.33 | β | 0.00 | γ | 0.00 |

Displacement and tilt(3)

| X | 0.00 | Y | −0.35 | Z | 3.21 |
| α | 20.19 | β | 0.00 | γ | 0.00 |

Displacement and tilt(4)

| X | 0.00 | Y | −8.71 | Z | 3.22 |
| α | −3.45 | β | 0.00 | γ | 0.00 |

Displacement and tilt(5)

| X | 0.00 | Y | −11.69 | Z | 1.00 |
| α | 30.06 | β | 0.00 | γ | 0.00 |

Displacement and tilt(6)

| X | 0.00 | Y | −11.27 | Z | 4.09 |
| α | 9.60 | β | 0.00 | γ | 0.00 |

(Position 3)

| Surface No. | Radius of curvature | Surface separation | Displacement and tilt | Refractive index | Abbe's No. |
| --- | --- | --- | --- | --- | --- |
| Object plane | ∞ | 100.00 | | | |
| 1 | ∞ (Stop) | | | | |
| 2 | FFS① | | (1) | 1.5254 | 56.2 |
| 3 | FFS② | | (2) | | |
| 4 | FFS③ (DSM) | | (3) | | |
| 5 | FFS② | | (2) | 1.5254 | 56.2 |
| 6 | FFS① | | (1) | 1.5254 | 56.2 |
| 7 | FFS④ | | (4) | 1.5254 | 56.2 |
| 8 | FFS⑤ | | (5) | 1.5254 | 56.2 |
| 9 | FFS④ | | (4) | | |
| 10 | ∞ (HRP) | | (6) | | |
| 11 | ∞ | 0.55 | | 1.5163 | 64.1 |
| 12 | ∞ | 0.50 | | | |
| Image plane | ∞ | | | | |

FFS①

$C_4$ −1.8163 × 10⁻²  $C_6$ −1.1651 × 10⁻²  $C_8$ −3.0002 × 10⁻⁴
$C_{10}$ −3.5383 × 10⁻³  $C_{11}$ −3.3122 × 10⁻³  $C_{13}$ 1.2716 × 10⁻⁴
$C_{15}$ 9.7268 × 10⁻⁶

FFS②

$C_4$ −4.5005 × 10⁻³  $C_6$ 9.0138 × 10⁻⁴  $C_5$ 4.5271 × 10⁻³
$C_{10}$ −1.5303 × 10⁻³  $C_{11}$ 3.3446 × 10⁻⁴  $C_{13}$ 5.9680 × 10⁻⁴
$C_{15}$ −2.3049 × 10⁻⁴

-continued

FFS③

| | | | | | |
|---|---|---|---|---|---|
| $C_4$ | $-5.2834 \times 10^{-3}$ | $C_8$ | $-4.5878 \times 10^{-3}$ | $C_8$ | $2.1860 \times 10^{-3}$ |
| $C_{10}$ | $1.5914 \times 10^{-3}$ | $C_{11}$ | $-4.2563 \times 10^{-4}$ | $C_{13}$ | $1.6259 \times 10^{-4}$ |
| $C_{15}$ | $-6.8544 \times 10^{-4}$ | | | | |

FFS④

| | | | | | |
|---|---|---|---|---|---|
| $C_4$ | $-4.3696 \times 10^{-2}$ | $C_6$ | $-1.0430 \times 10^{-2}$ | $C_5$ | $7.1557 \times 10^{-3}$ |
| $C_{10}$ | $-1.2829 \times 10^{-3}$ | $C_{11}$ | $-9.5494 \times 10^{-5}$ | $C_{13}$ | $-4.0730 \times 10^{-5}$ |
| $C_{15}$ | $6.5262 \times 10^{-5}$ | | | | |

FFS⑤

| | | | | | |
|---|---|---|---|---|---|
| $C_4$ | $4.4714 \times 10^{-2}$ | $C_6$ | $-2.5659 \times 10^{-2}$ | $C_8$ | $1.9530 \times 10^{-3}$ |
| $C_{10}$ | $-2.1893 \times 10^{-3}$ | $C_{11}$ | $1.9650 \times 10^{-4}$ | $C_{13}$ | $-9.0025 \times 10^{-5}$ |
| $C_{15}$ | $2.2762 \times 10^{-4}$ | | | | |

Displacement and tilt(1)

| X | 0.00 | Y | -3.33 | Z | 0.14 |
|---|---|---|---|---|---|
| α | -9.55 | β | 000 | γ | 0.00 |

Displacement and tilt(2)

| X | 0.00 | Y | -0.13 | Z | 2.47 |
|---|---|---|---|---|---|
| α | 15.33 | β | 0.00 | γ | 0.00 |

Displacement and tilt(3)

| X | 0.00 | Y | -0.35 | Z | 3.21 |
|---|---|---|---|---|---|
| α | 20.19 | β | 0.00 | γ | 0.00 |

Displacement and tilt(4)

| X | 0.00 | Y | -8.71 | Z | 3.22 |
|---|---|---|---|---|---|
| α | -3.45 | β | 0.00 | γ | 0.00 |

Displacement and tilt(5)

| X | 0.00 | Y | -11.69 | Z | 1.00 |
|---|---|---|---|---|---|
| α | 30.06 | β | 0.00 | γ | 0.00 |

Displacement and tilt(6)

| X | 0.00 | Y | -11.27 | Z | 4.09 |
|---|---|---|---|---|---|
| α | 9.60 | β | 0.00 | γ | 0.00 |

Example 6
(Position 1)

| Surface No. | Radius of curvature | Surface separation | Displacement and tilt | Refractive index | Abbe's No. |
|---|---|---|---|---|---|
| Object plane | ∞ | ∞ | | | |
| 1 | -29.32 | 1.50 | | 1.4870 | 70.4 |
| 2 | 7.88 | 1.00 | | | |
| 3 | 7.65 | 2.25 | | 1.7305 | 37.4 |
| 4 | -163.55 | 0.50 | | | |
| 5 | -35.71 | 1.50 | | 1.6292 | 58.5 |
| 6 | 7.47 | 9.93 | | | |
| 7 | ∞ (Stop) | 1.99 | | | |
| 8 | FFS① | | (1) | 1.5254 | 56.2 |
| 9 | FFS② | | (2) | | |
| 10 | FFS③ (DSM) | | (3) | | |
| 11 | FFS② | | (2) | 1.5254 | 56.2 |
| 12 | FFS④ | | (4) | 1.5254 | 56.2 |
| 13 | FFS⑤ | | (5) | | |
| 14 | ∞ (HRF) | | (6) | | |
| 15 | ∞ | 0.90 | | 1.5163 | 64.1 |
| 16 | ∞ | 0.10 | | | |
| Image plane | ∞ | | | | |

FFS①

| | | | | | |
|---|---|---|---|---|---|
| $C_4$ | $1.9234 \times 10^{-3}$ | $C_6$ | $-3.9578 \times 10^{-2}$ | $C_8$ | $-4\ 7508 \times 10^{-3}$ |
| $C_{10}$ | $-7.9599 \times 10^{-3}$ | $C_{11}$ | $-1.8954 \times 10^{-4}$ | $C_{13}$ | $-8.9512 \times 10^{-4}$ |
| $C_{15}$ | $-9.0507 \times 10^{-4}$ | | | | |

FFS②

| | | | | | |
|---|---|---|---|---|---|
| $C_4$ | $-2.9392 \times 10^{-2}$ | $C_6$ | $-3.2309 \times 10^{-2}$ | $C_8$ | $-1.5549 \times 10^{-3}$ |
| $C_{10}$ | $-6.8644 \times 10^{-4}$ | $C_{11}$ | $-2.8433 \times 10^{-4}$ | $C_{13}$ | $2.3525 \times 10^{-4}$ |
| $C_{15}$ | $-1.8172 \times 10^{-4}$ | | | | |

FFS③

| | | | | | |
|---|---|---|---|---|---|
| $C_4$ | $-2.0132 \times 10^{-2}$ | $C_6$ | $-2.5665 \times 10^{-2}$ | $C_8$ | $2.4524 \times 10^{-4}$ |
| $C_{10}$ | $-7.4701 \times 10^{-4}$ | $C_{11}$ | $77978 \times 10^{-5}$ | $C_{13}$ | $-1.9068 \times 10^{-4}$ |
| $C_{15}$ | $-8.2593 \times 10^{-6}$ | | | | |

FFS④

| | | | | | |
|---|---|---|---|---|---|
| $C_4$ | $-7.8643 \times 10^{-3}$ | $C_6$ | $-2.1051 \times 10^{-2}$ | $C_8$ | $-2.9543 \times 10^{-3}$ |
| $C_{10}$ | $-5.6981 \times 10^{-4}$ | $C_{11}$ | $-6.4779 \times 10^{-5}$ | $C_{13}$ | $-6.6714 \times 10^{-5}$ |
| $C_{15}$ | $-2.0575 \times 10^{-5}$ | | | | |

FFS⑤

| | | | | | |
|---|---|---|---|---|---|
| $C_4$ | $2.5984 \times 10^{-2}$ | $C_6$ | $-1.3750 \times 10^{-2}$ | $C_8$ | $-1.1378 \times 10^{-2}$ |
| $C_{10}$ | $-1.9427 \times 10^{-3}$ | $C_{11}$ | $1.1354 \times 10^{-3}$ | $C_{13}$ | $8.4860 \times 10^{-4}$ |
| $C_{15}$ | $9.8463 \times 10^{-4}$ | | | | |

Displacement and tilt(1)

| X | 0.00 | Y | 0.00 | Z | 0.00 |
|---|---|---|---|---|---|
| α | -11.41 | β | 0.00 | γ | 0.00 |

Displacement and tilt(2)

| X | 0.00 | Y | -0.36 | Z | 5.13 |
|---|---|---|---|---|---|
| α | 12.01 | β | 0.00 | γ | 0.00 |

Displacement and tilt(3)

| X | 0.00 | Y | -0.97 | Z | 7.84 |
|---|---|---|---|---|---|
| α | 12.11 | β | 0.00 | γ | 0.00 |

Displacement and tilt(4)

| X | 0.00 | Y | -5.81 | Z | -1.18 |
|---|---|---|---|---|---|
| α | -16.65 | β | 0.00 | γ | 0.00 |

Displacement and tilt(5)

| X | 0.00 | Y | -8.80 | Z | 0.69 |
|---|---|---|---|---|---|
| α | -69.38 | β | 0.00 | γ | 0.00 |

Displacement and tilt(6)

| X | 0.00 | Y | -9.58 | Z | 1.31 |
|---|---|---|---|---|---|
| α | -51.68 | β | 0.00 | γ | 0.00 |

(Position 2)

| Surface No. | Radius of curvature | Surface separation | Displacement and tilt | Refractive index | Abbe's No. |
|---|---|---|---|---|---|
| Object plane | ∞ | ∞ | | | |
| 1 | -29.32 | 1.50 | | 1.4870 | 70.4 |
| 2 | 7.88 | 1.00 | | | |
| 3 | 7.65 | 2.25 | | 1.7305 | 37.4 |
| 4 | -163.55 | 0.50 | | | |
| 5 | -35.71 | 1.50 | | 1.6292 | 58.5 |
| 6 | 7.47 | 9.93 | | | |
| 7 | ∞ (Stop) | 1.99 | | | |
| 8 | FFS① | | (1) | 1.5254 | 56.2 |
| 9 | FFS② | | (2) | | |
| 10 | FFS③ (DSM) | | (3) | | |
| 11 | FFS② | | (2) | 1.5254 | 56.2 |
| 12 | FFS④ | | (4) | 1.5254 | 56.2 |
| 13 | FFS⑤ | | (5) | | |
| 14 | ∞ (HRF) | | (6) | | |
| 15 | ∞ | 0.90 | | 1.5163 | 64.1 |
| 16 | ∞ | 0.10 | | | |
| Image plane | ∞ | | | | |

FFS①

| | | | | | |
|---|---|---|---|---|---|
| $C_4$ | $1.9234 \times 10^{-3}$ | $C_6$ | $-3.9578 \times 10^{-2}$ | $C_8$ | $-4\ 7508 \times 10^{-3}$ |
| $C_{10}$ | $-7.9599 \times 10^{-3}$ | $C_{11}$ | $-1.8954 \times 10^{-4}$ | $C_{13}$ | $-8.9512 \times 10^{-4}$ |
| $C_{15}$ | $-9.0507 \times 10^{-4}$ | | | | |

FFS②

| | | | | | |
|---|---|---|---|---|---|
| $C_4$ | $-2.9392 \times 10^{-2}$ | $C_6$ | $-3.2309 \times 10^{-2}$ | $C_8$ | $-1.5549 \times 10^{-3}$ |
| $C_{10}$ | $-6.8644 \times 10^{-4}$ | $C_{11}$ | $-2.8433 \times 10^{-4}$ | $C_{13}$ | $2.3525 \times 10^{-4}$ |
| $C_{15}$ | $-1.8172 \times 10^{-4}$ | | | | |

FFS③

| | | | | | |
|---|---|---|---|---|---|
| $C_4$ | $-2.0187 \times 10^{-2}$ | $C_6$ | $-2.5626 \times 10^{-2}$ | $C_8$ | $2.4499 \times 10^{-4}$ |
| $C_{10}$ | $-7.5505 \times 10^{-4}$ | $C_{11}$ | $7.4891 \times 10^{-5}$ | $C_{13}$ | $-1.9494 \times 10^{-4}$ |

-continued $C_{15}$  $-7.5368 \times 10^{-6}$

FFS④

| $C_4$ | $-7.8643 \times 10^{-3}$ | $C_6$ | $-2.1051 \times 10^{-2}$ | $C_8$ | $-2.9543 \times 10^{-3}$ |
| $C_{10}$ | $-5.6981 \times 10^{-4}$ | $C_{11}$ | $-6.4779 \times 10^{-5}$ | $C_{13}$ | $-6.6714 \times 10^{-5}$ |
| $C_{15}$ | $-2.0575 \times 10^{-5}$ | | | | |

FFS⑤

| $C_4$ | $2.5984 \times 10^{-2}$ | $C_6$ | $-1.3750 \times 10^{-2}$ | $C_8$ | $-1.1378 \times 10^{-2}$ |
| $C_{10}$ | $-1.9427 \times 10^{-3}$ | $C_{11}$ | $1.1354 \times 10^{-3}$ | $C_{13}$ | $8.4860 \times 10^{-4}$ |
| $C_{15}$ | $9.8463 \times 10^{-4}$ | | | | |

Displacement and tilt(1)

| X | 0.00 | Y | 0.00 | Z | 0.00 |
| α | −11.41 | β | 0.00 | γ | 0.00 |

Displacement and tilt(2)

| X | 0.00 | Y | −0.36 | Z | 5.13 |
| α | 12.01 | β | 0.00 | γ | 0.00 |

Displacement and tilt(3)

| X | 0.00 | Y | −0.97 | Z | 7.84 |
| α | 12.11 | β | 0.00 | γ | 0.00 |

Displacement and tilt(4)

| X | 0.00 | Y | −5.81 | Z | −1.18 |
| α | −16.65 | β | 0.00 | γ | 0.00 |

Displacement and tilt(5)

| X | 0.00 | Y | −8.80 | Z | 0.69 |
| α | −69.38 | β | 0.00 | γ | 0.00 |

Displacement and tilt(6)

| X | 0.00 | Y | −9.58 | Z | 1.31 |
| α | −51.68 | β | 0.00 | γ | 0.00 |

(Position 3)

| Surface No. | Radius of curvature | Surface separation | Displacement and tilt | Refractive index | Abbe's No. |
|---|---|---|---|---|---|
| Object plane | ∞ | ∞ | | | |
| 1 | −29.32 | 1.50 | | 1.4870 | 70.4 |
| 2 | 7.88 | 1.00 | | | |
| 3 | 7.65 | 2.25 | | 1.7305 | 37.4 |
| 4 | −163.55 | 0.50 | | | |
| 5 | −35.71 | 1.50 | | 1.6292 | 58.5 |
| 6 | 7.47 | 9.93 | | | |
| 7 | ∞ (Stop) | 1.99 | | | |
| 8 | FFS① | | (1) | 1.5254 | 56.2 |
| 9 | FFS② | | (2) | | |
| 10 | FFS③ (DSM) | | (3) | | |
| 11 | FFS② | | (2) | 1.5254 | 56.2 |
| 12 | FFS④ | | (4) | 1.5254 | 56.2 |
| 13 | FFS⑤ | | (5) | | |
| 14 | ∞ (HRP) | | (6) | | |
| 15 | ∞ | 0.90 | | 1.5163 | 64.1 |
| 16 | ∞ | 0.10 | | | |
| Image plane | ∞ | | | | |

FFS①

| $C_4$ | $1.9234 \times 10^{-3}$ | $C_6$ | $-3.9578 \times 10^{-2}$ | $C_8$ | $-4.7508 \times 10^{-3}$ |
| $C_{10}$ | $-7.9599 \times 10^{-3}$ | $C_{11}$ | $-1.8954 \times 10^{-4}$ | $C_{13}$ | $-8.9512 \times 10^{-4}$ |
| $C_{15}$ | $-9.0507 \times 10^{-4}$ | | | | |

FFS②

| $C_4$ | $-2.9392 \times 10^{-2}$ | $C_6$ | $-3.2309 \times 10^{-2}$ | $C_8$ | $-1.5549 \times 10^{-3}$ |
| $C_{10}$ | $-6.8644 \times 10^{-4}$ | $C_{11}$ | $-2.8433 \times 10^{-4}$ | $C_{13}$ | $2.3525 \times 10^{-4}$ |
| $C_{15}$ | $-1.8172 \times 10^{-4}$ | | | | |

FFS③

| $C_4$ | $-2.0227 \times 10^{-2}$ | $C_6$ | $-2.5619 \times 10^{-2}$ | $C_8$ | $2.3786 \times 10^{-4}$ |
| $C_{10}$ | $-7.6498 \times 10^{-4}$ | $C_{11}$ | $5.1776 \times 10^{-5}$ | $C_{13}$ | $-2.0973 \times 10^{-4}$ |
| $C_{15}$ | $-1.1573 \times 10^{-6}$ | | | | |

FFS④

| $C_4$ | $-7.8643 \times 10^{-3}$ | $C_6$ | $-2.1051 \times 10^{-2}$ | $C_8$ | $-2.9543 \times 10^{-3}$ |
| $C_{10}$ | $-5.6981 \times 10^{-4}$ | $C_{11}$ | $-6.4779 \times 10^{-5}$ | $C_{13}$ | $-6.6714 \times 10^{-5}$ |
| $C_{15}$ | $-2.0575 \times 10^{-5}$ | | | | |

FFS⑤

| $C_4$ | $2.5984 \times 10^{-2}$ | $C_6$ | $-1.3750 \times 10^{-2}$ | $C_8$ | $-1.1378 \times 10^{-2}$ |
| $C_{10}$ | $-1.9427 \times 10^{-3}$ | $C_{11}$ | $1.1354 \times 10^{-3}$ | $C_{13}$ | $8.4860 \times 10^{-4}$ |
| $C_{15}$ | $9.8463 \times 10^{-4}$ | | | | |

Displacement and tilt(1)

| X | 0.00 | Y | 0.00 | Z | 0.00 |
| α | −11.41 | β | 0.00 | γ | 0.00 |

Displacement and tilt(2)

| X | 0.00 | Y | −0.36 | Z | 5.13 |
| α | 12.01 | β | 0.00 | γ | 0.00 |

Displacement and tilt(3)

| X | 0.00 | Y | −0.97 | Z | 7.84 |
| α | 12.11 | β | 0.00 | γ | 0.00 |

Displacement and tilt(4)

| X | 0.00 | Y | −5.81 | Z | −1.18 |
| α | −16.65 | β | 0.00 | γ | 0.00 |

Displacement and tilt(5)

| X | 0.00 | Y | −8.80 | Z | 0.69 |
| α | −69.38 | β | 0.00 | γ | 0.00 |

Displacement and tilt(6)

| X | 0.00 | Y | −9.58 | Z | 1.31 |
| α | −51.68 | β | 0.00 | γ | 0.00 |

Example 7

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | | |
| 4 | FFS③ (DSM) | | (3) | | |
| 5 | FFS② | | (2) | 1.5254 | 56.2 |
| 6 | FFS④ | | (4) | 1.5254 | 56.2 |
| 7 | FFS⑤ | | (5) | | |
| 8 | ∞ (HRP) | | (6) | | |
| 9 | ∞ | 1.00 | | 1.5163 | 64.1 |
| 10 | ∞ | 0.50 | | | |
| Image plane | ∞ | | | | |

FFS①

| $C_4$ | $-6.1472 \times 10^{-2}$ | $C_6$ | $-6.5206 \times 10^{-2}$ | $C_8$ | $-2.2839 \times 10^{-2}$ |
| $C_{10}$ | $-1.6839 \times 10^{-2}$ | $C_{11}$ | $-1.2295 \times 10^{-3}$ | $C_{13}$ | $-4.8789 \times 10^{-3}$ |
| $C_{15}$ | $-1.6701 \times 10^{-3}$ | | | | |

FFS②

| $C_4$ | $-5.8777 \times 10^{-2}$ | $C_6$ | $-4.8740 \times 10^{-2}$ | $C_8$ | $-4.3380 \times 10^{-3}$ |
| $C_{10}$ | $-2.5314 \times 10^{-3}$ | $C_{11}$ | $-2.7163 \times 10^{-4}$ | $C_{13}$ | $-4.6696 \times 10^{-4}$ |
| $C_{15}$ | $2.3035 \times 10^{-4}$ | | | | |

FFS③

| $C_4$ | $2.4572 \times 10^{-2}$ | $C_6$ | $2.8263 \times 10^{-2}$ | $C_8$ | $-1.6010 \times 10^{-3}$ |
| $C_{10}$ | $-8.4354 \times 10^{-4}$ | $C_{11}$ | $4.6909 \times 10^{-5}$ | $C_{13}$ | $-1.7875 \times 10^{-4}$ |
| $C_{15}$ | $1.0744 \times 10^{-5}$ | | | | |

FFS④

| $C_4$ | $1.2619 \times 10^{-2}$ | $C_6$ | $1.1670 \times 10^{-2}$ | $C_8$ | $-3.0772 \times 10^{-3}$ |
| $C_{10}$ | $-8.2107 \times 10^{-4}$ | $C_{11}$ | $-4.7837 \times 10^{-5}$ | $C_{13}$ | $2.8954 \times 10^{-4}$ |
| $C_{15}$ | $2.7821 \times 10^{-4}$ | | | | |
| A | 0.001 | | | | |
| R | 1.75 | | | | |

FFS⑤

| $C_4$ | $1.8447 \times 10^{-2}$ | $C_6$ | $4.1562 \times 10^{-2}$ | $C_8$ | $-9.6013 \times 10^{-3}$ |
| $C_{10}$ | $94593 \times 10^{-3}$ | $C_{11}$ | $1.6389 \times 10^{-3}$ | $C_{13}$ | $2.9356 \times 10^{-3}$ |
| $C_{15}$ | $5.4875 \times 10^{-3}$ | | | | |

-continued

Displacement and tilt(1)

| X | 0.00 | Y | 0.00 | Z | 0.50 |
|---|---|---|---|---|---|
| α | −4.99 | β | 0.00 | γ | 0.00 |

Displacement and tilt(2)

| X | 0.00 | Y | −0.07 | Z | 2.96 |
|---|---|---|---|---|---|
| α | 22.02 | β | 0.00 | γ | 0.00 |

Displacement and tilt(3)

| X | 0.00 | Y | −0.45 | Z | 4.29 |
|---|---|---|---|---|---|
| α | 22.02 | β | 0.00 | γ | 0.00 |

Displacement and tilt(4)

| X | 0.00 | Y | −4.55 | Z | 0.44 |
|---|---|---|---|---|---|
| α | 1.76 | β | 000 | γ | 0.00 |

Displacement and tilt(5)

| X | 0.00 | Y | −6.27 | Z | 2.61 |
|---|---|---|---|---|---|
| α | −50.21 | β | 0.00 | γ | 0.00 |

Displacement and tilt(6)

| X | 0.00 | Y | −6.78 | Z | 3.42 |
|---|---|---|---|---|---|
| α | −32.07 | β | 0.00 | γ | 0.00 |

Values concerning the conditions (1) to (3) and (6) in the above-described Examples 1 to 7 are as follows:

|  | $\Delta\mu_{max}$ ($\mu$m) | $\Delta L_f$ (mm) | $\Delta L_b$ (mm) | φ (°) |
|---|---|---|---|---|
| Example 1 | 28.26 | – | 7.15 | 19.22 |
| Example 2 | 32.65 | 1.38 | 1.55 | 37.88 |
| Example 3 | 27.88 | 2.69 | 2.37 | 34.40 |
| Example 4 | 36.65 | 0.96 | 0.97 | 22.62 |
| Example 5 | 28.53 | 1.26 | 0.87 | 36.33 |
| Example 6 | 7.66 | 2.67 | 2.97 | 25.90 |
| Example 7 | 7.25 | 1.38 | 1.55 | 37.88 |

Incidentally, variable-configuration mirror 303 in this invention is deformed into a desired surface configuration by a mechanism such as that shown in FIG. 72, for example. In FIG. 72, the variable-configuration mirror 303 is formed from an aluminum-coated thin film (reflecting surface). A plurality of parallel-arranged electrodes 331 are provided at the reverse side of the thin film at a distance therefrom. A variable resistor 332 is connected to each electrode 331. A power source 334 is connected between the variable-configuration mirror 303 and each electrode 331 through a variable resistor 332' and a power switch 333. Because of this arrangement, when a voltage applied between the variable-configuration mirror 303 and each electrode 331 is set at will with the variable resistor 332, it is possible to obtain a desired distribution of electrostatic force acting between the variable-configuration mirror 303 and the electrodes 331 and hence possible to change the surface configuration of the variable-configuration mirror 303 at will. In the case of FIG. 72, the apparatus is arranged so that the resistance value of each variable resistor 332 is controlled by a computing unit 335. The computing unit 335 is connected with a temperature sensor 336, a humidity sensor 337, and a distance sensor 338. On the basis of a temperature value measured by the temperature sensor 336 or a humidity value measured by the humidity sensor 337, the computing unit 335 controls the resistance value of each variable resistor 332 so as to reduce degradation in optical performance of a decentered reflecting optical apparatus incorporating the variable-configuration mirror 303 due to environmental conditions, e.g. temperature and humidity. It should be noted that the relationship between the measured temperature and humidity and the resistance value of each variable resistor 332 is previously stored in a memory attached to the computing unit 335, and the resistance value of each variable resistor 332 is controlled on the basis of the stored data and the measured temperature value or humidity value.

The distance sensor 338 is a distance sensor for measuring the distance to a subject to be imaged on a solid-state image pickup device 304 by the optical apparatus in FIG. 72. On the basis of the measured value obtained with the distance sensor 338, the power of the variable configuration mirror 303 is controlled to effect focusing. In this case also, the relationship between the subject distance and the resistance value of each variable resistor 332 is previously stored in a memory attached to the computing unit 335, and the resistance value of each variable resistor 332 is controlled to effect focusing on the basis of the stored data and the measured subject distance. It should be noted that reference symbol 330 in the figure denotes a lens. In the case of this example, the lens 330, the decentered prism 302 and the variable-configuration mirror 303 constitute a decentered reflecting optical system.

FIG. 73 is a view showing an example of a variable-refractive-index mirror usable in place of the variable-configuration mirror. The variable-refractive-index mirror operates in the same way as the variable-configuration mirror by freely changing the refractive index of an optical medium in the vicinity of the entrance side of the reflecting surface. This is an example of a liquid crystal variable mirror 341 for leading light from an object to a solid-state image pickup device 304 through a decentered prism 302. The liquid crystal variable mirror 341 is formed by filling a twisted nematic liquid crystal material 343 between a split electrode 342 serving also as a curved surface mirror and a transparent electrode 344. The helical pitch P of the twisted nematic liquid crystal material 343 satisfies $P<5\lambda,$ where λ, is the wavelength of light, which is equal to about 380 nm to about 700 nm in the case of visible light.

When the twisted nematic liquid crystal material 343 satisfies the above condition, the refractive index becomes approximately isotropic independently of the polarization direction of the incident light and changes according to the applied voltage. Therefore, it is possible to freely change the direction of reflection for each position in the surface of the curved surface mirror 342. Accordingly, it is possible to obtain an action similar to that of the variable-configuration mirror 303.

Although in the foregoing description the variable-configuration mirror or variable-refractive-index mirror according to this invention is used for focus adjustment and correction of aberration variations caused by zooming and for compensation for variations in optical performance caused by changes in temperature and humidity and also for compensation for manufacturing errors of optical elements, it is also similarly usable for diopter adjustment, correction of assembling errors of the optical system, hand-shake correction, etc.

The above-described decentered optical system according to this invention can be used as an optical system of a head-mounted image display apparatus, for example. Examples of such image display apparatus will be described below.

First, FIG. 74 shows a head-mounted image display apparatus arranged for two eyes in a state where the image display apparatus is fitted on an observer's head, and FIG. 75 is a sectional view of the image display apparatus. In this arrangement, as shown in FIG. 75, the decentered optical system according to this invention is used as an ocular optical system 100. A pair of combinations of an ocular optical system 100, a liquid crystal display device 10 and a backlight 101 are prepared for the right and left, respectively, and supported apart from each other by the interpupillary distance, thereby forming a stationary or portable image display apparatus 102, such as a head-mounted image display apparatus, which enables the observer to see with both eyes.

More specifically, a decentered optical system comprising a decentered prism 302 and a variable-configuration mirror 303 as stated above is disposed in the display apparatus body unit 102. The decentered prism 302 has a first surface 321 facing the liquid crystal display device 310, a second surface 322 facing an observer's eyeball, and a third surface 323 provided at a side remote from the observer's eyeball. The variable-configuration mirror 303 is positioned outside the third surface 323. A light beam from the liquid crystal display device 310 enters the prism 302 through the first surface 321 and is once totally reflected by the second surface 322. Then, the light beam is refracted by the third surface 323 to come out of the prism 302 once so as to be incident on the variable-configuration mirror 303. The light beam is reflected by the variable-configuration mirror 303 to reenter the prism 302 through the third surface 323. The light beam is refracted by the second surface 322 this time to exit from the prism 302. Thus, the light beam projects the display image of the liquid crystal display device 310 as an enlarged image in the observer's eyeball placed at the exit pupil position. In this case, the surface configuration of the variable-configuration mirror 303 is changed to compensate for variations in optical performance caused by changes in temperature and humidity, compensate for manufacturing errors of optical elements, or perform diopter adjustment.

Thus, the decentered optical system comprising a decentered prism 302 and the variable-configuration mirror 303 is used as an ocular optical system 100, and a pair of such ocular optical systems 100 are provided for the right and left, respectively. Liquid crystal display devices 10 are disposed in the respective image planes of the two ocular optical systems 100. As shown in FIG. 74, the display apparatus body unit 102 is provided with temporal frames 103 that are contiguous with the left and right ends thereof so that the display apparatus body unit 102 can be held in front of the observer's eyes. As shown in FIG. 75, to protect the second surface 322 of the decentered prism 10 in the ocular optical system 100 of each image display apparatus 102, a cover member 399 is placed between the exit pupil of the ocular optical system 100 and the second surface 322. As the cover member 399, any of a plane-parallel plate, a positive lends and a negative lens can be used.

Further, a speaker 104 is provided on each temporal frame 103 to enable the user to enjoy listening to stereophonic sound in addition to image observation. The display apparatus body unit 102 having the speakers 104 is connected with a replaying unit 106, e.g. a portable video cassette unit, through an image and sound transmitting cord 105. Therefore, the observer can enjoy not only observing an image but also listening to sound with the replaying unit 106 retained on a desired position, e.g. a belt, as illustrated in the figure. Reference symbol 107 in FIG. 74 denotes a switch and volume control part of the replaying unit 106. It should be noted that the display apparatus body unit 102 contains electronic parts such as image and sound processing circuits.

It should be noted that the cord 105 may have a jack and plug arrangement attached to the distal end thereof so that the cord 105 can be detachably connected to an existing video deck. The cord 105 may also be connected to a TV signal receiving tuner so as to enable the user to enjoy watching TV. Alternatively, the cord 105 may be connected to a computer to receive computer graphic images or message images or the like from the computer. To eliminate the bothersome cord, the image display apparatus may be arranged to receive external radio signals through an antenna connected thereto.

The viewing optical system according to this invention may also be used in a head-mounted image display apparatus for a single eye by placing the ocular optical system in front of either of the left and right eyes. FIG. 76 shows the head-mounted image display apparatus for a single eye in a state where it is fitted on an observer's head (in this case, the apparatus is fitted for the left eye). In this arrangement, a display apparatus body unit 102 includes a single combination of an ocular optical system 100 and a liquid crystal display device 10. The display apparatus body unit 102 is mounted on a front frame 108 so as to lie in front of the associated eye of the observer. As shown in the figure, the front frame 108 is provided with temporal frames 103 that are contiguous with the left and right ends thereof so that the display apparatus body unit 102 can be held in front of one eye of the observer. The arrangement of the rest of the apparatus is the same as in the case of FIG. 74. Therefore, a description thereof is omitted.

To allow focus adjustment by using the variable-configuration mirror according to this invention, the optical system may be arranged, for example, as an optical apparatus having a device for measuring the distance to a subject, a variable-configuration mirror capable of controlling the reflecting surface configuration so that the focus position is optimized on the image pickup surface according to the subject distance, and a reflecting optical system having at least one rotationally asymmetric surface.

More preferably, the optical system may be arranged, for example, as an optical apparatus having a device for measuring the distance to a subject, a storage unit for storing optimum reflecting surface configurations according to the distance to the subject, a variable-configuration mirror capable of changing the configuration into any of the reflecting surface configurations stored in the storage unit, and a reflecting optical system having at least one rotationally asymmetric surface.

To reduce degradation in optical performance due to manufacturing errors or assembling errors of the optical system, the optical system may be arranged, for example, as an optical apparatus having a variable-configuration mirror capable of controlling the configuration of a reflecting surface, a storage unit for storing surface configuration changes for correcting degradation in optical performance caused by manufacturing errors and assembling errors of a decentered prism, and a reflecting optical system having at least one rotationally asymmetric surface.

To reduce degradation in optical performance due to environmental conditions, e.g. temperature and humidity, the optical system may be arranged, for example, as an optical apparatus having a variable-configuration mirror, a storage unit for storing configuration changes for correcting degradation in optical performance caused by environmental conditions, e.g. temperature and humidity, a temperature sensor and humidity sensor for measuring environmental conditions at the time of photographing, and a reflecting optical system having at least one rotationally asymmetric surface.

To suppress variations in aberrational condition between zoom positions so as to provide a favorable aberrational condition at each zoom position, the optical system may be arranged, for example, as a zoom optical system having a variable-configuration mirror, a storage unit for storing a surface configuration of the variable-configuration mirror for providing an optimum aberrational condition for each zoom position, and a reflecting optical system having at least one rotationally asymmetric surface.

The above-described decentered optical system according to the third invention in the present invention can be arranged, for example, as follows:

[1] A decentered optical system having at least one reflecting surface with a rotationally asymmetric surface configuration, which is characterized by including an active reflecting optical element capable of changing the direction of reflection for each position in the reflecting surface.

[2] A decentered optical system as stated in the above paragraph 1, which is characterized in that the active reflecting optical element constitutes at least one reflecting surface of the decentered optical system.

[3] A decentered optical system as stated in the above paragraph 1 or 2, which is characterized in that the active reflecting optical element is a variable-configuration mirror capable of changing the surface configuration.

[4] A decentered optical system as stated in the above paragraph 3, which is characterized in that when the maximum amount of change in mirror configuration of the variable-configuration mirror is denoted by $\Delta\mu_{max}$, the following condition is satisfied:

$$0.0001 < \Delta\mu_{max} < 10 \text{(mm)} \tag{1}$$

[5] A decentered optical system as stated in the above paragraph 1 or 2, which is characterized in that the active reflecting optical element is a variable-refractive-index mirror capable of freely changing the refractive index of an optical medium in the vicinity of the entrance side of the reflecting surface.

[6] A decentered optical system as stated in any one of the above paragraphs 1 to 5, which is characterized in that the mirror surface of the active reflecting optical element has a rotationally asymmetric surface configuration for correcting rotationally asymmetric aberrations produced by the mirror surface.

[7] A decentered optical system as stated in any one of the above paragraphs 1 to 6, which is characterized in that when the optical path length of the axial principal ray from the optical functional surface previous to the active reflecting optical element to the reflecting surface of the active reflecting optical element is denoted by $\Delta L_f$ and the optical path length of the axial principal ray from the reflecting surface of the active reflecting optical element to the optical functional surface subsequent to the active reflecting optical element is denoted by $\Delta L_b$, at least either one of the following conditions is satisfied:

$$0.001 < \Delta L_f < 1000 \text{(mm)} \tag{2}$$

$$0.001 < \Delta L_b < 1000 \text{(mm)} \tag{3}$$

[8] A decentered optical system as stated in any one of the above paragraphs 1 to 7, which is characterized by having an optical element, wherein the active reflecting optical element is disposed adjacently to one exit surface of the optical element, and when the angle formed between a line normal to the exit surface at a position where an emergent ray exits from the exit surface and the ray inside the optical element is denoted by $\theta_{ex}$ and the angle formed between a line normal to the exit surface at a position where a ray reflected from the active reflecting optical element is incident on the exit surface and the ray outside the optical element is denoted by $\theta_{in}$ and further the refractive index of the medium of the optical element is denoted by n and the refractive index of a medium contacting the optical element is denoted by n', at least either one of the following conditions is satisfied:
when n>n', $$0 \leq \sin\theta_{ex} < n'/n \tag{4}$$

when n<n', $$0 \leq \sin\theta_{in} < n/n' \tag{5}$$

[9] A decentered optical system as stated in the above paragraph 8, which is characterized in that the active reflecting optical element is a variable-configuration mirror capable of freely changing the surface configuration, and the space between the exit surface and the variable-configuration mirror is filled with a transparent fluid.

[10] A decentered optical system as stated in any one of the above paragraphs 1 to 9, which is characterized in that when the angle formed between the axial principal ray incident on the active reflecting optical element and a line normal to the reflecting surface of the active reflecting optical element at a position where the axial principal ray intersects the reflecting surface is denoted by $\phi$, the following condition is satisfied:

$$1° < \phi < 85° \tag{6}$$

[11] A decentered optical system as stated in any one of the above paragraphs 1 to 10, which is characterized in that focus adjustment is effected by the active reflecting optical element.

[12] A decentered optical system as stated in any one of the above paragraphs 1 to 10, which is characterized in that diopter adjustment is effected by the active reflecting optical element.

[13] A decentered optical system as stated in any one of the above paragraphs 1 to 10, which is characterized in that aberration variations caused by zooming is corrected by the active reflecting optical element.

[14] A decentered optical system as stated in any one of the above paragraphs 1 to 10, which is characterized in that a change in optical performance caused by a change in temperature or humidity is corrected by the active reflecting optical element.

[15] A decentered optical system as stated in any one of the above paragraphs 1 to 10, which is characterized in that a manufacturing error of a constituent optical element or the optical system is compensated for by the active reflecting optical element.

[16] A decentered optical system as stated in any one of the above paragraphs 1 to 10, which is characterized in that a hand shake of the optical system is corrected by the active reflecting optical element.

[17] An optical apparatus characterized by having a decentered optical system as stated in any one of the above paragraphs 1 to 16.

As will be clear from the foregoing description, because the third invention includes an active reflecting optical element capable of changing the direction of reflection for each position in the reflecting surface, it is possible to perform, with a simple arrangement, focus adjustment and diopter adjustment of the decentered reflecting optical system, correction of aberration variations caused by zooming, compensation for variations in optical performance caused by changes in temperature and humidity, compensation for manufacturing errors of optical elements, hand-shake correction, etc.

What we claim is:

1. A decentered optical system comprising, at least, a front optical surface and a variable optical surface, which are disposed along a direction in which a light beam travels;

said front optical surface being a reflecting surface reflecting the light beam obliquely incident thereon in an oblique direction;

said variable optical surface being formed by an active reflecting optical element that reflects the light beam obliquely incident thereon in an oblique direction and changes a configuration of a reflecting surface thereof to change a focal length;

wherein a driving member drives said active reflecting optical element so that the configuration of the reflecting surface thereof is changed;

wherein, when driven by said driving member, said active reflecting optical element changes the configuration of the reflecting surface into a rotationally asymmetric curved surface configuration that corrects rotationally asymmetric decentration aberrations produced by the light beam obliquely incident thereon; and wherein when an optical path length of an axial principal ray from said front optical surface to the variable optical surface of said active reflecting optical element is denoted by $\Delta L_f$, the following condition (2) is satisfied:

$$0.001 < \Delta L_f < 1000 \text{(mm)} \tag{2}$$

2. A decentered optical system comprising, at least, a variable optical surface and a rear optical surface, which are disposed along a direction in which a light beam travels;

said rear optical surface being a reflecting surface reflecting the light beam obliquely incident thereon in an oblique direction;

said variable optical surface being formed by an active reflecting optical element that reflects the light beam obliquely incident thereon in an oblique direction and changes a configuration of a reflecting surface thereof to change a focal length;

wherein a driving member drives said active reflecting optical element so that the configuration of the reflecting surface thereof is changed;

wherein, when driven by said driving member, said active reflecting optical element changes the configuration of the reflecting surface into a rotationally asymmetric curved surface configuration that corrects rotationally asymmetric decentration aberrations produced by the light beam obliquely incident thereon; and wherein when an optical path length of an axial principal ray from the variable optical surface of said active reflecting optical element to said rear optical surface is denoted by $\Delta L_b$, the following condition (3) is satisfied:

$$0.001 < \Delta L_b < 1000 \text{(mm)} \tag{3}$$

3. A decentered optical system comprising, at least, a front optical surface and a variable optical surface, which are disposed along a direction in which a light beam travels;

said front optical surface being a transmitting surface transmitting the light beam;

said variable optical surface being formed by an active reflecting optical element that reflects the light beam obliquely incident thereon in an oblique direction and changes a configuration of a reflecting surface thereof to change a focal length;

wherein a driving member drives said active reflecting optical element so that the configuration of the reflecting surface thereof is changed;

wherein, when driven by said driving member, said active reflecting optical element changes the configuration of the reflecting surface into a rotationally asymmetric curved surface configuration that corrects rotationally asymmetric decentration aberrations produced by the light beam obliquely incident thereon; and wherein when an optical path length of an axial principal ray from said front optical surface to said variable optical surface is denoted by $\Delta L_f$, the following condition (2) is satisfied:

$$0.001 < \Delta L_f < 1000 \text{(mm)} \tag{2}$$

4. A decentered optical system comprising, at least, a variable optical surface and a rear optical surface, which are disposed along a direction in which a light beam travels;

said rear optical surface being a transmitting surface transmitting the light beam;

said variable optical surface being formed by an active reflecting optical element that reflects the light beam obliquely incident thereon in an oblique direction and changes a configuration of a reflecting surface thereof to change a focal length;

wherein a driving member drives said active reflecting optical element so that the configuration of the reflecting surface thereof is changed;

wherein, when driven by said driving member, said active reflecting optical element changes the configuration of the reflecting surface into a rotationally asymmetric curved surface configuration that corrects rotationally asymmetric decentration aberrations produced by the light beam obliquely incident thereon; and wherein when an optical path length of an axial principal ray from the variable optical surface of said active reflecting optical element to said rear optical surface is denoted by $\Delta L_b$, the following condition (3) is satisfied:

$$0.001 < \Delta L_b < 1000 \text{(mm)} \tag{3}$$

5. A decentered optical system comprising, at least, a front optical surface, a variable optical surface, and a rear optical surface, which are disposed along a direction in which a light beam travels;

said front optical surface and said rear optical surface being provided on a prism member;

said front optical surface being an exit surface through which the light beam exits from an inside of said prism member to an outside thereof;

said variable optical surface being formed by an active reflecting optical element that reflects the light beam obliquely incident thereon in an oblique direction and changes a configuration of a reflecting surface thereof to change a focal length;

said rear optical surface being an entrance surface through which the light beam reflected from said active reflecting optical element enters said prism member;

wherein a driving member drives said active reflecting optical element so that the configuration of the reflecting surface thereof is changed;

wherein, when driven by said driving member, said active reflecting optical element changes the configuration of the reflecting surface into a rotationally asymmetric curved surface configuration that corrects rotationally asymmetric decentration aberrations produced by the light beam obliquely incident thereon; and wherein when an angle formed between a line normal to said front optical surface at a position where an optical axis exits from said exit surface and the optical axis leading to said exit surface within said prism member is denoted by $\theta_{ex}$, and a refractive index of a medium of said prism member is denoted by n, and further a refractive index of a medium between said prism member and said active reflecting optical element is denoted by n', the condition of n>n' is satisfied, and further the following condition (4) is satisfied:

$$0 \leq \sin \theta_{ex} < n'/n \tag{4}$$

6. A decentered optical system comprising, at least, a front optical surface, a variable optical surface, and a rear optical surface, which are disposed along a direction in which a light beam travels;

said front optical surface and said rear optical surface being provided on a prism member;

said front optical surface being an exit surface through which the light beam exits from an inside of said prism member to an outside thereof;

said variable optical surface being formed by an active reflecting optical element that reflects the light beam obliquely incident thereon in an oblique direction and changes a configuration of a reflecting surface thereof to change a focal length;

said rear optical surface being an entrance surface through which the light beam reflected from said active reflecting optical element enters said prism member;

wherein a driving member drives said active reflecting optical element so that the configuration of the reflecting surface thereof is changed;

wherein, when driven by said driving member, said active reflecting optical element changes the configuration of the reflecting surface into a rotationally asymmetric curved surface configuration that corrects rotationally asymmetric decentration aberrations produced by the light beam obliquely incident thereon; and wherein when an angle formed between a line normal to said entrance surface at a position where an optical axis reflected from said active reflecting optical element is incident on said entrance surface and the optical axis leading to said entrance surface outside said prism member is denoted by $\theta_{in}$, and a refractive index of a medium of said prism member is denoted by n, and further a refractive index of a medium between said prism member and said active reflecting optical element is denoted by n', the condition of n<n' is satisfied, and further the following condition (5) is satisfied:

$$0 \leq \sin \theta_{in} < n/n' \qquad (5).$$

7. A decentered optical system according to any one of claims 1 to 4, wherein said driving member continuously changes an amount of change in the focal length caused by varying the surface configuration of said active reflecting optical element, thereby providing a zooming function.

8. A decentered optical system according to any one of claims 1 to 4, wherein said driving member stepwisely changes an amount of change in the focal length caused by varying the surface configuration of said active reflecting optical element, thereby allowing a plurality of focal lengths to be switched from one to another.

9. A decentered optical system according to any one of claims 1 to 4, wherein said driving member changes the focal length by varying the surface configuration of said active reflecting optical element.

10. A decentered optical system according to any one of claims 1 to 4, wherein said active reflecting optical element is a variable-configuration mirror member capable of changing a mirror configuration.

11. A decentered optical system according to claim 10, wherein when a maximum amount of change in the mirror configuration of said variable-configuration mirror member is denoted by $\Delta\mu_{max}$, the following condition is satisfied:

$$0.0001 < \Delta\mu_{max} < 10 \text{(mm)} \qquad (1).$$

12. A decentered optical system as claimed in claims 5 or 6, wherein when an angle formed between an axial principal ray incident on said active reflecting optical element and a line normal to the reflecting surface of said active reflecting optical element at a position where the axial principal ray intersects the reflecting surface is denoted by o, the following condition is satisfied:

$$1° < \phi < 85° \qquad (6).$$

13. A decentered optical system as claimed in any one of claims 1 to 4, 5 and 6, wherein focus adjustment or diopter adjustment is effected by said active reflecting optical element.

14. A decentered optical system as claimed in any one of claims 1 to 4, 5 and 6, wherein zooming or correction of aberration variations caused by zooming is effected by said active reflecting optical element.

15. A decentered optical system according to claim 3, wherein said front optical surface is provided on a prism member.

16. A decentered optical system according to claim 4, wherein said rear optical surface is provided on a prism member.

17. An image-forming optical system comprising:

said decentered optical system according to claims 1 or 3;

an aperture stop positioned in front of said front optical surface; and an image pickup device positioned behind said variable optical surface;

wherein said decentered optical system forms an object image on a light-receiving surface of said image pickup device.

18. An image-forming optical system comprising:

said decentered optical system according to claims 2 or 4;

an aperture stop positioned in front of said variable optical surface; and an image pickup device positioned behind said rear optical surface;

wherein said decentered optical system forms an object image on a light-receiving surface of said image pickup device.

19. A viewing optical system comprising:

said decentered optical system according to claims 1 or 3;

an image forming device positioned in front of said front optical surface; and an optical pupil position formed behind said variable optical surface;

wherein said decentered optical system leads an observation image formed by said image forming device to said optical pupil position, thereby allowing an observer placing an eyeball at said optical pupil position to view said observation image.

20. A viewing optical system comprising:

said decentered optical system according to claims 2 or 4;

an image forming device positioned in front of said variable optical surface; and an optical pupil position formed behind said rear optical surface;

wherein said decentered optical system leads an observation image formed by said image forming device to said optical pupil position, thereby allowing an observer placing an eyeball at said optical pupil position to view said observation image.

* * * * *